United States Patent
Chen et al.

(10) Patent No.: US 12,553,152 B2
(45) Date of Patent: Feb. 17, 2026

(54) LIBRARY CONSTRUCTION METHOD FOR DETECTING ENDOMETRIAL CANCER-RELATED GENE MUTATIONS BASED ON HIGH-THROUGHPUT SEQUENCING

(71) Applicant: XIAMEN SPACEGEN CO., LTD., Fujian (CN)

(72) Inventors: Zhihong Chen, Fujian (CN); Bing Xiao, Fujian (CN); Yan Chen, Fujian (CN); Cankun Kang, Fujian (CN)

(73) Assignee: XIAMEN SPACEGEN CO., LTD, Xiamen (CN)

( * ) Notice: Subject to any disclaimer, the term of this patent is extended or adjusted under 35 U.S.C. 154(b) by 1226 days.

(21) Appl. No.: 17/430,315

(22) PCT Filed: Oct. 30, 2020

(86) PCT No.: PCT/CN2020/125277
§ 371 (c)(1),
(2) Date: Aug. 11, 2021

(87) PCT Pub. No.: WO2022/067938
PCT Pub. Date: Apr. 7, 2022

(65) Prior Publication Data
US 2022/0307016 A1    Sep. 29, 2022

(30) Foreign Application Priority Data

Sep. 30, 2020  (CN) .......................... 202011059870.5

(51) Int. Cl.
*C40B 50/06*     (2006.01)
(52) U.S. Cl.
CPC .................................. *C40B 50/06* (2013.01)

(58) Field of Classification Search
None
See application file for complete search history.

(56) References Cited

U.S. PATENT DOCUMENTS

2020/0319191 A1*  10/2020  Spetzler ........... G01N 33/57407

FOREIGN PATENT DOCUMENTS

| CN | 105332063 A | 2/2016 |
|---|---|---|
| CN | 106591957 A | 4/2017 |

(Continued)

OTHER PUBLICATIONS

"DNA", Chin J Obstet Gynecol, Dec. 2019, vol. 54, No. 12.

(Continued)

*Primary Examiner* — Christian C Boesen

(57) ABSTRACT

The present disclosure discloses a library construction method for detecting endometrial cancer-related gene mutations based on high-throughput sequencing, and belongs to the field of biotechnology. The method can detect the mutation types of endometrial cancer-related genes MSH2, PMS2, MLH1, MSH6 EPCAM, TP53, POLE, and PTEN in surgically removed fresh pathological tissues, formaldehyde-fixed and paraffin-embedded pathological tissues, paraffin sections, and specimens of whole blood, plasma, serum, and pleural effusion, etc. It may be used for multiple target sequences in a single tube to quickly complete the library construction. The entire library construction process only takes 3 hours, and the manual operation only needs 30 minutes. Combined with high-throughput sequencing, the platform may effectively solve the current difficulty in the detection of somatic multi-gene all-exon mutations in clinical endometrial cancer samples based on small numbers of clinical samples, and the cost is low.

6 Claims, 4 Drawing Sheets

Specification includes a Sequence Listing.

Migration time (minute)

(56) References Cited

FOREIGN PATENT DOCUMENTS

| | | |
|---|---|---|
| CN | 106755501 A | 5/2017 |
| CN | 106939337 A | 7/2017 |
| CN | 107312822 A | 11/2017 |
| WO | 2016/141169 A1 | 9/2016 |

OTHER PUBLICATIONS

Sing, et al., "Targeted sequencing of genes associated with the mismatch repair pathway in patients with endometrial cancer", PLOS One, https://doi.org/10.1371/journal.pone.0235613, Jul. 7, 2020.

Office Action dated Jan. 26, 2021 issued in Chinese Application No. 202011059870.8.

\* cited by examiner

Statistics of raw data

| Percentage of Q30 bases of the raw reads:93.34% | Total number of the raw reads: 1,131,524 | Percentage of the alignable reads: 94.28% |
|---|---|---|
| Percentage of the amplicons: 92.52% | Average depth of amplicons: 2,933 | Homogeneity of the amplicons:: 91.04% |

| Gene name | Transcript | Base variation | Amino acid variation | Variation frequency | Variation level |
|---|---|---|---|---|---|
| EPCAM | NM_002354:exon3 | c.344T>C | p.Met115Thr | 99.78% | Benign/Likely_benign |
| PMS2 | NM_000535:exon11 | c.1621A>G | p.Lys541Glu | 99.86% | Benign |
| PMS2 | NM_000535:exon11 | c.1408C>T | p.Pro470Ser | 50.83% | Benign |
| PTEN | NM_000314:UTR5 | c.-9C>G | -- | 79.35% | Benign |
| PTEN | NM_000314:exon5 | c.397G>A | p.Val133Ile | 41.06% | Pathogenic |
| POLE | NM_006231:exon34 | c.4337_4338del | p.Val1446fs | 6.07% | VUS |
| POLE | NM_006231:exon8 | c.755C>T | p.Ala252Val | 55.44% | Benign |
| TP53 | NM_000546:exon4 | c.215C>G | p.Pro72Arg | 99.63% | drug_response |

FIG. 4

LIBRARY CONSTRUCTION METHOD FOR DETECTING ENDOMETRIAL CANCER-RELATED GENE MUTATIONS BASED ON HIGH-THROUGHPUT SEQUENCING

CROSS REFERENCE TO RELATED APPLICATION

This is a National Phase Application filed under 35 U.S.C. 371 as a national stage of PCT/CN2020/125277, filed Oct. 30, 2020, an application claiming the benefit of Chinese Application No. 202011059870.8, filed Sep. 30, 2020, the content of each of which is hereby incorporated by reference in its entirety.

TECHNICAL FIELD

The present disclosure belongs to the field of biotechnology, and in particular relates to a library construction method for detecting endometrial cancer-related gene mutations based on high-throughput sequencing.

BACKGROUND ART

Endometrial cancer is a group of epithelial malignant endometrial cancers that occur in the endometrium, which occurs in perimenopausal and postmenopausal women. Endometrial cancer is one of the most common endometrial cancers of the female reproductive system. There are close to 200,000 new cases each year, and it is the third most common gynecological malignant endometrial cancer that causes death (second only to ovarian cancer and cervical cancer).

Although most endometrial cancers do not occur familiarly, about 3% of endometrial cancers are inherited. Among them, Lynch syndrome is the most common cause. Compared with people without the disease, people with Lynch syndrome are more likely to develop endometrial cancer, colorectal cancer, and other cancers. If a woman with endometrial cancer is found to have Lynch syndrome, her chances of developing colorectal cancer will be much higher. Because Lynch syndrome is hereditary, the information of which is important to family members, it is especially important for patients with endometrial cancer to determine whether they have Lynch syndrome.

Lynch syndrome is a highly penetrant syndrome that is inherited in an autosomal dominant manner with genetic predisposition, and it is caused by a monoallelic germline mutation in a mismatch repair gene (especially MLH1, MSH2, MSH6 or PMS2), or by the epigenetic silencing of the adjacent MSH2 gene due to the germline deletion in EPCAM. Approximate 2-6% of endometrial cancers belong to Lynch syndrome; TP53 is the most commonly mutated gene in human cancers, and germline mutations occur in Li-Fraumeni syndrome, a cancer predisposition syndrome; Cowden syndrome is kind of disease that is caused by PTEN germline mutations, and the susceptibility of mutation carriers to endometrial cancer is increased. POLE mutations in endometrial cancer result in under-corrected patients showing a better prognosis.

Currently, the commonly adopted method to detect endometrial cancer-related genes MSH2, PMS2, MLH1, MSH6, EPCAM, TP53, POLE, and PTEN is to use Sanger sequencing method, that is, designing the primers of these genes, and then sequencing the gene sequence in different sections to analyze whether there are mutations. Because the length of the genetic sequences of these 8 genes are relatively long, at least 200 amplification tubes are required for separate amplification and sequencing when detecting by Sanger sequencing method, which leads to a large sample size, heavy workload for operators, long time to complete the detection, and high cost of sequencing for each sample. Therefore, there is an urgent need for a method that is not only efficient but also capable of simultaneously detecting the eight genes mentioned above.

SUMMARY

In order to solve the above technical problems, the present disclosure provides a library construction method for detecting endometrial cancer-related gene mutations based on high-throughput sequencing.

The library construction method provided by the present disclosure is used to qualitatively detect the mutation status of the eight related genes MSH2, PMS2, MLH1, MSH6, EPCAM, TP53, POLE, and PTEN in specimens of paraffin section of tissues of Endometrial Cancer (EC) patients. The detection range covers the coding regions and exon-intron junction regions of these eight genes. It may analyze the molecular characteristics of endometrial cancer to assess family genetic risk, predict disease recurrence, and guide drug treatment. Moreover, this method only requires 10 ng of DNA sample volume, and the library construction is completed in a single tube. The operation may be simple and convenient. It only takes 3.5 hours to complete the library construction, which may greatly reduce the detection cost.

To achieve the above objectives, the present disclosure adopts the following technical solutions.

A library construction method for detecting endometrial cancer-related gene mutations based on high-throughput sequencing, which includes the following steps:

1. Designing multiple pairs of specific modified degenerate primers according to the wild-type gene sequence of all exons of 8 endometrial cancer-related genes (MSH2, PMS2, MLH1, MSH6, EPCAM, TP53, POLE, and PTEN). In primer design, the non-specificity caused by cross-linking between primers in the highly multiplexed PCR, and the uniformity difference caused by different amplification efficiency of each pair of primers should be taken into consideration. Therefore, the primer design of the present disclosure is completely different from that of the conventional PCR reaction, and it is more difficult.

The primer sequences SEQ ID NO. 1-759 of the 8 endometrial cancer-related genes designed by the present disclosure are shown in Table 1.

TABLE 1

Detection primers for 8 endometrial cancer-related genes

| Number | Primer name | | Sequence (5' to 3') |
|---|---|---|---|
| 1 | ill-EC-2-PMS2-01F | SEQ ID NO. 1 | TTTTTTTTATCACTTTTAAATGGGTGTGATGTGTA |
| 2 | ill-EC-2-PMS2-01R | SEQ ID NO. 2 | TTTTTTTTGACACATCGCCAACCTGG |
| 3 | ill-EC-1-PMS2-02F | SEQ ID NO. 3 | TTTTTTTTAGTTGAGAGTCTGAGGTCTGAAAAA |

TABLE 1-continued

Detection primers for 8 endometrial cancer-related genes

| Number | Primer name | | Sequence (5' to 3') |
|---|---|---|---|
| 4 | ill-EC-1-PMS2-02R | SEQ ID NO. 4 | TTTTTTTTTCAGGAAGTTTTGTGACACTTAGCT |
| 5 | ill-EC-2-PMS2-02F | SEQ ID NO. 5 | TTTTTTTTTTAAAGTAGATACAAGGTCTTGCTG |
| 6 | ill-EC-2-PMS2-02R | SEQ ID NO. 6 | TTTTTTTTAGCAGCACACCGTGCTC |
| 7 | ill-EC-1-PMS2-03F | SEQ ID NO. 7 | TTTTTTTTAAATCCCAGGTTAAACTGACCAATGA |
| 8 | ill-EC-1-PMS2-03R | SEQ ID NO. 8 | TTTTTTTTGGATGGCTAGGGACTTTATTTTGT |
| 9 | ill-EC-2-PMS2-03F | SEQ ID NO. 9 | TTTTTTTTAACTTTACCTTATCTCTTTTCTTAGTTC |
| 10 | ill-EC-2-PMS2-03R | SEQ ID NO. 10 | TTTTTTTTAAAGTTGTGCCCCTGGACT |
| 11 | ill-EC-1-PMS2-04F | SEQ ID NO. 11 | TTTTTTTTTCCCCTTCACTTTGCTGTG |
| 12 | ill-EC-1-PMS2-04R | SEQ ID NO. 12 | TTTTTTTTCTTTCCAGTTCTGACATTTGTC |
| 13 | ill-EC-2-PMS2-04F | SEQ ID NO. 13 | TTTTTTTTCATCAACCTGAGAGGCTGACAT |
| 14 | ill-EC-2-PMS2-04R | SEQ ID NO. 14 | TTTTTTTTGTGGACTGCCATTCAAACCA |
| 15 | ill-EC-1-PMS2-05F | SEQ ID NO. 15 | TTTTTTTTGTTGGCTGAGGCAAAACTCG |
| 16 | ill-EC-1-PMS2-05R | SEQ ID NO. 16 | TTTTTTTTGCAGTCACTGCAGCAGCG |
| 17 | ill-EC-2-PMS2-05F | SEQ ID NO. 17 | TTTTTTTTGGGAGCTGGCCGCATAC |
| 18 | ill-EC-2-PMS2-05R | SEQ ID NO. 18 | TTTTTTTTGCGTCCTGAGACCTCAGAAAG |
| 19 | ill-EC-1-PMS2-06F | SEQ ID NO. 19 | TTTTTTTTAGGGTCACTGGGTCCGT |
| 20 | ill-EC-1-PMS2-06R | SEQ ID NO. 20 | TTTTTTTTGCCTCACAGCCCAAAGACTC |
| 21 | ill-EC-2-PMS2-06F | SEQ ID NO. 21 | TTTTTTTTACCCCTTTTCTGTCCTAGAGG |
| 22 | ill-EC-2-PMS2-06R | SEQ ID NO. 22 | TTTTTTTTGCCCATGGTAGAAAAGCAGGA |
| 23 | ill-EC-1-PMS2-07F | SEQ ID NO. 23 | TTTTTTTTAAGGCCTCTCGCAGTCT |
| 24 | ill-EC-1-PMS2-07R | SEQ ID NO. 24 | TTTTTTTTCCATTTCAGGATAGTCCCTGACC |
| 25 | ill-EC-2-PMS2-07F | SEQ ID NO. 25 | TTTTTTTTAGGAAACACATTAGCTAAAAGCTT |
| 26 | ill-EC-2-PMS2-07R | SEQ ID NO. 26 | TTTTTTTTGAGGAAAGCTTTTGTTGGCAGTT |
| 27 | ill-EC-1-PMS2-08F | SEQ ID NO. 27 | TTTTTTTTGCTTGTTGACATCACTATCAAACA |
| 28 | ill-EC-1-PMS2-08R | SEQ ID NO. 28 | TTTTTTTTGCCTTAGAATGCGTTGATATCAATG |
| 29 | ill-EC-2-PMS2-08F | SEQ ID NO. 29 | TTTTTTTTTTTCCTCTTGTAGCAAAATTTGCCT |
| 30 | ill-EC-2-PMS2-08R | SEQ ID NO. 30 | TTTTTTTTAGAGTGAGACGCTGTCTGAAAATAAT |
| 31 | ill-EC-1-PMS2-09F | SEQ ID NO. 31 | TTTTTTTTTCTCATTCCAGTCATAGCAGAGC |
| 32 | ill-EC-1-PMS2-09R | SEQ ID NO. 32 | TTTTTTTTTCTGCAGACTCGTGAATGAGG |
| 33 | ill-EC-2-PMS2-09F | SEQ ID NO. 33 | TTTTTTTTTGGATACTGGTGTCGATTATACAT |
| 34 | ill-EC-2-PMS2-09R | SEQ ID NO. 34 | TTTTTTTTCTAAGAACATGCTGGTTGGTTAGA |
| 35 | ill-EC-1-PMS2-10F | SEQ ID NO. 35 | TTTTTTTTGCACAAAATAAGATAATGTTAAAGCC |
| 36 | ill-EC-1-PMS2-10R | SEQ ID NO. 36 | TTTTTTTTTTATCAACCGGCGGCCTT |
| 37 | ill-EC-2-PMS2-10F | SEQ ID NO. 37 | TTTTTTTTGTCAAAGGCATAAAGAACAAACT |
| 38 | ill-EC-2-PMS2-10R | SEQ ID NO. 38 | TTTTTTTTTCCTGCCCTTACCATATTAATGTTG |
| 39 | ill-EC-1-PMS2-11F | SEQ ID NO. 39 | TTTTTTTTAAAGAAAAACTGTCTGTCGTTGAA |
| 40 | ill-EC-1-PMS2-11R | SEQ ID NO. 40 | TTTTTTTTCACCTGGTGTTTTGTTTTCATTTCA |

TABLE 1-continued

Detection primers for 8 endometrial cancer-related genes

| Number | Primer name | | Sequence (5' to 3') |
|---|---|---|---|
| 41 | ill-EC-2-PMS2-11F | SEQ ID NO. 41 | TTTTTTTTACACGAAACTATTAGCCTTAGAAT |
| 42 | ill-EC-2-PMS2-11R | SEQ ID NO. 42 | TTTTTTTTCCTAGTGACTCCGTGTGTGAAG |
| 43 | ill-EC-1-PMS2-12F | SEQ ID NO. 43 | TTTTTTTTTCTCTTGCCAGCAATCTACTTACTA |
| 44 | ill-EC-1-PMS2-12R | SEQ ID NO. 44 | TTTTTTTTGTCCACTCTGTCTTTATTAGGAAG |
| 45 | ill-EC-2-PMS2-12F | SEQ ID NO. 45 | TTTTTTTTGACAATGGAAACCCGCTATAATC |
| 46 | ill-EC-2-PMS2-12R | SEQ ID NO. 46 | TTTTTTTTGTGTAAGTTGCACCAATCAGCTT |
| 47 | ill-EC-1-PMS2-13F | SEQ ID NO. 47 | TTTTTTTTCAAACACAGAGCCGATATTTT |
| 48 | ill-EC-1-PMS2-13R | SEQ ID NO. 48 | TTTTTTTTTTTAAACAGGAGTATGCCAAAATG |
| 49 | ill-EC-2-PMS2-13F | SEQ ID NO. 49 | TTTTTTTTCACGGATGCCTGCTGAAATGA |
| 50 | ill-EC-2-PMS2-13R | SEQ ID NO. 50 | TTTTTTTTCCTTGATTTGTGCGATGATGTGAG |
| 51 | ill-EC-1-PMS2-14F | SEQ ID NO. 51 | TTTTTTTTCCTTATGGCGCACAGGTAGT |
| 52 | ill-EC-1-PMS2-14R | SEQ ID NO. 52 | TTTTTTTTGCATCGGCGAAGGTTGGA |
| 53 | ill-EC-2-PMS2-14F | SEQ ID NO. 53 | TTTTTTTTGGGTTTTCTGGATAATTTTCCCATTG |
| 54 | ill-EC-2-PMS2-14R | SEQ ID NO. 54 | TTTTTTTTAGTGCCCAACATCATGGGT |
| 55 | ill-EC-1-PMS2-15F | SEQ ID NO. 55 | TTTTTTTTAAGTTGAGATGTTGAGATAGAAAAC |
| 56 | ill-EC-1-PMS2-15R | SEQ ID NO. 56 | TTTTTTTTTGCCGACCTAACTCAGGTT |
| 57 | ill-EC-2-PMS2-15F | SEQ ID NO. 57 | TTTTTTTTTGTATCACCTCAGTGCACAAAGT |
| 58 | ill-EC-2-PMS2-15R | SEQ ID NO. 58 | TTTTTTTTTCATGTATATTTTGTTGTTATAGCACT |
| 59 | ill-EC-1-PMS2-16F | SEQ ID NO. 59 | TTTTTTTTTGTTTTGCATTTCCCAAGACAGT |
| 60 | ill-EC-1-PMS2-16R | SEQ ID NO. 60 | TTTTTTTTAGCTTAAGGACTATGGAGTGGATCTT |
| 61 | ill-EC-2-PMS2-16F | SEQ ID NO. 61 | TTTTTTTTAGGATTAGAAAAAGTCAACTTACTTAA |
| 62 | ill-EC-2-PMS2-16R | SEQ ID NO. 62 | TTTTTTTTAAAAACTGATAGCATGGGTCCGT |
| 63 | ill-EC-1-PMS2-17F | SEQ ID NO. 63 | TTTTTTTTCAATAACAAATGTTTCTTAACTACAAC |
| 64 | ill-EC-1-PMS2-17R | SEQ ID NO. 64 | TTTTTTTTCAGATTTGCTCTGGGCAGG |
| 65 | ill-EC-2-PMS2-17F | SEQ ID NO. 65 | TTTTTTTTAGACTCAGTACCACCTGCC |
| 66 | ill-EC-2-PMS2-17R | SEQ ID NO. 66 | TTTTTTTTTATTTACAGTGTTGAGTCATTTCCC |
| 67 | ill-EC-1-PMS2-18F | SEQ ID NO. 67 | TTTTTTTTGGAATGCCGTGGGTCTCAA |
| 68 | ill-EC-1-PMS2-18R | SEQ ID NO. 68 | TTTTTTTTCTGGAGGGAACTTTCCCAGTC |
| 69 | ill-EC-2-TP53-01F | SEQ ID NO. 69 | TTTTTTTTCTATTGCAAGCAAGGGTTCAAAGA |
| 70 | ill-EC-2-TP53-01R | SEQ ID NO. 70 | TTTTTTTTTCAGTCTACCTCCCGCCATAAAA |
| 71 | ill-EC-1-TP53-02F | SEQ ID NO. 71 | TTTTTTTTGGGAACAAGAAGTGGAGAATGTCA |
| 72 | ill-EC-1-TP53-02R | SEQ ID NO. 72 | TTTTTTTTTCTCACTCATGTGATGTCATCTCTCC |
| 73 | ill-EC-2-TP53-02F | SEQ ID NO. 73 | TTTTTTTTAGACTGACCCTTTTTGGACTTCAG |
| 74 | ill-EC-2-TP53-02R | SEQ ID NO. 74 | TTTTTTTTGGCCACCATCTTGATTTGAATTCC |
| 75 | ill-EC-1-TP53-03F | SEQ ID NO. 75 | TTTTTTTTATGAAGGCAGGATGAGAATGGAATC |
| 76 | ill-EC-1-TP53-03R | SEQ ID NO. 76 | TTTTTTTTTCGAGATGTTCCGAGAGCTGAAT |
| 77 | ill-EC-2-TP53-03F | SEQ ID NO. 77 | TTTTTTTTGCCTGGGCATCCTTGAGT |
| 78 | ill-EC-2-TP53-03R | SEQ ID NO. 78 | TTTTTTTTTGTTGCTTTTGTACCGTCATAAAGTC |

TABLE 1-continued

Detection primers for 8 endometrial cancer-related genes

| Number | Primer name | | Sequence (5'to3') |
|---|---|---|---|
| 79 | ill-EC-1-TP53-04F | SEQ ID NO. 79 | TTTTTTTTCTAGGCTAAGCTATGATGTTCCTT |
| 80 | ill-EC-1-TP53-04R | SEQ ID NO. 80 | TTTTTTTTAGAGCATGAAAATGGTTCTATGAC |
| 81 | ill-EC-2-TP53-04F | SEQ ID NO. 81 | TTTTTTTTCGACGAGTTTATCAGGAAGTAACAC |
| 82 | ill-EC-2-TP53-04R | SEQ ID NO. 82 | TTTTTTTTTGGTTGTAGCTAACTAACTTCA |
| 83 | ill-EC-1-TP53-05F | SEQ ID NO. 83 | TTTTTTTTGCATTTTGAGTGTTAGACTGGA |
| 84 | ill-EC-1-TP53-05R | SEQ ID NO. 84 | TTTTTTTTCCTCAGATTCACTTTTATCACCTT |
| 85 | ill-EC-2-TP53-05F | SEQ ID NO. 85 | TTTTTTTTAGGGTGAAATATTCTCCATCCA |
| 86 | ill-EC-2-TP53-05R | SEQ ID NO. 86 | TTTTTTTTAGCACTAAGCGAGGTAAGCAAG |
| 87 | ill-EC-1-TP53-06F | SEQ ID NO. 87 | TTTTTTTTTCTGAGGCATAACTGCACCCT |
| 88 | ill-EC-1-TP53-06R | SEQ ID NO. 88 | TTTTTTTTACAGCTTTGAGGTGCGTGTTT |
| 89 | ill-EC-2-TP53-06F | SEQ ID NO. 89 | TTTTTTTTCCCTTTCTTGCGGAGATTCTCT |
| 90 | ill-EC-2-TP53-06R | SEQ ID NO. 90 | TTTTTTTTTTAAATGGGACAGGTAGGACCTG |
| 91 | ill-EC-1-TP53-07F | SEQ ID NO. 91 | TTTTTTTTAGAGGTGGATGGGTAGTAGTATGG |
| 92 | ill-EC-1-TP53-07R | SEQ ID NO. 92 | TTTTTTTTGCATGGGCGGCATGAAC |
| 93 | ill-EC-2-TP53-07F | SEQ ID NO. 93 | TTTTTTTTGCTCCTGACCTGGAGTCTTC |
| 94 | ill-EC-2-TP53-07R | SEQ ID NO. 94 | TTTTTTTTGCCACAGGTCTCCCCAAGG |
| 95 | ill-EC-1-TP53-08F | SEQ ID NO. 95 | TTTTTTTTCCACTGACAACCACCCTTAACC |
| 96 | ill-EC-1-TP53-08R | SEQ ID NO. 96 | TTTTTTTTCCTCCTCAGCATCTTATCCGAGT |
| 97 | ill-EC-2-TP53-08F | SEQ ID NO. 97 | TTTTTTTTTCTGTCATCCAAATACTCCACACG |
| 98 | ill-EC-2-TP53-08R | SEQ ID NO. 98 | TTTTTTTTCCATGAGCGCTGCTCAGATAG |
| 99 | ill-EC-1-TP53-09F | SEQ ID NO. 99 | TTTTTTTTCAGACCTAAGAGCAATCAGTGAG |
| 100 | ill-EC-1-TP53-09R | SEQ ID NO. 100 | TTTTTTTTCATGGCCATCTACAAGCAGTC |
| 101 | ill-EC-2-TP53-09F | SEQ ID NO. 101 | TTTTTTTTCCTCACAACCTCCGTCATGTG |
| 102 | ill-EC-2-TP53-09R | SEQ ID NO. 102 | TTTTTTTTTGTCTCCTTCCTCTTCCTACAGTA |
| 103 | ill-EC-1-TP53-10F | SEQ ID NO. 103 | TTTTTTTTGCCAGTTGGCAAAACATCTTGT |
| 104 | ill-EC-1-TP53-10R | SEQ ID NO. 104 | TTTTTTTTTAGCTCGCTAGTGGGTTGC |
| 105 | ill-EC-2-TP53-10F | SEQ ID NO. 105 | TTTTTTTTGGGTGAAGAGGAATCCCAAAGT |
| 106 | ill-EC-2-TP53-10R | SEQ ID NO. 106 | TTTTTTTTAGAAAACCTACCAGGGCAGCTA |
| 107 | ill-EC-1-TP53-11F | SEQ ID NO. 107 | TTTTTTTTTGTCCCAGAATGCAAGAAGCC |
| 108 | ill-EC-1-TP53-11R | SEQ ID NO. 108 | TTTTTTTTAGATGAAGCTCCCAGAATGCCA |
| 109 | ill-EC-2-TP53-11F | SEQ ID NO. 109 | TTTTTTTTCCGCCGGTGTAGGAGCT |
| 110 | ill-EC-2-TP53-11R | SEQ ID NO. 110 | TTTTTTTTGCTCTTTTCACCCATCTACAG |
| 111 | ill-EC-1-TP53-12F | SEQ ID NO. 111 | TTTTTTTTCAGCATCAAATCATCCATTGCTT |
| 112 | ill-EC-1-TP53-12R | SEQ ID NO. 112 | TTTTTTTTTCAGACTTCCTGAAAACAACGT |
| 113 | ill-EC-2-TP53-12F | SEQ ID NO. 113 | TTTTTTTTGCCCAACCCTTGTCCTTAC |
| 114 | ill-EC-2-TP53-12R | SEQ ID NO. 114 | TTTTTTTTTCAGACCTATGGAAACTGTGAGTG |
| 115 | ill-EC-1-TP53-13F | SEQ ID NO. 115 | TTTTTTTTGCCTGCCCTTCCAATGGAT |

TABLE 1-continued

Detection primers for 8 endometrial cancer-related genes

| Number | Primer name | | | | Sequence (5' to 3') |
|---|---|---|---|---|---|
| 116 | ill-EC-1-TP53-13R | SEQ ID NO. | 116 | TTTTTTTTAGGGTTGGAAGTGTCTCATGC |
| 117 | ill-EC-1-MLH1-01F | SEQ ID NO. | 117 | TTTTTTTTGGCACTTCCGTTGAGCATCTAG |
| 118 | ill-EC-1-MLH1-01R | SEQ ID NO. | 118 | TTTTTTTTCCGTACCAGTTCTCAATCATCTCTTTG |
| 119 | ill-EC-2-MLH1-02F | SEQ ID NO. | 119 | TTTTTTTTGGCGCCAAAATGTCGTTCG |
| 120 | ill-EC-2-MLH1-02R | SEQ ID NO. | 120 | TTTTTTTTCCGTTAAGTCGTAGCCCTTAAGT |
| 121 | ill-EC-1-MLH1-02F | SEQ ID NO. | 121 | TTTTTTTTAACACGTTAATGAGGCACTATTGTTTG |
| 122 | ill-EC-1-MLH1-02R | SEQ ID NO. | 122 | TTTTTTTTTCAGGCCTCCCTCTTTAACAATC |
| 123 | ill-EC-2-MLH1-03F | SEQ ID NO. | 123 | TTTTTTTTCTGTTTGATTTGCCAGTTTAGATGC |
| 124 | ill-EC-2-MLH1-03R | SEQ ID NO. | 124 | TTTTTTTTAGAGAAAGGTCCTGACTCTTCCAT |
| 125 | ill-EC-1-MLH1-03F | SEQ ID NO. | 125 | TTTTTTTTCAAGAAAATGGGAATTCAAAGAGA |
| 126 | ill-EC-1-MLH1-03R | SEQ ID NO. | 126 | TTTTTTTTCACCTCGAAAGCCATAGGTAGAAAT |
| 127 | ill-EC-2-MLH1-04F | SEQ ID NO. | 127 | TTTTTTTTAAAGGTTCACTACTAGTAAACTGCA |
| 128 | ill-EC-2-MLH1-04R | SEQ ID NO. | 128 | TTTTTTTTCAGACAATGTCATCACAGGAGGATAT |
| 129 | ill-EC-1-MLH1-04F | SEQ ID NO. | 129 | TTTTTTTTGTTCAGATAACCTTTCCCTTTGGT |
| 130 | ill-EC-1-MLH1-04R | SEQ ID NO. | 130 | TTTTTTTTAGTCAGCACTATACCTGTATGCAC |
| 131 | ill-EC-2-MLH1-05F | SEQ ID NO. | 131 | TTTTTTTTATTTTCTTTTCTTCCTTAGGCTTT |
| 132 | ill-EC-2-MLH1-05R | SEQ ID NO. | 132 | TTTTTTTTTGAGACAGGATTACTCTGAGACC |
| 133 | ill-EC-1-MLH1-05F | SEQ ID NO. | 133 | TTTTTTTTTCTCTTTTCCCCTTGGGATTAGTA |
| 134 | ill-EC-1-MLH1-05R | SEQ ID NO. | 134 | TTTTTTTTTCAACAATTTACTCTCCCATGTACC |
| 135 | ill-EC-2-MLH1-06F | SEQ ID NO. | 135 | TTTTTTTTTCCTAAACCATGTGCTGGCAATC |
| 136 | ill-EC-2-MLH1-06R | SEQ ID NO. | 136 | TTTTTTTTGGGACCTCCATTAACTAGTGCAA |
| 137 | ill-EC-1-MLH1-06F | SEQ ID NO. | 137 | TTTTTTTTGTGCTTAGAACTGTGCTGTTGGTA |
| 138 | ill-EC-1-MLH1-06R | SEQ ID NO. | 138 | TTTTTTTTAAAGCTTTTCTCCTCGTGGCTAT |
| 139 | ill-EC-2-MLH1-07F | SEQ ID NO. | 139 | TTTTTTTTATCAATCTTCTGTTCAGGTGGAGGA |
| 140 | ill-EC-2-MLH1-07R | SEQ ID NO. | 140 | TTTTTTTTTGAGCACTAGAACACATTACTTTGA |
| 141 | ill-EC-1-MLH1-07F | SEQ ID NO. | 141 | TTTTTTTTGACATCTAGTGTGTGTTTTGGCAAC |
| 142 | ill-EC-1-MLH1-07R | SEQ ID NO. | 142 | TTTTTTTTCACCAGCAAACTATTAAAAATCCCCTT |
| 143 | ill-EC-2-MLH1-08F | SEQ ID NO. | 143 | TTTTTTTTGGTTATGATGTTTCAGTCTCAGCCA |
| 144 | ill-EC-2-MLH1-08R | SEQ ID NO. | 144 | TTTTTTTTAGGTTATCGACATACCGACTAACAG |
| 145 | ill-EC-1-MLH1-08F | SEQ ID NO. | 145 | TTTTTTTTCTCAACCGTGGACAATATTCGC |
| 146 | ill-EC-1-MLH1-08R | SEQ ID NO. | 146 | TTTTTTTTCCTGTGTATTTGACTAAAGCAAA |
| 147 | ill-EC-2-MLH1-09F | SEQ ID NO. | 147 | TTTTTTTTATGGGAAGGAACCTTGTGTTTTTAAATT |
| 148 | ill-EC-2-MLH1-09R | SEQ ID NO. | 148 | TTTTTTTTCACTGAGTAGTTTGCATTGGATAT |
| 149 | ill-EC-1-MLH1-09F | SEQ ID NO. | 149 | TTTTTTTTAGAAATTGGATGTGAGGATAAAACCCT |
| 150 | ill-EC-1-MLH1-09R | SEQ ID NO. | 150 | TTTTTTTTATGGTCCCATAAAATTCCCTGTGG |
| 151 | ill-EC-2-MLH1-10F | SEQ ID NO. | 151 | TTTTTTTTTGTCTTTCCTGAGGTGATTTCATGAC |
| 152 | ill-EC-2-MLH1-10R | SEQ ID NO. | 152 | TTTTTTTTTTTTGGGCAAATAGGCTGCATAC |
| 153 | ill-EC-1-MLH1-10F | SEQ ID NO. | 153 | TTTTTTTTGATCGTCTGGTAGAATCAACTTCCTT |

TABLE 1-continued

Detection primers for 8 endometrial cancer-related genes

| Number | Primer name | | Sequence (5'to3') |
|---|---|---|---|
| 154 | ill-EC-1-MLH1-10R | SEQ ID NO. 154 | TTTTTTTTATCTCTTTCAAAGAGGAGAGCCTGAT |
| 155 | ill-EC-2-MLH1-11F | SEQ ID NO. 155 | TTTTTTTTCATACACCATATGTGGGCTTTTTCTC |
| 156 | ill-EC-2-MLH1-11R | SEQ ID NO. 156 | TTTTTTTTGCAGGAAGTGAACTTCATGCTTTG |
| 157 | ill-EC-1-MLH1-11F | SEQ ID NO. 157 | TTTTTTTTCAGTCCCCAGAATGTGGATGTTAA |
| 158 | ill-EC-1-MLH1-11R | SEQ ID NO. 158 | TTTTTTTTGAGAAGTAGCTGGATGAGAAGCG |
| 159 | ill-EC-2-MLH1-12F | SEQ ID NO. 159 | TTTTTTTTCCAATTCCTCCAGGATGTACTTCAC |
| 160 | ill-EC-2-MLH1-12R | SEQ ID NO. 160 | TTTTTTTTATCCAGGTAATACTTGCAAAGAAGTTC |
| 161 | ill-EC-1-MLH1-12F | SEQ ID NO. 161 | TTTTTTTTTACAGACTTTGCTACCAGGACTT |
| 162 | ill-EC-1-MLH1-12R | SEQ ID NO. 162 | TTTTTTTTGAAATGCATCAAGCTTCTGTTCCC |
| 163 | ill-EC-2-MLH1-13F | SEQ ID NO. 163 | TTTTTTTTTCTGGAAGTAGTGATAAGGTCTATGC |
| 164 | ill-EC-2-MLH1-13R | SEQ ID NO. 164 | TTTTTTTTCCTAGCCCTGCCACTAGAAATATC |
| 165 | ill-EC-1-MLH1-13F | SEQ ID NO. 165 | TTTTTTTTCAGGCCATTGTCACAGAGGATAA |
| 166 | ill-EC-1-MLH1-13R | SEQ ID NO. 166 | TTTTTTTTTCTGAAGTCCCCTTTGTTGTATCC |
| 167 | ill-EC-2-MLH1-14F | SEQ ID NO. 167 | TTTTTTTTAGCAAGATGAGGAGATGCTTGAAC |
| 168 | ill-EC-2-MLH1-14R | SEQ ID NO. 168 | TTTTTTTTAGAATAAAGGAGGTAGGCTGTACT |
| 169 | ill-EC-1-MLH1-14F | SEQ ID NO. 169 | TTTTTTTTCTTCAGAAATGTCAGAGAAGAGGA |
| 170 | ill-EC-1-MLH1-14R | SEQ ID NO. 170 | TTTTTTTTGCAGAGAGAAGATGCAAGTGATTCAT |
| 171 | ill-EC-2-MLH1-15F | SEQ ID NO. 171 | TTTTTTTTGTTCATTCACAGCTCTGTAGAACCA |
| 172 | ill-EC-2-MLH1-15R | SEQ ID NO. 172 | TTTTTTTTCATCTTCCACCATTTCCACATCAGA |
| 173 | ill-EC-1-MLH1-15F | SEQ ID NO. 173 | TTTTTTTTATGATCTGCACTTCCTTTTCTTCATTG |
| 174 | ill-EC-1-MLH1-15R | SEQ ID NO. 174 | TTTTTTTTCCCTGCTCATTAATTTCTTCCTGGAG |
| 175 | ill-EC-2-MLH1-16F | SEQ ID NO. 175 | TTTTTTTTGGAAGATGATTCCCGAAAGGAAATG |
| 176 | ill-EC-2-MLH1-16R | SEQ ID NO. 176 | TTTTTTTTATTTCCAAAACCTTGGCAGTTGAG |
| 177 | ill-EC-1-MLH1-16F | SEQ ID NO. 177 | TTTTTTTTGGTTGGTAGGATTCTATTACTTACC |
| 178 | ill-EC-1-MLH1-16R | SEQ ID NO. 178 | TTTTTTTTGCTGATTTACCTAAGCTTGGTGGT |
| 179 | ill-EC-2-MLH1-17F | SEQ ID NO. 179 | TTTTTTTTGTTTGCAGTTCTCCGGGAGAT |
| 180 | ill-EC-2-MLH1-17R | SEQ ID NO. 180 | TTTTTTTTCTCCCTGGACCATTGTTGTAGTAG |
| 181 | ill-EC-1-MLH1-17F | SEQ ID NO. 181 | TTTTTTTTCTCAAGCATGAATTCAGCTTTTCCTT |
| 182 | ill-EC-1-MLH1-17R | SEQ ID NO. 182 | TTTTTTTTAGCTACTATTTTCAGAAACGATCA |
| 183 | ill-EC-2-MLH1-18F | SEQ ID NO. 183 | TTTTTTTTGGATGCTCCGTTAAAGCTTGC |
| 184 | ill-EC-2-MLH1-18R | SEQ ID NO. 184 | TTTTTTTTAGCCTTCTTCTTCAGAAACTCAACA |
| 185 | ill-EC-1-MLH1-18F | SEQ ID NO. 185 | TTTTTTTTCCCAAAGAAGGACTTGCTGAATAC |
| 186 | ill-EC-1-MLH1-18R | SEQ ID NO. 186 | TTTTTTTTCCGGCTGGAAATTTTATTTGAAG |
| 187 | ill-EC-2-MLH1-19F | SEQ ID NO. 187 | TTTTTTTTAGCACTGGAGAAATGGGATTTGTTTA |
| 188 | ill-EC-2-MLH1-19R | SEQ ID NO. 188 | TTTTTTTTCCTCAGTGGCTAGTCGAAGAAT |
| 189 | ill-EC-1-MLH1-19F | SEQ ID NO. 189 | TTTTTTTTGGAACCTGATTGGATTACCCCTT |
| 190 | ill-EC-1-MLH1-19R | SEQ ID NO. 190 | TTTTTTTTATTCCAGATCAAAGGGTGGTCAT |

TABLE 1-continued

Detection primers for 8 endometrial cancer-related genes

| Number | Primer name | | Sequence (5'to3') |
|---|---|---|---|
| 191 | ill-EC-2-MLH1-20F | SEQ ID NO. 191 | TTTTTTTTGTCTGTGATCTCCGTTTAGAATGAG |
| 192 | ill-EC-2-MLH1-20R | SEQ ID NO. 192 | TTTTTTTTAGGGTCGACTCCTCAGATATGTAC |
| 193 | ill-EC-1-MLH1-20F | SEQ ID NO. 193 | TTTTTTTTCCAGGTGAATTGGGACGAAGAAAA |
| 194 | ill-EC-1-MLH1-20R | SEQ ID NO. 194 | TTTTTTTTAAGATTGTATGAGGTCCTGTCCTAGT |
| 195 | ill-EC-2-MLH1-21F | SEQ ID NO. 195 | TTTTTTTTTCAAAAGCCCTAGATAACACCAAGT |
| 196 | ill-EC-2-MLH1-21R | SEQ ID NO. 196 | TTTTTTTTACAATGTGTTCCACAGTCCACTTC |
| 197 | ill-EC-1-MLH1-21F | SEQ ID NO. 197 | TTTTTTTTCTAATGTGTTTTCCAGAGTGAAGTGC |
| 198 | ill-EC-1-MLH1-21R | SEQ ID NO. 198 | TTTTTTTTCAAAGACTTTGTATAGATCAGGCAG |
| 199 | ill-EC-2-MLH1-22F | SEQ ID NO. 199 | TTTTTTTTGATGGAAATATCCTGCAGCTTGCTA |
| 200 | ill-EC-2-MLH1-22R | SEQ ID NO. 200 | TTTTTTTTATGTTGGTACACTTTGTATATCACA |
| 201 | ill-EC-1-EPCAM-01F | SEQ ID NO. 201 | TTTTTTTTGGCTCCTCGTGTCCCACTC |
| 202 | ill-EC-1-EPCAM-01R | SEQ ID NO. 202 | TTTTTTTTCAATCCGCGCCTCACCT |
| 203 | ill-EC-2-EPCAM-02F | SEQ ID NO. 203 | TTTTTTTTCCGCAGGTCCTCGCGTT |
| 204 | ill-EC-2-EPCAM-02R | SEQ ID NO. 204 | TTTTTTTTGCCTCTTGGTCCCCTCCCTA |
| 205 | ill-EC-1-EPCAM-03F | SEQ ID NO. 205 | TTTTTTTTTGGGACATGAGAGTTAATAGATCCACA |
| 206 | ill-EC-1-EPCAM-03R | SEQ ID NO. 206 | TTTTTTTTTTACTCACGCTTTGAGCAAATGAC |
| 207 | ill-EC-2-EPCAM-04F | SEQ ID NO. 207 | TTTTTTTTTGGCCGTAAACTGCTTTGTGAATAAT |
| 208 | ill-EC-2-EPCAM-04R | SEQ ID NO. 208 | TTTTTTTTGCCAATAAAACTCTTTCCAACTCAAGG |
| 209 | ill-EC-1-EPCAM-05F | SEQ ID NO. 209 | TTTTTTTTAATCATGTTACAAAGTAAGTGTGGGAAC |
| 210 | ill-EC-1-EPCAM-05R | SEQ ID NO. 210 | TTTTTTTTATTCATTTCTGCCTTCATCACCAAAC |
| 211 | ill-EC-2-EPCAM-06F | SEQ ID NO. 211 | TTTTTTTTTCAGTTTGGCATTAAGGTTTCTTTTTCA |
| 212 | ill-EC-2-EPCAM-06R | SEQ ID NO. 212 | TTTTTTTTTTAAAGAGCCCGCTCTCATCG |
| 213 | ill-EC-1-EPCAM-07F | SEQ ID NO. 213 | TTTTTTTTCCTCCAGAACAATGATGGGCTT |
| 214 | ill-EC-1-EPCAM-07R | SEQ ID NO. 214 | TTTTTTTTACTCACTAGGTTCTCACTCGCT |
| 215 | ill-EC-2-EPCAM-08F | SEQ ID NO. 215 | TTTTTTTTGAACAGACAAGGACACTGAAATAACC |
| 216 | ill-EC-2-EPCAM-08R | SEQ ID NO. 216 | TTTTTTTTGCTTTTCACTGGACACTCATATCTTCT |
| 217 | ill-EC-1-EPCAM-09F | SEQ ID NO. 217 | TTTTTTTTGGAAAATAGTATGGAAGACTGAGTTA |
| 218 | ill-EC-1-EPCAM-09R | SEQ ID NO. 218 | TTTTTTTTAGATTTGAGCCACCAACTGTGC |
| 219 | ill-EC-2-EPCAM-10F | SEQ ID NO. 219 | TTTTTTTTGCTTCTTACTGTTGTGTGGTACAAAC |
| 220 | ill-EC-2-EPCAM-10R | SEQ ID NO. 220 | TTTTTTTTATACTGTCTCACCAACTGTCTGCTA |
| 221 | ill-EC-1-EPCAM-11F | SEQ ID NO. 221 | TTTTTTTTGAAAATCAAACACTGAATATTCTGATT |
| 222 | ill-EC-1-EPCAM-11R | SEQ ID NO. 222 | TTTTTTTTGCTATGTCCACATCATTCTGAGTTTTT |
| 223 | ill-EC-2-EPCAM-12F | SEQ ID NO. 223 | TTTTTTTTTTCCCCAGTATGAGAATAATGTTATCA |
| 224 | ill-EC-2-EPCAM-12R | SEQ ID NO. 224 | TTTTTTTTTTGAGGCATGATAGACTACATTCCTG |
| 225 | ill-EC-1-EPCAM-13F | SEQ ID NO. 225 | TTTTTTTTAAGATTCTTGGCAGCGGTTCTT |
| 226 | ill-EC-1-EPCAM-13R | SEQ ID NO. 226 | TTTTTTTTATCCAGTTGTTCCCCATTTACTGTC |
| 227 | ill-EC-2-EPCAM-14F | SEQ ID NO. 227 | TTTTTTTTTTTTAATTCCTTTTCTCCTTTTCAATAC |
| 228 | ill-EC-2-EPCAM-14R | SEQ ID NO. 228 | TTTTTTTTACCAGCTTTTAGACCCTGCAT |

TABLE 1-continued

Detection primers for 8 endometrial cancer-related genes

| Number | Primer name | | Sequence (5'to3') |
|---|---|---|---|
| 229 | ill-EC-1-EPCAM-15F | SEQ ID NO. 229 | TTTTTTTTGTTGATGAAAAAGCACCTGAATTCTCA |
| 230 | ill-EC-1-EPCAM-15R | SEQ ID NO. 230 | TTTTTTTTGCCCAGCCACTATTACTTTTTCTTGAA |
| 231 | ill-EC-1-EPCAM-16F | SEQ ID NO. 231 | TTTTTTTTTGTCCATTAAAAGCATATATGTCTGT |
| 232 | ill-EC-1-EPCAM-16R | SEQ ID NO. 232 | TTTTTTTTTTCAACAGGGCCTTTCTATTTAGGT |
| 233 | ill-EC-2-EPCAM-17F | SEQ ID NO. 233 | TTTTTTTTCAATAGTTGTCTTTCTTCCACTCAGGT |
| 234 | ill-EC-2-EPCAM-17R | SEQ ID NO. 234 | TTTTTTTTAAGGGACTCCAGTATAACTGAAATGC |
| 235 | ill-EC-2-EPCAM-18F | SEQ ID NO. 235 | TTTTTTTTTTTTCTGTGCTTTTTCCTGTTTCAGA |
| 236 | ill-EC-2-EPCAM-18R | SEQ ID NO. 236 | TTTTTTTTAAACTCATGACCTTCAAAGATGTCTT |
| 237 | ill-EC-1-MSH2-01F | SEQ ID NO. 237 | TTTTTTTTGGAAACAGCTTAGTGGGTGTG |
| 238 | ill-EC-1-MSH2-01R | SEQ ID NO. 238 | TTTTTTTTGAAAAGGCGCACTGTGGTG |
| 239 | ill-EC-2-MSH2-02F | SEQ ID NO. 239 | TTTTTTTTCGGCCGAGGTCGGCTTC |
| 240 | ill-EC-2-MSH2-02R | SEQ ID NO. 240 | TTTTTTTTACCTGCCGGCCCCATGTA |
| 241 | ill-EC-1-MSH2-02F | SEQ ID NO. 241 | TTTTTTTTCGCCCGGGAGGTGTTCAA |
| 242 | ill-EC-1-MSH2-02R | SEQ ID NO. 242 | TTTTTTTTCCACTCTCTGAGGCGGGAA |
| 243 | ill-EC-2-MSH2-03F | SEQ ID NO. 243 | TTTTTTTTACAGTGCTTGAACATGTAATATCTCAAAT |
| 244 | ill-EC-2-MSH2-03R | SEQ ID NO. 244 | TTTTTTTTAAACTTCAACTCTATACTGACGAACCAG |
| 245 | ill-EC-1-MSH2-03F | SEQ ID NO. 245 | TTTTTTTTTTAAGGAGCAAAGAATCTGCAGAGT |
| 246 | ill-EC-1-MSH2-03R | SEQ ID NO. 246 | TTTTTTTTAGGAAGATAATTACCTTATATGCCAAATA |
| 247 | ill-EC-2-MSH2-04F | SEQ ID NO. 247 | TTTTTTTTAGAATAGAGCTGGAAATAAGGCATCC |
| 248 | ill-EC-2-MSH2-04R | SEQ ID NO. 248 | TTTTTTTTGTGTCTCAAACCATTCTACTATCACAATCT |
| 249 | ill-EC-1-MSH2-04F | SEQ ID NO. 249 | TTTTTTTTGAGTTTGGATTTTTCCTTTTTGCTTATA |
| 250 | ill-EC-1-MSH2-04R | SEQ ID NO. 250 | TTTTTTTTCCACAACACCAATGGAAGCTGA |
| 251 | ill-EC-2-MSH2-05F | SEQ ID NO. 251 | TTTTTTTTCTTAGGCTTCTCCTGGCAATCTC |
| 252 | ill-EC-2-MSH2-05R | SEQ ID NO. 252 | TTTTTTTTGGGAATTCACACAGTCCTAGTTTCC |
| 253 | ill-EC-1-MSH2-05F | SEQ ID NO. 253 | TTTTTTTTGGTGTTAAAATGTCCGCAGTTGAT |
| 254 | ill-EC-1-MSH2-05R | SEQ ID NO. 254 | TTTTTTTTGTCTCTCCTCCGGGTAAAACAC |
| 255 | ill-EC-2-MSH2-06F | SEQ ID NO. 255 | TTTTTTTTGATCAGTTCTCCAATCTTGAGGCT |
| 256 | ill-EC-2-MSH2-06R | SEQ ID NO. 256 | TTTTTTTTAACAGTATCATGTCAATTAAAGAGCCT |
| 257 | ill-EC-1-MSH2-06F | SEQ ID NO. 257 | TTTTTTTTTTCATTTTTGCTTTTCTTATTCCTTTTCT |
| 258 | ill-EC-1-MSH2-06R | SEQ ID NO. 258 | TTTTTTTTGCCTTCAACAACCGGTTGAG |
| 259 | ill-EC-2-MSH2-07F | SEQ ID NO. 259 | TTTTTTTTTCAAAGAGGAGGAATTCTGATCACA |
| 260 | ill-EC-2-MSH2-07R | SEQ ID NO. 260 | TTTTTTTTATTCACATTTATAATCCATGTACCTGATT |
| 261 | ill-EC-1-MSH2-07F | SEQ ID NO. 261 | TTTTTTTTGGAGAGCAGATGAATAGTGCTGTA |
| 262 | ill-EC-1-MSH2-07R | SEQ ID NO. 262 | TTTTTTTTCACAGTTTAGGTTTTGAGATAAATATG |
| 263 | ill-EC-2-MSH2-08F | SEQ ID NO. 263 | TTTTTTTTAGAACTGGATCCAGTGGTATAGAAATCT |
| 264 | ill-EC-2-MSH2-08R | SEQ ID NO. 264 | TTTTTTTTACTGGCTGAAGTCAAAAGTAGTCAG |
| 265 | ill-EC-1-MSH2-08F | SEQ ID NO. 265 | TTTTTTTTAATTTTAGGTTGCAGTTTCATCACTGT |

TABLE 1-continued

Detection primers for 8 endometrial cancer-related genes

| Number | Primer name | | Sequence (5' to 3') |
|---|---|---|---|
| 266 | ill-EC-1-MSH2-08R | SEQ ID NO. 266 | TTTTTTTTACCTGAAAAAGGTTAAGGGCTCT |
| 267 | ill-EC-2-MSH2-09F | SEQ ID NO. 267 | TTTTTTTTTAAGGTTTTCACTAATGAGCTTGCCATT |
| 268 | ill-EC-2-MSH2-09R | SEQ ID NO. 268 | TTTTTTTTGTTCTTATCCATGAGAGGCTGCTTA |
| 269 | ill-EC-1-MSH2-09F | SEQ ID NO. 269 | TTTTTTTTGCTGCCTTGCTGAATAAGTGTAAAA |
| 270 | ill-EC-1-MSH2-09R | SEQ ID NO. 270 | TTTTTTTTAAGTGGTATAATCATGTGGGTAACTGC |
| 271 | ill-EC-2-MSH2-10F | SEQ ID NO. 271 | TTTTTTTTCAAGCTTTTTAAATGGAATTTTGAGCTGAT |
| 272 | ill-EC-2-MSH2-10R | SEQ ID NO. 272 | TTTTTTTTCTTCTTGTAAAGTCTGCCTCAATTCT |
| 273 | ill-EC-1-MSH2-10F | SEQ ID NO. 273 | TTTTTTTTTTATTTCAGATTGAATTTAGTGGAAGC |
| 274 | ill-EC-1-MSH2-10R | SEQ ID NO. 274 | TTTTTTTTAGTTGATTTATACCCTGATAGAGTCGGT |
| 275 | ill-EC-2-MSH2-11F | SEQ ID NO. 275 | TTTTTTTTTGCCAAGAAGTTTCAAAGACAAGC |
| 276 | ill-EC-2-MSH2-11R | SEQ ID NO. 276 | TTTTTTTTGACAGCACATTGCCAAGTATATATTGT |
| 277 | ill-EC-1-MSH2-11F | SEQ ID NO. 277 | TTTTTTTTACCTTTTGGATCAAATGATGCTTGTTTA |
| 278 | ill-EC-1-MSH2-11R | SEQ ID NO. 278 | TTTTTTTTCTTGGAGAAGTCAGAACGAAGATCA |
| 279 | ill-EC-2-MSH2-12F | SEQ ID NO. 279 | TTTTTTTTCCAGAAATTATTGTTGGCAGTTTTTGTG |
| 280 | ill-EC-2-MSH2-12R | SEQ ID NO. 280 | TTTTTTTTTACAAACTTTCTTAAAGTGGCCTTTGC |
| 281 | ill-EC-1-MSH2-12F | SEQ ID NO. 281 | TTTTTTTTTGAAAACAGTAAAATTTAAGTGGGAGG |
| 282 | ill-EC-1-MSH2-12R | SEQ ID NO. 282 | TTTTTTTTTTCACTGAGATTAGGATCAAATGAAG |
| 283 | ill-EC-2-MSH2-13F | SEQ ID NO. 283 | TTTTTTTTGATTTTGTCACTTTGTTCTGTTTGCAG |
| 284 | ill-EC-2-MSH2-13R | SEQ ID NO. 284 | TTTTTTTTCAACCTCCAATGACCCATTCTTACC |
| 285 | ill-EC-1-MSH2-13F | SEQ ID NO. 285 | TTTTTTTTAGTCAACATTAATAAGTGCAGCCAGA |
| 286 | ill-EC-1-MSH2-13R | SEQ ID NO. 286 | TTTTTTTTTGTTGGGCGATTTCTGTTTGAC |
| 287 | ill-EC-2-MSH2-14F | SEQ ID NO. 287 | TTTTTTTTACATTGAAAAATGGTAGTAGGTATTTATGGA |
| 288 | ill-EC-2-MSH2-14R | SEQ ID NO. 288 | TTTTTTTTGTTTTTATTGTTACGAAGGACTTTTTCTTCCT |
| 289 | ill-EC-1-MSH2-14F | SEQ ID NO. 289 | TTTTTTTTAGTTTGGATATTACTTTCGTGTAACCTGT |
| 290 | ill-EC-1-MSH2-14R | SEQ ID NO. 290 | TTTTTTTTTTCACATCATGTTAGAGCATTTAGGGAAT |
| 291 | ill-EC-2-MSH2-15F | SEQ ID NO. 291 | TTTTTTTTACTTTGGATATGTTTCACGTAGTACACA |
| 292 | ill-EC-2-MSH2-15R | SEQ ID NO. 292 | TTTTTTTTGGCATCCTGGGCTTCTTCATATTC |
| 293 | ill-EC-1-MSH2-15F | SEQ ID NO. 293 | TTTTTTTTTGCAGCAAATTGACTTCTTTAAATGAAGAG |
| 294 | ill-EC-1-MSH2-15R | SEQ ID NO. 294 | TTTTTTTTTTACCAAAAGCCAGGTGACATTCAG |
| 295 | ill-EC-2-MSH2-16F | SEQ ID NO. 295 | TTTTTTTTGAAATGGGTTTTGAATTCCCAAATGG |
| 296 | ill-EC-2-MSH2-16R | SEQ ID NO. 296 | TTTTTTTTACAACAGCATCTAGCTGAGCTAAC |
| 297 | ill-EC-1-MSH2-16F | SEQ ID NO. 297 | TTTTTTTTATACAGGCTATGTAGAACCAATGCAG |
| 298 | ill-EC-1-MSH2-16R | SEQ ID NO. 298 | TTTTTTTTGCATGCCTGGATGCTTTTAATATAATTCT |
| 299 | ill-EC-2-MSH2-17F | SEQ ID NO. 299 | TTTTTTTTGAGCACCTGTTCCATATGTACG |
| 300 | ill-EC-2-MSH2-17R | SEQ ID NO. 300 | TTTTTTTTTTTACCAGTAATGATGTGGAACATCTGT |
| 301 | ill-EC-1-MSH2-17F | SEQ ID NO. 301 | TTTTTTTTATTGCATTTATTCCTAATGACGTATACTTTGA |
| 302 | ill-EC-1-MSH2-17R | SEQ ID NO. 302 | TTTTTTTTGAACTGGGAATTTTCTCCATCAATTTTAAATA |
| 303 | ill-EC-2-MSH2-18F | SEQ ID NO. 303 | TTTTTTTTACCTACGCGATTAATCATCAGTGTAC |

TABLE 1-continued

Detection primers for 8 endometrial cancer-related genes

| Number | Primer name | | Sequence (5'to3') |
|---|---|---|---|
| 304 | ill-EC-2-MSH2-18R | SEQ ID NO. 304 | TTTTTTTTCCCAATTTGGGCCATGAGTACTATC |
| 305 | ill-EC-1-MSH2-18F | SEQ ID NO. 305 | TTTTTTTTGCCCCAATATGGGAGGTAAATCAA |
| 306 | ill-EC-1-MSH2-18R | SEQ ID NO. 306 | TTTTTTTTACGTGGAGACTCCTTTCAATTGAC |
| 307 | ill-EC-2-MSH2-19F | SEQ ID NO. 307 | TTTTTTTTGACTGCATCTTAGCCCGAGTAG |
| 308 | ill-EC-2-MSH2-19R | SEQ ID NO. 308 | TTTTTTTTCTGCAAATATACTTTTCCTTCTCACAGG |
| 309 | ill-EC-1-MSH2-19F | SEQ ID NO. 309 | TTTTTTTTGGCATATCCTTCCCAATGTATTGTCT |
| 310 | ill-EC-1-MSH2-19R | SEQ ID NO. 310 | TTTTTTTTCTAACCCAAATCCATCGTAGGTAGAA |
| 311 | ill-EC-2-MSH2-20F | SEQ ID NO. 311 | TTTTTTTTAATTATGTGCTTCAGGTCTGCAAC |
| 312 | ill-EC-2-MSH2-20R | SEQ ID NO. 312 | TTTTTTTTCAAGGCAGTAAGTTCATGAAAATGGG |
| 313 | ill-EC-1-MSH2-20F | SEQ ID NO. 313 | TTTTTTTTGGGCTATATCAGAATACATTGCAACA |
| 314 | ill-EC-1-MSH2-20R | SEQ ID NO. 314 | TTTTTTTTACATACCTTTCTTCACCTGATAAAGCA |
| 315 | ill-EC-2-MSH2-21F | SEQ ID NO. 315 | TTTTTTTTCTTGGCCAATCAGATACCAACTGT |
| 316 | ill-EC-2-MSH2-21R | SEQ ID NO. 316 | TTTTTTTTAGGCAATTACTGATGATTTCAAGGGT |
| 317 | ill-EC-1-MSH2-21F | SEQ ID NO. 317 | TTTTTTTTACATAAATTGCTGTCTCTTCTCATGCT |
| 318 | ill-EC-1-MSH2-21R | SEQ ID NO. 318 | TTTTTTTTCAAGTTCCAGGGCTTTCTGTTTAG |
| 319 | ill-EC-2-MSH2-22F | SEQ ID NO. 319 | TTTTTTTTCGCTTCCCCAAATTTCTTATAGGTG |
| 320 | ill-EC-2-MSH2-22R | SEQ ID NO. 320 | TTTTTTTTTGCTGCTGGTTCCATGATATCATA |
| 321 | ill-EC-1-MSH2-22F | SEQ ID NO. 321 | TTTTTTTTGGAACTTGAGGAGTTTCAGTATATTGGA |
| 322 | ill-EC-1-MSH2-22R | SEQ ID NO. 322 | TTTTTTTTAAAACCTTCATCTTAGTGTCCTGTTTATGT |
| 323 | ill-EC-2-MSH2-23F | SEQ ID NO. 323 | TTTTTTTTGATGGAAATGAAACAATTTGTCACTGTC |
| 324 | ill-EC-2-MSH2-23R | SEQ ID NO. 324 | TTTTTTTTGTAAAGGGCATTTGTTTCACCTTGG |
| 325 | ill-EC-1-MSH2-23F | SEQ ID NO. 325 | TTTTTTTTACTAATGGGACATTCACATGTGTTTCA |
| 326 | ill-EC-1-MSH2-23R | SEQ ID NO. 326 | TTTTTTTTCTTTGCTATTACTTCAGCTTTTAGCTGTT |
| 327 | ill-EC-2-MSH2-24F | SEQ ID NO. 327 | TTTTTTTTCCCTTTACTGAAATGTCAGAAGAAAACAT |
| 328 | ill-EC-2-MSH2-24R | SEQ ID NO. 328 | TTTTTTTTCAGACAATAGCTTATCAATATTACCTTCA |
| 329 | ill-EC-1-MSH2-24F | SEQ ID NO. 329 | TTTTTTTTACGAATAAAAGTTACTACGTGAAAA |
| 330 | ill-EC-1-MSH2-24R | SEQ ID NO. 330 | TTTTTTTTCATGGGCACTGACAGTTAACACTA |
| 331 | ill-EC-1-MSH6-01F | SEQ ID NO. 331 | TTTTTTTTGAGCCGCGCGGTAGATG |
| 332 | ill-EC-1-MSH6-01R | SEQ ID NO. 332 | TTTTTTTTGGCCGCCTTCGCGTGAG |
| 333 | ill-EC-2-MSH6-02F | SEQ ID NO. 333 | TTTTTTTTCAAGTCTCCGGCGCTGA |
| 334 | ill-EC-2-MSH6-02R | SEQ ID NO. 334 | TTTTTTTTCTTCGCCTTGGGCGGTGA |
| 335 | ill-EC-1-MSH6-02F | SEQ ID NO. 335 | TTTTTTTTGATGCGGCCTGGAGCGA |
| 336 | ill-EC-1-MSH6-02R | SEQ ID NO. 336 | TTTTTTTTCGCTATGCCCCCGCCTT |
| 337 | ill-EC-2-MSH6-03F | SEQ ID NO. 337 | TTTTTTTTCTGCTGCCCCCACCAGGTA |
| 338 | ill-EC-2-MSH6-03R | SEQ ID NO. 338 | TTTTTTTTGACCCCTGCACTCATTCAAGC |
| 339 | ill-EC-1-MSH6-03F | SEQ ID NO. 339 | TTTTTTTTAACTGCCTTTAAGGAAACTTGACCA |
| 340 | ill-EC-1-MSH6-03R | SEQ ID NO. 340 | TTTTTTTTTCCCTTTCTCGCGGATGAATG |

TABLE 1-continued

Detection primers for 8 endometrial cancer-related genes

| Number | Primer name | | Sequence (5' to 3') |
|---|---|---|---|
| 341 | ill-EC-2-MSH6-04F | SEQ ID NO. 341 | TTTTTTTTGGAGATTTGGTTTGGGCCAAGAT |
| 342 | ill-EC-2-MSH6-04R | SEQ ID NO. 342 | TTTTTTTTGCTTTAAAAGCCTTTTGCTAACCCA |
| 343 | ill-EC-1-MSH6-04F | SEQ ID NO. 343 | TTTTTTTTGAAAGGGAAATCAGTCCGTGTTCA |
| 344 | ill-EC-1-MSH6-04R | SEQ ID NO. 344 | TTTTTTTTAAAAAGTCTGCCTGTCTGTCTGTT |
| 345 | ill-EC-2-MSH6-05F | SEQ ID NO. 345 | TTTTTTTTCCTGGCATATATATATTTTAAGATAG |
| 346 | ill-EC-2-MSH6-05R | SEQ ID NO. 346 | TTTTTTTTCACTGTAAAAATGACCTCCCTTCTG |
| 347 | ill-EC-1-MSH6-05F | SEQ ID NO. 347 | TTTTTTTTACCCGGCCCTTATTGTTTATAAA |
| 348 | ill-EC-1-MSH6-05R | SEQ ID NO. 348 | TTTTTTTTCATCACAAACTGCCAATTCAAGCC |
| 349 | ill-EC-2-MSH6-06F | SEQ ID NO. 349 | TTTTTTTTGAAATACTGAGAGCAATGCAACG |
| 350 | ill-EC-2-MSH6-06R | SEQ ID NO. 350 | TTTTTTTTCTTCCCCCATCACCCTAACATAA |
| 351 | ill-EC-1-MSH6-06F | SEQ ID NO. 351 | TTTTTTTTGCACGGGTACCATTATAAAGT |
| 352 | ill-EC-1-MSH6-06R | SEQ ID NO. 352 | TTTTTTTTGTACTTCCTCTTCACTCTCAATTTCA |
| 353 | ill-EC-2-MSH6-07F | SEQ ID NO. 353 | TTTTTTTTCTGGCAGGTAGGCACAACTTA |
| 354 | ill-EC-2-MSH6-07R | SEQ ID NO. 354 | TTTTTTTTAATTCCACATCAGAGCCACCAA |
| 355 | ill-EC-1-MSH6-07F | SEQ ID NO. 355 | TTTTTTTTAACGAAGGGTCATATCAGATTCTGAG |
| 356 | ill-EC-1-MSH6-07R | SEQ ID NO. 356 | TTTTTTTTATTCTCTTCCGCTTTCGAGCAA |
| 357 | ill-EC-2-MSH6-08F | SEQ ID NO. 357 | TTTTTTTTGCAGTGATGAAATAAGCAGTGGAGT |
| 358 | ill-EC-2-MSH6-08R | SEQ ID NO. 358 | TTTTTTTTCTGATGAAATGCTAGTTGCTTGTTT |
| 359 | ill-EC-1-MSH6-08F | SEQ ID NO. 359 | TTTTTTTTCTCTTAAAAGGAAAAGCTCTAGGAA |
| 360 | ill-EC-1-MSH6-08R | SEQ ID NO. 360 | TTTTTTTTATACCAAACAGTAGGGCGACTAC |
| 361 | ill-EC-2-MSH6-09F | SEQ ID NO. 361 | TTTTTTTTCTGCCCCTCAAAATTCTGAATCC |
| 362 | ill-EC-2-MSH6-09R | SEQ ID NO. 362 | TTTTTTTTGCACATAGAGTGTAGATGCATCAAAATC |
| 363 | ill-EC-1-MSH6-09F | SEQ ID NO. 363 | TTTTTTTTATGAAACTTTAGAATGGCTTAAGGAGGA |
| 364 | ill-EC-1-MSH6-09R | SEQ ID NO. 364 | TTTTTTTTATCAAAGTTCTGAGACTTAATCTGCCA |
| 365 | ill-EC-2-MSH6-10F | SEQ ID NO. 365 | TTTTTTTTTATGTGCCTGAGGATTTCCTCAATTC |
| 366 | ill-EC-2-MSH6-10R | SEQ ID NO. 366 | TTTTTTTTTCATGAATACCAGCCCCAGTTC |
| 367 | ill-EC-1-MSH6-10F | SEQ ID NO. 367 | TTTTTTTTGGGAAATTTTATGAGCTGTACCAC |
| 368 | ill-EC-1-MSH6-10R | SEQ ID NO. 368 | TTTTTTTTCAGTCTGTTCCACTCGTGCTAC |
| 369 | ill-EC-2-MSH6-11F | SEQ ID NO. 369 | TTTTTTTTGTTATTCAGATTCCCTGGTGCAGA |
| 370 | ill-EC-2-MSH6-11R | SEQ ID NO. 370 | TTTTTTTTCACTGTAAGTCTGTGTACCCTTGG |
| 371 | ill-EC-1-MSH6-11F | SEQ ID NO. 371 | TTTTTTTTTATCCAAGTATGATAGAGTGGTGAGGA |
| 372 | ill-EC-1-MSH6-11R | SEQ ID NO. 372 | TTTTTTTTGCACACACCATATGCACGAGTA |
| 373 | ill-EC-2-MSH6-12F | SEQ ID NO. 373 | TTTTTTTTGGTGATCCCTCTGAGAACTACAGTA |
| 374 | ill-EC-2-MSH6-12R | SEQ ID NO. 374 | TTTTTTTTCCACTAGAGTCCTAAATCTCGAACAA |
| 375 | ill-EC-1-MSH6-12F | SEQ ID NO. 375 | TTTTTTTTGTGCTTTGTTGATACTTCACTGGGA |
| 376 | ill-EC-1-MSH6-12R | SEQ ID NO. 376 | TTTTTTTTAGAACAGGACAATGAACTCTTTAGAA |
| 377 | ill-EC-2-MSH6-13F | SEQ ID NO. 377 | TTTTTTTTCACACTATCCCCCAGTACAAGTTTT |
| 378 | ill-EC-2-MSH6-13R | SEQ ID NO. 378 | TTTTTTTTTTCTTCCTCAAGGAGAGTTCTCAAAG |

TABLE 1-continued

Detection primers for 8 endometrial cancer-related genes

| Number | Primer name | | Sequence (5'to3') |
|---|---|---|---|
| 379 | ill-EC-1-MSH6-13F | SEQ ID NO. 379 | TTTTTTTTCTGTTCTCTTCAGGAAGGTCTGATAC |
| 380 | ill-EC-1-MSH6-13R | SEQ ID NO. 380 | TTTTTTTTGTCAACCCAATGGAATCAGACTC |
| 381 | ill-EC-2-MSH6-14F | SEQ ID NO. 381 | TTTTTTTTGTTACCCCAGGTGCTTAAAGGTA |
| 382 | ill-EC-2-MSH6-14R | SEQ ID NO. 382 | TTTTTTTTCAAAATTAGCCATTGATAAAAGCTCCTGA |
| 383 | ill-EC-1-MSH6-14F | SEQ ID NO. 383 | TTTTTTTTGCTCTAGGTGGTTGTGTCTTCTAC |
| 384 | ill-EC-1-MSH6-14R | SEQ ID NO. 384 | TTTTTTTTTAATGTCACTGCATCTAGCACCAT |
| 385 | ill-EC-2-MSH6-15F | SEQ ID NO. 385 | TTTTTTTTACTACAAGATCTGGTGCTATCTTCAC |
| 386 | ill-EC-2-MSH6-15R | SEQ ID NO. 386 | TTTTTTTTATTGCTTTAGGAGCCGCTTACC |
| 387 | ill-EC-1-MSH6-15F | SEQ ID NO. 387 | TTTTTTTTACTGAAGGAACCCTACTAGAGAGG |
| 388 | ill-EC-1-MSH6-15R | SEQ ID NO. 388 | TTTTTTTTGCTCTACAACTTCGGAGATTTTGTC |
| 389 | ill-EC-2-MSH6-16F | SEQ ID NO. 389 | TTTTTTTTCGTCTAGATGCCATAGAAGACCTCA |
| 390 | ill-EC-2-MSH6-16R | SEQ ID NO. 390 | TTTTTTTTAGTTTCTTCATACATTATAGCCCTGCT |
| 391 | ill-EC-1-MSH6-16F | SEQ ID NO. 391 | TTTTTTTTCTCAGTAAAATTCATAATGTTGGG |
| 392 | ill-EC-1-MSH6-16R | SEQ ID NO. 392 | TTTTTTTTCAGCAACTTCTTCCATGATCCCTATAAT |
| 393 | ill-EC-2-MSH6-17F | SEQ ID NO. 393 | TTTTTTTTCTGCTCTGGAAGGATTCAAAGTAAT |
| 394 | ill-EC-2-MSH6-17R | SEQ ID NO. 394 | TTTTTTTTGGTCAAAGGCTGTATCCCATCG |
| 395 | ill-EC-1-MSH6-17F | SEQ ID NO. 395 | TTTTTTTTGGTCGTTTTCCTGATTTGACTGTAGA |
| 396 | ill-EC-1-MSH6-17R | SEQ ID NO. 396 | TTTTTTTTGTTTCTCTAGGTATTCCAGGAGGCT |
| 397 | ill-EC-2-MSH6-18F | SEQ ID NO. 397 | TTTTTTTTCTTGCTGACATAAGAGAAAATGAACAG |
| 398 | ill-EC-2-MSH6-18R | SEQ ID NO. 398 | TTTTTTTTAGATTTCAACTCGTATTCTTCTGGCAA |
| 399 | ill-EC-1-MSH6-18F | SEQ ID NO. 399 | TTTTTTTTCCTGAGAATTTCACCACTCGCAA |
| 400 | ill-EC-1-MSH6-18R | SEQ ID NO. 400 | TTTTTTTTAGTTATAGAACAGTCGCCGCAT |
| 401 | ill-EC-2-MSH6-19F | SEQ ID NO. 401 | TTTTTTTTCATAAATGCTGAAGAACGGAGGGA |
| 402 | ill-EC-2-MSH6-19R | SEQ ID NO. 402 | TTTTTTTTCTGGCAAACAGCACTACTTATCAAA |
| 403 | ill-EC-1-MSH6-19F | SEQ ID NO. 403 | TTTTTTTTACTTAGGCTGATAAAACCCCCAAA |
| 404 | ill-EC-1-MSH6-19R | SEQ ID NO. 404 | TTTTTTTTATGGCGTGATCCTTTAAGCTCTAA |
| 405 | ill-EC-2-MSH6-20F | SEQ ID NO. 405 | TTTTTTTTGTGCCTGGCTAACTATAGTCG |
| 406 | ill-EC-2-MSH6-20R | SEQ ID NO. 406 | TTTTTTTTCCTCACAGCCTATTAGAATGTCA |
| 407 | ill-EC-1-MSH6-20F | SEQ ID NO. 407 | TTTTTTTTCGCCATCCTTGCATTACGAAGA |
| 408 | ill-EC-1-MSH6-20R | SEQ ID NO. 408 | TTTTTTTTAGAATCAGTTACCTGTCTCATAAGCG |
| 409 | ill-EC-2-MSH6-21F | SEQ ID NO. 409 | TTTTTTTTAGGAAAATGGCAAAGCCTATTGTG |
| 410 | ill-EC-2-MSH6-21R | SEQ ID NO. 410 | TTTTTTTTGCTGACTTTATGTAACTGTGTTTGGAA |
| 411 | ill-EC-1-MSH6-21F | SEQ ID NO. 411 | TTTTTTTTGCCTAGCTCTTACGTAAGGGTTC |
| 412 | ill-EC-1-MSH6-21R | SEQ ID NO. 412 | TTTTTTTTCACTCTATCAATTGGTGTGAGCCT |
| 413 | ill-EC-2-MSH6-22F | SEQ ID NO. 413 | TTTTTTTTCAGATGGGTTGTTACGTCCCT |
| 414 | ill-EC-2-MSH6-22R | SEQ ID NO. 414 | TTTTTTTTAGGCTCATATACAAGAAGCAAATATCTT |
| 415 | ill-EC-1-MSH6-22F | SEQ ID NO. 415 | TTTTTTTTATGTGTAGCTCATGATAGCTATATAACCTAG |

TABLE 1-continued

Detection primers for 8 endometrial cancer-related genes

| Number | Primer name | | Sequence (5'to3') |
|---|---|---|---|
| 416 | ill-EC-1-MSH6-22R | SEQ ID NO. 416 | TTTTTTTTACAAGCACCAGAGAATGTGC |
| 417 | ill-EC-2-MSH6-23F | SEQ ID NO. 417 | TTTTTTTTCCAGCATACTCATGCATGCAA |
| 418 | ill-EC-2-MSH6-23R | SEQ ID NO. 418 | TTTTTTTTTGCGTGCTCTAAAAACATTCATATTGT |
| 419 | ill-EC-1-MSH6-23F | SEQ ID NO. 419 | TTTTTTTTCGATGTTGCTTTTCTGTCCTAGCAT |
| 420 | ill-EC-1-MSH6-23R | SEQ ID NO. 420 | TTTTTTTTACGACATTTTATAGTCTCAGCAAGTTCT |
| 421 | ill-EC-2-MSH6-24F | SEQ ID NO. 421 | TTTTTTTTACTTTAACAGGAAGAGGTACTGCAAC |
| 422 | ill-EC-2-MSH6-24R | SEQ ID NO. 422 | TTTTTTTTGCGCACAGCAACATTTTGAGAATAAT |
| 423 | ill-EC-1-MSH6-24F | SEQ ID NO. 423 | TTTTTTTTATGTCGTACATTATTTTCAACTCACTACCA |
| 424 | ill-EC-1-MSH6-24R | SEQ ID NO. 424 | TTTTTTTTGAAAAATATTAGCGATACATGTGCTAGCAA |
| 425 | ill-EC-2-MSH6-25F | SEQ ID NO. 425 | TTTTTTTTGCGCCTAGGACATATGGTATGTG |
| 426 | ill-EC-2-MSH6-25R | SEQ ID NO. 426 | TTTTTTTTGAGGAACGTAATAGTCTCCTGGCT |
| 427 | ill-EC-1-MSH6-25F | SEQ ID NO. 427 | TTTTTTTTGGCATGCATGGTAGAAAATGAATGT |
| 428 | ill-EC-1-MSH6-25R | SEQ ID NO. 428 | TTTTTTTTCTTCTCAAATTCTCTTGCTTTTCTATGTCC |
| 429 | ill-EC-2-MSH6-26F | SEQ ID NO. 429 | TTTTTTTTCTTGCTAATCTCCCAGAGGAAGTTAT |
| 430 | ill-EC-2-MSH6-26R | SEQ ID NO. 430 | TTTTTTTTTCATCCCTTCCCCTTTTACTGTTTCT |
| 431 | ill-EC-1-MSH6-26F | SEQ ID NO. 431 | TTTTTTTTGGAAGGGATGATGCACTATGAAAAA |
| 432 | ill-EC-1-MSH6-26R | SEQ ID NO. 432 | TTTTTTTTAGTCAACTCAAAGCTTCCAATGTAGT |
| 433 | ill-EC-2-MSH6-27F | SEQ ID NO. 433 | TTTTTTTTGCTAGTGAAAGGTCAACTGTAGATGC |
| 434 | ill-EC-2-MSH6-27R | SEQ ID NO. 434 | TTTTTTTTTGTTGTCTGAATTTACCACCTTTGTCA |
| 435 | ill-EC-1-PTEN-01F | SEQ ID NO. 435 | TTTTTTTTGTGGAAGCCGTGGGCTC |
| 436 | ill-EC-1-PTEN-01R | SEQ ID NO. 436 | TTTTTTTTAACTCTCCGGCGTTCCC |
| 437 | ill-EC-2-PTEN-02F | SEQ ID NO. 437 | TTTTTTTTGGGTCTGAGTCGCCTGT |
| 438 | ill-EC-2-PTEN-02R | SEQ ID NO. 438 | TTTTTTTTTAAAACCGGCCCGGGTC |
| 439 | ill-EC-1-PTEN-02F | SEQ ID NO. 439 | TTTTTTTTCGGCGGCTGGCACATCC |
| 440 | ill-EC-1-PTEN-02R | SEQ ID NO. 440 | TTTTTTTTTCTCCTCAGCAGCCAGAGG |
| 441 | ill-EC-2-PTEN-03F | SEQ ID NO. 441 | TTTTTTTTGCAGCCGTTCGGAGGATT |
| 442 | ill-EC-2-PTEN-03R | SEQ ID NO. 442 | TTTTTTTTCTGATGCCCCTCGCTCT |
| 443 | ill-EC-1-PTEN-03F | SEQ ID NO. 443 | TTTTTTTTCCGGCTGCGGTCCAGAG |
| 444 | ill-EC-1-PTEN-03R | SEQ ID NO. 444 | TTTTTTTTCGATCTCTTTGATGATGGCTGTCA |
| 445 | ill-EC-2-PTEN-04F | SEQ ID NO. 445 | TTTTTTTTGCCATCTCTCTCCTCCTTTTTCT |
| 446 | ill-EC-2-PTEN-04R | SEQ ID NO. 446 | TTTTTTTTCGTTCTAAGAGAGTGACAGAAAGGT |
| 447 | ill-EC-1-PTEN-04F | SEQ ID NO. 447 | TTTTTTTTTCTTTTAGTTTGATTGCTGCATATTT |
| 448 | ill-EC-1-PTEN-04R | SEQ ID NO. 448 | TTTTTTTTTCAAAGCATTCTTACCTTACTACATCA |
| 449 | ill-EC-2-PTEN-05F | SEQ ID NO. 449 | TTTTTTTTAGTACTCAGATATTTATCCAAACATTATT |
| 450 | ill-EC-2-PTEN-05R | SEQ ID NO. 450 | TTTTTTTTAGAAATCTTTTCTAAATGAAAACACAA |
| 451 | ill-EC-1-PTEN-05F | SEQ ID NO. 451 | TTTTTTTTGTTAGCTCATTTTGTTAATGGTGGCT |
| 452 | ill-EC-1-PTEN-05R | SEQ ID NO. 452 | TTTTTTTTCTAACAAGCAGATAACTTTCACTTAA |
| 453 | ill-EC-2-PTEN-06F | SEQ ID NO. 453 | TTTTTTTTTGTGTCACATTATAAAGATTCAGGCAATG |

TABLE 1-continued

Detection primers for 8 endometrial cancer-related genes

| Number | Primer name | | Sequence (5'to3') |
|---|---|---|---|
| 454 | ill-EC-2-PTEN-06R | SEQ ID NO. 454 | TTTTTTTTGTACAGTACATTCATACCTACCTCTGC |
| 455 | ill-EC-1-PTEN-06F | SEQ ID NO. 455 | TTTTTTTTCTTTTAGTTGTGCTGAAAGACATTAT |
| 456 | ill-EC-1-PTEN-06R | SEQ ID NO. 456 | TTTTTTTTTGTATCTCACTCGATAATCTGGATGACT |
| 457 | ill-EC-2-PTEN-07F | SEQ ID NO. 457 | TTTTTTTTGCAACATTTCTAAAGTTACCTACTTGT |
| 458 | ill-EC-2-PTEN-07R | SEQ ID NO. 458 | TTTTTTTTATCTTCACTTAGCCATTGGTCAAGA |
| 459 | ill-EC-1-PTEN-07F | SEQ ID NO. 459 | TTTTTTTTACCCACCACAGCTAGAACTTATC |
| 460 | ill-EC-1-PTEN-07R | SEQ ID NO. 460 | TTTTTTTTAGGGCCTCTTGTGCCTTTAAA |
| 461 | ill-EC-2-PTEN-08F | SEQ ID NO. 461 | TTTTTTTTGAAAGGGACGAACTGGTGTAATGATAT |
| 462 | ill-EC-2-PTEN-08R | SEQ ID NO. 462 | TTTTTTTTTCCAATAAATTCTCAGATCCAGGAAGA |
| 463 | ill-EC-1-PTEN-08F | SEQ ID NO. 463 | TTTTTTTTACGACCCAGTTACCATAGCAATTTA |
| 464 | ill-EC-1-PTEN-08R | SEQ ID NO. 464 | TTTTTTTTAGTGCCACTGGTCTATAATCCAGA |
| 465 | ill-EC-2-PTEN-09F | SEQ ID NO. 465 | TTTTTTTTAGTCAGAGGCGCTATGTGTATTATT |
| 466 | ill-EC-2-PTEN-09R | SEQ ID NO. 466 | TTTTTTTTAGAAAACTGTTCCAATACATGGAAGGA |
| 467 | ill-EC-1-PTEN-09F | SEQ ID NO. 467 | TTTTTTTTCGGAACTTGCAGTAAGTGCTTG |
| 468 | ill-EC-1-PTEN-09R | SEQ ID NO. 468 | TTTTTTTTAATGCTTCAGAAATATAGTCTCCTGCAT |
| 469 | ill-EC-2-PTEN-10F | SEQ ID NO. 469 | TTTTTTTTCGTTTTGACAGTTTGACAGTTAAAGG |
| 470 | ill-EC-2-PTEN-10R | SEQ ID NO. 470 | TTTTTTTTGGGAACTCAAAGTACATGAACTTGTCT |
| 471 | ill-EC-1-PTEN-10F | SEQ ID NO. 471 | TTTTTTTTGCCAGCTAAAGGTGAAGATATATTCCT |
| 472 | ill-EC-1-PTEN-10R | SEQ ID NO. 472 | TTTTTTTTTCTCCCAATGAAAGTAAAGTACAAACCTT |
| 473 | ill-EC-2-PTEN-11F | SEQ ID NO. 473 | TTTTTTTTGTTACCTGTGTGTGGTGATATCAAA |
| 474 | ill-EC-2-PTEN-11R | SEQ ID NO. 474 | TTTTTTTTTGCAGATCTAATAGAAAACAAATTATAG |
| 475 | ill-EC-1-PTEN-11F | SEQ ID NO. 475 | TTTTTTTTAAATGTTTAACATAGGTGACAGATTTTCT |
| 476 | ill-EC-1-PTEN-11R | SEQ ID NO. 476 | TTTTTTTTTCTACTTTTTCTGAGGTTTCCTCTGG |
| 477 | ill-EC-2-PTEN-12F | SEQ ID NO. 477 | TTTTTTTTGGGTAAATACATTCTTCATACCAGGACC |
| 478 | ill-EC-2-PTEN-12R | SEQ ID NO. 478 | TTTTTTTTTTGTCTTTATTTGCTTTGTCAAGATC |
| 479 | ill-EC-1-PTEN-12F | SEQ ID NO. 479 | TTTTTTTTTAGAGCGTGCAGATAATGACAAGG |
| 480 | ill-EC-1-PTEN-12R | SEQ ID NO. 480 | TTTTTTTTAGAATTAAACACACATCACATACATAC |
| 481 | ill-EC-2-PTEN-13F | SEQ ID NO. 481 | TTTTTTTTAAATAGTTTAAGATGAGTCATATTTGT |
| 482 | ill-EC-1-PTEN-13F | SEQ ID NO. 482 | TTTTTTTTTGAGTCATATTTGTGGGTTTTCATTTT |
| 483 | ill-EC-2-PTEN-13R | SEQ ID NO. 483 | TTTTTTTTTGTCAGAATATCTATAATGATCAGGTT |
| 484 | ill-EC-1-PTEN-13R | SEQ ID NO. 484 | TTTTTTTTTCAGAGTCAGTGGTGTCAGAATATCT |
| 485 | ill-EC-2-PTEN-14F | SEQ ID NO. 485 | TTTTTTTTTCTGACACCACTGACTCTGATC |
| 486 | ill-EC-2-PTEN-14R | SEQ ID NO. 486 | TTTTTTTTTCTGACACAATGTCCTATTGCCATT |
| 487 | ill-EC-1-POLE-01F | SEQ ID NO. 487 | TTTTTTTTAGTGGTCTGGTCACTGGAAG |
| 488 | ill-EC-1-POLE-01R | SEQ ID NO. 488 | TTTTTTTTCGGAACATTGCCCAGCACTA |
| 489 | ill-EC-2-POLE-02F | SEQ ID NO. 489 | TTTTTTTTTCCAGGGTCTCCAGGAGGTA |
| 490 | ill-EC-2-POLE-02R | SEQ ID NO. 490 | TTTTTTTTCTCATCTGCCTCGGCTCAG |

TABLE 1-continued

Detection primers for 8 endometrial cancer-related genes

| Number | Primer name | | Sequence (5' to 3') |
|---|---|---|---|
| 491 | ill-EC-1-POLE-02F | SEQ ID NO. 491 | TTTTTTTTGAGACCCCAGTCCACTCAGA |
| 492 | ill-EC-1-POLE-02R | SEQ ID NO. 492 | TTTTTTTTCTGCTCCCTTTCAGGTCTGC |
| 493 | ill-EC-2-POLE-03F | SEQ ID NO. 493 | TTTTTTTTGATGGTGAGGGCGAAGTCTC |
| 494 | ill-EC-2-POLE-03R | SEQ ID NO. 494 | TTTTTTTTGCCCACGAATGTGTCTCG |
| 495 | ill-EC-1-POLE-03F | SEQ ID NO. 495 | TTTTTTTTGGGCATGGACTGGTCTGCA |
| 496 | ill-EC-1-POLE-03R | SEQ ID NO. 496 | TTTTTTTTAGAAGCTGATGGCCTTCACC |
| 497 | ill-EC-2-POLE-04F | SEQ ID NO. 497 | TTTTTTTTTGCACGACTCACCAGGTC |
| 498 | ill-EC-2-POLE-04R | SEQ ID NO. 498 | TTTTTTTTGGGCTGGTGACCTCTCG |
| 499 | ill-EC-1-POLE-04F | SEQ ID NO. 499 | TTTTTTTTTCATCTCGATGGCAGAGGAG |
| 500 | ill-EC-1-POLE-04R | SEQ ID NO. 500 | TTTTTTTTCACCAGGCGCTTCTCACAG |
| 501 | ill-EC-2-POLE-05F | SEQ ID NO. 501 | TTTTTTTTCTGCAGAAGCCCTCAAGACAC |
| 502 | ill-EC-2-POLE-05R | SEQ ID NO. 502 | TTTTTTTTCGCTCCTACGTGCTTCCTGA |
| 503 | ill-EC-1-POLE-05F | SEQ ID NO. 503 | TTTTTTTTTCTGAGAAGGAAGAGTCTTTACACA |
| 504 | ill-EC-1-POLE-05R | SEQ ID NO. 504 | TTTTTTTTCAAACCAGGTGAATAAGCTGAACC |
| 505 | ill-EC-2-POLE-06F | SEQ ID NO. 505 | TTTTTTTTGAGAACTCGCCGACATCCAC |
| 506 | ill-EC-2-POLE-06R | SEQ ID NO. 506 | TTTTTTTTGTAGCCTAAGGTCCAGAGGGTT |
| 507 | ill-EC-1-POLE-06F | SEQ ID NO. 507 | TTTTTTTTACACATGTACGTTAGTGTCCTCTC |
| 508 | ill-EC-1-POLE-06R | SEQ ID NO. 508 | TTTTTTTTGATTCAGAAGAAAGTCACAGGCT |
| 509 | ill-EC-2-POLE-07F | SEQ ID NO. 509 | TTTTTTTTTATTGAGCAGCAAGTGGGAACC |
| 510 | ill-EC-2-POLE-07R | SEQ ID NO. 510 | TTTTTTTTCCTTATACTTCCAGGAATGATCA |
| 511 | ill-EC-1-POLE-07F | SEQ ID NO. 511 | TTTTTTTTCTCTGAGTGAGCTCATTTGCGA |
| 512 | ill-EC-1-POLE-07R | SEQ ID NO. 512 | TTTTTTTTAGTGACCTAACTCCTCTGTGTGC |
| 513 | ill-EC-2-POLE-08F | SEQ ID NO. 513 | TTTTTTTTTAGGTCACTGGCACATGGC |
| 514 | ill-EC-2-POLE-08R | SEQ ID NO. 514 | TTTTTTTTCGTGGCCGTGTACCACT |
| 515 | ill-EC-1-POLE-08F | SEQ ID NO. 515 | TTTTTTTTGCCTCAGCCCGTCCTTCAT |
| 516 | ill-EC-1-POLE-08R | SEQ ID NO. 516 | TTTTTTTTATTAACAATGACATTTTAGCCTCA |
| 517 | ill-EC-2-POLE-09F | SEQ ID NO. 517 | TTTTTTTTCCCTTCTTGCGATACCATGGC |
| 518 | ill-EC-2-POLE-09R | SEQ ID NO. 518 | TTTTTTTTTTACTGGAAAACAACTGGAACAT |
| 519 | ill-EC-1-POLE-09F | SEQ ID NO. 519 | TTTTTTTTGGCTGCCTGTGGCAAAAACT |
| 520 | ill-EC-1-POLE-09R | SEQ ID NO. 520 | TTTTTTTTCTCATGTGTTACAGCAAGACTC |
| 521 | ill-EC-2-POLE-10F | SEQ ID NO. 521 | TTTTTTTTCAGTAAATCCTCCACGTTGGATT |
| 522 | ill-EC-2-POLE-10R | SEQ ID NO. 522 | TTTTTTTTCCTCTACCAGGCCGCGAT |
| 523 | ill-EC-1-POLE-10F | SEQ ID NO. 523 | TTTTTTTTCACTTGCTGCAGGAATGAACG |
| 524 | ill-EC-1-POLE-10R | SEQ ID NO. 524 | TTTTTTTTAATTTCTTTCTCTCGATGCTGGGA |
| 525 | ill-EC-2-POLE-11F | SEQ ID NO. 525 | TTTTTTTTCTTTTCCTTTGATTCCGCCATAGTT |
| 526 | ill-EC-2-POLE-11R | SEQ ID NO. 526 | TTTTTTTTGGAAATAAAGGAAAGTTGAGAACAA |
| 527 | ill-EC-1-POLE-11F | SEQ ID NO. 527 | TTTTTTTTGGGTCATTTAGCATCCCTCTCAAA |
| 528 | ill-EC-1-POLE-11R | SEQ ID NO. 528 | TTTTTTTTGGTCATCAGTCATCTACGCCAA |

TABLE 1-continued

Detection primers for 8 endometrial cancer-related genes

| Number | Primer name | | Sequence (5'to3') |
|---|---|---|---|
| 529 | ill-EC-2-POLE-12F | SEQ ID NO. 529 | TTTTTTTTTTGTACAGAGGATGATGCGGTT |
| 530 | ill-EC-2-POLE-12R | SEQ ID NO. 530 | TTTTTTTTCTCAGCTCTTTTCCCTCTTGGATT |
| 531 | ill-EC-1-POLE-12F | SEQ ID NO. 531 | TTTTTTTTCACTACTTATCCCAGAGGCACT |
| 532 | ill-EC-1-POLE-12R | SEQ ID NO. 532 | TTTTTTTTCCTCTCTGCTTCATGACCCT |
| 533 | ill-EC-2-POLE-13F | SEQ ID NO. 533 | TTTTTTTTGGAAGAGCTTCTTCATCATGTTG |
| 534 | ill-EC-2-POLE-13R | SEQ ID NO. 534 | TTTTTTTTGATCCTGAAGAGCATGGTCGT |
| 535 | ill-EC-1-POLE-13F | SEQ ID NO. 535 | TTTTTTTTCCTGGTTGTCTGCATAGATGTTGT |
| 536 | ill-EC-1-POLE-13R | SEQ ID NO. 536 | TTTTTTTTGAAAACCTGTGCCCATTTCAGT |
| 537 | ill-EC-2-POLE-14F | SEQ ID NO. 537 | TTTTTTTTAAATTAAGGGCAAAGGATAAGAC |
| 538 | ill-EC-2-POLE-14R | SEQ ID NO. 538 | TTTTTTTTATCAGCTTCGACGTGATCCAG |
| 539 | ill-EC-1-POLE-14F | SEQ ID NO. 539 | TTTTTTTTAGCCTGACCACCCGTGAT |
| 540 | ill-EC-1-POLE-14R | SEQ ID NO. 540 | TTTTTTTTGAGCATGGCGTCTTCCTGT |
| 541 | ill-EC-2-POLE-15F | SEQ ID NO. 541 | TTTTTTTTTGTCGTTGACATGGTGAGACT |
| 542 | ill-EC-2-POLE-15R | SEQ ID NO. 542 | TTTTTTTTGGTCTGTTGCTGGTTCTGGA |
| 543 | ill-EC-1-POLE-15F | SEQ ID NO. 543 | TTTTTTTTGGCACTATTGCCTTGAGAAGAT |
| 544 | ill-EC-1-POLE-15R | SEQ ID NO. 544 | TTTTTTTTGACAACTGTCTTGTCATGGAGT |
| 545 | ill-EC-2-POLE-16F | SEQ ID NO. 545 | TTTTTTTTTGATCTCAACAGTGGCTTGG |
| 546 | ill-EC-2-POLE-16R | SEQ ID NO. 546 | TTTTTTTTAGAGGACATCTCCACATTCGG |
| 547 | ill-EC-1-POLE-16F | SEQ ID NO. 547 | TTTTTTTTCAGTTGTCATCAGCCTCCTTT |
| 548 | ill-EC-1-POLE-16R | SEQ ID NO. 548 | TTTTTTTTGTGCAGGTACTTTCACATTCCC |
| 549 | ill-EC-2-POLE-17F | SEQ ID NO. 549 | TTTTTTTTTGTCCTCTGGTAGGTTCCCAA |
| 550 | ill-EC-2-POLE-17R | SEQ ID NO. 550 | TTTTTTTTGGCCTTCGAGATGAGCAGGT |
| 551 | ill-EC-1-POLE-17F | SEQ ID NO. 551 | TTTTTTTTGCCCACAACGACAGTACTGTG |
| 552 | ill-EC-1-POLE-17R | SEQ ID NO. 552 | TTTTTTTTGCCTATCTGTGTGGCTGACAAGAT |
| 553 | ill-EC-2-POLE-18F | SEQ ID NO. 553 | TTTTTTTTCAGGTTGAGGTAGTGACGGATC |
| 554 | ill-EC-2-POLE-18R | SEQ ID NO. 554 | TTTTTTTTCCACACTCATCGCTGTTCAGT |
| 555 | ill-EC-1-POLE-18F | SEQ ID NO. 555 | TTTTTTTTGATAGGCACCAGTGGGAATTCC |
| 556 | ill-EC-1-POLE-18R | SEQ ID NO. 556 | TTTTTTTTGTGTGAGCCCCATCTTCTTTGA |
| 557 | ill-EC-2-POLE-19F | SEQ ID NO. 557 | TTTTTTTTCAAGGCAAAATGGAAGAAAAGACC |
| 558 | ill-EC-2-POLE-19R | SEQ ID NO. 558 | TTTTTTTTCAAACACACCTTCGAAGTTCGG |
| 559 | ill-EC-1-POLE-19F | SEQ ID NO. 559 | TTTTTTTTCGAGCAGGAATCGCTGGA |
| 560 | ill-EC-1-POLE-19R | SEQ ID NO. 560 | TTTTTTTTGTCTAGGTGCGCAGCAAC |
| 561 | ill-EC-2-POLE-20F | SEQ ID NO. 561 | TTTTTTTTCCGTGCTCTGCTGAGTACAGG |
| 562 | ill-EC-2-POLE-20R | SEQ ID NO. 562 | TTTTTTTTCCATGAGTGCTTGTCGTGATTGA |
| 563 | ill-EC-1-POLE-20F | SEQ ID NO. 563 | TTTTTTTTCCCTTGAGGACAAGACCTGGAG |
| 564 | ill-EC-1-POLE-20R | SEQ ID NO. 564 | TTTTTTTTCCCACAAAGCGCTCTTCG |
| 565 | ill-EC-2-POLE-21F | SEQ ID NO. 565 | TTTTTTTTTCACAGTGTCCAGCACAAAGAC |

TABLE 1-continued

Detection primers for 8 endometrial cancer-related genes

| Number | Primer name | | Sequence (5' to 3') |
|---|---|---|---|
| 566 | ill-EC-2-POLE-21R | SEQ ID NO. 566 | TTTTTTTTGGGTGACGGTCTTGTTTCCTT |
| 567 | ill-EC-1-POLE-21F | SEQ ID NO. 567 | TTTTTTTTGCGTGGTGGTACAGGTAGATATG |
| 568 | ill-EC-1-POLE-21R | SEQ ID NO. 568 | TTTTTTTTAGAGACCTTTGCTCTTGAGCAC |
| 569 | ill-EC-2-POLE-22F | SEQ ID NO. 569 | TTTTTTTTCCTGGTTCCAGGTAGCTGAACT |
| 570 | ill-EC-2-POLE-22R | SEQ ID NO. 570 | TTTTTTTTCCCGATTCTTCCAGGTTCCGTTA |
| 571 | ill-EC-1-POLE-22F | SEQ ID NO. 571 | TTTTTTTTGCTTCCCAGCCTGAAAGGT |
| 572 | ill-EC-1-POLE-22R | SEQ ID NO. 572 | TTTTTTTTCACATCCCGGGCAGAAGTC |
| 573 | ill-EC-2-POLE-23F | SEQ ID NO. 573 | TTTTTTTTGGGCGGGTTTCTTTCCTCCATA |
| 574 | ill-EC-2-POLE-23R | SEQ ID NO. 574 | TTTTTTTTTATGAGTATTCAGTGCCAGAGG |
| 575 | ill-EC-1-POLE-23F | SEQ ID NO. 575 | TTTTTTTTCAGCTCAGCGTTGATCTCGTT |
| 576 | ill-EC-1-POLE-23R | SEQ ID NO. 576 | TTTTTTTTGCTTTGTGTGTGTACCACAGACA |
| 577 | ill-EC-2-POLE-24F | SEQ ID NO. 577 | TTTTTTTTAGATCATGGGAAAGCCACCTCA |
| 578 | ill-EC-2-POLE-24R | SEQ ID NO. 578 | TTTTTTTTCCCGTGTGTTCTACGTGAACC |
| 579 | ill-EC-1-POLE-24F | SEQ ID NO. 579 | TTTTTTTTCCCTCCTCCGCTTTAGCGA |
| 580 | ill-EC-1-POLE-24R | SEQ ID NO. 580 | TTTTTTTTGTTCCAGTGTGTCCTGTGATGTG |
| 581 | ill-EC-2-POLE-25F | SEQ ID NO. 581 | TTTTTTTTGCTGGTCTCGCTGATCTGAAA |
| 582 | ill-EC-2-POLE-25R | SEQ ID NO. 582 | TTTTTTTTCTGGAGTTTCCTGCCCATCGTA |
| 583 | ill-EC-1-POLE-25F | SEQ ID NO. 583 | TTTTTTTTAACCCTCCCATCCCAGACCT |
| 584 | ill-EC-1-POLE-25R | SEQ ID NO. 584 | TTTTTTTTGGGAGCTTCTTGCGAAGAAC |
| 585 | ill-EC-2-POLE-26F | SEQ ID NO. 585 | TTTTTTTTCTGCCACGGAAGGTCCA |
| 586 | ill-EC-2-POLE-26R | SEQ ID NO. 586 | TTTTTTTTCAAGAAGAAGTGGCAGCTGCA |
| 587 | ill-EC-1-POLE-26F | SEQ ID NO. 587 | TTTTTTTTCCCTCTGCCGACTCCAGAC |
| 588 | ill-EC-1-POLE-26R | SEQ ID NO. 588 | TTTTTTTTGGCGGGCATTCCCATCTCA |
| 589 | ill-EC-2-POLE-27F | SEQ ID NO. 589 | TTTTTTTTCTGTGCAGACCCCTCAGAGA |
| 590 | ill-EC-2-POLE-27R | SEQ ID NO. 590 | TTTTTTTTCAGCCCTGTCACTGTGAAG |
| 591 | ill-EC-1-POLE-27F | SEQ ID NO. 591 | TTTTTTTTTCTCCCAAAGAACTCGCTTCC |
| 592 | ill-EC-1-POLE-27R | SEQ ID NO. 592 | TTTTTTTTGCAGCCCGAGATCCTGAGAT |
| 593 | ill-EC-2-POLE-28F | SEQ ID NO. 593 | TTTTTTTTGAACAGAAGCTTCACTACAGCACA |
| 594 | ill-EC-2-POLE-28R | SEQ ID NO. 594 | TTTTTTTTAACTGCTGGAGAAGAATGATGTCT |
| 595 | ill-EC-1-POLE-28F | SEQ ID NO. 595 | TTTTTTTTGGGTGAAGAGCTCACTGATCTT |
| 596 | ill-EC-1-POLE-28R | SEQ ID NO. 596 | TTTTTTTTGGGCTAAAAACTGTGCAGTTAGAC |
| 597 | ill-EC-2-POLE-29F | SEQ ID NO. 597 | TTTTTTTTATCAGAGAGAGACCCTTGTCTAAC |
| 598 | ill-EC-2-POLE-29R | SEQ ID NO. 598 | TTTTTTTTCAGATTCTGGATTGGGACTACTACA |
| 599 | ill-EC-1-POLE-29F | SEQ ID NO. 599 | TTTTTTTTGGGATGGTGATGATCTTCTGGATG |
| 600 | ill-EC-1-POLE-29R | SEQ ID NO. 600 | TTTTTTTTTGAGAGGATTAAATAAGACACAGTG |
| 601 | ill-EC-2-POLE-30F | SEQ ID NO. 601 | TTTTTTTTATTCTGCTCTGTCTAGCTTTCCTTG |
| 602 | ill-EC-2-POLE-30R | SEQ ID NO. 602 | TTTTTTTTGAGGAAGCACTTTCTCCGGAAAT |
| 603 | ill-EC-1-POLE-30F | SEQ ID NO. 603 | TTTTTTTTCTGGCACTCACTGCTCGAATATC |

TABLE 1-continued

Detection primers for 8 endometrial cancer-related genes

| Number | Primer name | | Sequence (5' to 3') |
|---|---|---|---|
| 604 | ill-EC-1-POLE-30R | SEQ ID NO. 604 | TTTTTTTTAGGATCAGATTTTGGGTGATTTTC |
| 605 | ill-EC-2-POLE-31F | SEQ ID NO. 605 | TTTTTTTTGAGCCCTCACCTGTCCGT |
| 606 | ill-EC-2-POLE-31R | SEQ ID NO. 606 | TTTTTTTTCCGAGTTCCTGGGAGACCAGA |
| 607 | ill-EC-1-POLE-31F | SEQ ID NO. 607 | TTTTTTTTAGATGATGTAGCGGCAACTCAG |
| 608 | ill-EC-1-POLE-31R | SEQ ID NO. 608 | TTTTTTTTAACATGCCTGACTCTGAGCTATTC |
| 609 | ill-EC-2-POLE-32F | SEQ ID NO. 609 | TTTTTTTTGTAGACTTCTGCTCCCCGTAATCT |
| 610 | ill-EC-2-POLE-32R | SEQ ID NO. 610 | TTTTTTTTCCTTGATTTCTGCAGTGTTTTACCC |
| 611 | ill-EC-1-POLE-32F | SEQ ID NO. 611 | TTTTTTTTGTTGGCTGCCTAGAGAAAGACAAT |
| 612 | ill-EC-1-POLE-32R | SEQ ID NO. 612 | TTTTTTTTAAAGTATTGCCACACAGGCATATTAGA |
| 613 | ill-EC-2-POLE-33F | SEQ ID NO. 613 | TTTTTTTTCTTCATCCTTCATCCCTCAGAGC |
| 614 | ill-EC-2-POLE-33R | SEQ ID NO. 614 | TTTTTTTTTGCAGCTGATTAAGATCTTCCAATCC |
| 615 | ill-EC-1-POLE-33F | SEQ ID NO. 615 | TTTTTTTTACAGAGCCATACACCTCTTCCA |
| 616 | ill-EC-1-POLE-33R | SEQ ID NO. 616 | TTTTTTTTGGTATGCTGTGTTCAATGAAGACG |
| 617 | ill-EC-2-POLE-34F | SEQ ID NO. 617 | TTTTTTTTCGCGGCGTTTGACCTCAA |
| 618 | ill-EC-2-POLE-34R | SEQ ID NO. 618 | TTTTTTTTGACAGGTGGAGGGTTGGAAAG |
| 619 | ill-EC-1-POLE-34F | SEQ ID NO. 619 | TTTTTTTTCCAACCTCCTTTCTGGGCTAAATTA |
| 620 | ill-EC-1-POLE-34R | SEQ ID NO. 620 | TTTTTTTTTTTTGAGGTTGATGGGCCCTA |
| 621 | ill-EC-2-POLE-35F | SEQ ID NO. 621 | TTTTTTTTGGAGGCTGGAAGAATCATGG |
| 622 | ill-EC-2-POLE-35R | SEQ ID NO. 622 | TTTTTTTTGGGCCATCATGAGTGAAGCT |
| 623 | ill-EC-1-POLE-35F | SEQ ID NO. 623 | TTTTTTTTGTGACATCAGGGCACTGACG |
| 624 | ill-EC-1-POLE-35R | SEQ ID NO. 624 | TTTTTTTTCCCAACAGCTTCCCAGAAAATT |
| 625 | ill-EC-2-POLE-36F | SEQ ID NO. 625 | TTTTTTTTCCTGGGTAGGAGATGGTCAC |
| 626 | ill-EC-2-POLE-36R | SEQ ID NO. 626 | TTTTTTTTCACTGGGTGAAAAGGAAAGGG |
| 627 | ill-EC-1-POLE-36F | SEQ ID NO. 627 | TTTTTTTTTCCTTCCTGCCCATGCTTG |
| 628 | ill-EC-1-POLE-36R | SEQ ID NO. 628 | TTTTTTTTCTCTCAGGGCTCGCTGGT |
| 629 | ill-EC-2-POLE-37F | SEQ ID NO. 629 | TTTTTTTTCGGCTCCCCTTCTGCACTC |
| 630 | ill-EC-2-POLE-37R | SEQ ID NO. 630 | TTTTTTTTCTCTGATACCCCCTGGAGGA |
| 631 | ill-EC-1-POLE-37F | SEQ ID NO. 631 | TTTTTTTTCTCCCTCCAACATTCCTTGAATCAG |
| 632 | ill-EC-1-POLE-37R | SEQ ID NO. 632 | TTTTTTTTCAAGTGCATCCTGAACTCCTTCTA |
| 633 | ill-EC-2-POLE-38F | SEQ ID NO. 633 | TTTTTTTTCTACCCCTTGCGCATGACATA |
| 634 | ill-EC-2-POLE-38R | SEQ ID NO. 634 | TTTTTTTTCATGTTCATGTGCTTCTCAGGTGT |
| 635 | ill-EC-1-POLE-38F | SEQ ID NO. 635 | TTTTTTTTTCATACAGCACCTCCATGTTCTTG |
| 636 | ill-EC-1-POLE-38R | SEQ ID NO. 636 | TTTTTTTTACTAAAAACCTGGGCTATTGACTTTGT |
| 637 | ill-EC-2-POLE-39F | SEQ ID NO. 637 | TTTTTTTTCCACTTCATGAGCCGACTGAAA |
| 638 | ill-EC-2-POLE-39R | SEQ ID NO. 638 | TTTTTTTTGGGAAAACTCCTTCTACGTGGAC |
| 639 | ill-EC-1-POLE-39F | SEQ ID NO. 639 | TTTTTTTTGTGGAGCCCTTTGAACTCGTAA |
| 640 | ill-EC-1-POLE-39R | SEQ ID NO. 640 | TTTTTTTTTGCTTAGATTACTGCCGGAAAGC |

TABLE 1-continued

Detection primers for 8 endometrial cancer-related genes

| Number | Primer name | | Sequence (5' to 3') |
|---|---|---|---|
| 641 | ill-EC-2-POLE-40F | SEQ ID NO. 641 | TTTTTTTTCCTTGGTGATGTGGATCTTCTTGTAG |
| 642 | ill-EC-2-POLE-40R | SEQ ID NO. 642 | TTTTTTTTTAGCAGTGTATCTGAGCTGTTGC |
| 643 | ill-EC-1-POLE-40F | SEQ ID NO. 643 | TTTTTTTTGAGCAGGAGCCACATCTTTACA |
| 644 | ill-EC-1-POLE-40R | SEQ ID NO. 644 | TTTTTTTTATACCATCGGATCCAGCACCA |
| 645 | ill-EC-2-POLE-41F | SEQ ID NO. 645 | TTTTTTTTTCCTCGCGGGACAGTTC |
| 646 | ill-EC-2-POLE-41R | SEQ ID NO. 646 | TTTTTTTTGTGTGTCTGTGCCTCCTTTTGA |
| 647 | ill-EC-1-POLE-41F | SEQ ID NO. 647 | TTTTTTTTGACACTCACCCACCCGTTT |
| 648 | ill-EC-1-POLE-41R | SEQ ID NO. 648 | TTTTTTTTGCCCTCTGCCATGGTGGAC |
| 649 | ill-EC-2-POLE-42F | SEQ ID NO. 649 | TTTTTTTTGCAGTTTGCTCCAGGCTTATTGAA |
| 650 | ill-EC-2-POLE-42R | SEQ ID NO. 650 | TTTTTTTTATGTACCCCAACATCATCCTGAC |
| 651 | ill-EC-1-POLE-42F | SEQ ID NO. 651 | TTTTTTTTCGACTCTGACACGGGAAGTAAA |
| 652 | ill-EC-1-POLE-42R | SEQ ID NO. 652 | TTTTTTTTTCTCTGCAGGTGTGTGATGAGATTA |
| 653 | ill-EC-2-POLE-43F | SEQ ID NO. 653 | TTTTTTTTTGGTAGATGAGTGGACACTCGAT |
| 654 | ill-EC-2-POLE-43R | SEQ ID NO. 654 | TTTTTTTTCAGCTTTTTCCTCTCCTGAATGTCTA |
| 655 | ill-EC-1-POLE-43F | SEQ ID NO. 655 | TTTTTTTTCACAATAAACGTGCTGCTGAAAGA |
| 656 | ill-EC-1-POLE-43R | SEQ ID NO. 656 | TTTTTTTTCTTGAGGAAGAGGAGAAAGTGCCT |
| 657 | ill-EC-2-POLE-44F | SEQ ID NO. 657 | TTTTTTTTCCTCCCTGATGGTTACCTCTTCAA |
| 658 | ill-EC-2-POLE-44R | SEQ ID NO. 658 | TTTTTTTTCTGACCCCGTCGTCTCACT |
| 659 | ill-EC-1-POLE-44F | SEQ ID NO. 659 | TTTTTTTTTCAAAGGCGGCAGGATTCTA |
| 660 | ill-EC-1-POLE-44R | SEQ ID NO. 660 | TTTTTTTTGGAGCTTTCTCGGGCACAAC |
| 661 | ill-EC-2-POLE-45F | SEQ ID NO. 661 | TTTTTTTTGGTCCTACCACAGCACAAGAGT |
| 662 | ill-EC-2-POLE-45R | SEQ ID NO. 662 | TTTTTTTTAGTTCAATAAGCTGACGGACGA |
| 663 | ill-EC-1-POLE-45F | SEQ ID NO. 663 | TTTTTTTTCCCGACGTAGGTCTCAGAGTC |
| 664 | ill-EC-1-POLE-45R | SEQ ID NO. 664 | TTTTTTTTCTGGAAGCCTTGGTTTCTCTTGC |
| 665 | ill-EC-2-POLE-46F | SEQ ID NO. 665 | TTTTTTTTGGAAGATGATGTTGGCGTGGAA |
| 666 | ill-EC-2-POLE-46R | SEQ ID NO. 666 | TTTTTTTTTCCTTTCACACTGAAGTTCAGCTTA |
| 667 | ill-EC-1-POLE-46F | SEQ ID NO. 667 | TTTTTTTTTCAGCTCCAGTGCATTTGGAAT |
| 668 | ill-EC-1-POLE-46R | SEQ ID NO. 668 | TTTTTTTTCAGATGCTGTCGCCACTTACTAC |
| 669 | ill-EC-2-POLE-47F | SEQ ID NO. 669 | TTTTTTTTTAATGGTGCACAGAGCAAAGATGAAT |
| 670 | ill-EC-2-POLE-47R | SEQ ID NO. 670 | TTTTTTTTGACCCTGGGCTCTTGATTTTGAT |
| 671 | ill-EC-1-POLE-47F | SEQ ID NO. 671 | TTTTTTTTCCGGGATGTGGCTCACATG |
| 672 | ill-EC-1-POLE-47R | SEQ ID NO. 672 | TTTTTTTTCCAAGGCCAAGCTAGGCTAT |
| 673 | ill-EC-2-POLE-48F | SEQ ID NO. 673 | TTTTTTTTGCTCCGTGGCCATCCG |
| 674 | ill-EC-2-POLE-48R | SEQ ID NO. 674 | TTTTTTTTGGGCTGCATGTTAGAATCATCCT |
| 675 | ill-EC-1-POLE-48F | SEQ ID NO. 675 | TTTTTTTTTCCTCCCATGAGATGTGGTGAC |
| 676 | ill-EC-1-POLE-48R | SEQ ID NO. 676 | TTTTTTTTAGGAGATAGGCTTCCAGAAGGAC |
| 677 | ill-EC-2-POLE-49F | SEQ ID NO. 677 | TTTTTTTTACCTGAGGCAGTCCATGTG |
| 678 | ill-EC-2-POLE-49R | SEQ ID NO. 678 | TTTTTTTTGGGCATTAGAGCCTGACCT |

TABLE 1-continued

Detection primers for 8 endometrial cancer-related genes

| Number | Primer name | | Sequence (5'to3') |
|---|---|---|---|
| 679 | ill-EC-1-POLE-49F | SEQ ID NO. 679 | TTTTTTTTGCCACCTCCTAAGTCGACATG |
| 680 | ill-EC-1-POLE-49R | SEQ ID NO. 680 | TTTTTTTTGATCCAAAGGTGGTTTGAACACG |
| 681 | ill-EC-2-POLE-50F | SEQ ID NO. 681 | TTTTTTTTCCAGTTACTCATAGAGAAGACACAGACT |
| 682 | ill-EC-2-POLE-50R | SEQ ID NO. 682 | TTTTTTTTTGGAATAGCTTGAAGAAGAGAAAGAGC |
| 683 | ill-EC-1-POLE-50F | SEQ ID NO. 683 | TTTTTTTTGCTGCAATTCTGATCTGACGGA |
| 684 | ill-EC-1-POLE-50R | SEQ ID NO. 684 | TTTTTTTTATTGAAGATTTTGAGTTCACCCCAA |
| 685 | ill-EC-2-POLE-51F | SEQ ID NO. 685 | TTTTTTTTGGTAGTTTCCCAAGTGATACCTCCTTA |
| 686 | ill-EC-2-POLE-51R | SEQ ID NO. 686 | TTTTTTTTCTCTGACTTGTGCTGATTGCTAATGA |
| 687 | ill-EC-1-POLE-51F | SEQ ID NO. 687 | TTTTTTTTTCTGAAACAATCTCCCTGTTGGTG |
| 688 | ill-EC-1-POLE-51R | SEQ ID NO. 688 | TTTTTTTTAGGAAGCTTAAAGCACTTTCACATTG |
| 689 | ill-EC-2-POLE-52F | SEQ ID NO. 689 | TTTTTTTTATTCCTGGACTAACTCATTATTCACTCAA |
| 690 | ill-EC-2-POLE-52R | SEQ ID NO. 690 | TTTTTTTTCTGATGCTGAGACAGACCAGATTA |
| 691 | ill-EC-1-POLE-52F | SEQ ID NO. 691 | TTTTTTTTTGGCCATCGATCATGTAGGAAATC |
| 692 | ill-EC-1-POLE-52R | SEQ ID NO. 692 | TTTTTTTTGGAGTTTAGAGCTTGGCTTTATGCTTA |
| 693 | ill-EC-2-POLE-53F | SEQ ID NO. 693 | TTTTTTTTCAGTTTGGTCGTCTCAATGTCAAA |
| 694 | ill-EC-2-POLE-53R | SEQ ID NO. 694 | TTTTTTTTCAGCTCTAGAGCCTTTTGACTCTTT |
| 695 | ill-EC-1-POLE-53F | SEQ ID NO. 695 | TTTTTTTTGCACTGAAGAATATTCTCTCCAGAAAAC |
| 696 | ill-EC-1-POLE-53R | SEQ ID NO. 696 | TTTTTTTTCTAGTTAGCACACTGTGTGTTTTGC |
| 697 | ill-EC-2-POLE-54F | SEQ ID NO. 697 | TTTTTTTTAGCAAAACTTACAGGTCGTTCAAC |
| 698 | ill-EC-2-POLE-54R | SEQ ID NO. 698 | TTTTTTTTAGATGATCATTATGGGTGAATCCACA |
| 699 | ill-EC-1-POLE-54F | SEQ ID NO. 699 | TTTTTTTTTCATCTCCTGGCTGTTAGGAAATT |
| 700 | ill-EC-1-POLE-54R | SEQ ID NO. 700 | TTTTTTTTACTGATGAAGAGGAAACCTCTAAGAAGA |
| 701 | ill-EC-2-POLE-55F | SEQ ID NO. 701 | TTTTTTTTCATCGTACTCGCGCATGTC |
| 702 | ill-EC-2-POLE-55R | SEQ ID NO. 702 | TTTTTTTTCCTACTGAGTTGGAACTCTGGTC |
| 703 | ill-EC-1-POLE-55F | SEQ ID NO. 703 | TTTTTTTTGTGTTCCTGTCTCCTATCCATCTTG |
| 704 | ill-EC-1-POLE-55R | SEQ ID NO. 704 | TTTTTTTTACACTGTGGAGGATCTTGTCAAAG |
| 705 | ill-EC-2-POLE-56F | SEQ ID NO. 705 | TTTTTTTTCAAGACCAAAGTTTACCTGGAAAGC |
| 706 | ill-EC-2-POLE-56R | SEQ ID NO. 706 | TTTTTTTTCAAATCACTTGGTGGGTTTGAAGC |
| 707 | ill-EC-1-POLE-56F | SEQ ID NO. 707 | TTTTTTTTGTGGAAGGACAGCCTGATGTAATT |
| 708 | ill-EC-1-POLE-56R | SEQ ID NO. 708 | TTTTTTTTCTTGAAGTCGCCAACTCTTTGACT |
| 709 | ill-EC-2-POLE-57F | SEQ ID NO. 709 | TTTTTTTTAACAATGTAGACTCTGGCCTCATTTA |
| 710 | ill-EC-2-POLE-57R | SEQ ID NO. 710 | TTTTTTTTGAAAGCCTTTTCATTCTGATCCTGATT |
| 711 | ill-EC-1-POLE-57F | SEQ ID NO. 711 | TTTTTTTTAGAAAAGATGAAACTTCTCGCTCACA |
| 712 | ill-EC-1-POLE-57R | SEQ ID NO. 712 | TTTTTTTTGACCAGAAAGGTGAGTGTGTTTCA |
| 713 | ill-EC-2-POLE-58F | SEQ ID NO. 713 | TTTTTTTTAGAATGACACACAGGTCGTCTGA |
| 714 | ill-EC-2-POLE-58R | SEQ ID NO. 714 | TTTTTTTTGCAAGCAATGTGTTTTCACTTTTCTC |
| 715 | ill-EC-1-POLE-58F | SEQ ID NO. 715 | TTTTTTTTCAGTCACAGAGCTACATGAACACC |

TABLE 1-continued

Detection primers for 8 endometrial cancer-related genes

| Number | Primer name | | Sequence (5'to3') |
|---|---|---|---|
| 716 | ill-EC-2-POLE-59F | SEQ ID NO. 716 | TTTTTTTTACCCATAAAAGTGGGTTTTAGCTTGTC |
| 717 | ill-EC-1-POLE-58R | SEQ ID NO. 717 | TTTTTTTTTGTGTCTGTGTTGACTGATTCTCT |
| 718 | ill-EC-2-POLE-59R | SEQ ID NO. 718 | TTTTTTTTCTAACTGTGTAGAGGATGGTCTTGTG |
| 719 | ill-EC-1-POLE-59F | SEQ ID NO. 719 | TTTTTTTTCTTCACATCTCCCACCTGATTCAC |
| 720 | ill-EC-1-POLE-59R | SEQ ID NO. 720 | TTTTTTTTTGAGAAGACAGGCTGGCTCATTA |
| 721 | ill-EC-2-POLE-60F | SEQ ID NO. 721 | TTTTTTTTGGAGAAGGACCTAGTGCTTACAG |
| 722 | ill-EC-2-POLE-60R | SEQ ID NO. 722 | TTTTTTTTTCTTTCACTCAGGGATGATGGC |
| 723 | ill-EC-1-POLE-60F | SEQ ID NO. 723 | TTTTTTTTCAAAACCAAACCGCAAATCCATCTT |
| 724 | ill-EC-1-POLE-60R | SEQ ID NO. 724 | TTTTTTTTTAGCAGCAGGTGGCATTACAAATTAA |
| 725 | ill-EC-2-POLE-61F | SEQ ID NO. 725 | TTTTTTTTCCCCATGGCACCCTCCG |
| 726 | ill-EC-2-POLE-61R | SEQ ID NO. 726 | TTTTTTTTGTGGGAGCGCGCCAAATT |
| 727 | ill-EC-MLH1-Z01F | SEQ ID NO. 727 | TTTTTTTTTGCTCCATTTGGGGACCTGT |
| 728 | ill-EC-MLH1-Z01R | SEQ ID NO. 728 | TTTTTTTTTAAGACGAGGTCAGACTTGTTGT |
| 729 | ill-EC-PMS2-Z01F | SEQ ID NO. 729 | TTTTTTTTCCATACAGTGACTACGGTCAGTTCT |
| 730 | ill-EC-PMS2-Z01R | SEQ ID NO. 730 | TTTTTTTTGATGAAGAAACTGATCACCCACAT |
| 731 | ill-EC-PMS2-Z02F | SEQ ID NO. 731 | TTTTTTTTAGTTCCAGGGGTGGTCCAT |
| 732 | ill-EC-PMS2-Z02R | SEQ ID NO. 732 | TTTTTTTTTCTGAAGAGCTGCCATTCTGAC |
| 733 | ill-EC-PMS2-Z03F | SEQ ID NO. 733 | TTTTTTTTGCTGAGACCTTCCTCGACTG |
| 734 | ill-EC-PMS2-Z03R | SEQ ID NO. 734 | TTTTTTTTCCAGGACGTCGATGAACTGAT |
| 735 | ill-EC-PMS2-Z04F | SEQ ID NO. 735 | TTTTTTTTGGCTGTCGCTCAGCATGAAG |
| 736 | ill-EC-PMS2-Z04R | SEQ ID NO. 736 | TTTTTTTTAAACGTGTTTGTCAAGTCATGGA |
| 737 | ill-EC-PMS2-Z05F | SEQ ID NO. 737 | TTTTTTTTTGAACACTAAACACACTCACGCT |
| 738 | ill-EC-PMS2-Z05R | SEQ ID NO. 738 | TTTTTTTTTGCAGAAATGGAAATCATTGGTCA |
| 739 | ill-EC-PMS2-Z06F | SEQ ID NO. 739 | TTTTTTTTTGCTCATGTGCATTAACCAATACTC |
| 740 | ill-EC-PMS2-Z06R | SEQ ID NO. 740 | TTTTTTTTGTCAGCGTGCAGCAGTTATT |
| 741 | ill-EC-PTEN-Z01F | SEQ ID NO. 741 | TTTTTTTTGCAGTTCAACTTCTGTAACACCA |
| 742 | ill-EC-PTEN-Z01R | SEQ ID NO. 742 | TTTTTTTTTGCTGATCTTCATCAAAAGGTTC |
| 743 | Ion-BC1-F | SEQ ID NO. 743 | TCCGATCGCAAGCCTCAGTAGCGACCATCTCATCCCTGCGTGTCTCCGACTCAGCTAAGGTAACGATCGGAAAAA |
| 744 | Ion-BC1-R | SEQ ID NO. 744 | ATCACCGACGCAAGCCTCAGTAGCGACTAAGGTCTCAGCCTCTCTATGGGCAGTCGGTGATAAAAA |
| 745 | Ion-BC2-F | SEQ ID NO. 745 | TCCGATCGCAAGCCTCAGTAGCGACCATCTCATCCCTGCGTGTCTCCGACTCAGTTACAACCTCGATCGGAAAAA |
| 746 | Ion-BC2-R | SEQ ID NO. 746 | ATCACCGACGCAAGCCTCAGTAGCGATTACAGTCTCAGCCTCTCTATGGGCAGTCGGTGATAAAAA |
| 747 | Ion-BC3-F | SEQ ID NO. 747 | TCCGATCGCAAGCCTCAGTAGCGACCATCTCATCCCTGCGTGTCTCCGACTCAGCCTGCCATTCGCGATCGGAAAAA |
| 748 | Ion-BC3-R | SEQ ID NO. 748 | ATCACCGACGCAAGCCTCAGTAGCGACCTGCGTCTCAGCCTCTCTATGGGCAGTCGGTGATAAAAA |

TABLE 1-continued

Detection primers for 8 endometrial cancer-related genes

| Number | Primer name | Sequence (5'to3') |
|---|---|---|
| 749 | Ion-BC4-F SEQ ID NO. 749 | TCCGATCGCAAGCCTCAGTAGCGACCATCTCATCCCT GCGTGTCTCCGACTCAGTGGAGGACGGACGATCGGA AAAA |
| 750 | Ion-BC4-R SEQ ID NO. 750 | ATCACCGACGCAAGCCTCAGTAGCGATGGAGGTCTC AGCCTCTCTATGGGCAGTCGGTGATAAAAA |
| 751 | Ion-BC5-F SEQ ID NO. 751 | TCCGATCGCAAGCCTCAGTAGCGACCATCTCATCCCT GCGTGTCTCCGACTCAGTGAGCGGAACGATCGGAAA AA |
| 752 | Ion-BC5-R SEQ ID NO. 752 | ATCACCGACGCAAGCCTCAGTAGCGATGAGCGTCTC AGCCTCTCTATGGGCAGTCGGTGATAAAAA |
| 753 | Ion-BC6-F SEQ ID NO. 753 | TCCGATCGCAAGCCTCAGTAGCGACCATCTCATCCCT GCGTGTCTCCGACTCAGCCTTAGAGTTCGATCGGAA AAA |
| 754 | Ion-BC6-R SEQ ID NO. 754 | ATCACCGACGCAAGCCTCAGTAGCGACCTTAGTCTC AGCCTCTCTATGGGCAGTCGGTGATAAAAA |
| 755 | Ion-BC7-F SEQ ID NO. 755 | TCCGATCGCAAGCCTCAGTAGCGACCATCTCATCCCT GCGTGTCTCCGACTCAGTCCTCGAATCGATCGGAAA AA |
| 756 | Ion-BC7-R SEQ ID NO. 756 | ATCACCGACGCAAGCCTCAGTAGCGATCCTCGTCTC AGCCTCTCTATGGGCAGTCGGTGATAAAAA |
| 757 | Ion-BC8-F SEQ ID NO. 757 | TCCGATCGCAAGCCTCAGTAGCGACCATCTCATCCCT GCGTGTCTCCGACTCAGAACCTCATTCGATCGGAAA AA |
| 758 | Ion-BC8-R SEQ ID NO. 758 | ATCACCGACGCAAGCCTCAGTAGCGAAACCTGTCTC AGCCTCTCTATGGGCAGTCGGTGATAAAAA |
| 759 | C-primer SEQ ID NO. 759 | TCGCTACTGAGGCTTGC |

2. Sample Processing and Template Extraction

The scope of samples includes fresh pathological tissues surgically resected, formaldehyde-fixed paraffin-embedded pathological tissues, paraffin sections, and specimens of whole blood, plasma, serum, and pleural effusion, etc.

A paraffin block sample is cut into 5-8 μm sections, 5 pieces of which are taken, or alternatively, 5 pieces of 5-8 μm sections that have been prepared are taken. After deparaffinization with xylene, the genomic DNA is extracted using the paraffin-embedded DNA extraction kit of Meiji Company, following the protocols of the kit.

The genomic DNA of specimens of whole blood, plasma, serum and pleural effusion is extracted using Qiagen Tissue DNA Extraction Kit. The specific steps for operation follow the protocols of the kit. 200 μl of whole blood are extracted each time, and no less than 800 μl for plasma, serum and pleural effusion.

The extracted DNA is dissolved in Tris-HCl (10 mmol/L, pH 8.0), and the extraction quality is checked by an ultraviolet spectrophotometer, and the concentration is determined. The DNA concentration is adjusted to 2 ng/μl with Tris-HCl solution (10 mmol/L, pH 8.0) as a template for PCR amplification.

3. Highly Multiplexed PCR System Preparation and PCR Amplification

To prepare a reaction system for highly multiplexed PCR amplification of the ligating gene sequence, this reaction system not only consider the amplification efficiency of the amplification reaction, but also the amplification efficiency and specific amplification of each pair of primers.

(1) Each primer MIX for DNA enrichment reaction is prepared according to Table 2.

TABLE 2

Primer MIX for DNA enrichment reaction

| Number | Primer name | Concentration (μM) | Volume (μL) |
|---|---|---|---|
| 1 | ill-EC-2-PMS2-01F | 50 | 0.01 |
| 2 | ill-EC-2-PMS2-01R | 50 | 0.01 |
| 3 | ill-EC-1-PMS2-02F | 50 | 0.02 |
| 4 | ill-EC-1-PMS2-02R | 50 | 0.01 |
| 5 | ill-EC-2-PMS2-02F | 50 | 0.03 |
| 6 | ill-EC-2-PMS2-02R | 50 | 0.01 |
| 7 | ill-EC-1-PMS2-03F | 50 | 0.01 |
| 8 | ill-EC-1-PMS2-03R | 50 | 0.02 |
| 9 | ill-EC-2-PMS2-03F | 50 | 0.01 |
| 10 | ill-EC-2-PMS2-03R | 50 | 0.01 |
| 11 | ill-EC-1-PMS2-04F | 50 | 0.01 |
| 12 | ill-EC-1-PMS2-04R | 50 | 0.01 |
| 13 | ill-EC-2-PMS2-04F | 50 | 0.01 |
| 14 | ill-EC-2-PMS2-04R | 50 | 0.01 |
| 15 | ill-EC-1-PMS2-05F | 50 | 0.01 |
| 16 | ill-EC-1-PMS2-05R | 50 | 0.01 |
| 17 | ill-EC-2-PMS2-05F | 50 | 0.01 |
| 18 | ill-EC-2-PMS2-05R | 50 | 0.01 |
| 19 | ill-EC-1-PMS2-06F | 50 | 0.01 |
| 20 | ill-EC-1-PMS2-06R | 50 | 0.01 |
| 21 | ill-EC-2-PMS2-06F | 50 | 0.01 |
| 22 | ill-EC-2-PMS2-06R | 50 | 0.01 |
| 23 | ill-EC-1-PMS2-07F | 50 | 0.01 |
| 24 | ill-EC-1-PMS2-07R | 50 | 0.01 |
| 25 | ill-EC-2-PMS2-07F | 50 | 0.01 |

TABLE 2-continued

Primer MIX for DNA enrichment reaction

| Number | Primer name | Concentration (µM) | Volume (µL) |
|---|---|---|---|
| 26 | ill-EC-2-PMS2-07R | 50 | 0.01 |
| 27 | ill-EC-1-PMS2-08F | 50 | 0.01 |
| 28 | ill-EC-1-PMS2-08R | 50 | 0.01 |
| 29 | ill-EC-2-PMS2-08F | 50 | 0.01 |
| 30 | ill-EC-2-PMS2-08R | 50 | 0.01 |
| 31 | ill-EC-1-PMS2-09F | 50 | 0.02 |
| 32 | ill-EC-1-PMS2-09R | 50 | 0.02 |
| 33 | ill-EC-2-PMS2-09F | 50 | 0.01 |
| 34 | ill-EC-2-PMS2-09R | 50 | 0.01 |
| 35 | ill-EC-1-PMS2-10F | 50 | 0.01 |
| 36 | ill-EC-1-PMS2-10R | 50 | 0.01 |
| 37 | ill-EC-2-PMS2-10F | 50 | 0.01 |
| 38 | ill-EC-2-PMS2-10R | 50 | 0.01 |
| 39 | ill-EC-1-PMS2-11F | 50 | 0.01 |
| 40 | ill-EC-1-PMS2-11R | 50 | 0.01 |
| 41 | ill-EC-2-PMS2-11F | 50 | 0.01 |
| 42 | ill-EC-2-PMS2-11R | 50 | 0.01 |
| 43 | ill-EC-1-PMS2-12F | 50 | 0.03 |
| 44 | ill-EC-1-PMS2-12R | 50 | 0.03 |
| 45 | ill-EC-2-PMS2-12F | 50 | 0.01 |
| 46 | ill-EC-2-PMS2-12R | 50 | 0.01 |
| 47 | ill-EC-1-PMS2-13F | 50 | 0.01 |
| 48 | ill-EC-1-PMS2-13R | 50 | 0.01 |
| 49 | ill-EC-2-PMS2-13F | 50 | 0.01 |
| 50 | ill-EC-2-PMS2-13R | 50 | 0.01 |
| 51 | ill-EC-1-PMS2-14F | 50 | 0.01 |
| 52 | ill-EC-1-PMS2-14R | 50 | 0.01 |
| 53 | ill-EC-2-PMS2-14F | 50 | 0.02 |
| 54 | ill-EC-2-PMS2-14R | 50 | 0.02 |
| 55 | ill-EC-1-PMS2-15F | 50 | 0.01 |
| 56 | ill-EC-1-PMS2-15R | 50 | 0.01 |
| 57 | ill-EC-2-PMS2-15F | 50 | 0.01 |
| 58 | ill-EC-2-PMS2-15R | 50 | 0.01 |
| 59 | ill-EC-1-PMS2-16F | 50 | 0.01 |
| 60 | ill-EC-1-PMS2-16R | 50 | 0.01 |
| 61 | ill-EC-2-PMS2-16F | 50 | 0.01 |
| 62 | ill-EC-2-PMS2-16R | 50 | 0.01 |
| 63 | ill-EC-1-PMS2-17F | 50 | 0.01 |
| 64 | ill-EC-1-PMS2-17R | 50 | 0.01 |
| 65 | ill-EC-2-PMS2-17F | 50 | 0.01 |
| 66 | ill-EC-2-PMS2-17R | 50 | 0.01 |
| 67 | ill-EC-1-PMS2-18F | 50 | 0.01 |
| 68 | ill-EC-1-PMS2-18R | 50 | 0.01 |
| 69 | ill-EC-2-TP53-01F | 50 | 0.01 |
| 70 | ill-EC-2-TP53-01R | 50 | 0.01 |
| 71 | ill-EC-1-TP53-02F | 50 | 0.01 |
| 72 | ill-EC-1-TP53-02R | 50 | 0.01 |
| 73 | ill-EC-1-TP53-02F | 50 | 0.01 |
| 74 | ill-EC-2-TP53-02R | 50 | 0.01 |
| 75 | ill-EC-1-TP53-03F | 50 | 0.01 |
| 76 | ill-EC-1-TP53-03R | 50 | 0.01 |
| 77 | ill-EC-1-TP53-03F | 50 | 0.01 |
| 78 | ill-EC-2-TP53-03R | 50 | 0.01 |
| 79 | ill-EC-1-TP53-04F | 50 | 0.01 |
| 80 | ill-EC-1-TP53-04R | 50 | 0.01 |
| 81 | ill-EC-1-TP53-04F | 50 | 0.01 |
| 82 | ill-EC-2-TP53-04R | 50 | 0.01 |
| 83 | ill-EC-1-TP53-05F | 50 | 0.01 |
| 84 | ill-EC-1-TP53-05R | 50 | 0.01 |
| 85 | ill-EC-2-TP53-05F | 50 | 0.01 |
| 86 | ill-EC-2-TP53-05R | 50 | 0.01 |
| 87 | ill-EC-1-TP53-06F | 50 | 0.01 |
| 88 | ill-EC-1-TP53-06R | 50 | 0.01 |
| 89 | ill-EC-2-TP53-06F | 50 | 0.01 |
| 90 | ill-EC-2-TP53-06R | 50 | 0.01 |
| 91 | ill-EC-1-TP53-07F | 50 | 0.01 |
| 92 | ill-EC-1-TP53-07R | 50 | 0.01 |
| 93 | ill-EC-2-TP53-07F | 50 | 0.03 |
| 94 | ill-EC-2-TP53-07R | 50 | 0.03 |
| 95 | ill-EC-1-TP53-08F | 50 | 0.01 |
| 96 | ill-EC-1-TP53-08R | 50 | 0.01 |
| 97 | ill-EC-2-TP53-08F | 50 | 0.01 |
| 98 | ill-EC-2-TP53-08R | 50 | 0.01 |
| 99 | ill-EC-1-TP53-09F | 50 | 0.01 |
| 100 | ill-EC-1-TP53-09R | 50 | 0.01 |
| 101 | ill-EC-2-TP53-09F | 50 | 0.02 |
| 102 | ill-EC-2-TP53-09R | 50 | 0.02 |
| 103 | ill-EC-1-TP53-10F | 50 | 0.01 |
| 104 | ill-EC-1-TP53-10R | 50 | 0.01 |
| 105 | ill-EC-2-TP53-10F | 50 | 0.01 |
| 106 | ill-EC-2-TP53-10R | 50 | 0.01 |
| 107 | ill-EC-1-TP53-11F | 50 | 0.01 |
| 108 | ill-EC-1-TP53-11R | 50 | 0.01 |
| 109 | ill-EC-2-TP53-11F | 50 | 0.01 |
| 110 | ill-EC-2-TP53-11R | 50 | 0.01 |
| 111 | ill-EC-1-TP53-12F | 50 | 0.01 |
| 112 | ill-EC-1-TP53-12R | 50 | 0.01 |
| 113 | ill-EC-2-TP53-12F | 50 | 0.02 |
| 114 | ill-EC-2-TP53-12R | 50 | 0.02 |
| 115 | ill-EC-1-TP53-13F | 50 | 0.01 |
| 116 | ill-EC-1-TP53-13R | 50 | 0.01 |
| 117 | ill-EC-1-MLH1-01F | 50 | 0.01 |
| 118 | ill-EC-1-MLH1-01R | 50 | 0.01 |
| 119 | ill-EC-2-MLH1-02F | 50 | 0.01 |
| 120 | ill-EC-2-MLH1-02R | 50 | 0.01 |
| 121 | ill-EC-1-MLH1-02F | 50 | 0.01 |
| 122 | ill-EC-1-MLH1-02R | 50 | 0.01 |
| 123 | ill-EC-2-MLH1-03F | 50 | 0.01 |
| 124 | ill-EC-2-MLH1-03R | 50 | 0.01 |
| 125 | ill-EC-1-MLH1-03F | 50 | 0.01 |
| 126 | ill-EC-1-MLH1-03R | 50 | 0.01 |
| 127 | ill-EC-2-MLH1-04F | 50 | 0.01 |
| 128 | ill-EC-2-MLH1-04R | 50 | 0.01 |
| 129 | ill-EC-1-MLH1-04F | 50 | 0.01 |
| 130 | ill-EC-1-MLH1-04R | 50 | 0.01 |
| 131 | ill-EC-2-MLH1-05F | 50 | 0.01 |
| 132 | ill-EC-2-MLH1-05R | 50 | 0.01 |
| 133 | ill-EC-1-MLH1-05F | 50 | 0.02 |
| 134 | ill-EC-1-MLH1-05R | 50 | 0.02 |
| 135 | ill-EC-2-MLH1-06F | 50 | 0.01 |
| 136 | ill-EC-2-MLH1-06R | 50 | 0.01 |
| 137 | ill-EC-1-MLH1-06F | 50 | 0.01 |
| 138 | ill-EC-1-MLH1-06R | 50 | 0.01 |
| 139 | ill-EC-2-MLH1-07F | 50 | 0.01 |
| 140 | ill-EC-2-MLH1-07R | 50 | 0.01 |
| 141 | ill-EC-1-MLH1-07F | 50 | 0.01 |
| 142 | ill-EC-1-MLH1-07R | 50 | 0.01 |
| 143 | ill-EC-2-MLH1-08F | 50 | 0.01 |
| 144 | ill-EC-2-MLH1-08R | 50 | 0.01 |
| 145 | ill-EC-1-MLH1-08F | 50 | 0.01 |
| 146 | ill-EC-1-MLH1-08R | 50 | 0.01 |
| 147 | ill-EC-2-MLH1-09F | 50 | 0.01 |
| 148 | ill-EC-2-MLH1-09R | 50 | 0.01 |
| 149 | ill-EC-1-MLH1-09F | 50 | 0.01 |
| 150 | ill-EC-1-MLH1-09R | 50 | 0.01 |
| 151 | ill-EC-2-MLH1-10F | 50 | 0.01 |
| 152 | ill-EC-2-MLH1-10R | 50 | 0.01 |
| 153 | ill-EC-1-MLH1-10F | 50 | 0.01 |
| 154 | ill-EC-1-MLH1-10R | 50 | 0.01 |
| 155 | ill-EC-2-MLH1-11F | 50 | 0.01 |
| 156 | ill-EC-2-MLH1-11R | 50 | 0.01 |
| 157 | ill-EC-1-MLH1-11F | 50 | 0.01 |
| 158 | ill-EC-1-MLH1-11R | 50 | 0.01 |
| 159 | ill-EC-2-MLH1-12F | 50 | 0.01 |
| 160 | ill-EC-2-MLH1-12R | 50 | 0.01 |
| 161 | ill-EC-1-MLH1-12F | 50 | 0.01 |
| 162 | ill-EC-1-MLH1-12R | 50 | 0.01 |
| 163 | ill-EC-2-MLH1-13F | 50 | 0.01 |
| 164 | ill-EC-2-MLH1-13R | 50 | 0.01 |
| 165 | ill-EC-1-MLH1-13F | 50 | 0.01 |
| 166 | ill-EC-1-MLH1-13R | 50 | 0.01 |
| 167 | ill-EC-2-MLH1-14F | 50 | 0.01 |
| 168 | ill-EC-2-MLH1-14R | 50 | 0.01 |
| 169 | ill-EC-1-MLH1-14F | 50 | 0.01 |
| 170 | ill-EC-1-MLH1-14R | 50 | 0.01 |
| 171 | ill-EC-2-MLH1-15F | 50 | 0.01 |
| 172 | ill-EC-2-MLH1-15R | 50 | 0.01 |
| 173 | ill-EC-1-MLH1-15F | 50 | 0.01 |
| 174 | ill-EC-1-MLH1-15R | 50 | 0.01 |
| 175 | ill-EC-2-MLH1-16F | 50 | 0.01 |

TABLE 2-continued

Primer MIX for DNA enrichment reaction

| Number | Primer name | Concentration (μM) | Volume (μL) |
|---|---|---|---|
| 176 | ill-EC-2-MLH1-16R | 50 | 0.01 |
| 177 | ill-EC-1-MLH1-16F | 50 | 0.03 |
| 178 | ill-EC-1-MLH1-16R | 50 | 0.03 |
| 179 | ill-EC-2-MLH1-17F | 50 | 0.01 |
| 180 | ill-EC-2-MLH1-17R | 50 | 0.01 |
| 181 | ill-EC-1-MLH1-17F | 50 | 0.01 |
| 182 | ill-EC-1-MLH1-17R | 50 | 0.01 |
| 183 | ill-EC-2-MLH1-18F | 50 | 0.01 |
| 184 | ill-EC-2-MLH1-18R | 50 | 0.01 |
| 185 | ill-EC-1-MLH1-18F | 50 | 0.01 |
| 186 | ill-EC-1-MLH1-18R | 50 | 0.01 |
| 187 | ill-EC-2-MLH1-19F | 50 | 0.01 |
| 188 | ill-EC-2-MLH1-19R | 50 | 0.01 |
| 189 | ill-EC-1-MLH1-19F | 50 | 0.01 |
| 190 | ill-EC-1-MLH1-19R | 50 | 0.01 |
| 191 | ill-EC-2-MLH1-20F | 50 | 0.01 |
| 192 | ill-EC-2-MLH1-20R | 50 | 0.01 |
| 193 | ill-EC-1-MLH1-20F | 50 | 0.01 |
| 194 | ill-EC-1-MLH1-20R | 50 | 0.01 |
| 195 | ill-EC-2-MLH1-21F | 50 | 0.01 |
| 196 | ill-EC-2-MLH1-21R | 50 | 0.01 |
| 197 | ill-EC-1-MLH1-21F | 50 | 0.01 |
| 198 | ill-EC-1-MLH1-21R | 50 | 0.01 |
| 199 | ill-EC-2-MLH1-22F | 50 | 0.01 |
| 200 | ill-EC-2-MLH1-22R | 50 | 0.01 |
| 201 | ill-EC-1-EPCAM-01F | 50 | 0.01 |
| 202 | ill-EC-1-EPCAM-01R | 50 | 0.01 |
| 203 | ill-EC-2-EPCAM-02F | 50 | 0.02 |
| 204 | ill-EC-2-EPCAM-02R | 50 | 0.02 |
| 205 | ill-EC-1-EPCAM-03F | 50 | 0.01 |
| 206 | ill-EC-1-EPCAM-03R | 50 | 0.01 |
| 207 | ill-EC-2-EPCAM-04F | 50 | 0.01 |
| 208 | ill-EC-2-EPCAM-04R | 50 | 0.01 |
| 209 | ill-EC-1-EPCAM-05F | 50 | 0.01 |
| 210 | ill-EC-1-EPCAM-05R | 50 | 0.01 |
| 211 | ill-EC-2-EPCAM-06F | 50 | 0.01 |
| 212 | ill-EC-2-EPCAM-06R | 50 | 0.01 |
| 213 | ill-EC-1-EPCAM-07F | 50 | 0.01 |
| 214 | ill-EC-1-EPCAM-07R | 50 | 0.01 |
| 215 | ill-EC-2-EPCAM-08F | 50 | 0.01 |
| 216 | ill-EC-2-EPCAM-08R | 50 | 0.01 |
| 217 | ill-EC-1-EPCAM-09F | 50 | 0.01 |
| 218 | ill-EC-1-EPCAM-09R | 50 | 0.01 |
| 219 | ill-EC-2-EPCAM-10F | 50 | 0.01 |
| 220 | ill-EC-2-EPCAM-10R | 50 | 0.01 |
| 221 | ill-EC-1-EPCAM-11F | 50 | 0.01 |
| 222 | ill-EC-1-EPCAM-11R | 50 | 0.01 |
| 223 | ill-EC-2-EPCAM-12F | 50 | 0.01 |
| 224 | ill-EC-2-EPCAM-12R | 50 | 0.01 |
| 225 | ill-EC-1-EPCAM-13F | 50 | 0.01 |
| 226 | ill-EC-1-EPCAM-13R | 50 | 0.01 |
| 227 | ill-EC-2-EPCAM-14F | 50 | 0.01 |
| 228 | ill-EC-2-EPCAM-14R | 50 | 0.01 |
| 229 | ill-EC-1-EPCAM-15F | 50 | 0.01 |
| 230 | ill-EC-1-EPCAM-15R | 50 | 0.01 |
| 231 | ill-EC-1-EPCAM-16F | 50 | 0.02 |
| 232 | ill-EC-1-EPCAM-16R | 50 | 0.02 |
| 233 | ill-EC-2-EPCAM-17F | 50 | 0.01 |
| 234 | ill-EC-2-EPCAM-17R | 50 | 0.01 |
| 235 | ill-EC-2-EPCAM-18F | 50 | 0.01 |
| 236 | ill-EC-2-EPCAM-18R | 50 | 0.01 |
| 237 | ill-EC-1-MSH2-01F | 50 | 0.01 |
| 238 | ill-EC-1-MSH2-01R | 50 | 0.01 |
| 239 | ill-EC-2-MSH2-02F | 50 | 0.01 |
| 240 | ill-EC-2-MSH2-02R | 50 | 0.01 |
| 241 | ill-EC-1-MSH2-02F | 50 | 0.01 |
| 242 | ill-EC-1-MSH2-02R | 50 | 0.01 |
| 243 | ill-EC-2-MSH2-03F | 50 | 0.01 |
| 244 | ill-EC-2-MSH2-03R | 50 | 0.01 |
| 245 | ill-EC-1-MSH2-03F | 50 | 0.01 |
| 246 | ill-EC-1-MSH2-03R | 50 | 0.01 |
| 247 | ill-EC-2-MSH2-04F | 50 | 0.01 |
| 248 | ill-EC-2-MSH2-04R | 50 | 0.01 |
| 249 | ill-EC-1-MSH2-04F | 50 | 0.01 |
| 250 | ill-EC-1-MSH2-04R | 50 | 0.01 |
| 251 | ill-EC-2-MSH2-05F | 50 | 0.01 |
| 252 | ill-EC-2-MSH2-05R | 50 | 0.01 |
| 253 | ill-EC-1-MSH2-05F | 50 | 0.01 |
| 254 | ill-EC-1-MSH2-05R | 50 | 0.01 |
| 255 | ill-EC-2-MSH2-06F | 50 | 0.01 |
| 256 | ill-EC-2-MSH2-06R | 50 | 0.01 |
| 257 | ill-EC-1-MSH2-06F | 50 | 0.01 |
| 258 | ill-EC-1-MSH2-06R | 50 | 0.01 |
| 259 | ill-EC-2-MSH2-07F | 50 | 0.01 |
| 260 | ill-EC-2-MSH2-07R | 50 | 0.01 |
| 261 | ill-EC-1-MSH2-07F | 50 | 0.01 |
| 262 | ill-EC-1-MSH2-07R | 50 | 0.01 |
| 263 | ill-EC-2-MSH2-08F | 50 | 0.01 |
| 264 | ill-EC-2-MSH2-08R | 50 | 0.01 |
| 265 | ill-EC-1-MSH2-08F | 50 | 0.01 |
| 266 | ill-EC-1-MSH2-08R | 50 | 0.01 |
| 267 | ill-EC-2-MSH2-09F | 50 | 0.01 |
| 268 | ill-EC-2-MSH2-09R | 50 | 0.01 |
| 269 | ill-EC-1-MSH2-09F | 50 | 0.01 |
| 270 | ill-EC-1-MSH2-09R | 50 | 0.01 |
| 271 | ill-EC-2-MSH2-10F | 50 | 0.01 |
| 272 | ill-EC-2-MSH2-10R | 50 | 0.01 |
| 273 | ill-EC-1-MSH2-10F | 50 | 0.01 |
| 274 | ill-EC-1-MSH2-10R | 50 | 0.01 |
| 275 | ill-EC-2-MSH2-11F | 50 | 0.02 |
| 276 | ill-EC-2-MSH2-11R | 50 | 0.02 |
| 277 | ill-EC-1-MSH2-11F | 50 | 0.01 |
| 278 | ill-EC-1-MSH2-11R | 50 | 0.01 |
| 279 | ill-EC-2-MSH2-12F | 50 | 0.01 |
| 280 | ill-EC-2-MSH2-12R | 50 | 0.01 |
| 281 | ill-EC-1-MSH2-12F | 50 | 0.01 |
| 282 | ill-EC-1-MSH2-12R | 50 | 0.01 |
| 283 | ill-EC-2-MSH2-13F | 50 | 0.01 |
| 284 | ill-EC-2-MSH2-13R | 50 | 0.01 |
| 285 | ill-EC-1-MSH2-13F | 50 | 0.01 |
| 286 | ill-EC-1-MSH2-13R | 50 | 0.01 |
| 287 | ill-EC-2-MSH2-14F | 50 | 0.01 |
| 288 | ill-EC-2-MSH2-14R | 50 | 0.01 |
| 289 | ill-EC-1-MSH2-14F | 50 | 0.01 |
| 290 | ill-EC-1-MSH2-14R | 50 | 0.01 |
| 291 | ill-EC-2-MSH2-15F | 50 | 0.01 |
| 292 | ill-EC-2-MSH2-15R | 50 | 0.01 |
| 293 | ill-EC-1-MSH2-15F | 50 | 0.01 |
| 294 | ill-EC-1-MSH2-15R | 50 | 0.01 |
| 295 | ill-EC-2-MSH2-16F | 50 | 0.01 |
| 296 | ill-EC-2-MSH2-16R | 50 | 0.01 |
| 297 | ill-EC-1-MSH2-16F | 50 | 0.01 |
| 298 | ill-EC-1-MSH2-16R | 50 | 0.01 |
| 299 | ill-EC-2-MSH2-17F | 50 | 0.01 |
| 300 | ill-EC-2-MSH2-17R | 50 | 0.01 |
| 301 | ill-EC-1-MSH2-17F | 50 | 0.01 |
| 302 | ill-EC-1-MSH2-17R | 50 | 0.01 |
| 303 | ill-EC-2-MSH2-18F | 50 | 0.01 |
| 304 | ill-EC-2-MSH2-18R | 50 | 0.01 |
| 305 | ill-EC-1-MSH2-18F | 50 | 0.01 |
| 306 | ill-EC-1-MSH2-18R | 50 | 0.01 |
| 307 | ill-EC-2-MSH2-19F | 50 | 0.01 |
| 308 | ill-EC-2-MSH2-19R | 50 | 0.01 |
| 309 | ill-EC-1-MSH2-19F | 50 | 0.01 |
| 310 | ill-EC-1-MSH2-19R | 50 | 0.01 |
| 311 | ill-EC-2-MSH2-20F | 50 | 0.01 |
| 312 | ill-EC-2-MSH2-20R | 50 | 0.01 |
| 313 | ill-EC-1-MSH2-20F | 50 | 0.01 |
| 314 | ill-EC-1-MSH2-20R | 50 | 0.01 |
| 315 | ill-EC-2-MSH2-21F | 50 | 0.01 |
| 316 | ill-EC-2-MSH2-21R | 50 | 0.01 |
| 317 | ill-EC-1-MSH2-21F | 50 | 0.02 |
| 318 | ill-EC-1-MSH2-21R | 50 | 0.02 |
| 319 | ill-EC-2-MSH2-22F | 50 | 0.01 |
| 320 | ill-EC-2-MSH2-22R | 50 | 0.01 |
| 321 | ill-EC-1-MSH2-22F | 50 | 0.01 |
| 322 | ill-EC-1-MSH2-22R | 50 | 0.01 |
| 323 | ill-EC-2-MSH2-23F | 50 | 0.01 |
| 324 | ill-EC-2-MSH2-23R | 50 | 0.01 |
| 325 | ill-EC-1-MSH2-23F | 50 | 0.01 |

TABLE 2-continued

Primer MIX for DNA enrichment reaction

| Number | Primer name | Concentration (µM) | Volume (µL) |
|---|---|---|---|
| 326 | ill-EC-1-MSH2-23R | 50 | 0.01 |
| 327 | ill-EC-2-MSH2-24F | 50 | 0.01 |
| 328 | ill-EC-2-MSH2-24R | 50 | 0.01 |
| 329 | ill-EC-1-MSH2-24F | 50 | 0.01 |
| 330 | ill-EC-1-MSH2-24R | 50 | 0.01 |
| 331 | ill-EC-1-MSH6-01F | 50 | 0.01 |
| 332 | ill-EC-1-MSH6-01R | 50 | 0.01 |
| 333 | ill-EC-2-MSH6-02F | 50 | 0.01 |
| 334 | ill-EC-2-MSH6-02R | 50 | 0.01 |
| 335 | ill-EC-1-MSH6-02F | 50 | 0.01 |
| 336 | ill-EC-1-MSH6-02R | 50 | 0.01 |
| 337 | ill-EC-2-MSH6-03F | 50 | 0.01 |
| 338 | ill-EC-2-MSH6-03R | 50 | 0.01 |
| 339 | ill-EC-1-MSH6-03F | 50 | 0.01 |
| 340 | ill-EC-1-MSH6-03R | 50 | 0.01 |
| 341 | ill-EC-2-MSH6-04F | 50 | 0.01 |
| 342 | ill-EC-2-MSH6-04R | 50 | 0.01 |
| 343 | ill-EC-1-MSH6-04F | 50 | 0.01 |
| 344 | ill-EC-1-MSH6-04R | 50 | 0.01 |
| 345 | ill-EC-2-MSH6-05F | 50 | 0.01 |
| 346 | ill-EC-2-MSH6-05R | 50 | 0.01 |
| 347 | ill-EC-1-MSH6-05F | 50 | 0.01 |
| 348 | ill-EC-1-MSH6-05R | 50 | 0.01 |
| 349 | ill-EC-2-MSH6-06F | 50 | 0.01 |
| 350 | ill-EC-2-MSH6-06R | 50 | 0.01 |
| 351 | ill-EC-1-MSH6-06F | 50 | 0.01 |
| 352 | ill-EC-1-MSH6-06R | 50 | 0.01 |
| 353 | ill-EC-2-MSH6-07F | 50 | 0.01 |
| 354 | ill-EC-2-MSH6-07R | 50 | 0.01 |
| 355 | ill-EC-1-MSH6-07F | 50 | 0.01 |
| 356 | ill-EC-1-MSH6-07R | 50 | 0.01 |
| 357 | ill-EC-2-MSH6-08F | 50 | 0.01 |
| 358 | ill-EC-2-MSH6-08R | 50 | 0.01 |
| 359 | ill-EC-1-MSH6-08F | 50 | 0.02 |
| 360 | ill-EC-1-MSH6-08R | 50 | 0.02 |
| 361 | ill-EC-2-MSH6-09F | 50 | 0.01 |
| 362 | ill-EC-2-MSH6-09R | 50 | 0.01 |
| 363 | ill-EC-1-MSH6-09F | 50 | 0.01 |
| 364 | ill-EC-1-MSH6-09R | 50 | 0.01 |
| 365 | ill-EC-2-MSH6-10F | 50 | 0.01 |
| 366 | ill-EC-2-MSH6-10R | 50 | 0.01 |
| 367 | ill-EC-1-MSH6-10F | 50 | 0.01 |
| 368 | ill-EC-1-MSH6-10R | 50 | 0.01 |
| 369 | ill-EC-2-MSH6-11F | 50 | 0.01 |
| 370 | ill-EC-2-MSH6-11R | 50 | 0.01 |
| 371 | ill-EC-1-MSH6-11F | 50 | 0.01 |
| 372 | ill-EC-1-MSH6-11R | 50 | 0.01 |
| 373 | ill-EC-2-MSH6-12F | 50 | 0.01 |
| 374 | ill-EC-2-MSH6-12R | 50 | 0.01 |
| 375 | ill-EC-1-MSH6-12F | 50 | 0.01 |
| 376 | ill-EC-1-MSH6-12R | 50 | 0.01 |
| 377 | ill-EC-2-MSH6-13F | 50 | 0.01 |
| 378 | ill-EC-2-MSH6-13R | 50 | 0.01 |
| 379 | ill-EC-1-MSH6-13F | 50 | 0.01 |
| 380 | ill-EC-1-MSH6-13R | 50 | 0.01 |
| 381 | ill-EC-2-MSH6-14F | 50 | 0.01 |
| 382 | ill-EC-2-MSH6-14R | 50 | 0.01 |
| 383 | ill-EC-1-MSH6-14F | 50 | 0.01 |
| 384 | ill-EC-1-MSH6-14R | 50 | 0.01 |
| 385 | ill-EC-2-MSH6-15F | 50 | 0.01 |
| 386 | ill-EC-2-MSH6-15R | 50 | 0.01 |
| 387 | ill-EC-1-MSH6-15F | 50 | 0.01 |
| 388 | ill-EC-1-MSH6-15R | 50 | 0.01 |
| 389 | ill-EC-2-MSH6-16F | 50 | 0.02 |
| 390 | ill-EC-2-MSH6-16R | 50 | 0.02 |
| 391 | ill-EC-1-MSH6-16F | 50 | 0.01 |
| 392 | ill-EC-1-MSH6-16R | 50 | 0.01 |
| 393 | ill-EC-2-MSH6-17F | 50 | 0.01 |
| 394 | ill-EC-2-MSH6-17R | 50 | 0.01 |
| 395 | ill-EC-1-MSH6-17F | 50 | 0.01 |
| 396 | ill-EC-1-MSH6-17R | 50 | 0.01 |
| 397 | ill-EC-2-MSH6-18F | 50 | 0.01 |
| 398 | ill-EC-2-MSH6-18R | 50 | 0.01 |
| 399 | ill-EC-1-MSH6-18F | 50 | 0.01 |
| 400 | ill-EC-1-MSH6-18R | 50 | 0.01 |
| 401 | ill-EC-2-MSH6-19F | 50 | 0.01 |
| 402 | ill-EC-2-MSH6-19R | 50 | 0.01 |
| 403 | ill-EC-1-MSH6-19F | 50 | 0.01 |
| 404 | ill-EC-1-MSH6-19R | 50 | 0.01 |
| 405 | ill-EC-2-MSH6-20F | 50 | 0.01 |
| 406 | ill-EC-2-MSH6-20R | 50 | 0.01 |
| 407 | ill-EC-1-MSH6-20F | 50 | 0.01 |
| 408 | ill-EC-1-MSH6-20R | 50 | 0.01 |
| 409 | ill-EC-2-MSH6-21F | 50 | 0.01 |
| 410 | ill-EC-2-MSH6-21R | 50 | 0.01 |
| 411 | ill-EC-1-MSH6-21F | 50 | 0.01 |
| 412 | ill-EC-1-MSH6-21R | 50 | 0.01 |
| 413 | ill-EC-2-MSH6-22F | 50 | 0.01 |
| 414 | ill-EC-2-MSH6-22R | 50 | 0.01 |
| 415 | ill-EC-1-MSH6-22F | 50 | 0.01 |
| 416 | ill-EC-1-MSH6-22R | 50 | 0.01 |
| 417 | ill-EC-2-MSH6-23F | 50 | 0.01 |
| 418 | ill-EC-2-MSH6-23R | 50 | 0.01 |
| 419 | ill-EC-1-MSH6-23F | 50 | 0.02 |
| 420 | ill-EC-1-MSH6-23R | 50 | 0.02 |
| 421 | ill-EC-2-MSH6-24F | 50 | 0.01 |
| 422 | ill-EC-2-MSH6-24R | 50 | 0.01 |
| 423 | ill-EC-1-MSH6-24F | 50 | 0.01 |
| 424 | ill-EC-1-MSH6-24R | 50 | 0.01 |
| 425 | ill-EC-2-MSH6-25F | 50 | 0.01 |
| 426 | ill-EC-2-MSH6-25R | 50 | 0.01 |
| 427 | ill-EC-1-MSH6-25F | 50 | 0.01 |
| 428 | ill-EC-1-MSH6-25R | 50 | 0.01 |
| 429 | ill-EC-2-MSH6-26F | 50 | 0.01 |
| 430 | ill-EC-2-MSH6-26R | 50 | 0.01 |
| 431 | ill-EC-1-MSH6-26F | 50 | 0.01 |
| 432 | ill-EC-1-MSH6-26R | 50 | 0.01 |
| 433 | ill-EC-2-MSH6-27F | 50 | 0.01 |
| 434 | ill-EC-2-MSH6-27R | 50 | 0.01 |
| 435 | ill-EC-1-PTEN-01F | 50 | 0.01 |
| 436 | ill-EC-1-PTEN-01R | 50 | 0.01 |
| 437 | ill-EC-2-PTEN-02F | 50 | 0.01 |
| 438 | ill-EC-2-PTEN-02R | 50 | 0.01 |
| 439 | ill-EC-1-PTEN-02F | 50 | 0.01 |
| 440 | ill-EC-1-PTEN-02R | 50 | 0.01 |
| 441 | ill-EC-2-PTEN-03F | 50 | 0.01 |
| 442 | ill-EC-2-PTEN-03R | 50 | 0.01 |
| 443 | ill-EC-1-PTEN-03F | 50 | 0.01 |
| 444 | ill-EC-1-PTEN-03R | 50 | 0.01 |
| 445 | ill-EC-2-PTEN-04F | 50 | 0.01 |
| 446 | ill-EC-2-PTEN-04R | 50 | 0.01 |
| 447 | ill-EC-1-PTEN-04F | 50 | 0.01 |
| 448 | ill-EC-1-PTEN-04R | 50 | 0.01 |
| 449 | ill-EC-2-PTEN-05F | 50 | 0.01 |
| 450 | ill-EC-2-PTEN-05R | 50 | 0.01 |
| 451 | ill-EC-1-PTEN-05F | 50 | 0.01 |
| 452 | ill-EC-1-PTEN-05R | 50 | 0.01 |
| 453 | ill-EC-2-PTEN-06F | 50 | 0.01 |
| 454 | ill-EC-2-PTEN-06R | 50 | 0.01 |
| 455 | ill-EC-1-PTEN-06F | 50 | 0.01 |
| 456 | ill-EC-1-PTEN-06R | 50 | 0.01 |
| 457 | ill-EC-2-PTEN-07F | 50 | 0.01 |
| 458 | ill-EC-2-PTEN-07R | 50 | 0.01 |
| 459 | ill-EC-1-PTEN-07F | 50 | 0.01 |
| 460 | ill-EC-1-PTEN-07R | 50 | 0.01 |
| 461 | ill-EC-2-PTEN-08F | 50 | 0.01 |
| 462 | ill-EC-2-PTEN-08R | 50 | 0.01 |
| 463 | ill-EC-1-PTEN-08F | 50 | 0.01 |
| 464 | ill-EC-1-PTEN-08R | 50 | 0.01 |
| 465 | ill-EC-2-PTEN-09F | 50 | 0.03 |
| 466 | ill-EC-2-PTEN-09R | 50 | 0.03 |
| 467 | ill-EC-1-PTEN-09F | 50 | 0.01 |
| 468 | ill-EC-1-PTEN-09R | 50 | 0.01 |
| 469 | ill-EC-2-PTEN-10F | 50 | 0.01 |
| 470 | ill-EC-2-PTEN-10R | 50 | 0.01 |
| 471 | ill-EC-1-PTEN-10F | 50 | 0.01 |
| 472 | ill-EC-1-PTEN-10R | 50 | 0.01 |
| 473 | ill-EC-2-PTEN-11F | 50 | 0.01 |
| 474 | ill-EC-2-PTEN-11R | 50 | 0.01 |
| 475 | ill-EC-1-PTEN-11F | 50 | 0.01 |

TABLE 2-continued

Primer MIX for DNA enrichment reaction

| Number | Primer name | Concentration (μM) | Volume (μL) |
|---|---|---|---|
| 476 | ill-EC-1-PTEN-11R | 50 | 0.01 |
| 477 | ill-EC-2-PTEN-12F | 50 | 0.01 |
| 478 | ill-EC-2-PTEN-12R | 50 | 0.01 |
| 479 | ill-EC-1-PTEN-12F | 50 | 0.01 |
| 480 | ill-EC-1-PTEN-12R | 50 | 0.01 |
| 481 | ill-EC-2-PTEN-13F | 50 | 0.01 |
| 482 | ill-EC-1-PTEN-13F | 50 | 0.01 |
| 483 | ill-EC-2-PTEN-13R | 50 | 0.01 |
| 484 | ill-EC-1-PTEN-13R | 50 | 0.01 |
| 485 | ill-EC-2-PTEN-14F | 50 | 0.01 |
| 486 | ill-EC-2-PTEN-14R | 50 | 0.01 |
| 487 | ill-EC-1-POLE-01F | 50 | 0.01 |
| 488 | ill-EC-1-POLE-01R | 50 | 0.01 |
| 489 | ill-EC-2-POLE-02F | 50 | 0.01 |
| 490 | ill-EC-2-POLE-02R | 50 | 0.01 |
| 491 | ill-EC-1-POLE-02F | 50 | 0.01 |
| 492 | ill-EC-1-POLE-02R | 50 | 0.01 |
| 493 | ill-EC-2-POLE-03F | 50 | 0.01 |
| 494 | ill-EC-2-POLE-03R | 50 | 0.01 |
| 495 | ill-EC-1-POLE-03F | 50 | 0.01 |
| 496 | ill-EC-1-POLE-03R | 50 | 0.01 |
| 497 | ill-EC-2-POLE-04F | 50 | 0.03 |
| 498 | ill-EC-2-POLE-04R | 50 | 0.03 |
| 499 | ill-EC-1-POLE-04F | 50 | 0.01 |
| 500 | ill-EC-1-POLE-04R | 50 | 0.01 |
| 501 | ill-EC-2-POLE-05F | 50 | 0.01 |
| 502 | ill-EC-2-POLE-05R | 50 | 0.01 |
| 503 | ill-EC-1-POLE-05F | 50 | 0.01 |
| 504 | ill-EC-1-POLE-05R | 50 | 0.01 |
| 505 | ill-EC-2-POLE-06F | 50 | 0.01 |
| 506 | ill-EC-2-POLE-06R | 50 | 0.01 |
| 507 | ill-EC-1-POLE-06F | 50 | 0.01 |
| 508 | ill-EC-1-POLE-06R | 50 | 0.01 |
| 509 | ill-EC-2-POLE-07F | 50 | 0.01 |
| 510 | ill-EC-2-POLE-07R | 50 | 0.01 |
| 511 | ill-EC-1-POLE-07F | 50 | 0.01 |
| 512 | ill-EC-1-POLE-07R | 50 | 0.01 |
| 513 | ill-EC-2-POLE-08F | 50 | 0.01 |
| 514 | ill-EC-2-POLE-08R | 50 | 0.01 |
| 515 | ill-EC-1-POLE-08F | 50 | 0.01 |
| 516 | ill-EC-1-POLE-08R | 50 | 0.01 |
| 517 | ill-EC-2-POLE-09F | 50 | 0.01 |
| 518 | ill-EC-2-POLE-09R | 50 | 0.01 |
| 519 | ill-EC-1-POLE-09F | 50 | 0.01 |
| 520 | ill-EC-1-POLE-09R | 50 | 0.01 |
| 521 | ill-EC-2-POLE-10F | 50 | 0.01 |
| 522 | ill-EC-2-POLE-10R | 50 | 0.01 |
| 523 | ill-EC-1-POLE-10F | 50 | 0.01 |
| 524 | ill-EC-1-POLE-10R | 50 | 0.01 |
| 525 | ill-EC-2-POLE-11F | 50 | 0.01 |
| 526 | ill-EC-2-POLE-11R | 50 | 0.01 |
| 527 | ill-EC-1-POLE-11F | 50 | 0.01 |
| 528 | ill-EC-1-POLE-11R | 50 | 0.01 |
| 529 | ill-EC-2-POLE-12F | 50 | 0.01 |
| 530 | ill-EC-2-POLE-12R | 50 | 0.01 |
| 531 | ill-EC-1-POLE-12F | 50 | 0.01 |
| 532 | ill-EC-1-POLE-12R | 50 | 0.01 |
| 533 | ill-EC-2-POLE-13F | 50 | 0.01 |
| 534 | ill-EC-2-POLE-13R | 50 | 0.01 |
| 535 | ill-EC-1-POLE-13F | 50 | 0.01 |
| 536 | ill-EC-1-POLE-13R | 50 | 0.01 |
| 537 | ill-EC-2-POLE-14F | 50 | 0.01 |
| 538 | ill-EC-2-POLE-14R | 50 | 0.01 |
| 539 | ill-EC-1-POLE-14F | 50 | 0.03 |
| 540 | ill-EC-1-POLE-14R | 50 | 0.03 |
| 541 | ill-EC-2-POLE-15F | 50 | 0.01 |
| 542 | ill-EC-2-POLE-15R | 50 | 0.01 |
| 543 | ill-EC-1-POLE-15F | 50 | 0.01 |
| 544 | ill-EC-1-POLE-15R | 50 | 0.01 |
| 545 | ill-EC-2-POLE-16F | 50 | 0.01 |
| 546 | ill-EC-2-POLE-16R | 50 | 0.01 |
| 547 | ill-EC-1-POLE-16F | 50 | 0.01 |
| 548 | ill-EC-1-POLE-16R | 50 | 0.01 |
| 549 | ill-EC-2-POLE-17F | 50 | 0.01 |
| 550 | ill-EC-2-POLE-17R | 50 | 0.01 |
| 551 | ill-EC-1-POLE-17F | 50 | 0.01 |
| 552 | ill-EC-1-POLE-17R | 50 | 0.01 |
| 553 | ill-EC-2-POLE-18F | 50 | 0.01 |
| 554 | ill-EC-2-POLE-18R | 50 | 0.01 |
| 555 | ill-EC-1-POLE-18F | 50 | 0.01 |
| 556 | ill-EC-1-POLE-18R | 50 | 0.01 |
| 557 | ill-EC-2-POLE-19F | 50 | 0.01 |
| 558 | ill-EC-2-POLE-19R | 50 | 0.01 |
| 559 | ill-EC-1-POLE-19F | 50 | 0.01 |
| 560 | ill-EC-1-POLE-19R | 50 | 0.01 |
| 561 | ill-EC-2-POLE-20F | 50 | 0.01 |
| 562 | ill-EC-2-POLE-20R | 50 | 0.01 |
| 563 | ill-EC-1-POLE-20F | 50 | 0.01 |
| 564 | ill-EC-1-POLE-20R | 50 | 0.01 |
| 565 | ill-EC-2-POLE-21F | 50 | 0.01 |
| 566 | ill-EC-2-POLE-21R | 50 | 0.01 |
| 567 | ill-EC-1-POLE-21F | 50 | 0.01 |
| 568 | ill-EC-1-POLE-21R | 50 | 0.01 |
| 569 | ill-EC-2-POLE-22F | 50 | 0.01 |
| 570 | ill-EC-2-POLE-22R | 50 | 0.01 |
| 571 | ill-EC-1-POLE-22F | 50 | 0.01 |
| 572 | ill-EC-1-POLE-22R | 50 | 0.01 |
| 573 | ill-EC-2-POLE-23F | 50 | 0.01 |
| 574 | ill-EC-2-POLE-23R | 50 | 0.01 |
| 575 | ill-EC-1-POLE-23F | 50 | 0.01 |
| 576 | ill-EC-1-POLE-23R | 50 | 0.01 |
| 577 | ill-EC-2-POLE-24F | 50 | 0.01 |
| 578 | ill-EC-2-POLE-24R | 50 | 0.01 |
| 579 | ill-EC-1-POLE-24F | 50 | 0.01 |
| 580 | ill-EC-1-POLE-24R | 50 | 0.01 |
| 581 | ill-EC-2-POLE-25F | 50 | 0.01 |
| 582 | ill-EC-2-POLE-25R | 50 | 0.01 |
| 583 | ill-EC-1-POLE-25F | 50 | 0.01 |
| 584 | ill-EC-1-POLE-25R | 50 | 0.01 |
| 585 | ill-EC-2-POLE-26F | 50 | 0.03 |
| 586 | ill-EC-2-POLE-26R | 50 | 0.03 |
| 587 | ill-EC-1-POLE-26F | 50 | 0.01 |
| 588 | ill-EC-1-POLE-26R | 50 | 0.01 |
| 589 | ill-EC-2-POLE-27F | 50 | 0.01 |
| 590 | ill-EC-2-POLE-27R | 50 | 0.01 |
| 591 | ill-EC-1-POLE-27F | 50 | 0.01 |
| 592 | ill-EC-1-POLE-27R | 50 | 0.01 |
| 593 | ill-EC-2-POLE-28F | 50 | 0.01 |
| 594 | ill-EC-2-POLE-28R | 50 | 0.01 |
| 595 | ill-EC-1-POLE-28F | 50 | 0.01 |
| 596 | ill-EC-1-POLE-28R | 50 | 0.01 |
| 597 | ill-EC-2-POLE-29F | 50 | 0.01 |
| 598 | ill-EC-2-POLE-29R | 50 | 0.01 |
| 599 | ill-EC-1-POLE-29F | 50 | 0.01 |
| 600 | ill-EC-1-POLE-29R | 50 | 0.01 |
| 601 | ill-EC-2-POLE-30F | 50 | 0.01 |
| 602 | ill-EC-2-POLE-30R | 50 | 0.01 |
| 603 | ill-EC-1-POLE-30F | 50 | 0.01 |
| 604 | ill-EC-1-POLE-30R | 50 | 0.01 |
| 605 | ill-EC-2-POLE-31F | 50 | 0.01 |
| 606 | ill-EC-2-POLE-31R | 50 | 0.01 |
| 607 | ill-EC-1-POLE-31F | 50 | 0.01 |
| 608 | ill-EC-1-POLE-31R | 50 | 0.01 |
| 609 | ill-EC-2-POLE-32F | 50 | 0.01 |
| 610 | ill-EC-2-POLE-32R | 50 | 0.01 |
| 611 | ill-EC-1-POLE-32F | 50 | 0.01 |
| 612 | ill-EC-1-POLE-32R | 50 | 0.01 |
| 613 | ill-EC-2-POLE-33F | 50 | 0.01 |
| 614 | ill-EC-2-POLE-33R | 50 | 0.01 |
| 615 | ill-EC-1-POLE-33F | 50 | 0.02 |
| 616 | ill-EC-1-POLE-33R | 50 | 0.02 |
| 617 | ill-EC-2-POLE-34F | 50 | 0.01 |
| 618 | ill-EC-2-POLE-34R | 50 | 0.01 |
| 619 | ill-EC-1-POLE-34F | 50 | 0.01 |
| 620 | ill-EC-1-POLE-34R | 50 | 0.01 |
| 621 | ill-EC-2-POLE-35F | 50 | 0.01 |
| 622 | ill-EC-2-POLE-35R | 50 | 0.01 |
| 623 | ill-EC-1-POLE-35F | 50 | 0.01 |
| 624 | ill-EC-1-POLE-35R | 50 | 0.01 |
| 625 | ill-EC-2-POLE-36F | 50 | 0.01 |

TABLE 2-continued

Primer MIX for DNA enrichment reaction

| Number | Primer name | Concentration (μM) | Volume (μL) |
|---|---|---|---|
| 626 | ill-EC-2-POLE-36R | 50 | 0.01 |
| 627 | ill-EC-1-POLE-36F | 50 | 0.01 |
| 628 | ill-EC-1-POLE-36R | 50 | 0.01 |
| 629 | ill-EC-2-POLE-37F | 50 | 0.01 |
| 630 | ill-EC-2-POLE-37R | 50 | 0.01 |
| 631 | ill-EC-1-POLE-37F | 50 | 0.01 |
| 632 | ill-EC-1-POLE-37R | 50 | 0.01 |
| 633 | ill-EC-2-POLE-38F | 50 | 0.01 |
| 634 | ill-EC-2-POLE-38R | 50 | 0.01 |
| 635 | ill-EC-1-POLE-38F | 50 | 0.01 |
| 636 | ill-EC-1-POLE-38R | 50 | 0.01 |
| 637 | ill-EC-2-POLE-39F | 50 | 0.01 |
| 638 | ill-EC-2-POLE-39R | 50 | 0.01 |
| 639 | ill-EC-1-POLE-39F | 50 | 0.01 |
| 640 | ill-EC-1-POLE-39R | 50 | 0.01 |
| 641 | ill-EC-2-POLE-40F | 50 | 0.01 |
| 642 | ill-EC-2-POLE-40R | 50 | 0.01 |
| 643 | ill-EC-1-POLE-40F | 50 | 0.01 |
| 644 | ill-EC-1-POLE-40R | 50 | 0.01 |
| 645 | ill-EC-2-POLE-41F | 50 | 0.01 |
| 646 | ill-EC-2-POLE-41R | 50 | 0.01 |
| 647 | ill-EC-1-POLE-41F | 50 | 0.03 |
| 648 | ill-EC-1-POLE-41R | 50 | 0.03 |
| 649 | ill-EC-2-POLE-42F | 50 | 0.01 |
| 650 | ill-EC-2-POLE-42R | 50 | 0.01 |
| 651 | ill-EC-1-POLE-42F | 50 | 0.01 |
| 652 | ill-EC-1-POLE-42R | 50 | 0.01 |
| 653 | ill-EC-2-POLE-43F | 50 | 0.01 |
| 654 | ill-EC-2-POLE-43R | 50 | 0.01 |
| 655 | ill-EC-1-POLE-43F | 50 | 0.01 |
| 656 | ill-EC-1-POLE-43R | 50 | 0.01 |
| 657 | ill-EC-2-POLE-44F | 50 | 0.01 |
| 658 | ill-EC-2-POLE-44R | 50 | 0.01 |
| 659 | ill-EC-1-POLE-44F | 50 | 0.01 |
| 660 | ill-EC-1-POLE-44R | 50 | 0.01 |
| 661 | ill-EC-2-POLE-45F | 50 | 0.01 |
| 662 | ill-EC-2-POLE-45R | 50 | 0.01 |
| 663 | ill-EC-1-POLE-45F | 50 | 0.01 |
| 664 | ill-EC-1-POLE-45R | 50 | 0.01 |
| 665 | ill-EC-2-POLE-46F | 50 | 0.01 |
| 666 | ill-EC-2-POLE-46R | 50 | 0.01 |
| 667 | ill-EC-1-POLE-46F | 50 | 0.01 |
| 668 | ill-EC-1-POLE-46R | 50 | 0.01 |
| 669 | ill-EC-2-POLE-47F | 50 | 0.01 |
| 670 | ill-EC-2-POLE-47R | 50 | 0.01 |
| 671 | ill-EC-1-POLE-47F | 50 | 0.01 |
| 672 | ill-EC-1-POLE-47R | 50 | 0.01 |
| 673 | ill-EC-2-POLE-48F | 50 | 0.01 |
| 674 | ill-EC-2-POLE-48R | 50 | 0.01 |
| 675 | ill-EC-1-POLE-48F | 50 | 0.02 |
| 676 | ill-EC-1-POLE-48R | 50 | 0.02 |
| 677 | ill-EC-2-POLE-49F | 50 | 0.01 |
| 678 | ill-EC-2-POLE-49R | 50 | 0.01 |
| 679 | ill-EC-1-POLE-49F | 50 | 0.01 |
| 680 | ill-EC-1-POLE-49R | 50 | 0.01 |
| 681 | ill-EC-2-POLE-50F | 50 | 0.01 |
| 682 | ill-EC-2-POLE-50R | 50 | 0.01 |
| 683 | ill-EC-1-POLE-50F | 50 | 0.01 |
| 684 | ill-EC-1-POLE-50R | 50 | 0.01 |
| 685 | ill-EC-2-POLE-51F | 50 | 0.01 |
| 686 | ill-EC-2-POLE-51R | 50 | 0.01 |
| 687 | ill-EC-1-POLE-51F | 50 | 0.01 |
| 688 | ill-EC-1-POLE-51R | 50 | 0.01 |
| 689 | ill-EC-2-POLE-52F | 50 | 0.01 |
| 690 | ill-EC-2-POLE-52R | 50 | 0.01 |
| 691 | ill-EC-1-POLE-52F | 50 | 0.01 |
| 692 | ill-EC-1-POLE-52R | 50 | 0.01 |
| 693 | ill-EC-2-POLE-53F | 50 | 0.01 |
| 694 | ill-EC-2-POLE-53R | 50 | 0.01 |
| 695 | ill-EC-1-POLE-53F | 50 | 0.01 |
| 696 | ill-EC-1-POLE-53R | 50 | 0.01 |
| 697 | ill-EC-2-POLE-54F | 50 | 0.02 |
| 698 | ill-EC-2-POLE-54R | 50 | 0.02 |
| 699 | ill-EC-1-POLE-54F | 50 | 0.01 |
| 700 | ill-EC-1-POLE-54R | 50 | 0.01 |
| 701 | ill-EC-2-POLE-55F | 50 | 0.01 |
| 702 | ill-EC-2-POLE-55R | 50 | 0.01 |
| 703 | ill-EC-1-POLE-55F | 50 | 0.01 |
| 704 | ill-EC-1-POLE-55R | 50 | 0.01 |
| 705 | ill-EC-2-POLE-56F | 50 | 0.01 |
| 706 | ill-EC-2-POLE-56R | 50 | 0.01 |
| 707 | ill-EC-1-POLE-56F | 50 | 0.01 |
| 708 | ill-EC-1-POLE-56R | 50 | 0.01 |
| 709 | ill-EC-2-POLE-57F | 50 | 0.01 |
| 710 | ill-EC-2-POLE-57R | 50 | 0.01 |
| 711 | ill-EC-1-POLE-57F | 50 | 0.01 |
| 712 | ill-EC-1-POLE-57R | 50 | 0.01 |
| 713 | ill-EC-2-POLE-58F | 50 | 0.01 |
| 714 | ill-EC-2-POLE-58R | 50 | 0.03 |
| 715 | ill-EC-1-POLE-58F | 50 | 0.01 |
| 716 | ill-EC-2-POLE-59F | 50 | 0.01 |
| 717 | ill-EC-1-POLE-58R | 50 | 0.01 |
| 718 | ill-EC-2-POLE-59R | 50 | 0.01 |
| 719 | ill-EC-1-POLE-59F | 50 | 0.02 |
| 720 | ill-EC-1-POLE-59R | 50 | 0.02 |
| 721 | ill-EC-2-POLE-60F | 50 | 0.01 |
| 722 | ill-EC-2-POLE-60R | 50 | 0.01 |
| 723 | ill-EC-1-POLE-60F | 50 | 0.01 |
| 724 | ill-EC-1-POLE-60R | 50 | 0.01 |
| 725 | ill-EC-2-POLE-61F | 50 | 0.01 |
| 726 | ill-EC-2-POLE-61R | 50 | 0.01 |
| 727 | ill-EC-MLH1-Z01F | 50 | 0.01 |
| 728 | ill-EC-MLH1-Z01R | 50 | 0.01 |
| 729 | ill-EC-PMS2-Z01F | 50 | 0.01 |
| 730 | ill-EC-PMS2-Z01R | 50 | 0.01 |
| 731 | ill-EC-PMS2-Z02F | 50 | 0.01 |
| 732 | ill-EC-PMS2-Z02R | 50 | 0.03 |
| 733 | ill-EC-PMS2-Z03F | 50 | 0.01 |
| 734 | ill-EC-PMS2-Z03R | 50 | 0.01 |
| 735 | ill-EC-PMS2-Z04F | 50 | 0.02 |
| 736 | ill-EC-PMS2-Z04R | 50 | 0.01 |
| 737 | ill-EC-PMS2-Z05F | 50 | 0.01 |
| 738 | ill-EC-PMS2-Z05R | 50 | 0.01 |
| 739 | ill-EC-PMS2-Z06F | 50 | 0.02 |
| 740 | ill-EC-PMS2-Z06R | 50 | 0.01 |
| 741 | ill-EC-PTEN-Z01F | 50 | 0.01 |
| 742 | ill-EC-PTEN-Z01R | 50 | 0.01 |
| Total | | | 8.16 |

(2) The formula of DNA PCR system per person is shown in Table 3

TABLE 3

The formula of DNA PCR system

| Number | Ingredients | Concentration | Volume (μL) |
|---|---|---|---|
| 1 | RingCap buffer | 10× | 2 |
| 2 | MgCl$_2$ | 25 mM | 4 |
| 3 | dNTPs | 10 μM | 2 |
| 4 | DNA enrichment reaction primer MIX | 50 μM | 5 |
| 5 | H$_2$O | Purified water | 5.9 |
| 6 | RingCap-Taq enzyme | 5 U/ul | 0.5 |
| 7 | Ion-BCXX-F | 50 μM | 0.2 |
| 8 | Ion-BCXX-R | 50 μM | 0.2 |
| 9 | C-Primer | 50 μM | 0.2 |
| 10 | DNA | 2 ng/ul | 5 |
| | Total volume | | 25 |

In the table, Ion-BCXX-F and Ion-BCXX-R indicate the asymmetric ligation probe set including Jon-BC1-F, Jon-BC1-R, Ion-BC2-F, Ion-BC2-R, Ion-BC3-F, Ion-B3-R, Ion-BC4-F, Ion-BC4-R, Ion-BC5-F, Ion-BC5-R, Ion-BC6-F, Ion-BC6-R, Ion-BC7-F, Jon-BC7-R, Ion-BC8-F and Ion-BC8-R. The above BC1-8 represents eight different tag sequences, respectively. The concentration of each probe is 50 μM, and C-Primer is a universal primer not complementary to the human genome.

The reaction system prepared in step (2) is subjected to PCR amplification according to the amplification procedure shown in Table 4.

TABLE 4

PCR amplification program

| Stage | Temperature | Time | Cycle |
|---|---|---|---|
| Pre-denaturation | 98° C. | 2 min | 1 |
| Denaturation | 98° C. | 15 s | 15 |
| Annealing | 60° C. | 25 s | |
| Extension | 72° C. | 20 s | |
| Denaturation | 98° C. | 15 s | 20 |
| Annealing | 56° C. | 25 s | |
| Extension | 72° C. | 20 s | |
| Preservation | 10° C. | 2 min | 1 |

4. The above amplified products are purified by magnetic beads and capillary electrophoresis are performed to obtain a library of samples with a size of 180 bp as the main product of the amplified fragment. The library is used for detection in the next step of the high-throughput sequencing instrument to obtain the target sequence information. By aligning with the wild-type sequence information, the mutation status may be identified.

The library construction method for detecting all-exon gene mutations of 8 human endometrial cancer-related genes based on a high-throughput sequencing platform does not include the steps of sample processing and template extraction. The amplification and detection capabilities for short fragment DNA from formaldehyde-fixed and paraffin-embedded samples is still the same as that for fresh tissue samples and blood samples.

Compared with the prior art, the disclosure may have the following beneficial effects:

(1) The method for constructing a single-tube high-throughput sequencing library of the present disclosure utilizes a single tube for multiple target sequences to quickly complete the library construction. The entire library construction process only takes 3 hours and the manual time is only 30 minutes. Combined with the high-throughput sequencing platform, it may be very effective to solve the current difficulty in the detection of somatic multi-gene all-exon mutations in clinical endometrial cancer samples based on small numbers of clinical samples, and the cost is low;

(2) The library sequence prepared by the construction method of the present disclosure may be recognized and detected by the current high-throughput sequencing system, thereby realizing the application of library construction for nucleic acid sequence detection. The nucleic acid detection may be applied to a variety of current high-throughput sequencing platforms.

BRIEF DESCRIPTION OF THE DRAWINGS

FIG. 4 shows the detection results of mutations in 8 endometrial cancer-related genes by highly multiplexed PCR in Example 1.

DETAILED DESCRIPTION OF THE EMBODIMENTS

The $MgCl_2$ and dNTP used in the following examples were purchased from Dalian Bao Biological Company, China. RingCap buffer and RingCap-Taq enzyme are produced by Xiamen Feishuo Biotechnology Co., Ltd.

Example 1

In this example, 100 samples of clinical endometrial cancer were collected. A traditional Sanger sequencing method and the method of the present disclosure were used for double-blind comparison. In this example, the 100 clinical endometrial cancer samples included in the group were all donated from the hospital. The samples were pathologically diagnosed as endometrial cancer. Meanwhile, considering the family heredity, the samples were embedded in paraffin and 7 pieces of 5 micrometers unstained paraffin section were cut as control.

Implementation of the above method included the following steps:

(1) Sample Processing and Quality Control of Template Extraction

A paraffin block sample was cut into 5-8 μm sections, 5 pieces of which are taken, or alternatively, 5 pieces of 5-8 μm sections that have been prepared are taken. After deparaffinization with xylene, the genomic DNA was extracted using the paraffin-embedded DNA extraction kit of Meiji Company, following the protocols of the kit. The extracted DNA was dissolved in Tris-HCl (10 mmol/L, pH 8.0), and the extraction quality was checked by an ultraviolet spectrophotometer, and the concentration was determined. The DNA concentration was adjusted to 100 ng/μl or 2 ng/μl with Tris-HCl solution (10 mmol/L, pH 8.0) as a template for PCR amplification.

(2) Highly Multiplexed PCR System and PCR Amplification

The DNA enrichment reaction primer shown as SEQ ID NO. 1-742 in the above table 1 was diluted to 50 μM after synthesis, and mixed according to the ratio in Table 2. 5 μL of mixture was taken. The multiplex PCR amplification system was prepared according to Table 3 above, and then multiple PCR amplification was performed according to the amplification procedure of Table 4.

(3) Library Purification Method

The first round of purification steps:
(i) 12.5 μL (0.5× sample volume) of Agencourt AMPure XP reagent was added to 25 μL of products in each sample reaction tube, and pipetted up and down 5 times, and the DNA was mixed and resuspended;
(ii) a resulting mixture was incubated at room temperature for 5 minutes;
(iii) a resulting mixture was placed on a magnetic support, incubated for 5 minutes until the solution was clear;
(iv) the supernatant was piped carefully and placed in a new centrifuge tube without disturbing the magnetic beads; Note: Do not discard the amplified library in the supernatant.

Figures 1, 2:
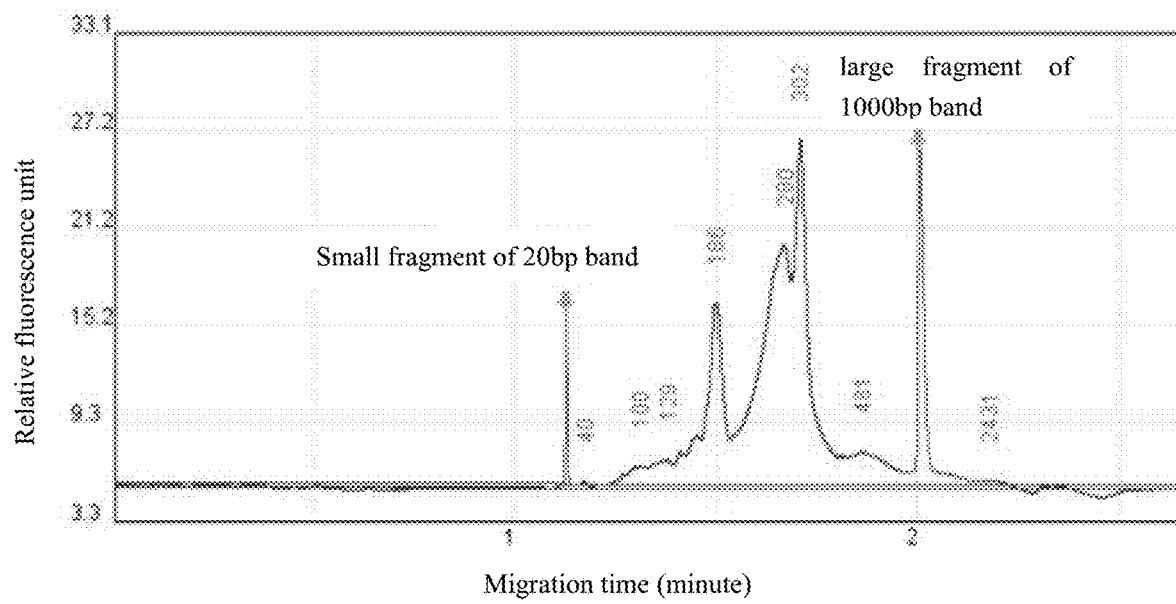
FIG. 1 is a data diagram of the fragment size of the nucleic acid library in Example 1.
FIG. 2 is a statistical diagram of the output data volume of a single sample in the detection of 8 endometrial cancer-related genes by highly multiplexed PCR in Example 1.

The second round of purification steps:
(i) 30 μL (1.2× sample volume) of Agencourt AMPure XP reagent was added to 25 μL of the above-absorbed supernatant, and pipetted up and down 5 times, and the DNA was mix thoroughly and resuspended;
(ii) a resulting mixture was incubated at room temperature for 5 minutes;
(iii) a resulting mixture was placed on a magnetic support and incubated for 3 minutes until the solution was clear. The supernatant was carefully aspirated and discarded without disturbing the magnetic beads. Note: Do not discard the amplified library on the magnetic beads.
(iv) 150 μl of freshly prepared 70% ethanol was added, with the magnetic bead sample submerged. The centrifuge tube was moved in the forward and reverse directions 5 times, and then incubated on a magnetic support for 2 minutes and the supernatant was removed;
(v) The above step 4 was repeated for the second washing;
(vi) After ensuring that all the ethanol droplets had been sucked from the wells, the plate was placed on a magnetic support and air dried at room temperature for 5 minutes. Over-dry should be avoided.
(vii) The sample tube was removed from the magnetic support. 25 μL TE (PH8.0) buffer was added to each well to fully soak the magnetic beads and was shaken well to mix, and quickly centrifuged to collect the liquid at the bottom of the tube. (pipetting more than half of the liquid up and down with a pipette for at least 5 times to mix may also be chosen); Note: Do not discard the supernatant containing the amplified library.
(viii) The sample tube was placed on a magnetic support for 2 minutes. The supernatant contained the amplified library. 20 μL of supernatant was taken out.
(ix) The obtained library was subjected to capillary electrophoresis for fragment detection. FIG. 1 shows the library detection result by electrophoresis. The main peak of the library was between 280-300.

(4) On-board detection: The Miseq sequencer (Illumina) could detect 30 samples at a time, including positive control: mutant cell line DNA; negative control: wild-type cell line DNA.

Figure 3:
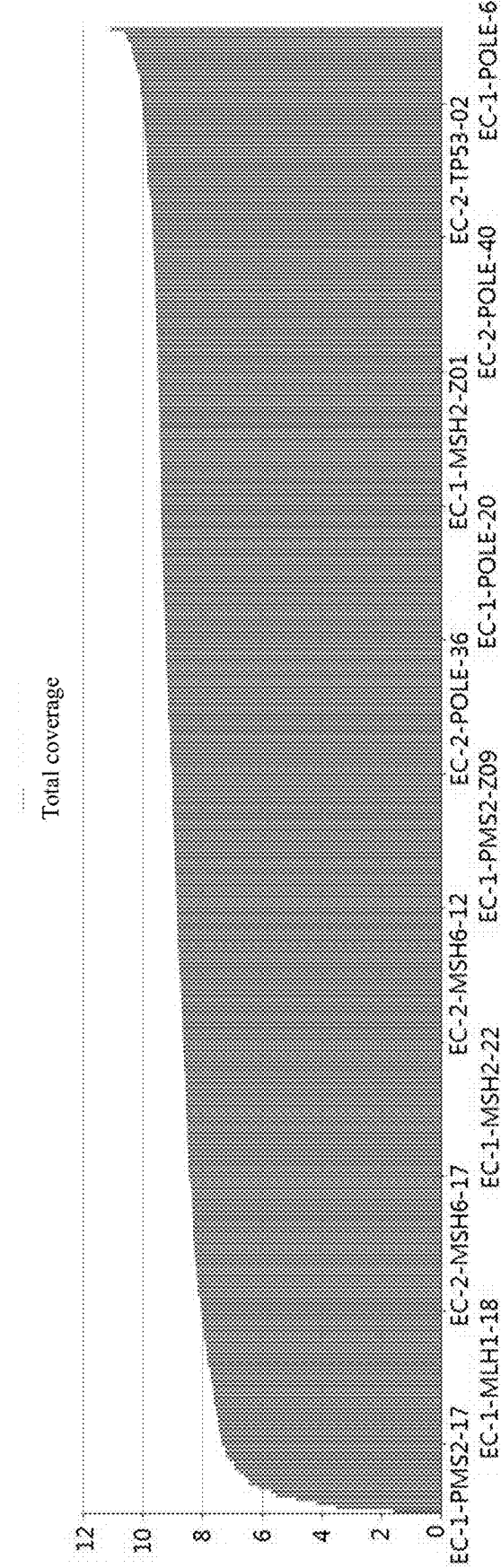
FIG. 3 is a diagram showing the uniformity of detection of mutations in 8 endometrial cancer-related genes by highly multiplexed PCR in Example 1.
Figure 5:
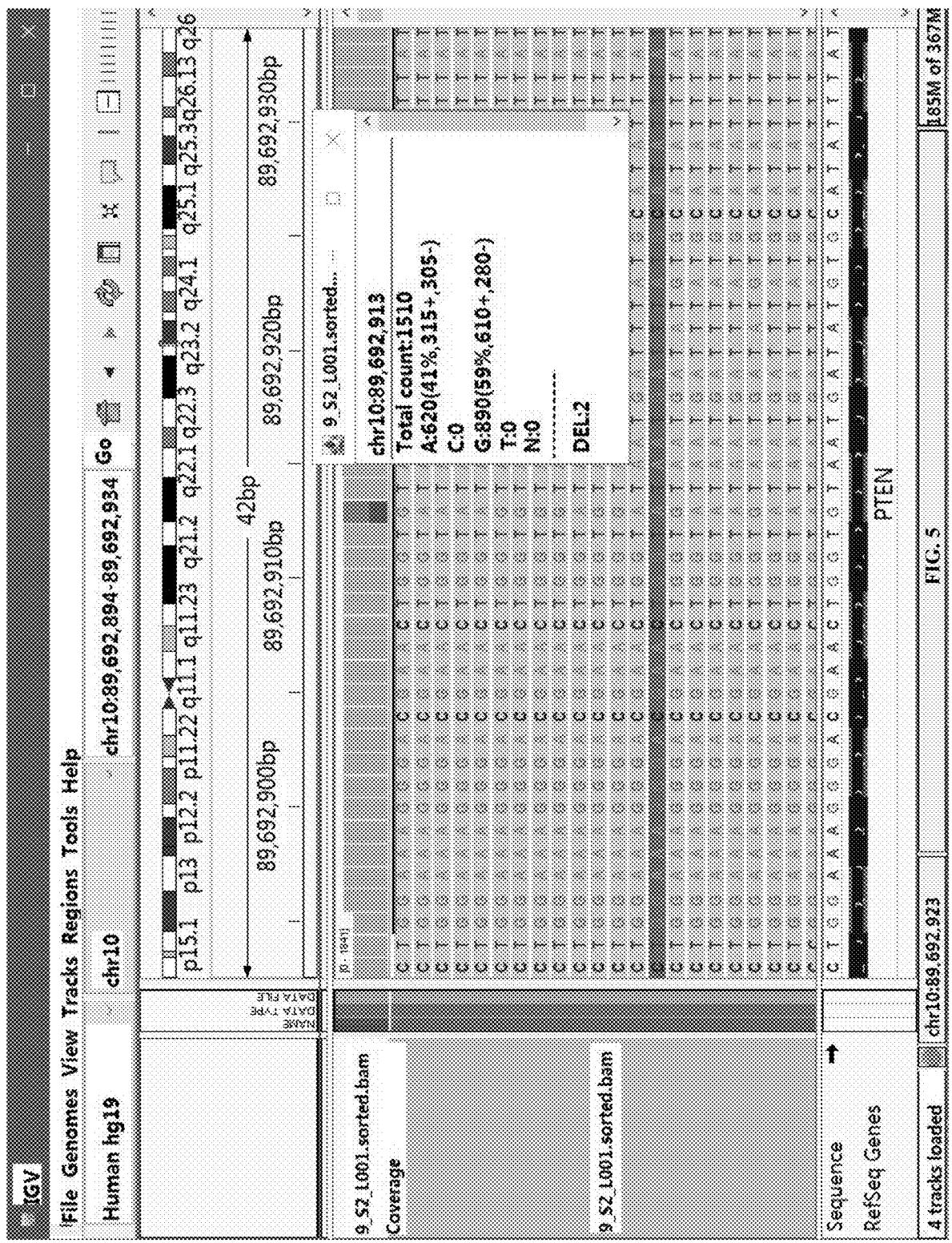
FIG. 5 is a schematic diagram of the detection and alignment results of the PTEN gene c.397G>A mutation (COSM5044) in Example 1.

The output data was subjected to a sequence alignment analysis. FIG. 2 is a statistical diagram of the output data volume of a single sample in the detection of 8 endometrial cancer-related genes by highly multiplexed PCR of the present disclosure. The amplicon sequence shown in the figure accounts for 92.52%, that is, the reads obtained by our sequencing that was aligned to our target sequence accounts for 92.52%, indicating that the multiple primers used in the present disclosure had high amplification specificity. The homogeneity of the amplicons shown in FIG. 2 was 91.04%. The higher the value was, the closer the sequencing depth of different amplicons was. Each column of the histogram in FIG. 3 represented an amplicon, and the height of the column represented the sequencing depth of the corresponding amplicon. It could be seen intuitively in the figure that the sequencing depths of different amplicons were relatively consistent, indicating the amplification uniformity of the multiple primers of the present disclosure. FIG. 4 shows the annotation result of a positive clinical sample after sequencing and alignment. The result showed that the sample's PTEN gene had a c.397G>A mutation (COSM5044), and the COSMIC database recorded it as a pathogenic mutation. FIG. 5 shows the result of c.397G>A mutation viewed by the IGV alignment visualization software.

For 100 clinical samples of endometrial cancer, the detection results of the present disclosure were completely consistent with the results of Sanger sequencing: among the 100 samples, 6 cases had TP53 gene mutations, 4 cases had POLE gene mutations, 2 cases had MSH2 gene mutations, 3 cases had EPCAM gene mutations, and the remaining 85 cases were wild-type, as shown in Table 5.

TABLE 5

Comparison of high-throughput sequencing detection results and Sanger sequencing results

| | | Method of the present disclosure | | |
|---|---|---|---|---|
| | | Positive | Negative | Detection rate |
| Sanger method | Positive | 15 | 0 | 15/100 |
| | Negative | 0 | 85 | 85/100 |
| | Detection rate | 15/100 | 85/100 | |

Example 2

This example was to investigate the sensitivity and specificity of the method of the present disclosure. The known common mutation sites in Table 6 below were selected as the sequence for constructing positive plasmids.

TABLE 6 positive plasmids

| Number | Gene name | COSMIC number of mutation | Base alteration | Type of mutation |
|---|---|---|---|---|
| M1 | TP53 | COSM44957 | c.80del | Deletion mutation |
| M2 | POLE | COSM937332 | c.857C > G | Site mutation |
| M3 | PTEN | COSM1684696 | c.38_39insC | Insertion mutation |
| M4 | EPCAM | COSM4681226 | c.924G > A | Site mutation |
| M5 | MSH6 | COSM190062 | c.1082G > A | Site mutation |
| M6 | MLH1 | COSM6943688 | c.105_107del | Deletion mutation |
| M7 | PMS2 | COSM5621554 | c.209A > G | Site mutation |
| M8 | MSH2 | COSM5751788 | c.89_90insT | Insertion mutation |

The above-mentioned plasmids containing the mutant sequences were synthesized by genetic engineering technology, and the length of which was 500 bp.

1. Sample processing: 10 clinical paracancerous tissues were collected at the same time. After Sanger sequencing, the samples were verified to be negative for the 8 genes and named as WT1-10. The wild-type DNA was diluted to 2 ng/μL, and the above 8 plasmids were diluted to $10^4/\mu L$ at the same time, with 2 ng L wild-type DNA as the diluent. The above 8 plasmids were sequentially diluted to $10^3/\mu L$, $10^2/\mu L$, $10^1/\mu L$, $10^0/\mu L$. There were a total of 32 plasmid samples and 10 wild-type DNAs.

2. The highly multiplexed PCR and library purification steps were the same as in Example 1.

3. On-board detection: The Miseq sequencer (Illumina) could detect 30 samples at a time (including the negative and positive control). The results are shown in Table 7. The detection results of 10 wild-type samples were all negative, and no pathogenic mutations were detected. The detection results of 8 positive plasmids with gradient dilution also showed that the present disclosure had a high detection sensitivity, at least $10^1$ copies/μL, wherein the detection sensitivity of M4 and M6 reached $10^0$ copies/μL.

TABLE 7

Detection results

| Sample name | Detection results | Sample name | Detection results | Sample name | Detection results | Sample name | Detection results |
|---|---|---|---|---|---|---|---|
| WT1 | negative | WT2 | negative | WT3 | negative | WT4 | negative |
| WT5 | negative | WT6 | negative | WT7 | negative | WT8 | negative |
| WT9 | negative | WT10 | negative | — | | — | |
| M1-$10^3$/μL | positive | M1-$10^2$/μL | positive | M1-$10^1$/μL | positive | M1-$10^0$ μL | negative |
| M2-$10^3$/μL | positive | M2-$10^2$/μL | positive | M2-$10^1$/μL | positive | M2-$10^0$ μL | negative |
| M3-$10^3$/μL | positive | M3-$10^2$/μL | positive | M3-$10^1$/μL | positive | M3-$10^0$ μL | negative |
| M4-$10^3$/μL | positive | M4-$10^2$/μL | positive | M4-$10^1$/μL | positive | M4-$10^0$ μL | negative |
| M5-$10^3$/μL | positive | M5-$10^2$/μL | positive | M5-$10^1$/μL | positive | M5-$10^0$ μL | negative |
| M6-$10^3$/μL | positive | M6-$10^2$/μL | positive | M6-$10^1$/μL | positive | M6-$10^0$ μL | negative |
| M7-$10^3$/μL | positive | M7-$10^2$/μL | positive | M7-$10^1$/μL | positive | M7-$10^0$ μL | negative |
| M8-$10^3$/μL | positive | M8-$10^2$/μL | positive | M8-$10^1$/μL | positive | M8-$10^0$ μL | negative |

Example 3

In this example, the repeatability of the method of the present disclosure was investigated through clinical sample detection.

10 clinical samples of endometrial cancer were collected, and detected by traditional Sanger sequencing method. The mutation results are shown in Table 8.

TABLE 8

Results of Sanger sequencing

| 编号 | Sanger results | Gene name | COSMIC number of mutation | Base alteration | Mutation rate | Type of mutation |
|---|---|---|---|---|---|---|
| ZG-01 | TP53positive | TP53 | COSM43834 | c.81_87delinsAG | 15.9% | Insertion mutation |
| ZG-02 | POLE positive | POLE | COSM25282 | c.71del | 26.1% | Deletion mutation |
| ZG-03 | PTEN positive | PTEN | COSM5107 | c.71A > G | 57.2% | Site mutation |
| ZG-04 | EPCAM positive | EPCAM | COSM7873523 | c.697C > A | 46.8% | Site mutation |
| ZG-05 | MSH6 positive | MSH6 | COSM3749667 | c.116G > A | 36.3% | Site mutation |
| ZG-06 | negative | | | | | |
| ZG-07 | negative | | | | | |
| ZG-08 | negative | | | | | |
| ZG-09 | negative | | | | | |
| ZG-10 | negative | | | | | |

Implementation of the above method includes the following steps:

1. Sample processing and quality control of template extraction: A clinically collected paraffin block sample was cut into 5-8 μm sections, 5 pieces of which are taken, or alternatively, 5 pieces of 5-8 μm sections that have been prepared are taken. After deparaffinization with xylene, the genomic DNA was extracted using the paraffin-embedded DNA extraction kit of Meiji Company, following the protocols of the kit. The extracted DNA was dissolved in Tris-HCl (10 mmol/L, pH 8.0), and the extraction quality was checked by an ultraviolet spectrophotometer, and the concentration was determined. The DNA concentration was adjusted to 100 ng/μl or 2 ng/μl with Tris-HCl solution (10 mmol/L, pH 8.0) as a template for PCR amplification.

2. The highly multiplexed PCR and library purification steps were the same as in Example 1.

3. On-board detection: The Miseq sequencer (Illumina) could detect 30 samples at a time (including the negative and positive control). The results are shown in Table 9.

TABLE 9

Results of repeatability test

| Sample name | Test result of repeat 1 | Test result of repeat 2 | Test result of repeat 3 | Test result of repeat 4 | Test result of repeat 5 | Test result of repeat 6 | Test result of repeat 7 |
|---|---|---|---|---|---|---|---|
| ZG-01 | positive | positive | positive | positive | positive | positive | positive |
| ZG-02 | positive | positive | positive | positive | positive | positive | positive |
| ZG-03 | positive | positive | positive | positive | positive | positive | positive |
| ZG-04 | positive | positive | positive | positive | positive | positive | positive |

TABLE 9-continued

Results of repeatability test

| Sample name | Test result of repeat 1 | Test result of repeat 2 | Test result of repeat 3 | Test result of repeat 4 | Test result of repeat 5 | Test result of repeat 6 | Test result of repeat 7 |
| --- | --- | --- | --- | --- | --- | --- | --- |
| ZG-05 | positive | positive | positive | positive | positive | positive | positive |
| ZG-06 | negative | negative | negative | negative | negative | negative | negative |
| ZG-07 | negative | negative | negative | negative | negative | negative | negative |
| ZG-08 | negative | negative | negative | negative | negative | negative | negative |
| ZG-09 | negative | negative | negative | negative | negative | negative | negative |
| ZG-10 | negative | negative | negative | negative | negative | negative | negative |

It could be seen from the above results that the library construction method provided by the present disclosure had good repeatability in the detection of clinical samples.

The method for constructing a multi-gene library of endometrial cancer of the present disclosure may simultaneously detect full exon mutation sites of 8 endometrial cancer-related genes, and the library construction only takes 3 hours. Therefore, the present disclosure may save time and effort, have high accuracy, and allow rapid diagnosis of mutations. Moreover, the coincidence rate of the results of high-throughput sequencing method with traditional sequencing method may be 100%, and the sensitivity and selective detection ability of high-throughput sequencing method may be higher than that of traditional sequencing method. 10 ng sample DNA containing 1% of mutant DNA may be detected.

The above-mentioned embodiments only describe the preferred mode of the present disclosure, not to limit the scope of the present disclosure. Without departing from the design spirit of the present disclosure, various modifications and improvements made by those of ordinary skill in the art to the technical solution of the present disclosure should fall within the scope of protection determined by the claims of the present disclosure.

What is claimed is:

1. A library construction method for detecting endometrial cancer-related gene mutations based on high-throughput sequencing, wherein the method comprises the following steps:

(1) using primer sequences as set forth in SEQ ID NO. 1-759 to perform multiplex PCR amplification of the sample to be detected to obtain a library; and (2) purifying the library;

wherein the PCR amplification program in step (1) is shown in the table below:

| Stage | Temperature | Time | Cycle |
| --- | --- | --- | --- |
| Pre-denaturation | 98° C. | 2 min | 1 |
| Denaturation | 98° C. | 15 s | 15 |
| Annealing | 60° C. | 25 s | |
| Extension | 72° C. | 20 s | |
| Denaturation | 98° C. | 15 s | 20 |
| Annealing | 56° C. | 25 s | |
| Extension | 72° C. | 20 s | |
| Preservation | 10° C. | 2 min | 1; | and the PCR amplification system in step (1) is shown in the table below:

| Number | Ingredients | Concentration | Volume (μL) |
| --- | --- | --- | --- |
| 1 | RingCap buffer | 10× | 2 |
| 2 | MgCl₂ | 25 mM | 4 |
| 3 | dNTPs | 10 μM | 2 |
| 4 | DNA enrichment reaction primer MIX | 50 μM | 5 |
| 5 | H₂O | Purified water | 5.9 |
| 6 | RingCap-Taq enzyme | 5 U/μl | 0.5 |
| 7 | Ion-BCXX-F | 50 μM | 0.2 |
| 8 | Ion-BCXX-R | 50 μM | 0.2 |
| 9 | C-Primer | 50 μM | 0.2 |
| 10 | DNA | 2 ng/μl | 5 |
| | Total volume | | 25. |

2. The library construction method for detecting endometrial cancer-related gene mutations based on high-throughput sequencing according to claim 1, wherein the sample to be detected comprises fresh pathological tissues from surgical resection, formaldehyde-fixed paraffin-embedded pathological tissues, paraffin sections, whole blood, plasma, serum, and pleural effusion.

3. The library construction method for detecting endometrial cancer-related gene mutations based on high-throughput sequencing according to claim 1, wherein the primer MIX for DNA enrichment reaction is prepared according to the table below:

| Number | Primer name | Concentration (μM) | Volume (μL) |
| --- | --- | --- | --- |
| 1 | ill-EC-2-PMS2-01F | 50 | 0.01 |
| 2 | ill-EC-2-PMS2-01R | 50 | 0.01 |
| 3 | ill-EC-1-PMS2-02F | 50 | 0.02 |
| 4 | ill-EC-1-PMS2-02R | 50 | 0.01 |
| 5 | ill-EC-2-PMS2-02F | 50 | 0.03 |
| 6 | ill-EC-2-PMS2-02R | 50 | 0.01 |
| 7 | ill-EC-1-PMS2-03F | 50 | 0.01 |
| 8 | ill-EC-1-PMS2-03R | 50 | 0.02 |
| 9 | ill-EC-2-PMS2-03F | 50 | 0.01 |
| 10 | ill-EC-2-PMS2-03R | 50 | 0.01 |
| 11 | ill-EC-1-PMS2-04F | 50 | 0.01 |
| 12 | ill-EC-1-PMS2-04R | 50 | 0.01 |
| 13 | ill-EC-2-PMS2-04F | 50 | 0.01 |
| 14 | ill-EC-2-PMS2-04R | 50 | 0.01 |
| 15 | ill-EC-1-PMS2-05F | 50 | 0.01 |
| 16 | ill-EC-1-PMS2-05R | 50 | 0.01 |
| 17 | ill-EC-2-PMS2-05F | 50 | 0.01 |
| 18 | ill-EC-2-PMS2-05R | 50 | 0.01 |
| 19 | ill-EC-1-PMS2-06F | 50 | 0.01 |
| 20 | ill-EC-1-PMS2-06R | 50 | 0.01 |
| 21 | ill-EC-2-PMS2-06F | 50 | 0.01 |
| 22 | ill-EC-2-PMS2-06R | 50 | 0.01 |
| 23 | ill-EC-1-PMS2-07F | 50 | 0.01 |
| 24 | ill-EC-1-PMS2-07R | 50 | 0.01 |
| 25 | ill-EC-2-PMS2-07F | 50 | 0.01 |
| 26 | ill-EC-2-PMS2-07R | 50 | 0.01 |
| 27 | ill-EC-1-PMS2-08F | 50 | 0.01 |
| 28 | ill-EC-1-PMS2-08R | 50 | 0.01 |
| 29 | ill-EC-2-PMS2-08F | 50 | 0.01 |
| 30 | ill-EC-2-PMS2-08R | 50 | 0.01 |
| 31 | ill-EC-1-PMS2-09F | 50 | 0.02 |
| 32 | ill-EC-1-PMS2-09R | 50 | 0.02 |
| 33 | ill-EC-2-PMS2-09F | 50 | 0.01 |
| 34 | ill-EC-2-PMS2-09R | 50 | 0.01 |
| 35 | ill-EC-1-PMS2-10F | 50 | 0.01 |
| 36 | ill-EC-1-PMS2-10R | 50 | 0.01 |
| 37 | ill-EC-2-PMS2-10F | 50 | 0.01 |
| 38 | ill-EC-2-PMS2-10R | 50 | 0.01 |
| 39 | ill-EC-1-PMS2-11F | 50 | 0.01 |
| 40 | ill-EC-1-PMS2-11R | 50 | 0.01 |
| 41 | ill-EC-2-PMS2-11F | 50 | 0.01 |
| 42 | ill-EC-2-PMS2-11R | 50 | 0.01 |
| 43 | ill-EC-1-PMS2-12F | 50 | 0.03 |
| 44 | ill-EC-1-PMS2-12R | 50 | 0.03 |
| 45 | ill-EC-2-PMS2-12F | 50 | 0.01 |
| 46 | ill-EC-2-PMS2-12R | 50 | 0.01 |
| 47 | ill-EC-1-PMS2-13F | 50 | 0.01 |
| 48 | ill-EC-1-PMS2-13R | 50 | 0.01 |
| 49 | ill-EC-2-PMS2-13F | 50 | 0.01 |
| 50 | ill-EC-2-PMS2-13R | 50 | 0.01 |
| 51 | ill-EC-1-PMS2-14F | 50 | 0.01 |
| 52 | ill-EC-1-PMS2-14R | 50 | 0.01 |
| 53 | ill-EC-2-PMS2-14F | 50 | 0.02 |
| 54 | ill-EC-2-PMS2-14R | 50 | 0.02 |
| 55 | ill-EC-1-PMS2-15F | 50 | 0.01 |
| 56 | ill-EC-1-PMS2-15R | 50 | 0.01 |
| 57 | ill-EC-2-PMS2-15F | 50 | 0.01 |
| 58 | ill-EC-2-PMS2-15R | 50 | 0.01 |
| 59 | ill-EC-1-PMS2-16F | 50 | 0.01 |
| 60 | ill-EC-1-PMS2-16R | 50 | 0.01 |
| 61 | ill-EC-2-PMS2-16F | 50 | 0.01 |
| 62 | ill-EC-2-PMS2-16R | 50 | 0.01 |
| 63 | ill-EC-1-PMS2-17F | 50 | 0.01 |
| 64 | ill-EC-1-PMS2-17R | 50 | 0.01 |
| 65 | ill-EC-2-PMS2-17F | 50 | 0.01 |

| Number | Primer name | Concentration (μM) | Volume (μL) | Number | Primer name | Concentration (μM) | Volume (μL) |
|---|---|---|---|---|---|---|---|
| 66 | ill-EC-2-PMS2-17R | 50 | 0.01 | 142 | ill-EC-1-MLH1-07R | 50 | 0.01 |
| 67 | ill-EC-1-PMS2-18F | 50 | 0.01 | 143 | ill-EC-1-MLH1-08F | 50 | 0.01 |
| 68 | ill-EC-1-PMS2-18R | 50 | 0.01 | 144 | ill-EC-2-MLH1-08R | 50 | 0.01 |
| 69 | ill-EC-2-TP53-01F | 50 | 0.01 | 145 | ill-EC-1-MLH1-08F | 50 | 0.01 |
| 70 | ill-EC-2-TP53-01R | 50 | 0.01 | 146 | ill-EC-1-MLH1-08R | 50 | 0.01 |
| 71 | ill-EC-1-TP53-02F | 50 | 0.01 | 147 | ill-EC-2-MLH1-09F | 50 | 0.01 |
| 72 | ill-EC-1-TP53-02R | 50 | 0.01 | 148 | ill-EC-2-MLH1-09R | 50 | 0.01 |
| 73 | ill-EC-2-TP53-02F | 50 | 0.01 | 149 | ill-EC-1-MLH1-09F | 50 | 0.01 |
| 74 | ill-EC-2-TP53-02R | 50 | 0.01 | 150 | ill-EC-1-MLH1-09R | 50 | 0.01 |
| 75 | ill-EC-1-TP53-03F | 50 | 0.01 | 151 | ill-EC-2-MLH1-10F | 50 | 0.01 |
| 76 | ill-EC-1-TP53-03R | 50 | 0.01 | 152 | ill-EC-2-MLH1-10R | 50 | 0.01 |
| 77 | ill-EC-2-TP53-03F | 50 | 0.01 | 153 | ill-EC-1-MLH1-10F | 50 | 0.01 |
| 78 | ill-EC-2-TP53-03R | 50 | 0.01 | 154 | ill-EC-1-MLH1-10R | 50 | 0.01 |
| 79 | ill-EC-1-TP53-04F | 50 | 0.01 | 155 | ill-EC-2-MLH1-11F | 50 | 0.01 |
| 80 | ill-EC-1-TP53-04R | 50 | 0.01 | 156 | ill-EC-2-MLH1-11R | 50 | 0.01 |
| 81 | ill-EC-2-TP53-04F | 50 | 0.01 | 157 | ill-EC-1-MLH1-11F | 50 | 0.01 |
| 82 | ill-EC-2-TP53-04R | 50 | 0.01 | 158 | ill-EC-1-MLH1-11R | 50 | 0.01 |
| 83 | ill-EC-1-TP53-05F | 50 | 0.01 | 159 | ill-EC-2-MLH1-12F | 50 | 0.01 |
| 84 | ill-EC-1-TP53-05R | 50 | 0.01 | 160 | ill-EC-2-MLH1-12R | 50 | 0.01 |
| 85 | ill-EC-2-TP53-05F | 50 | 0.01 | 161 | ill-EC-1-MLH1-12F | 50 | 0.01 |
| 86 | ill-EC-2-TP53-05R | 50 | 0.01 | 162 | ill-EC-1-MLH1-12R | 50 | 0.01 |
| 87 | ill-EC-1-TP53-06F | 50 | 0.01 | 163 | ill-EC-2-MLH1-13F | 50 | 0.01 |
| 88 | ill-EC-1-TP53-06R | 50 | 0.01 | 164 | ill-EC-2-MLH1-13R | 50 | 0.01 |
| 89 | ill-EC-2-TP53-06F | 50 | 0.01 | 165 | ill-EC-1-MLH1-13F | 50 | 0.01 |
| 90 | ill-EC-2-TP53-06R | 50 | 0.01 | 166 | ill-EC-1-MLH1-13R | 50 | 0.01 |
| 91 | ill-EC-1-TP53-07F | 50 | 0.01 | 167 | ill-EC-2-MLH1-14F | 50 | 0.01 |
| 92 | ill-EC-1-TP53-07R | 50 | 0.01 | 168 | ill-EC-2-MLH1-14R | 50 | 0.01 |
| 93 | ill-EC-2-TP53-07F | 50 | 0.03 | 169 | ill-EC-1-MLH1-14F | 50 | 0.01 |
| 94 | ill-EC-2-TP53-07R | 50 | 0.03 | 170 | ill-EC-1-MLH1-14R | 50 | 0.01 |
| 95 | ill-EC-1-TP53-08F | 50 | 0.01 | 171 | ill-EC-2-MLH1-15F | 50 | 0.01 |
| 96 | ill-EC-1-TP53-08R | 50 | 0.01 | 172 | ill-EC-2-MLH1-15R | 50 | 0.01 |
| 97 | ill-EC-2-TP53-08F | 50 | 0.01 | 173 | ill-EC-1-MLH1-15F | 50 | 0.01 |
| 98 | ill-EC-2-TP53-08R | 50 | 0.01 | 174 | ill-EC-1-MLH1-15R | 50 | 0.01 |
| 99 | ill-EC-1-TP53-09F | 50 | 0.01 | 175 | ill-EC-2-MLH1-16F | 50 | 0.01 |
| 100 | ill-EC-1-TP53-09R | 50 | 0.01 | 176 | ill-EC-2-MLH1-16R | 50 | 0.01 |
| 101 | ill-EC-2-TP53-09F | 50 | 0.02 | 177 | ill-EC-1-MLH1-16F | 50 | 0.03 |
| 102 | ill-EC-2-TP53-09R | 50 | 0.02 | 178 | ill-EC-1-MLH1-16R | 50 | 0.03 |
| 103 | ill-EC-1-TP53-10F | 50 | 0.01 | 179 | ill-EC-2-MLH1-17F | 50 | 0.01 |
| 104 | ill-EC-1-TP53-10R | 50 | 0.01 | 180 | ill-EC-2-MLH1-17R | 50 | 0.01 |
| 105 | ill-EC-2-TP53-10F | 50 | 0.01 | 181 | ill-EC-1-MLH1-17F | 50 | 0.01 |
| 106 | ill-EC-2-TP53-10R | 50 | 0.01 | 182 | ill-EC-1-MLH1-17R | 50 | 0.01 |
| 107 | ill-EC-1-TP53-11F | 50 | 0.01 | 183 | ill-EC-2-MLH1-18F | 50 | 0.01 |
| 108 | ill-EC-1-TP53-11R | 50 | 0.01 | 184 | ill-EC-2-MLH1-18R | 50 | 0.01 |
| 109 | ill-EC-2-TP53-11F | 50 | 0.01 | 185 | ill-EC-1-MLH1-18F | 50 | 0.01 |
| 110 | ill-EC-2-TP53-11R | 50 | 0.01 | 186 | ill-EC-1-MLH1-18R | 50 | 0.01 |
| 111 | ill-EC-1-TP53-12F | 50 | 0.01 | 187 | ill-EC-2-MLH1-19F | 50 | 0.01 |
| 112 | ill-EC-1-TP53-12R | 50 | 0.01 | 188 | ill-EC-2-MLH1-19R | 50 | 0.01 |
| 113 | ill-EC-2-TP53-12F | 50 | 0.02 | 189 | ill-EC-1-MLH1-19F | 50 | 0.01 |
| 114 | ill-EC-2-TP53-12R | 50 | 0.02 | 190 | ill-EC-1-MLH1-19R | 50 | 0.01 |
| 115 | ill-EC-1-TP53-13F | 50 | 0.01 | 191 | ill-EC-2-MLH1-20F | 50 | 0.01 |
| 116 | ill-EC-1-TP53-13R | 50 | 0.01 | 192 | ill-EC-2-MLH1-20R | 50 | 0.01 |
| 117 | ill-EC-1-MLH1-01F | 50 | 0.01 | 193 | ill-EC-1-MLH1-20F | 50 | 0.01 |
| 118 | ill-EC-1-MLH1-01R | 50 | 0.01 | 194 | ill-EC-1-MLH1-20R | 50 | 0.01 |
| 119 | ill-EC-2-MLH1-02F | 50 | 0.01 | 195 | ill-EC-2-MLH1-21F | 50 | 0.01 |
| 120 | ill-EC-2-MLH1-02R | 50 | 0.01 | 196 | ill-EC-2-MLH1-21R | 50 | 0.01 |
| 121 | ill-EC-1-MLH1-02F | 50 | 0.01 | 197 | ill-EC-1-MLH1-21F | 50 | 0.01 |
| 122 | ill-EC-1-MLH1-02R | 50 | 0.01 | 198 | ill-EC-1-MLH1-21R | 50 | 0.01 |
| 123 | ill-EC-2-MLH1-03F | 50 | 0.01 | 199 | ill-EC-2-MLH1-22F | 50 | 0.01 |
| 124 | ill-EC-2-MLH1-03R | 50 | 0.01 | 200 | ill-EC-2-MLH1-22R | 50 | 0.01 |
| 125 | ill-EC-1-MLH1-03F | 50 | 0.01 | 201 | ill-EC-1-EPCAM-01F | 50 | 0.01 |
| 126 | ill-EC-1-MLH1-03R | 50 | 0.01 | 202 | ill-EC-1-EPCAM-01R | 50 | 0.01 |
| 127 | ill-EC-2-MLH1-04F | 50 | 0.01 | 203 | ill-EC-2-EPCAM-02F | 50 | 0.02 |
| 128 | ill-EC-2-MLH1-04R | 50 | 0.01 | 204 | ill-EC-2-EPCAM-02R | 50 | 0.02 |
| 129 | ill-EC-1-MLH1-04F | 50 | 0.01 | 205 | ill-EC-1-EPCAM-03F | 50 | 0.01 |
| 130 | ill-EC-1-MLH1-04R | 50 | 0.01 | 206 | ill-EC-1-EPCAM-03R | 50 | 0.01 |
| 131 | ill-EC-2-MLH1-05F | 50 | 0.01 | 207 | ill-EC-2-EPCAM-04F | 50 | 0.01 |
| 132 | ill-EC-2-MLH1-05R | 50 | 0.01 | 208 | ill-EC-2-EPCAM-04R | 50 | 0.01 |
| 133 | ill-EC-1-MLH1-05F | 50 | 0.02 | 209 | ill-EC-1-EPCAM-05F | 50 | 0.01 |
| 134 | ill-EC-1-MLH1-05R | 50 | 0.02 | 210 | ill-EC-1-EPCAM-05R | 50 | 0.01 |
| 135 | ill-EC-2-MLH1-06F | 50 | 0.01 | 211 | ill-EC-2-EPCAM-06F | 50 | 0.01 |
| 136 | ill-EC-2-MLH1-06R | 50 | 0.01 | 212 | ill-EC-2-EPCAM-06R | 50 | 0.01 |
| 137 | ill-EC-1-MLH1-06F | 50 | 0.01 | 213 | ill-EC-1-EPCAM-07F | 50 | 0.01 |
| 138 | ill-EC-1-MLH1-06R | 50 | 0.01 | 214 | ill-EC-1-EPCAM-07R | 50 | 0.01 |
| 139 | ill-EC-2-MLH1-07F | 50 | 0.01 | 215 | ill-EC-2-EPCAM-08F | 50 | 0.01 |
| 140 | ill-EC-2-MLH1-07R | 50 | 0.01 | 216 | ill-EC-2-EPCAM-08R | 50 | 0.01 |
| 141 | ill-EC-1-MLH1-07F | 50 | 0.01 | 217 | ill-EC-1-EPCAM-09F | 50 | 0.01 |

| Number | Primer name | Concentration (μM) | Volume (μL) |
|---|---|---|---|
| 218 | ill-EC-1-EPCAM-09R | 50 | 0.01 |
| 219 | ill-EC-2-EPCAM-10F | 50 | 0.01 |
| 220 | ill-EC-2-EPCAM-10R | 50 | 0.01 |
| 221 | ill-EC-1-EPCAM-11F | 50 | 0.01 |
| 222 | ill-EC-1-EPCAM-11R | 50 | 0.01 |
| 223 | ill-EC-2-EPCAM-12F | 50 | 0.01 |
| 224 | ill-EC-2-EPCAM-12R | 50 | 0.01 |
| 225 | ill-EC-1-EPCAM-13F | 50 | 0.01 |
| 226 | ill-EC-1-EPCAM-13R | 50 | 0.01 |
| 227 | ill-EC-2-EPCAM-14F | 50 | 0.01 |
| 228 | ill-EC-2-EPCAM-14R | 50 | 0.01 |
| 229 | ill-EC-1-EPCAM-15F | 50 | 0.01 |
| 230 | ill-EC-1-EPCAM-15R | 50 | 0.01 |
| 231 | ill-EC-1-EPCAM-16F | 50 | 0.02 |
| 232 | ill-EC-1-EPCAM-16R | 50 | 0.02 |
| 233 | ill-EC-2-EPCAM-17F | 50 | 0.01 |
| 234 | ill-EC-2-EPCAM-17R | 50 | 0.01 |
| 235 | ill-EC-2-EPCAM-18F | 50 | 0.01 |
| 236 | ill-EC-2-EPCAM-18R | 50 | 0.01 |
| 237 | ill-EC-1-MSH2-01F | 50 | 0.01 |
| 238 | ill-EC-1-MSH2-01R | 50 | 0.01 |
| 239 | ill-EC-2-MSH2-02F | 50 | 0.01 |
| 240 | ill-EC-2-MSH2-02R | 50 | 0.01 |
| 241 | ill-EC-1-MSH2-02F | 50 | 0.01 |
| 242 | ill-EC-1-MSH2-02R | 50 | 0.01 |
| 243 | ill-EC-2-MSH2-03F | 50 | 0.01 |
| 244 | ill-EC-2-MSH2-03R | 50 | 0.01 |
| 245 | ill-EC-1-MSH2-03F | 50 | 0.01 |
| 246 | ill-EC-1-MSH2-03R | 50 | 0.01 |
| 247 | ill-EC-2-MSH2-04F | 50 | 0.01 |
| 248 | ill-EC-2-MSH2-04R | 50 | 0.01 |
| 249 | ill-EC-1-MSH2-04F | 50 | 0.01 |
| 250 | ill-EC-1-MSH2-04R | 50 | 0.01 |
| 251 | ill-EC-2-MSH2-05F | 50 | 0.01 |
| 252 | ill-EC-2-MSH2-05R | 50 | 0.01 |
| 253 | ill-EC-1-MSH2-05F | 50 | 0.01 |
| 254 | ill-EC-1-MSH2-05R | 50 | 0.01 |
| 255 | ill-EC-2-MSH2-06F | 50 | 0.01 |
| 256 | ill-EC-2-MSH2-06R | 50 | 0.01 |
| 257 | ill-EC-1-MSH2-06F | 50 | 0.01 |
| 258 | ill-EC-1-MSH2-06R | 50 | 0.01 |
| 259 | ill-EC-2-MSH2-07F | 50 | 0.01 |
| 260 | ill-EC-2-MSH2-07R | 50 | 0.01 |
| 261 | ill-EC-1-MSH2-07F | 50 | 0.01 |
| 262 | ill-EC-1-MSH2-07R | 50 | 0.01 |
| 263 | ill-EC-2-MSH2-08F | 50 | 0.01 |
| 264 | ill-EC-2-MSH2-08R | 50 | 0.01 |
| 265 | ill-EC-1-MSH2-08F | 50 | 0.01 |
| 266 | ill-EC-1-MSH2-08R | 50 | 0.01 |
| 267 | ill-EC-2-MSH2-09F | 50 | 0.01 |
| 268 | ill-EC-2-MSH2-09R | 50 | 0.01 |
| 269 | ill-EC-1-MSH2-09F | 50 | 0.01 |
| 270 | ill-EC-1-MSH2-09R | 50 | 0.01 |
| 271 | ill-EC-2-MSH2-10F | 50 | 0.01 |
| 272 | ill-EC-2-MSH2-10R | 50 | 0.01 |
| 273 | ill-EC-1-MSH2-10F | 50 | 0.01 |
| 274 | ill-EC-1-MSH2-10R | 50 | 0.01 |
| 275 | ill-EC-2-MSH2-11F | 50 | 0.02 |
| 276 | ill-EC-2-MSH2-11R | 50 | 0.02 |
| 277 | ill-EC-1-MSH2-11F | 50 | 0.01 |
| 278 | ill-EC-1-MSH2-11R | 50 | 0.01 |
| 279 | ill-EC-2-MSH2-12F | 50 | 0.01 |
| 280 | ill-EC-2-MSH2-12R | 50 | 0.01 |
| 281 | ill-EC-1-MSH2-12F | 50 | 0.01 |
| 282 | ill-EC-1-MSH2-12R | 50 | 0.01 |
| 283 | ill-EC-2-MSH2-13F | 50 | 0.01 |
| 284 | ill-EC-2-MSH2-13R | 50 | 0.01 |
| 285 | ill-EC-1-MSH2-13F | 50 | 0.01 |
| 286 | ill-EC-1-MSH2-13R | 50 | 0.01 |
| 287 | ill-EC-2-MSH2-14F | 50 | 0.01 |
| 288 | ill-EC-2-MSH2-14R | 50 | 0.01 |
| 289 | ill-EC-1-MSH2-14F | 50 | 0.01 |
| 290 | ill-EC-1-MSH2-14R | 50 | 0.01 |
| 291 | ill-EC-2-MSH2-15F | 50 | 0.01 |
| 292 | ill-EC-2-MSH2-15R | 50 | 0.01 |
| 293 | ill-EC-1-MSH2-15F | 50 | 0.01 |
| 294 | ill-EC-1-MSH2-15R | 50 | 0.01 |
| 295 | ill-EC-2-MSH2-16F | 50 | 0.01 |
| 296 | ill-EC-2-MSH2-16R | 50 | 0.01 |
| 297 | ill-EC-1-MSH2-16F | 50 | 0.01 |
| 298 | ill-EC-1-MSH2-16R | 50 | 0.01 |
| 299 | ill-EC-2-MSH2-17F | 50 | 0.01 |
| 300 | ill-EC-2-MSH2-17R | 50 | 0.01 |
| 301 | ill-EC-1-MSH2-17F | 50 | 0.01 |
| 302 | ill-EC-1-MSH2-17R | 50 | 0.01 |
| 303 | ill-EC-2-MSH2-18F | 50 | 0.01 |
| 304 | ill-EC-2-MSH2-18R | 50 | 0.01 |
| 305 | ill-EC-1-MSH2-18F | 50 | 0.01 |
| 306 | ill-EC-1-MSH2-18R | 50 | 0.01 |
| 307 | ill-EC-2-MSH2-19F | 50 | 0.01 |
| 308 | ill-EC-2-MSH2-19R | 50 | 0.01 |
| 309 | ill-EC-1-MSH2-19F | 50 | 0.01 |
| 310 | ill-EC-1-MSH2-19R | 50 | 0.01 |
| 311 | ill-EC-2-MSH2-20F | 50 | 0.01 |
| 312 | ill-EC-2-MSH2-20R | 50 | 0.01 |
| 313 | ill-EC-1-MSH2-20F | 50 | 0.01 |
| 314 | ill-EC-1-MSH2-20R | 50 | 0.01 |
| 315 | ill-EC-2-MSH2-21F | 50 | 0.01 |
| 316 | ill-EC-2-MSH2-21R | 50 | 0.01 |
| 317 | ill-EC-1-MSH2-21F | 50 | 0.02 |
| 318 | ill-EC-1-MSH2-21R | 50 | 0.02 |
| 319 | ill-EC-2-MSH2-22F | 50 | 0.01 |
| 320 | ill-EC-2-MSH2-22R | 50 | 0.01 |
| 321 | ill-EC-1-MSH2-22F | 50 | 0.01 |
| 322 | ill-EC-1-MSH2-22R | 50 | 0.01 |
| 323 | ill-EC-2-MSH2-23F | 50 | 0.01 |
| 324 | ill-EC-2-MSH2-23R | 50 | 0.01 |
| 325 | ill-EC-1-MSH2-23F | 50 | 0.01 |
| 326 | ill-EC-1-MSH2-23R | 50 | 0.01 |
| 327 | ill-EC-2-MSH2-24F | 50 | 0.01 |
| 328 | ill-EC-2-MSH2-24R | 50 | 0.01 |
| 329 | ill-EC-1-MSH2-24F | 50 | 0.01 |
| 330 | ill-EC-1-MSH2-24R | 50 | 0.01 |
| 331 | ill-EC-1-MSH6-01F | 50 | 0.01 |
| 332 | ill-EC-1-MSH6-01R | 50 | 0.01 |
| 333 | ill-EC-2-MSH6-02F | 50 | 0.01 |
| 334 | ill-EC-2-MSH6-02R | 50 | 0.01 |
| 335 | ill-EC-1-MSH6-02F | 50 | 0.01 |
| 336 | ill-EC-1-MSH6-02R | 50 | 0.01 |
| 337 | ill-EC-2-MSH6-03F | 50 | 0.01 |
| 338 | ill-EC-2-MSH6-03R | 50 | 0.01 |
| 339 | ill-EC-1-MSH6-03F | 50 | 0.01 |
| 340 | ill-EC-1-MSH6-03R | 50 | 0.01 |
| 341 | ill-EC-2-MSH6-04F | 50 | 0.01 |
| 342 | ill-EC-2-MSH6-04R | 50 | 0.01 |
| 343 | ill-EC-1-MSH6-04F | 50 | 0.01 |
| 344 | ill-EC-1-MSH6-04R | 50 | 0.01 |
| 345 | ill-EC-2-MSH6-05F | 50 | 0.01 |
| 346 | ill-EC-2-MSH6-05R | 50 | 0.01 |
| 347 | ill-EC-1-MSH6-05F | 50 | 0.01 |
| 348 | ill-EC-1-MSH6-05R | 50 | 0.01 |
| 349 | ill-EC-2-MSH6-06F | 50 | 0.01 |
| 350 | ill-EC-2-MSH6-06R | 50 | 0.01 |
| 351 | ill-EC-1-MSH6-06F | 50 | 0.01 |
| 352 | ill-EC-1-MSH6-06R | 50 | 0.01 |
| 353 | ill-EC-2-MSH6-07F | 50 | 0.01 |
| 354 | ill-EC-2-MSH6-07R | 50 | 0.01 |
| 355 | ill-EC-1-MSH6-07F | 50 | 0.01 |
| 356 | ill-EC-1-MSH6-07R | 50 | 0.01 |
| 357 | ill-EC-2-MSH6-08F | 50 | 0.01 |
| 358 | ill-EC-2-MSH6-08R | 50 | 0.01 |
| 359 | ill-EC-1-MSH6-08F | 50 | 0.02 |
| 360 | ill-EC-1-MSH6-08R | 50 | 0.02 |
| 361 | ill-EC-2-MSH6-09F | 50 | 0.01 |
| 362 | ill-EC-2-MSH6-09R | 50 | 0.01 |
| 363 | ill-EC-1-MSH6-09F | 50 | 0.01 |
| 364 | ill-EC-1-MSH6-09R | 50 | 0.01 |
| 365 | ill-EC-2-MSH6-10F | 50 | 0.01 |
| 366 | ill-EC-2-MSH6-10R | 50 | 0.01 |
| 367 | ill-EC-1-MSH6-10F | 50 | 0.01 |
| 368 | ill-EC-1-MSH6-10R | 50 | 0.01 |
| 369 | ill-EC-2-MSH6-11F | 50 | 0.01 |

| Number | Primer name | Concentration (µM) | Volume (µL) |
|---|---|---|---|
| 370 | ill-EC-2-MSH6-11R | 50 | 0.01 |
| 371 | ill-EC-1-MSH6-11F | 50 | 0.01 |
| 372 | ill-EC-1-MSH6-11R | 50 | 0.01 |
| 373 | ill-EC-2-MSH6-12F | 50 | 0.01 |
| 374 | ill-EC-2-MSH6-12R | 50 | 0.01 |
| 375 | ill-EC-1-MSH6-12F | 50 | 0.01 |
| 376 | ill-EC-1-MSH6-12R | 50 | 0.01 |
| 377 | ill-EC-2-MSH6-13F | 50 | 0.01 |
| 378 | ill-EC-2-MSH6-13R | 50 | 0.01 |
| 379 | ill-EC-1-MSH6-13F | 50 | 0.01 |
| 380 | ill-EC-1-MSH6-13R | 50 | 0.01 |
| 381 | ill-EC-2-MSH6-14F | 50 | 0.01 |
| 382 | ill-EC-2-MSH6-14R | 50 | 0.01 |
| 383 | ill-EC-1-MSH6-14F | 50 | 0.01 |
| 384 | ill-EC-1-MSH6-14R | 50 | 0.01 |
| 385 | ill-EC-2-MSH6-15F | 50 | 0.01 |
| 386 | ill-EC-2-MSH6-15R | 50 | 0.01 |
| 387 | ill-EC-1-MSH6-15F | 50 | 0.01 |
| 388 | ill-EC-1-MSH6-15R | 50 | 0.01 |
| 389 | ill-EC-2-MSH6-16F | 50 | 0.02 |
| 390 | ill-EC-2-MSH6-16R | 50 | 0.02 |
| 391 | ill-EC-1-MSH6-16F | 50 | 0.01 |
| 392 | ill-EC-1-MSH6-16R | 50 | 0.01 |
| 393 | ill-EC-2-MSH6-17F | 50 | 0.01 |
| 394 | ill-EC-2-MSH6-17R | 50 | 0.01 |
| 395 | ill-EC-1-MSH6-17F | 50 | 0.01 |
| 396 | ill-EC-1-MSH6-17R | 50 | 0.01 |
| 397 | ill-EC-2-MSH6-18F | 50 | 0.01 |
| 398 | ill-EC-2-MSH6-18R | 50 | 0.01 |
| 399 | ill-EC-1-MSH6-18F | 50 | 0.01 |
| 400 | ill-EC-1-MSH6-18R | 50 | 0.01 |
| 401 | ill-EC-2-MSH6-19F | 50 | 0.01 |
| 402 | ill-EC-2-MSH6-19R | 50 | 0.01 |
| 403 | ill-EC-1-MSH6-19F | 50 | 0.01 |
| 404 | ill-EC-1-MSH6-19R | 50 | 0.01 |
| 405 | ill-EC-2-MSH6-20F | 50 | 0.01 |
| 406 | ill-EC-2-MSH6-20R | 50 | 0.01 |
| 407 | ill-EC-1-MSH6-20F | 50 | 0.01 |
| 408 | ill-EC-1-MSH6-20R | 50 | 0.01 |
| 409 | ill-EC-2-MSH6-21F | 50 | 0.01 |
| 410 | ill-EC-2-MSH6-21R | 50 | 0.01 |
| 411 | ill-EC-1-MSH6-21F | 50 | 0.01 |
| 412 | ill-EC-1-MSH6-21R | 50 | 0.01 |
| 413 | ill-EC-2-MSH6-22F | 50 | 0.01 |
| 414 | ill-EC-2-MSH6-22R | 50 | 0.01 |
| 415 | ill-EC-1-MSH6-22F | 50 | 0.01 |
| 416 | ill-EC-1-MSH6-22R | 50 | 0.01 |
| 417 | ill-EC-2-MSH6-23F | 50 | 0.01 |
| 418 | ill-EC-2-MSH6-23R | 50 | 0.01 |
| 419 | ill-EC-1-MSH6-23F | 50 | 0.02 |
| 420 | ill-EC-1-MSH6-23R | 50 | 0.02 |
| 421 | ill-EC-2-MSH6-24F | 50 | 0.01 |
| 422 | ill-EC-2-MSH6-24R | 50 | 0.01 |
| 423 | ill-EC-1-MSH6-24F | 50 | 0.01 |
| 424 | ill-EC-1-MSH6-24R | 50 | 0.01 |
| 425 | ill-EC-2-MSH6-25F | 50 | 0.01 |
| 426 | ill-EC-2-MSH6-25R | 50 | 0.01 |
| 427 | ill-EC-1-MSH6-25F | 50 | 0.01 |
| 428 | ill-EC-1-MSH6-25R | 50 | 0.01 |
| 429 | ill-EC-2-MSH6-26F | 50 | 0.01 |
| 430 | ill-EC-2-MSH6-26R | 50 | 0.01 |
| 431 | ill-EC-1-MSH6-26F | 50 | 0.01 |
| 432 | ill-EC-1-MSH6-26R | 50 | 0.01 |
| 433 | ill-EC-2-MSH6-27F | 50 | 0.01 |
| 434 | ill-EC-2-MSH6-27R | 50 | 0.01 |
| 435 | ill-EC-1-PTEN-01F | 50 | 0.01 |
| 436 | ill-EC-1-PTEN-01R | 50 | 0.01 |
| 437 | ill-EC-2-PTEN-02F | 50 | 0.01 |
| 438 | ill-EC-2-PTEN-02R | 50 | 0.01 |
| 439 | ill-EC-1-PTEN-02F | 50 | 0.01 |
| 440 | ill-EC-1-PTEN-02R | 50 | 0.01 |
| 441 | ill-EC-2-PTEN-03F | 50 | 0.01 |
| 442 | ill-EC-2-PTEN-03R | 50 | 0.01 |
| 443 | ill-EC-1-PTEN-03F | 50 | 0.01 |
| 444 | ill-EC-1-PTEN-03R | 50 | 0.01 |
| 445 | ill-EC-2-PTEN-04F | 50 | 0.01 |
| 446 | ill-EC-2-PTEN-04R | 50 | 0.01 |
| 447 | ill-EC-1-PTEN-04F | 50 | 0.01 |
| 448 | ill-EC-1-PTEN-04R | 50 | 0.01 |
| 449 | ill-EC-2-PTEN-05F | 50 | 0.01 |
| 450 | ill-EC-2-PTEN-05R | 50 | 0.01 |
| 451 | ill-EC-1-PTEN-05F | 50 | 0.01 |
| 452 | ill-EC-1-PTEN-05R | 50 | 0.01 |
| 453 | ill-EC-2-PTEN-06F | 50 | 0.01 |
| 454 | ill-EC-2-PTEN-06R | 50 | 0.01 |
| 455 | ill-EC-1-PTEN-06F | 50 | 0.01 |
| 456 | ill-EC-1-PTEN-06R | 50 | 0.01 |
| 457 | ill-EC-2-PTEN-07F | 50 | 0.01 |
| 458 | ill-EC-2-PTEN-07R | 50 | 0.01 |
| 459 | ill-EC-1-PTEN-07F | 50 | 0.01 |
| 460 | ill-EC-1-PTEN-07R | 50 | 0.01 |
| 461 | ill-EC-2-PTEN-08F | 50 | 0.01 |
| 462 | ill-EC-2-PTEN-08R | 50 | 0.01 |
| 463 | ill-EC-1-PTEN-08F | 50 | 0.01 |
| 464 | ill-EC-1-PTEN-08R | 50 | 0.01 |
| 465 | ill-EC-2-PTEN-09F | 50 | 0.03 |
| 466 | ill-EC-2-PTEN-09R | 50 | 0.03 |
| 467 | ill-EC-1-PTEN-09F | 50 | 0.01 |
| 468 | ill-EC-1-PTEN-09R | 50 | 0.01 |
| 469 | ill-EC-2-PTEN-10F | 50 | 0.01 |
| 470 | ill-EC-2-PTEN-10R | 50 | 0.01 |
| 471 | ill-EC-1-PTEN-10F | 50 | 0.01 |
| 472 | ill-EC-1-PTEN-10R | 50 | 0.01 |
| 473 | ill-EC-2-PTEN-11F | 50 | 0.01 |
| 474 | ill-EC-2-PTEN-11R | 50 | 0.01 |
| 475 | ill-EC-1-PTEN-11F | 50 | 0.01 |
| 476 | ill-EC-1-PTEN-11R | 50 | 0.01 |
| 477 | ill-EC-2-PTEN-12F | 50 | 0.01 |
| 478 | ill-EC-2-PTEN-12R | 50 | 0.01 |
| 479 | ill-EC-1-PTEN-12F | 50 | 0.01 |
| 480 | ill-EC-1-PTEN-12R | 50 | 0.01 |
| 481 | ill-EC-2-PTEN-13F | 50 | 0.01 |
| 482 | ill-EC-1-PTEN-13F | 50 | 0.01 |
| 483 | ill-EC-2-PTEN-13R | 50 | 0.01 |
| 484 | ill-EC-1-PTEN-13R | 50 | 0.01 |
| 485 | ill-EC-2-PTEN-14F | 50 | 0.01 |
| 486 | ill-EC-2-PTEN-14R | 50 | 0.01 |
| 487 | ill-EC-1-POLE-01F | 50 | 0.01 |
| 488 | ill-EC-1-POLE-01R | 50 | 0.01 |
| 489 | ill-EC-2-POLE-02F | 50 | 0.01 |
| 490 | ill-EC-2-POLE-02R | 50 | 0.01 |
| 491 | ill-EC-1-POLE-02F | 50 | 0.01 |
| 492 | ill-EC-1-POLE-02R | 50 | 0.01 |
| 493 | ill-EC-2-POLE-03F | 50 | 0.01 |
| 494 | ill-EC-2-POLE-03R | 50 | 0.01 |
| 495 | ill-EC-1-POLE-03F | 50 | 0.01 |
| 496 | ill-EC-1-POLE-03R | 50 | 0.01 |
| 497 | ill-EC-2-POLE-04F | 50 | 0.03 |
| 498 | ill-EC-2-POLE-04R | 50 | 0.03 |
| 499 | ill-EC-1-POLE-04F | 50 | 0.01 |
| 500 | ill-EC-1-POLE-04R | 50 | 0.01 |
| 501 | ill-EC-2-POLE-05F | 50 | 0.01 |
| 502 | ill-EC-2-POLE-05R | 50 | 0.01 |
| 503 | ill-EC-1-POLE-05F | 50 | 0.01 |
| 504 | ill-EC-1-POLE-05R | 50 | 0.01 |
| 505 | ill-EC-2-POLE-06F | 50 | 0.01 |
| 506 | ill-EC-2-POLE-06R | 50 | 0.01 |
| 507 | ill-EC-1-POLE-06F | 50 | 0.01 |
| 508 | ill-EC-1-POLE-06R | 50 | 0.01 |
| 509 | ill-EC-2-POLE-07F | 50 | 0.01 |
| 510 | ill-EC-2-POLE-07R | 50 | 0.01 |
| 511 | ill-EC-1-POLE-07F | 50 | 0.01 |
| 512 | ill-EC-1-POLE-07R | 50 | 0.01 |
| 513 | ill-EC-2-POLE-08F | 50 | 0.01 |
| 514 | ill-EC-2-POLE-08R | 50 | 0.01 |
| 515 | ill-EC-1-POLE-08F | 50 | 0.01 |
| 516 | ill-EC-1-POLE-08R | 50 | 0.01 |
| 517 | ill-EC-2-POLE-09F | 50 | 0.01 |
| 518 | ill-EC-2-POLE-09R | 50 | 0.01 |
| 519 | ill-EC-1-POLE-09F | 50 | 0.01 |
| 520 | ill-EC-1-POLE-09R | 50 | 0.01 |
| 521 | ill-EC-2-POLE-10F | 50 | 0.01 |

| Number | Primer name | Concentration (μM) | Volume (μL) |
|---|---|---|---|
| 522 | ill-EC-2-POLE-10R | 50 | 0.01 |
| 523 | ill-EC-1-POLE-10F | 50 | 0.01 |
| 524 | ill-EC-1-POLE-10R | 50 | 0.01 |
| 525 | ill-EC-2-POLE-11F | 50 | 0.01 |
| 526 | ill-EC-2-POLE-11R | 50 | 0.01 |
| 527 | ill-EC-1-POLE-11F | 50 | 0.01 |
| 528 | ill-EC-1-POLE-11R | 50 | 0.01 |
| 529 | ill-EC-2-POLE-12F | 50 | 0.01 |
| 530 | ill-EC-2-POLE-12R | 50 | 0.01 |
| 531 | ill-EC-1-POLE-12F | 50 | 0.01 |
| 532 | ill-EC-1-POLE-12R | 50 | 0.01 |
| 533 | ill-EC-2-POLE-13F | 50 | 0.01 |
| 534 | ill-EC-2-POLE-13R | 50 | 0.01 |
| 535 | ill-EC-1-POLE-13F | 50 | 0.01 |
| 536 | ill-EC-1-POLE-13R | 50 | 0.01 |
| 537 | ill-EC-2-POLE-14F | 50 | 0.01 |
| 538 | ill-EC-2-POLE-14R | 50 | 0.01 |
| 539 | ill-EC-1-POLE-14F | 50 | 0.03 |
| 540 | ill-EC-1-POLE-14R | 50 | 0.03 |
| 541 | ill-EC-2-POLE-15F | 50 | 0.01 |
| 542 | ill-EC-2-POLE-15R | 50 | 0.01 |
| 543 | ill-EC-1-POLE-15F | 50 | 0.01 |
| 544 | ill-EC-1-POLE-15R | 50 | 0.01 |
| 545 | ill-EC-2-POLE-16F | 50 | 0.01 |
| 546 | ill-EC-2-POLE-16R | 50 | 0.01 |
| 547 | ill-EC-1-POLE-16F | 50 | 0.01 |
| 548 | ill-EC-1-POLE-16R | 50 | 0.01 |
| 549 | ill-EC-2-POLE-17F | 50 | 0.01 |
| 550 | ill-EC-2-POLE-17R | 50 | 0.01 |
| 551 | ill-EC-1-POLE-17F | 50 | 0.01 |
| 552 | ill-EC-1-POLE-17R | 50 | 0.01 |
| 553 | ill-EC-2-POLE-18F | 50 | 0.01 |
| 554 | ill-EC-2-POLE-18R | 50 | 0.01 |
| 555 | ill-EC-1-POLE-18F | 50 | 0.01 |
| 556 | ill-EC-1-POLE-18R | 50 | 0.01 |
| 557 | ill-EC-2-POLE-19F | 50 | 0.01 |
| 558 | ill-EC-2-POLE-19R | 50 | 0.01 |
| 559 | ill-EC-1-POLE-19F | 50 | 0.01 |
| 560 | ill-EC-1-POLE-19R | 50 | 0.01 |
| 561 | ill-EC-2-POLE-20F | 50 | 0.01 |
| 562 | ill-EC-2-POLE-20R | 50 | 0.01 |
| 563 | ill-EC-1-POLE-20F | 50 | 0.01 |
| 564 | ill-EC-1-POLE-20R | 50 | 0.01 |
| 565 | ill-EC-2-POLE-21F | 50 | 0.01 |
| 566 | ill-EC-2-POLE-21R | 50 | 0.01 |
| 567 | ill-EC-1-POLE-21F | 50 | 0.01 |
| 568 | ill-EC-1-POLE-21R | 50 | 0.01 |
| 569 | ill-EC-2-POLE-22F | 50 | 0.01 |
| 570 | ill-EC-2-POLE-22R | 50 | 0.01 |
| 571 | ill-EC-1-POLE-22F | 50 | 0.01 |
| 572 | ill-EC-1-POLE-22R | 50 | 0.01 |
| 573 | ill-EC-2-POLE-23F | 50 | 0.01 |
| 574 | ill-EC-2-POLE-23R | 50 | 0.01 |
| 575 | ill-EC-1-POLE-23F | 50 | 0.01 |
| 576 | ill-EC-1-POLE-23R | 50 | 0.01 |
| 577 | ill-EC-2-POLE-24F | 50 | 0.01 |
| 578 | ill-EC-2-POLE-24R | 50 | 0.01 |
| 579 | ill-EC-1-POLE-24F | 50 | 0.01 |
| 580 | ill-EC-1-POLE-24R | 50 | 0.01 |
| 581 | ill-EC-2-POLE-25F | 50 | 0.01 |
| 582 | ill-EC-2-POLE-25R | 50 | 0.01 |
| 583 | ill-EC-1-POLE-25F | 50 | 0.01 |
| 584 | ill-EC-1-POLE-25R | 50 | 0.01 |
| 585 | ill-EC-2-POLE-26F | 50 | 0.03 |
| 586 | ill-EC-2-POLE-26R | 50 | 0.03 |
| 587 | ill-EC-1-POLE-26F | 50 | 0.01 |
| 588 | ill-EC-1-POLE-26R | 50 | 0.01 |
| 589 | ill-EC-2-POLE-27F | 50 | 0.01 |
| 590 | ill-EC-2-POLE-27R | 50 | 0.01 |
| 591 | ill-EC-1-POLE-27F | 50 | 0.01 |
| 592 | ill-EC-1-POLE-27R | 50 | 0.01 |
| 593 | ill-EC-2-POLE-28F | 50 | 0.01 |
| 594 | ill-EC-2-POLE-28R | 50 | 0.01 |
| 595 | ill-EC-1-POLE-28F | 50 | 0.01 |
| 596 | ill-EC-1-POLE-28R | 50 | 0.01 |
| 597 | ill-EC-2-POLE-29F | 50 | 0.01 |
| 598 | ill-EC-2-POLE-29R | 50 | 0.01 |
| 599 | ill-EC-1-POLE-29F | 50 | 0.01 |
| 600 | ill-EC-1-POLE-29R | 50 | 0.01 |
| 601 | ill-EC-2-POLE-30F | 50 | 0.01 |
| 602 | ill-EC-2-POLE-30R | 50 | 0.01 |
| 603 | ill-EC-1-POLE-30F | 50 | 0.01 |
| 604 | ill-EC-1-POLE-30R | 50 | 0.01 |
| 605 | ill-EC-2-POLE-31F | 50 | 0.01 |
| 606 | ill-EC-2-POLE-31R | 50 | 0.01 |
| 607 | ill-EC-1-POLE-31F | 50 | 0.01 |
| 608 | ill-EC-1-POLE-31R | 50 | 0.01 |
| 609 | ill-EC-2-POLE-32F | 50 | 0.01 |
| 610 | ill-EC-2-POLE-32R | 50 | 0.01 |
| 611 | ill-EC-1-POLE-32F | 50 | 0.01 |
| 612 | ill-EC-1-POLE-32R | 50 | 0.01 |
| 613 | ill-EC-2-POLE-33F | 50 | 0.01 |
| 614 | ill-EC-2-POLE-33R | 50 | 0.01 |
| 615 | ill-EC-1-POLE-33F | 50 | 0.02 |
| 616 | ill-EC-1-POLE-33R | 50 | 0.02 |
| 617 | ill-EC-2-POLE-34F | 50 | 0.01 |
| 618 | ill-EC-2-POLE-34R | 50 | 0.01 |
| 619 | ill-EC-1-POLE-34F | 50 | 0.01 |
| 620 | ill-EC-1-POLE-34R | 50 | 0.01 |
| 621 | ill-EC-2-POLE-35F | 50 | 0.01 |
| 622 | ill-EC-2-POLE-35R | 50 | 0.01 |
| 623 | ill-EC-1-POLE-35F | 50 | 0.01 |
| 624 | ill-EC-1-POLE-35R | 50 | 0.01 |
| 625 | ill-EC-2-POLE-36F | 50 | 0.01 |
| 626 | ill-EC-2-POLE-36R | 50 | 0.01 |
| 627 | ill-EC-1-POLE-36F | 50 | 0.01 |
| 628 | ill-EC-1-POLE-36R | 50 | 0.01 |
| 629 | ill-EC-2-POLE-37F | 50 | 0.01 |
| 630 | ill-EC-2-POLE-37R | 50 | 0.01 |
| 631 | ill-EC-1-POLE-37F | 50 | 0.01 |
| 632 | ill-EC-1-POLE-37R | 50 | 0.01 |
| 633 | ill-EC-2-POLE-38F | 50 | 0.01 |
| 634 | ill-EC-2-POLE-38R | 50 | 0.01 |
| 635 | ill-EC-1-POLE-38F | 50 | 0.01 |
| 636 | ill-EC-1-POLE-38R | 50 | 0.01 |
| 637 | ill-EC-2-POLE-39F | 50 | 0.01 |
| 638 | ill-EC-2-POLE-39R | 50 | 0.01 |
| 639 | ill-EC-1-POLE-39F | 50 | 0.01 |
| 640 | ill-EC-1-POLE-39R | 50 | 0.01 |
| 641 | ill-EC-2-POLE-40F | 50 | 0.01 |
| 642 | ill-EC-2-POLE-40R | 50 | 0.01 |
| 643 | ill-EC-1-POLE-40F | 50 | 0.01 |
| 644 | ill-EC-1-POLE-40R | 50 | 0.01 |
| 645 | ill-EC-2-POLE-41F | 50 | 0.01 |
| 646 | ill-EC-2-POLE-41R | 50 | 0.01 |
| 647 | ill-EC-1-POLE-41F | 50 | 0.03 |
| 648 | ill-EC-1-POLE-41R | 50 | 0.03 |
| 649 | ill-EC-2-POLE-42F | 50 | 0.01 |
| 650 | ill-EC-2-POLE-42R | 50 | 0.01 |
| 651 | ill-EC-1-POLE-42F | 50 | 0.01 |
| 652 | ill-EC-1-POLE-42R | 50 | 0.01 |
| 653 | ill-EC-2-POLE-43F | 50 | 0.01 |
| 654 | ill-EC-2-POLE-43R | 50 | 0.01 |
| 655 | ill-EC-1-POLE-43F | 50 | 0.01 |
| 656 | ill-EC-1-POLE-43R | 50 | 0.01 |
| 657 | ill-EC-2-POLE-44F | 50 | 0.01 |
| 658 | ill-EC-2-POLE-44R | 50 | 0.01 |
| 659 | ill-EC-1-POLE-44F | 50 | 0.01 |
| 660 | ill-EC-1-POLE-44R | 50 | 0.01 |
| 661 | ill-EC-2-POLE-45F | 50 | 0.01 |
| 662 | ill-EC-2-POLE-45R | 50 | 0.01 |
| 663 | ill-EC-1-POLE-45F | 50 | 0.01 |
| 664 | ill-EC-1-POLE-45R | 50 | 0.01 |
| 665 | ill-EC-2-POLE-46F | 50 | 0.01 |
| 666 | ill-EC-2-POLE-46R | 50 | 0.01 |
| 667 | ill-EC-1-POLE-46F | 50 | 0.01 |
| 668 | ill-EC-1-POLE-46R | 50 | 0.01 |
| 669 | ill-EC-2-POLE-47F | 50 | 0.01 |
| 670 | ill-EC-2-POLE-47R | 50 | 0.01 |
| 671 | ill-EC-1-POLE-47F | 50 | 0.01 |
| 672 | ill-EC-1-POLE-47R | 50 | 0.01 |
| 673 | ill-EC-2-POLE-48F | 50 | 0.01 |

| Number | Primer name | Concentration (μM) | Volume (μL) |
|---|---|---|---|
| 674 | ill-EC-2-POLE-48R | 50 | 0.01 |
| 675 | ill-EC-1-POLE-48F | 50 | 0.02 |
| 676 | ill-EC-1-POLE-48R | 50 | 0.02 |
| 677 | ill-EC-2-POLE-49F | 50 | 0.01 |
| 678 | ill-EC-2-POLE-49R | 50 | 0.01 |
| 679 | ill-EC-1-POLE-49F | 50 | 0.01 |
| 680 | ill-EC-1-POLE-49R | 50 | 0.01 |
| 681 | ill-EC-2-POLE-50F | 50 | 0.01 |
| 682 | ill-EC-2-POLE-50R | 50 | 0.01 |
| 683 | ill-EC-1-POLE-50F | 50 | 0.01 |
| 684 | ill-EC-1-POLE-50R | 50 | 0.01 |
| 685 | ill-EC-2-POLE-51F | 50 | 0.01 |
| 686 | ill-EC-2-POLE-51R | 50 | 0.01 |
| 687 | ill-EC-1-POLE-51F | 50 | 0.01 |
| 688 | ill-EC-1-POLE-51R | 50 | 0.01 |
| 689 | ill-EC-2-POLE-52F | 50 | 0.01 |
| 690 | ill-EC-2-POLE-52R | 50 | 0.01 |
| 691 | ill-EC-1-POLE-52F | 50 | 0.01 |
| 692 | ill-EC-1-POLE-52R | 50 | 0.01 |
| 693 | ill-EC-2-POLE-53F | 50 | 0.01 |
| 694 | ill-EC-2-POLE-53R | 50 | 0.01 |
| 695 | ill-EC-1-POLE-53F | 50 | 0.01 |
| 696 | ill-EC-1-POLE-53R | 50 | 0.01 |
| 697 | ill-EC-2-POLE-54F | 50 | 0.02 |
| 698 | ill-EC-2-POLE-54R | 50 | 0.02 |
| 699 | ill-EC-1-POLE-54F | 50 | 0.01 |
| 700 | ill-EC-1-POLE-54R | 50 | 0.01 |
| 701 | ill-EC-2-POLE-55F | 50 | 0.01 |
| 702 | ill-EC-2-POLE-55R | 50 | 0.01 |
| 703 | ill-EC-1-POLE-55F | 50 | 0.01 |
| 704 | ill-EC-1-POLE-55R | 50 | 0.01 |
| 705 | ill-EC-2-POLE-56F | 50 | 0.01 |
| 706 | ill-EC-2-POLE-56R | 50 | 0.01 |
| 707 | ill-EC-1-POLE-56F | 50 | 0.01 |
| 708 | ill-EC-1-POLE-56R | 50 | 0.01 |
| 709 | ill-EC-2-POLE-57F | 50 | 0.01 |
| 710 | ill-EC-2-POLE-57R | 50 | 0.01 |
| 711 | ill-EC-1-POLE-57F | 50 | 0.01 |
| 712 | ill-EC-1-POLE-57R | 50 | 0.01 |
| 713 | ill-EC-2-POLE-58F | 50 | 0.01 |
| 714 | ill-EC-2-POLE-58R | 50 | 0.03 |
| 715 | ill-EC-1-POLE-58F | 50 | 0.01 |
| 716 | ill-EC-2-POLE-59F | 50 | 0.01 |
| 717 | ill-EC-1-POLE-58R | 50 | 0.01 |
| 718 | ill-EC-2-POLE-59R | 50 | 0.01 |
| 719 | ill-EC-1-POLE-59F | 50 | 0.02 |
| 720 | ill-EC-1-POLE-59R | 50 | 0.02 |
| 721 | ill-EC-2-POLE-60F | 50 | 0.01 |
| 722 | ill-EC-2-POLE-60R | 50 | 0.01 |
| 723 | ill-EC-1-POLE-60F | 50 | 0.01 |
| 724 | ill-EC-1-POLE-60R | 50 | 0.01 |
| 725 | ill-EC-2-POLE-61F | 50 | 0.01 |
| 726 | ill-EC-2-POLE-61R | 50 | 0.01 |
| 727 | ill-EC-MLH1-Z01F | 50 | 0.01 |
| 728 | ill-EC-MLH1-Z01R | 50 | 0.01 |
| 729 | ill-EC-PMS2-Z01F | 50 | 0.01 |
| 730 | ill-EC-PMS2-Z01R | 50 | 0.01 |
| 731 | ill-EC-PMS2-Z02F | 50 | 0.01 |
| 732 | ill-EC-PMS2-Z02R | 50 | 0.03 |
| 733 | ill-EC-PMS2-Z03F | 50 | 0.01 |
| 734 | ill-EC-PMS2-Z03R | 50 | 0.01 |
| 735 | ill-EC-PMS2-Z04F | 50 | 0.02 |
| 736 | ill-EC-PMS2-Z04R | 50 | 0.01 |
| 737 | ill-EC-PMS2-Z05F | 50 | 0.01 |
| 738 | ill-EC-PMS2-Z05R | 50 | 0.01 |
| 739 | ill-EC-PMS2-Z06F | 50 | 0.02 |
| 740 | ill-EC-PMS2-Z06R | 50 | 0.01 |
| 741 | ill-EC-PTEN-Z01F | 50 | 0.01 |
| 742 | ill-EC-PTEN-Z01R | 50 | 0.01 |
| Total | | | 8.16. |

4. The library construction method for detecting endometrial cancer-related gene mutations based on high-throughput sequencing according to claim 2, wherein the library in step (2) is purified twice.

5. The library construction method for detecting endometrial cancer-related gene mutations based on high-throughput sequencing according to claim 1, wherein the endometrial cancer-related gene comprises MSH2, PMS2, MLH1, MSH6, EPCAM, TP53, POLE, and PTEN.

6. The library construction method for detecting endometrial cancer-related gene mutations based on high-throughput sequencing according to claim 5, wherein the sample to be tested comprises fresh pathological tissues from surgical resection, formaldehyde-fixed paraffin-embedded pathological tissues, paraffin sections, whole blood, plasma, serum, and pleural effusion.

* * * * *

```
                      SEQUENCE LISTING

<160> NUMBER OF SEQ ID NOS: 759

<210> SEQ ID NO 1
<211> LENGTH: 35
<212> TYPE: DNA
<213> ORGANISM: Artificial Sequence
<220> FEATURE:
<223> OTHER INFORMATION: Primer ill-EC-2-PMS2-01F

<400> SEQUENCE: 1
ttttttttat cacttttaaa tgggtgtgat gtgta                                 35

<210> SEQ ID NO 2
<211> LENGTH: 26
<212> TYPE: DNA
<213> ORGANISM: Artificial Sequence
<220> FEATURE:
<223> OTHER INFORMATION: Primer ill-EC-2-PMS2-01R

<400> SEQUENCE: 2
ttttttttga cacatcgcca acctgg                                          26

<210> SEQ ID NO 3
<211> LENGTH: 33
<212> TYPE: DNA
<213> ORGANISM: Artificial Sequence
<220> FEATURE:
<223> OTHER INFORMATION: Primer ill-EC-1-PMS2-02F

<400> SEQUENCE: 3
ttttttttag ttgagagtct gaggtctgaa aaa                                  33

<210> SEQ ID NO 4
<211> LENGTH: 33
<212> TYPE: DNA
<213> ORGANISM: Artificial Sequence
<220> FEATURE:
<223> OTHER INFORMATION: Primer ill-EC-1-PMS2-02R
```

<400> SEQUENCE: 4 ttttttttttc aggaagtttt gtgacactta gct                              33

<210> SEQ ID NO 5
<211> LENGTH: 34
<212> TYPE: DNA
<213> ORGANISM: Artificial Sequence
<220> FEATURE:
<223> OTHER INFORMATION: Primer ill-EC-2-PMS2-02F

<400> SEQUENCE: 5
tttttttttt taaagtagat acaaggtctt gctg                             34

<210> SEQ ID NO 6
<211> LENGTH: 25
<212> TYPE: DNA
<213> ORGANISM: Artificial Sequence
<220> FEATURE:
<223> OTHER INFORMATION: Primer ill-EC-2-PMS2-02R

<400> SEQUENCE: 6
ttttttttag cagcacaccg tgctc                                       25

<210> SEQ ID NO 7
<211> LENGTH: 34
<212> TYPE: DNA
<213> ORGANISM: Artificial Sequence
<220> FEATURE:
<223> OTHER INFORMATION: Primer ill-EC-1-PMS2-03F

<400> SEQUENCE: 7
ttttttttaa atcccaggtt aaactgacca atga                             34

<210> SEQ ID NO 8
<211> LENGTH: 32
<212> TYPE: DNA
<213> ORGANISM: Artificial Sequence
<220> FEATURE:
<223> OTHER INFORMATION: Primer ill-EC-1-PMS2-03R

<400> SEQUENCE: 8
ttttttttgg atggctaggg actttatttt gt                               32

<210> SEQ ID NO 9
<211> LENGTH: 36
<212> TYPE: DNA
<213> ORGANISM: Artificial Sequence
<220> FEATURE:
<223> OTHER INFORMATION: Primer ill-EC-2-PMS2-03F

<400> SEQUENCE: 9
ttttttttaa ctttacctta tctcttttct tagttc                           36

<210> SEQ ID NO 10
<211> LENGTH: 27
<212> TYPE: DNA
<213> ORGANISM: Artificial Sequence
<220> FEATURE:
<223> OTHER INFORMATION: Primer ill-EC-2-PMS2-03R

<400> SEQUENCE: 10
ttttttttaa agttgtgccc ctggact                                     27

<210> SEQ ID NO 11
<211> LENGTH: 28

```
<212> TYPE: DNA
<213> ORGANISM: Artificial Sequence
<220> FEATURE:
<223> OTHER INFORMATION: Primer ill-EC-1-PMS2-04F

<400> SEQUENCE: 11
tttttttttt ccccttcact ttgctgtg                                      28

<210> SEQ ID NO 12
<211> LENGTH: 31
<212> TYPE: DNA
<213> ORGANISM: Artificial Sequence
<220> FEATURE:
<223> OTHER INFORMATION: Primer ill-EC-1-PMS2-04R

<400> SEQUENCE: 12
tttttttttc tttccagttc tgacatttgt c                                  31

<210> SEQ ID NO 13
<211> LENGTH: 30
<212> TYPE: DNA
<213> ORGANISM: Artificial Sequence
<220> FEATURE:
<223> OTHER INFORMATION: Primer ill-EC-2-PMS2-04F

<400> SEQUENCE: 13 tttttttca tcaacctgag aggctgacat                                     30

<210> SEQ ID NO 14
<211> LENGTH: 28
<212> TYPE: DNA
<213> ORGANISM: Artificial Sequence
<220> FEATURE:
<223> OTHER INFORMATION: Primer ill-EC-2-PMS2-04R

<400> SEQUENCE: 14 tttttttgt ggactgccat tcaaacca                                       28

<210> SEQ ID NO 15
<211> LENGTH: 28
<212> TYPE: DNA
<213> ORGANISM: Artificial Sequence
<220> FEATURE:
<223> OTHER INFORMATION: Primer ill-EC-1-PMS2-05F

<400> SEQUENCE: 15 tttttttgt tggctgaggc aaaactcg                                       28

<210> SEQ ID NO 16
<211> LENGTH: 26
<212> TYPE: DNA
<213> ORGANISM: Artificial Sequence
<220> FEATURE:
<223> OTHER INFORMATION: Primer ill-EC-1-PMS2-05R

<400> SEQUENCE: 16 tttttttgc agtcactgca gcagcg                                         26

<210> SEQ ID NO 17
<211> LENGTH: 25
<212> TYPE: DNA
<213> ORGANISM: Artificial Sequence
<220> FEATURE:
<223> OTHER INFORMATION: Primer ill-EC-2-PMS2-05F

<400> SEQUENCE: 17
```

```
ttttttttgg gagctggccg catac                                           25
```

<210> SEQ ID NO 18
<211> LENGTH: 29
<212> TYPE: DNA
<213> ORGANISM: Artificial Sequence
<220> FEATURE:
<223> OTHER INFORMATION: Primer ill-EC-2-PMS2-05R

<400> SEQUENCE: 18

```
ttttttttgc gtcctgagac ctcagaaag                                       29
```

<210> SEQ ID NO 19
<211> LENGTH: 25
<212> TYPE: DNA
<213> ORGANISM: Artificial Sequence
<220> FEATURE:
<223> OTHER INFORMATION: Primer ill-EC-1-PMS2-06F

<400> SEQUENCE: 19

```
ttttttttag ggtcactggg tccgt                                           25
```

<210> SEQ ID NO 20
<211> LENGTH: 28
<212> TYPE: DNA
<213> ORGANISM: Artificial Sequence
<220> FEATURE:
<223> OTHER INFORMATION: Primer ill-EC-1-PMS2-06R

<400> SEQUENCE: 20

```
ttttttttgc ctcacagccc aaagactc                                        28
```

<210> SEQ ID NO 21
<211> LENGTH: 29
<212> TYPE: DNA
<213> ORGANISM: Artificial Sequence
<220> FEATURE:
<223> OTHER INFORMATION: Primer ill-EC-2-PMS2-06F

<400> SEQUENCE: 21

```
ttttttttac ccctttctg tcctagagg                                        29
```

<210> SEQ ID NO 22
<211> LENGTH: 29
<212> TYPE: DNA
<213> ORGANISM: Artificial Sequence
<220> FEATURE:
<223> OTHER INFORMATION: Primer ill-EC-2-PMS2-06R

<400> SEQUENCE: 22

```
ttttttttgc ccatggtaga aaagcagga                                       29
```

<210> SEQ ID NO 23
<211> LENGTH: 25
<212> TYPE: DNA
<213> ORGANISM: Artificial Sequence
<220> FEATURE:
<223> OTHER INFORMATION: Primer ill-EC-1-PMS2-07F

<400> SEQUENCE: 23

```
ttttttttaa ggcctctcgc agtct                                           25
```

<210> SEQ ID NO 24
<211> LENGTH: 31
<212> TYPE: DNA
<213> ORGANISM: Artificial Sequence

```
<220> FEATURE:
<223> OTHER INFORMATION: Primer ill-EC-1-PMS2-07R

<400> SEQUENCE: 24
ttttttttcc atttcaggat agtccctgac c                                    31

<210> SEQ ID NO 25
<211> LENGTH: 32
<212> TYPE: DNA
<213> ORGANISM: Artificial Sequence
<220> FEATURE:
<223> OTHER INFORMATION: Primer ill-EC-2-PMS2-07F

<400> SEQUENCE: 25
ttttttttag gaaacacatt agctaaaagc tt                                   32

<210> SEQ ID NO 26
<211> LENGTH: 32
<212> TYPE: DNA
<213> ORGANISM: Artificial Sequence
<220> FEATURE:
<223> OTHER INFORMATION: Primer ill-EC-2-PMS2-07R

<400> SEQUENCE: 26
ttttttttga ggaaaagctt tgttggcag tt                                    32

<210> SEQ ID NO 27
<211> LENGTH: 32
<212> TYPE: DNA
<213> ORGANISM: Artificial Sequence
<220> FEATURE:
<223> OTHER INFORMATION: Primer ill-EC-1-PMS2-08F

<400> SEQUENCE: 27
ttttttttgc ttgttgacat cactatcaaa ca                                   32

<210> SEQ ID NO 28
<211> LENGTH: 33
<212> TYPE: DNA
<213> ORGANISM: Artificial Sequence
<220> FEATURE:
<223> OTHER INFORMATION: Primer ill-EC-1-PMS2-08R

<400> SEQUENCE: 28
ttttttttgc cttagaatgc gttgatatca atg                                  33

<210> SEQ ID NO 29
<211> LENGTH: 34
<212> TYPE: DNA
<213> ORGANISM: Artificial Sequence
<220> FEATURE:
<223> OTHER INFORMATION: Primer ill-EC-2-PMS2-08F

<400> SEQUENCE: 29
tttttttttt ttcctcttgt agcaaaattt gcct                                 34

<210> SEQ ID NO 30
<211> LENGTH: 34
<212> TYPE: DNA
<213> ORGANISM: Artificial Sequence
<220> FEATURE:
<223> OTHER INFORMATION: Primer ill-EC-2-PMS2-08R

<400> SEQUENCE: 30
ttttttttag agtgagacgc tgtctgaaaa taat                                 34
```

<210> SEQ ID NO 31
<211> LENGTH: 31
<212> TYPE: DNA
<213> ORGANISM: Artificial Sequence
<220> FEATURE:
<223> OTHER INFORMATION: Primer ill-EC-1-PMS2-09F

<400> SEQUENCE: 31
tttttttttc tcattccagt catagcagag c                           31

<210> SEQ ID NO 32
<211> LENGTH: 29
<212> TYPE: DNA
<213> ORGANISM: Artificial Sequence
<220> FEATURE:
<223> OTHER INFORMATION: Primer ill-EC-1-PMS2-09R

<400> SEQUENCE: 32
tttttttttc tgcagactcg tgaatgagg                              29

<210> SEQ ID NO 33
<211> LENGTH: 32
<212> TYPE: DNA
<213> ORGANISM: Artificial Sequence
<220> FEATURE:
<223> OTHER INFORMATION: Primer ill-EC-2-PMS2-09F

<400> SEQUENCE: 33 ttttttttttg gatactggtg tcgattatac at                         32

<210> SEQ ID NO 34
<211> LENGTH: 32
<212> TYPE: DNA
<213> ORGANISM: Artificial Sequence
<220> FEATURE:
<223> OTHER INFORMATION: Primer ill-EC-2-PMS2-09R

<400> SEQUENCE: 34 tttttttttct aagaacatgc tggttggtta ga                         32

<210> SEQ ID NO 35
<211> LENGTH: 34
<212> TYPE: DNA
<213> ORGANISM: Artificial Sequence
<220> FEATURE:
<223> OTHER INFORMATION: Primer ill-EC-1-PMS2-10F

<400> SEQUENCE: 35 tttttttttgc acaaataag ataatgttaa agcc                        34

<210> SEQ ID NO 36
<211> LENGTH: 27
<212> TYPE: DNA
<213> ORGANISM: Artificial Sequence
<220> FEATURE:
<223> OTHER INFORMATION: Primer ill-EC-1-PMS2-10R

<400> SEQUENCE: 36
tttttttttt tatcaaccgg cggcctt                                27

<210> SEQ ID NO 37
<211> LENGTH: 31
<212> TYPE: DNA
<213> ORGANISM: Artificial Sequence
<220> FEATURE:
<223> OTHER INFORMATION: Primer ill-EC-2-PMS2-10F

```
<400> SEQUENCE: 37 tttttttttgt caaaggcata agaacaaac t                                    31

<210> SEQ ID NO 38
<211> LENGTH: 33
<212> TYPE: DNA
<213> ORGANISM: Artificial Sequence
<220> FEATURE:
<223> OTHER INFORMATION: Primer ill-EC-2-PMS2-10R

<400> SEQUENCE: 38
tttttttttc ctgcccttac catattaatg ttg                                  33

<210> SEQ ID NO 39
<211> LENGTH: 33
<212> TYPE: DNA
<213> ORGANISM: Artificial Sequence
<220> FEATURE:
<223> OTHER INFORMATION: Primer ill-EC-1-PMS2-11F

<400> SEQUENCE: 39 tttttttttaa agaaaaactg tctgtctgtt gaa                                 33

<210> SEQ ID NO 40
<211> LENGTH: 33
<212> TYPE: DNA
<213> ORGANISM: Artificial Sequence
<220> FEATURE:
<223> OTHER INFORMATION: Primer ill-EC-1-PMS2-11R

<400> SEQUENCE: 40 tttttttttca cctggtgttt tgttttcatt tca                                 33

<210> SEQ ID NO 41
<211> LENGTH: 32
<212> TYPE: DNA
<213> ORGANISM: Artificial Sequence
<220> FEATURE:
<223> OTHER INFORMATION: Primer ill-EC-2-PMS2-11F

<400> SEQUENCE: 41 tttttttttac acgaaactat tagccttaga at                                  32

<210> SEQ ID NO 42
<211> LENGTH: 30
<212> TYPE: DNA
<213> ORGANISM: Artificial Sequence
<220> FEATURE:
<223> OTHER INFORMATION: Primer ill-EC-2-PMS2-11R

<400> SEQUENCE: 42 tttttttttcc tagtgactcc gtgtgtgaag                                     30

<210> SEQ ID NO 43
<211> LENGTH: 33
<212> TYPE: DNA
<213> ORGANISM: Artificial Sequence
<220> FEATURE:
<223> OTHER INFORMATION: Primer ill-EC-1-PMS2-12F

<400> SEQUENCE: 43
tttttttttc tcttgccagc aatctactta cta                                  33

<210> SEQ ID NO 44
```

```
<211> LENGTH: 32
<212> TYPE: DNA
<213> ORGANISM: Artificial Sequence
<220> FEATURE:
<223> OTHER INFORMATION: Primer ill-EC-1-PMS2-12R

<400> SEQUENCE: 44 tttttttttgt ccactctgtc tttattagga ag                              32

<210> SEQ ID NO 45
<211> LENGTH: 31
<212> TYPE: DNA
<213> ORGANISM: Artificial Sequence
<220> FEATURE:
<223> OTHER INFORMATION: Primer ill-EC-2-PMS2-12F

<400> SEQUENCE: 45 tttttttttga caatggaaac ccgctataat c                                31

<210> SEQ ID NO 46
<211> LENGTH: 31
<212> TYPE: DNA
<213> ORGANISM: Artificial Sequence
<220> FEATURE:
<223> OTHER INFORMATION: Primer ill-EC-2-PMS2-12R

<400> SEQUENCE: 46 tttttttttgt gtaagttgca ccaatcagct t                                31

<210> SEQ ID NO 47
<211> LENGTH: 29
<212> TYPE: DNA
<213> ORGANISM: Artificial Sequence
<220> FEATURE:
<223> OTHER INFORMATION: Primer ill-EC-1-PMS2-13F

<400> SEQUENCE: 47 tttttttttca aacacagagc cgatatttt                                   29

<210> SEQ ID NO 48
<211> LENGTH: 33
<212> TYPE: DNA
<213> ORGANISM: Artificial Sequence
<220> FEATURE:
<223> OTHER INFORMATION: Primer ill-EC-1-PMS2-13R

<400> SEQUENCE: 48
tttttttttt ttaaacagga gtatgccaaa atg                               33

<210> SEQ ID NO 49
<211> LENGTH: 29
<212> TYPE: DNA
<213> ORGANISM: Artificial Sequence
<220> FEATURE:
<223> OTHER INFORMATION: Primer ill-EC-2-PMS2-13F

<400> SEQUENCE: 49 tttttttttca cggatgcctg ctgaaatga                                   29

<210> SEQ ID NO 50
<211> LENGTH: 32
<212> TYPE: DNA
<213> ORGANISM: Artificial Sequence
<220> FEATURE:
<223> OTHER INFORMATION: Primer ill-EC-2-PMS2-13R

<400> SEQUENCE: 50
```

-continued tttttttttcc ttgatttgtg cgatgatgtg ag                               32

<210> SEQ ID NO 51
<211> LENGTH: 28
<212> TYPE: DNA
<213> ORGANISM: Artificial Sequence
<220> FEATURE:
<223> OTHER INFORMATION: Primer ill-EC-1-PMS2-14F

<400> SEQUENCE: 51 tttttttttcc ttatggcgca caggtagt                                   28

<210> SEQ ID NO 52
<211> LENGTH: 26
<212> TYPE: DNA
<213> ORGANISM: Artificial Sequence
<220> FEATURE:
<223> OTHER INFORMATION: Primer ill-EC-1-PMS2-14R

<400> SEQUENCE: 52 tttttttttgc atcggcgaag gttgga                                     26

<210> SEQ ID NO 53
<211> LENGTH: 34
<212> TYPE: DNA
<213> ORGANISM: Artificial Sequence
<220> FEATURE:
<223> OTHER INFORMATION: Primer ill-EC-2-PMS2-14F

<400> SEQUENCE: 53 tttttttttgg gttttctgga taattttccc attg                            34

<210> SEQ ID NO 54
<211> LENGTH: 27
<212> TYPE: DNA
<213> ORGANISM: Artificial Sequence
<220> FEATURE:
<223> OTHER INFORMATION: Primer ill-EC-2-PMS2-14R

<400> SEQUENCE: 54 tttttttttag tgcccaacat catgggt                                    27

<210> SEQ ID NO 55
<211> LENGTH: 33
<212> TYPE: DNA
<213> ORGANISM: Artificial Sequence
<220> FEATURE:
<223> OTHER INFORMATION: Primer ill-EC-1-PMS2-15F

<400> SEQUENCE: 55 tttttttttaa gttgagatgt tgagatagaa aac                             33

<210> SEQ ID NO 56
<211> LENGTH: 28
<212> TYPE: DNA
<213> ORGANISM: Artificial Sequence
<220> FEATURE:
<223> OTHER INFORMATION: Primer ill-EC-1-PMS2-15R

<400> SEQUENCE: 56
tttttttttt gccgacctaa ctcaggtt                                    28

<210> SEQ ID NO 57
<211> LENGTH: 31
<212> TYPE: DNA

<213> ORGANISM: Artificial Sequence
<220> FEATURE:
<223> OTHER INFORMATION: Primer ill-EC-2-PMS2-15F

<400> SEQUENCE: 57
tttttttttg tatcacctca gtgcacaaag t                              31

<210> SEQ ID NO 58
<211> LENGTH: 35
<212> TYPE: DNA
<213> ORGANISM: Artificial Sequence
<220> FEATURE:
<223> OTHER INFORMATION: Primer ill-EC-2-PMS2-15R

<400> SEQUENCE: 58
tttttttttc atgtatattt tgttgttata gcact                          35

<210> SEQ ID NO 59
<211> LENGTH: 32
<212> TYPE: DNA
<213> ORGANISM: Artificial Sequence
<220> FEATURE:
<223> OTHER INFORMATION: Primer ill-EC-1-PMS2-16F

<400> SEQUENCE: 59
tttttttttg tttttgcatt tcccaagaca gt                             32

<210> SEQ ID NO 60
<211> LENGTH: 34
<212> TYPE: DNA
<213> ORGANISM: Artificial Sequence
<220> FEATURE:
<223> OTHER INFORMATION: Primer ill-EC-1-PMS2-16R

<400> SEQUENCE: 60 tttttttttag cttaaggact atggagtgga tctt                          34

<210> SEQ ID NO 61
<211> LENGTH: 35
<212> TYPE: DNA
<213> ORGANISM: Artificial Sequence
<220> FEATURE:
<223> OTHER INFORMATION: Primer ill-EC-2-PMS2-16F

<400> SEQUENCE: 61 tttttttttag gattagaaaa agtcaactta cttaa                         35

<210> SEQ ID NO 62
<211> LENGTH: 31
<212> TYPE: DNA
<213> ORGANISM: Artificial Sequence
<220> FEATURE:
<223> OTHER INFORMATION: Primer ill-EC-2-PMS2-16R

<400> SEQUENCE: 62 tttttttttaa aaactgatag catgggtccg t                             31

<210> SEQ ID NO 63
<211> LENGTH: 36
<212> TYPE: DNA
<213> ORGANISM: Artificial Sequence
<220> FEATURE:
<223> OTHER INFORMATION: Primer ill-EC-1-PMS2-17F

<400> SEQUENCE: 63 ttttttttttc aataacaaat gtttcttaac tacaac                        36

<210> SEQ ID NO 64

```
<211> LENGTH: 27
<212> TYPE: DNA
<213> ORGANISM: Artificial Sequence
<220> FEATURE:
<223> OTHER INFORMATION: Primer ill-EC-1-PMS2-17R

<400> SEQUENCE: 64 tttttttttca gatttgctct gggcagg                                              27

<210> SEQ ID NO 65
<211> LENGTH: 27
<212> TYPE: DNA
<213> ORGANISM: Artificial Sequence
<220> FEATURE:
<223> OTHER INFORMATION: Primer ill-EC-2-PMS2-17F

<400> SEQUENCE: 65 tttttttttag actcagtacc acctgcc                                              27

<210> SEQ ID NO 66
<211> LENGTH: 34
<212> TYPE: DNA
<213> ORGANISM: Artificial Sequence
<220> FEATURE:
<223> OTHER INFORMATION: Primer ill-EC-2-PMS2-17R

<400> SEQUENCE: 66
tttttttttt atttacagtg ttgagtcatt tccc                                       34

<210> SEQ ID NO 67
<211> LENGTH: 28
<212> TYPE: DNA
<213> ORGANISM: Artificial Sequence
<220> FEATURE:
<223> OTHER INFORMATION: Primer ill-EC-1-PMS2-18F

<400> SEQUENCE: 67
tttttttttg gaatgccgtg ggtctcaa                                              28

<210> SEQ ID NO 68
<211> LENGTH: 29
<212> TYPE: DNA
<213> ORGANISM: Artificial Sequence
<220> FEATURE:
<223> OTHER INFORMATION: Primer ill-EC-1-PMS2-18R

<400> SEQUENCE: 68 tttttttttct ggagggaact ttcccagtc                                            29

<210> SEQ ID NO 69
<211> LENGTH: 32
<212> TYPE: DNA
<213> ORGANISM: Artificial Sequence
<220> FEATURE:
<223> OTHER INFORMATION: Primer ill-EC-2-TP53-01F

<400> SEQUENCE: 69 tttttttttct attgcaagca agggttcaaa ga                                        32

<210> SEQ ID NO 70
<211> LENGTH: 31
<212> TYPE: DNA
<213> ORGANISM: Artificial Sequence
<220> FEATURE:
<223> OTHER INFORMATION: Primer ill-EC-2-TP53-01R

<400> SEQUENCE: 70
```

```
tttttttttc agtctacctc ccgccataaa a                           31

<210> SEQ ID NO 71
<211> LENGTH: 32
<212> TYPE: DNA
<213> ORGANISM: Artificial Sequence
<220> FEATURE:
<223> OTHER INFORMATION: Primer ill-EC-1-TP53-02F

<400> SEQUENCE: 71 tttttttttgg gaacaagaag tgagaatgt ca                          32

<210> SEQ ID NO 72
<211> LENGTH: 34
<212> TYPE: DNA
<213> ORGANISM: Artificial Sequence
<220> FEATURE:
<223> OTHER INFORMATION: Primer ill-EC-1-TP53-02R

<400> SEQUENCE: 72
tttttttttc tcactcatgt gatgtcatct ctcc                        34

<210> SEQ ID NO 73
<211> LENGTH: 32
<212> TYPE: DNA
<213> ORGANISM: Artificial Sequence
<220> FEATURE:
<223> OTHER INFORMATION: Primer ill-EC-2-TP53-02F

<400> SEQUENCE: 73 tttttttttag actgaccctt tttggacttc ag                         32

<210> SEQ ID NO 74
<211> LENGTH: 32
<212> TYPE: DNA
<213> ORGANISM: Artificial Sequence
<220> FEATURE:
<223> OTHER INFORMATION: Primer ill-EC-2-TP53-02R

<400> SEQUENCE: 74 tttttttttgg ccaccatctt gatttgaatt cc                         32

<210> SEQ ID NO 75
<211> LENGTH: 33
<212> TYPE: DNA
<213> ORGANISM: Artificial Sequence
<220> FEATURE:
<223> OTHER INFORMATION: Primer ill-EC-1-TP53-03F

<400> SEQUENCE: 75 tttttttttat gaaggcagga tgagaatgga atc                        33

<210> SEQ ID NO 76
<211> LENGTH: 31
<212> TYPE: DNA
<213> ORGANISM: Artificial Sequence
<220> FEATURE:
<223> OTHER INFORMATION: Primer ill-EC-1-TP53-03R

<400> SEQUENCE: 76
tttttttttc gagatgttcc gagagctgaa t                           31

<210> SEQ ID NO 77
<211> LENGTH: 26
<212> TYPE: DNA
```

<213> ORGANISM: Artificial Sequence
<220> FEATURE:
<223> OTHER INFORMATION: Primer ill-EC-2-TP53-03F

<400> SEQUENCE: 77 tttttttttgc ctgggcatcc ttgagt                26

<210> SEQ ID NO 78
<211> LENGTH: 34
<212> TYPE: DNA
<213> ORGANISM: Artificial Sequence
<220> FEATURE:
<223> OTHER INFORMATION: Primer ill-EC-2-TP53-03R

<400> SEQUENCE: 78
tttttttttg ttgcttttgt accgtcataa agtc        34

<210> SEQ ID NO 79
<211> LENGTH: 32
<212> TYPE: DNA
<213> ORGANISM: Artificial Sequence
<220> FEATURE:
<223> OTHER INFORMATION: Primer ill-EC-1-TP53-04F

<400> SEQUENCE: 79 tttttttttct aggctaagct atgatgttcc tt         32

<210> SEQ ID NO 80
<211> LENGTH: 32
<212> TYPE: DNA
<213> ORGANISM: Artificial Sequence
<220> FEATURE:
<223> OTHER INFORMATION: Primer ill-EC-1-TP53-04R

<400> SEQUENCE: 80 tttttttttag agcatgaaaa tggttctatg ac         32

<210> SEQ ID NO 81
<211> LENGTH: 33
<212> TYPE: DNA
<213> ORGANISM: Artificial Sequence
<220> FEATURE:
<223> OTHER INFORMATION: Primer ill-EC-2-TP53-04F

<400> SEQUENCE: 81 tttttttttcg acgagtttat caggaagtaa cac        33

<210> SEQ ID NO 82
<211> LENGTH: 30
<212> TYPE: DNA
<213> ORGANISM: Artificial Sequence
<220> FEATURE:
<223> OTHER INFORMATION: Primer ill-EC-2-TP53-04R

<400> SEQUENCE: 82
tttttttttg gttgtagcta actaacttca             30

<210> SEQ ID NO 83
<211> LENGTH: 30
<212> TYPE: DNA
<213> ORGANISM: Artificial Sequence
<220> FEATURE:
<223> OTHER INFORMATION: Primer ill-EC-1-TP53-05F

<400> SEQUENCE: 83 tttttttttgc attttgagtg ttagactgga            30

<210> SEQ ID NO 84
<211> LENGTH: 32
<212> TYPE: DNA
<213> ORGANISM: Artificial Sequence
<220> FEATURE:
<223> OTHER INFORMATION: Primer ill-EC-1-TP53-05R

<400> SEQUENCE: 84 tttttttcc tcagattcac ttttatcacc tt                32

<210> SEQ ID NO 85
<211> LENGTH: 30
<212> TYPE: DNA
<213> ORGANISM: Artificial Sequence
<220> FEATURE:
<223> OTHER INFORMATION: Primer ill-EC-2-TP53-05F

<400> SEQUENCE: 85 tttttttag ggtgaaatat tctccatcca                30

<210> SEQ ID NO 86
<211> LENGTH: 30
<212> TYPE: DNA
<213> ORGANISM: Artificial Sequence
<220> FEATURE:
<223> OTHER INFORMATION: Primer ill-EC-2-TP53-05R

<400> SEQUENCE: 86 tttttttag cactaagcga ggtaagcaag                30

<210> SEQ ID NO 87
<211> LENGTH: 29
<212> TYPE: DNA
<213> ORGANISM: Artificial Sequence
<220> FEATURE:
<223> OTHER INFORMATION: Primer ill-EC-1-TP53-06F

<400> SEQUENCE: 87 tttttttc tgaggcataa ctgcaccct                29

<210> SEQ ID NO 88
<211> LENGTH: 29
<212> TYPE: DNA
<213> ORGANISM: Artificial Sequence
<220> FEATURE:
<223> OTHER INFORMATION: Primer ill-EC-1-TP53-06R

<400> SEQUENCE: 88 tttttttac agctttgagg tgcgtgttt                29

<210> SEQ ID NO 89
<211> LENGTH: 30
<212> TYPE: DNA
<213> ORGANISM: Artificial Sequence
<220> FEATURE:
<223> OTHER INFORMATION: Primer ill-EC-2-TP53-06F

<400> SEQUENCE: 89 tttttttcc ctttcttgcg gagattctct                30

<210> SEQ ID NO 90
<211> LENGTH: 32
<212> TYPE: DNA
<213> ORGANISM: Artificial Sequence
<220> FEATURE:

<223> OTHER INFORMATION: Primer ill-EC-2-TP53-06R

<400> SEQUENCE: 90
tttttttttt taaatgggac aggtaggacc tg					32

<210> SEQ ID NO 91
<211> LENGTH: 32
<212> TYPE: DNA
<213> ORGANISM: Artificial Sequence
<220> FEATURE:
<223> OTHER INFORMATION: Primer ill-EC-1-TP53-07F

<400> SEQUENCE: 91
ttttttttag aggtggatgg gtagtagtat gg					32

<210> SEQ ID NO 92
<211> LENGTH: 26
<212> TYPE: DNA
<213> ORGANISM: Artificial Sequence
<220> FEATURE:
<223> OTHER INFORMATION: Primer ill-EC-1-TP53-07R

<400> SEQUENCE: 92
tttttttttg catgggcggc atgaac						26

<210> SEQ ID NO 93
<211> LENGTH: 28
<212> TYPE: DNA
<213> ORGANISM: Artificial Sequence
<220> FEATURE:
<223> OTHER INFORMATION: Primer ill-EC-2-TP53-07F

<400> SEQUENCE: 93 tttttttgc tcctgacctg gagtcttc						28

<210> SEQ ID NO 94
<211> LENGTH: 27
<212> TYPE: DNA
<213> ORGANISM: Artificial Sequence
<220> FEATURE:
<223> OTHER INFORMATION: Primer ill-EC-2-TP53-07R

<400> SEQUENCE: 94 tttttttgc cacaggtctc cccaagg						27

<210> SEQ ID NO 95
<211> LENGTH: 30
<212> TYPE: DNA
<213> ORGANISM: Artificial Sequence
<220> FEATURE:
<223> OTHER INFORMATION: Primer ill-EC-1-TP53-08F

<400> SEQUENCE: 95 tttttttcc actgacaacc acccttaacc					30

<210> SEQ ID NO 96
<211> LENGTH: 31
<212> TYPE: DNA
<213> ORGANISM: Artificial Sequence
<220> FEATURE:
<223> OTHER INFORMATION: Primer ill-EC-1-TP53-08R

<400> SEQUENCE: 96 tttttttcc tcctcagcat cttatccgag t					31

-continued

```
<210> SEQ ID NO 97
<211> LENGTH: 32
<212> TYPE: DNA
<213> ORGANISM: Artificial Sequence
<220> FEATURE:
<223> OTHER INFORMATION: Primer ill-EC-2-TP53-08F

<400> SEQUENCE: 97
tttttttttc tgtcatccaa atactccaca cg                                    32

<210> SEQ ID NO 98
<211> LENGTH: 29
<212> TYPE: DNA
<213> ORGANISM: Artificial Sequence
<220> FEATURE:
<223> OTHER INFORMATION: Primer ill-EC-2-TP53-08R

<400> SEQUENCE: 98 tttttttcc atgagcgctg ctcagatag                                         29

<210> SEQ ID NO 99
<211> LENGTH: 31
<212> TYPE: DNA
<213> ORGANISM: Artificial Sequence
<220> FEATURE:
<223> OTHER INFORMATION: Primer ill-EC-1-TP53-09F

<400> SEQUENCE: 99 tttttttca gacctaagag caatcagtga g                                      31

<210> SEQ ID NO 100
<211> LENGTH: 29
<212> TYPE: DNA
<213> ORGANISM: Artificial Sequence
<220> FEATURE:
<223> OTHER INFORMATION: Primer ill-EC-1-TP53-09R

<400> SEQUENCE: 100 tttttttca tggccatcta caagcagtc                                         29

<210> SEQ ID NO 101
<211> LENGTH: 29
<212> TYPE: DNA
<213> ORGANISM: Artificial Sequence
<220> FEATURE:
<223> OTHER INFORMATION: Primer ill-EC-2-TP53-09F

<400> SEQUENCE: 101 tttttttcc tcacaacctc cgtcatgtg                                         29

<210> SEQ ID NO 102
<211> LENGTH: 32
<212> TYPE: DNA
<213> ORGANISM: Artificial Sequence
<220> FEATURE:
<223> OTHER INFORMATION: Primer ill-EC-2-TP53-09R

<400> SEQUENCE: 102
tttttttttg tctccttcct cttcctacag ta                                    32

<210> SEQ ID NO 103
<211> LENGTH: 30
<212> TYPE: DNA
<213> ORGANISM: Artificial Sequence
<220> FEATURE:
<223> OTHER INFORMATION: Primer ill-EC-1-TP53-10F
```

<400> SEQUENCE: 103 tttttttttgc cagttggcaa aacatcttgt                              30

<210> SEQ ID NO 104
<211> LENGTH: 27
<212> TYPE: DNA
<213> ORGANISM: Artificial Sequence
<220> FEATURE:
<223> OTHER INFORMATION: Primer ill-EC-1-TP53-10R

<400> SEQUENCE: 104 tttttttta gctcgctagt gggttgc                                   27

<210> SEQ ID NO 105
<211> LENGTH: 30
<212> TYPE: DNA
<213> ORGANISM: Artificial Sequence
<220> FEATURE:
<223> OTHER INFORMATION: Primer ill-EC-2-TP53-10F

<400> SEQUENCE: 105 tttttttgg gtgaagagga atcccaaagt                                30

<210> SEQ ID NO 106
<211> LENGTH: 30
<212> TYPE: DNA
<213> ORGANISM: Artificial Sequence
<220> FEATURE:
<223> OTHER INFORMATION: Primer ill-EC-2-TP53-10R

<400> SEQUENCE: 106 tttttttag aaaacctacc agggcagcta                                30

<210> SEQ ID NO 107
<211> LENGTH: 29
<212> TYPE: DNA
<213> ORGANISM: Artificial Sequence
<220> FEATURE:
<223> OTHER INFORMATION: Primer ill-EC-1-TP53-11F

<400> SEQUENCE: 107
tttttttttg tcccagaatg caagaagcc                                29

<210> SEQ ID NO 108
<211> LENGTH: 30
<212> TYPE: DNA
<213> ORGANISM: Artificial Sequence
<220> FEATURE:
<223> OTHER INFORMATION: Primer ill-EC-1-TP53-11R

<400> SEQUENCE: 108 tttttttag atgaagctcc cagaatgcca                                30

<210> SEQ ID NO 109
<211> LENGTH: 25
<212> TYPE: DNA
<213> ORGANISM: Artificial Sequence
<220> FEATURE:
<223> OTHER INFORMATION: Primer ill-EC-2-TP53-11F

<400> SEQUENCE: 109 tttttttcc gccggtgtag gagct                                     25

<210> SEQ ID NO 110
<211> LENGTH: 29

<212> TYPE: DNA
<213> ORGANISM: Artificial Sequence
<220> FEATURE:
<223> OTHER INFORMATION: Primer ill-EC-2-TP53-11R

<400> SEQUENCE: 110 tttttttttgc tcttttcacc catctacag                29

<210> SEQ ID NO 111
<211> LENGTH: 31
<212> TYPE: DNA
<213> ORGANISM: Artificial Sequence
<220> FEATURE:
<223> OTHER INFORMATION: Primer ill-EC-1-TP53-12F

<400> SEQUENCE: 111 tttttttttca gcatcaaatc atccattgct t              31

<210> SEQ ID NO 112
<211> LENGTH: 31
<212> TYPE: DNA
<213> ORGANISM: Artificial Sequence
<220> FEATURE:
<223> OTHER INFORMATION: Primer ill-EC-1-TP53-12R

<400> SEQUENCE: 112
tttttttttt cagacttcct gaaaacaacg t               31

<210> SEQ ID NO 113
<211> LENGTH: 27
<212> TYPE: DNA
<213> ORGANISM: Artificial Sequence
<220> FEATURE:
<223> OTHER INFORMATION: Primer ill-EC-2-TP53-12F

<400> SEQUENCE: 113 tttttttgc ccaacccttg tccttac                     27

<210> SEQ ID NO 114
<211> LENGTH: 32
<212> TYPE: DNA
<213> ORGANISM: Artificial Sequence
<220> FEATURE:
<223> OTHER INFORMATION: Primer ill-EC-2-TP53-12R

<400> SEQUENCE: 114 ttttttttc agacctatgg aaactgtgag tg               32

<210> SEQ ID NO 115
<211> LENGTH: 27
<212> TYPE: DNA
<213> ORGANISM: Artificial Sequence
<220> FEATURE:
<223> OTHER INFORMATION: Primer ill-EC-1-TP53-13F

<400> SEQUENCE: 115 tttttttgc ctgcccttcc aatggat                     27

<210> SEQ ID NO 116
<211> LENGTH: 29
<212> TYPE: DNA
<213> ORGANISM: Artificial Sequence
<220> FEATURE:
<223> OTHER INFORMATION: Primer ill-EC-1-TP53-13R

<400> SEQUENCE: 116 tttttttttag ggttggaagt gtctcatgc                29

<210> SEQ ID NO 117
<211> LENGTH: 30
<212> TYPE: DNA
<213> ORGANISM: Artificial Sequence
<220> FEATURE:
<223> OTHER INFORMATION: Primer ill-EC-1-MLH1-01F

<400> SEQUENCE: 117 tttttttttgg cacttccgtt gagcatctag                30

<210> SEQ ID NO 118
<211> LENGTH: 35
<212> TYPE: DNA
<213> ORGANISM: Artificial Sequence
<220> FEATURE:
<223> OTHER INFORMATION: Primer ill-EC-1-MLH1-01R

<400> SEQUENCE: 118 tttttttttcc gtaccagttc tcaatcatct ctttg                35

<210> SEQ ID NO 119
<211> LENGTH: 27
<212> TYPE: DNA
<213> ORGANISM: Artificial Sequence
<220> FEATURE:
<223> OTHER INFORMATION: Primer ill-EC-2-MLH1-02F

<400> SEQUENCE: 119 tttttttttgg cgccaaaatg tcgttcg                27

<210> SEQ ID NO 120
<211> LENGTH: 31
<212> TYPE: DNA
<213> ORGANISM: Artificial Sequence
<220> FEATURE:
<223> OTHER INFORMATION: Primer ill-EC-2-MLH1-02R

<400> SEQUENCE: 120 tttttttttcc gttaagtcgt agcccttaag t                31

<210> SEQ ID NO 121
<211> LENGTH: 35
<212> TYPE: DNA
<213> ORGANISM: Artificial Sequence
<220> FEATURE:
<223> OTHER INFORMATION: Primer ill-EC-1-MLH1-02F

<400> SEQUENCE: 121 tttttttttaa cacgttaatg aggcactatt gtttg                35

<210> SEQ ID NO 122
<211> LENGTH: 32
<212> TYPE: DNA
<213> ORGANISM: Artificial Sequence
<220> FEATURE:
<223> OTHER INFORMATION: Primer ill-EC-1-MLH1-02R

<400> SEQUENCE: 122 ttttttttttt caggcctccc tctttaacaa tc                32

<210> SEQ ID NO 123
<211> LENGTH: 34
<212> TYPE: DNA
<213> ORGANISM: Artificial Sequence

```
<220> FEATURE:
<223> OTHER INFORMATION: Primer ill-EC-2-MLH1-03F

<400> SEQUENCE: 123
tttttttttc tgtttgattt gccagtttag atgc                                   34

<210> SEQ ID NO 124
<211> LENGTH: 32
<212> TYPE: DNA
<213> ORGANISM: Artificial Sequence
<220> FEATURE:
<223> OTHER INFORMATION: Primer ill-EC-2-MLH1-03R

<400> SEQUENCE: 124 tttttttag agaaaggtcc tgactcttcc at                                      32

<210> SEQ ID NO 125
<211> LENGTH: 33
<212> TYPE: DNA
<213> ORGANISM: Artificial Sequence
<220> FEATURE:
<223> OTHER INFORMATION: Primer ill-EC-1-MLH1-03F

<400> SEQUENCE: 125
tttttttttc aagaaaatgg gaattcaaag aga                                    33

<210> SEQ ID NO 126
<211> LENGTH: 33
<212> TYPE: DNA
<213> ORGANISM: Artificial Sequence
<220> FEATURE:
<223> OTHER INFORMATION: Primer ill-EC-1-MLH1-03R

<400> SEQUENCE: 126 tttttttca cctcgaaagc cataggtaga aat                                     33

<210> SEQ ID NO 127
<211> LENGTH: 33
<212> TYPE: DNA
<213> ORGANISM: Artificial Sequence
<220> FEATURE:
<223> OTHER INFORMATION: Primer ill-EC-2-MLH1-04F

<400> SEQUENCE: 127 tttttttaa aggttcacta ctagtaaact gca                                     33

<210> SEQ ID NO 128
<211> LENGTH: 34
<212> TYPE: DNA
<213> ORGANISM: Artificial Sequence
<220> FEATURE:
<223> OTHER INFORMATION: Primer ill-EC-2-MLH1-04R

<400> SEQUENCE: 128 tttttttca gacaatgtca tcacaggagg atat                                    34

<210> SEQ ID NO 129
<211> LENGTH: 32
<212> TYPE: DNA
<213> ORGANISM: Artificial Sequence
<220> FEATURE:
<223> OTHER INFORMATION: Primer ill-EC-1-MLH1-04F

<400> SEQUENCE: 129 tttttttgt tcagataacc tttcccttttg gt                                     32
```

```
<210> SEQ ID NO 130
<211> LENGTH: 32
<212> TYPE: DNA
<213> ORGANISM: Artificial Sequence
<220> FEATURE:
<223> OTHER INFORMATION: Primer ill-EC-1-MLH1-04R

<400> SEQUENCE: 130 tttttttag tcagcactat acctgtatgc ac                          32

<210> SEQ ID NO 131
<211> LENGTH: 32
<212> TYPE: DNA
<213> ORGANISM: Artificial Sequence
<220> FEATURE:
<223> OTHER INFORMATION: Primer ill-EC-2-MLH1-05F

<400> SEQUENCE: 131
ttttttttat tttcttttct tccttaggct tt                         32

<210> SEQ ID NO 132
<211> LENGTH: 31
<212> TYPE: DNA
<213> ORGANISM: Artificial Sequence
<220> FEATURE:
<223> OTHER INFORMATION: Primer ill-EC-2-MLH1-05R

<400> SEQUENCE: 132
tttttttttg agacaggatt actctgagac c                          31

<210> SEQ ID NO 133
<211> LENGTH: 33
<212> TYPE: DNA
<213> ORGANISM: Artificial Sequence
<220> FEATURE:
<223> OTHER INFORMATION: Primer ill-EC-1-MLH1-05F

<400> SEQUENCE: 133
tttttttttt ctcttttccc cttgggatta gta                        33

<210> SEQ ID NO 134
<211> LENGTH: 33
<212> TYPE: DNA
<213> ORGANISM: Artificial Sequence
<220> FEATURE:
<223> OTHER INFORMATION: Primer ill-EC-1-MLH1-05R

<400> SEQUENCE: 134
tttttttttc aacaatttac tctcccatgt acc                        33

<210> SEQ ID NO 135
<211> LENGTH: 31
<212> TYPE: DNA
<213> ORGANISM: Artificial Sequence
<220> FEATURE:
<223> OTHER INFORMATION: Primer ill-EC-2-MLH1-06F

<400> SEQUENCE: 135
tttttttttc ctaaaccatg tgctggcaat c                          31

<210> SEQ ID NO 136
<211> LENGTH: 31
<212> TYPE: DNA
<213> ORGANISM: Artificial Sequence
<220> FEATURE:
<223> OTHER INFORMATION: Primer ill-EC-2-MLH1-06R
```

<400> SEQUENCE: 136 tttttttttgg gacctccatt aactagtgca a                                        31

<210> SEQ ID NO 137
<211> LENGTH: 32
<212> TYPE: DNA
<213> ORGANISM: Artificial Sequence
<220> FEATURE:
<223> OTHER INFORMATION: Primer ill-EC-1-MLH1-06F

<400> SEQUENCE: 137 tttttttttgt gcttagaact gtgctgttgg ta                                       32

<210> SEQ ID NO 138
<211> LENGTH: 31
<212> TYPE: DNA
<213> ORGANISM: Artificial Sequence
<220> FEATURE:
<223> OTHER INFORMATION: Primer ill-EC-1-MLH1-06R

<400> SEQUENCE: 138 tttttttttaa agcttttctc ctcgtggcta t                                        31

<210> SEQ ID NO 139
<211> LENGTH: 33
<212> TYPE: DNA
<213> ORGANISM: Artificial Sequence
<220> FEATURE:
<223> OTHER INFORMATION: Primer ill-EC-2-MLH1-07F

<400> SEQUENCE: 139 tttttttttat caatcttctg ttcaggtgga gga                                      33

<210> SEQ ID NO 140
<211> LENGTH: 33
<212> TYPE: DNA
<213> ORGANISM: Artificial Sequence
<220> FEATURE:
<223> OTHER INFORMATION: Primer ill-EC-2-MLH1-07R

<400> SEQUENCE: 140
tttttttttg agcactagaa cacattactt tga                                       33

<210> SEQ ID NO 141
<211> LENGTH: 34
<212> TYPE: DNA
<213> ORGANISM: Artificial Sequence
<220> FEATURE:
<223> OTHER INFORMATION: Primer ill-EC-1-MLH1-07F

<400> SEQUENCE: 141 tttttttttga catctagtgt gtgttttttgg caac                                    34

<210> SEQ ID NO 142
<211> LENGTH: 35
<212> TYPE: DNA
<213> ORGANISM: Artificial Sequence
<220> FEATURE:
<223> OTHER INFORMATION: Primer ill-EC-1-MLH1-07R

<400> SEQUENCE: 142 tttttttttca ccagcaaact attaaaaatc ccctt                                    35

<210> SEQ ID NO 143

```
<210> SEQ ID NO 143
<211> LENGTH: 33
<212> TYPE: DNA
<213> ORGANISM: Artificial Sequence
<220> FEATURE:
<223> OTHER INFORMATION: Primer ill-EC-2-MLH1-08F

<400> SEQUENCE: 143 tttttttttgg ttatgatgtt tcagtctcag cca                              33

<210> SEQ ID NO 144
<211> LENGTH: 33
<212> TYPE: DNA
<213> ORGANISM: Artificial Sequence
<220> FEATURE:
<223> OTHER INFORMATION: Primer ill-EC-2-MLH1-08R

<400> SEQUENCE: 144 tttttttttag gttatcgaca taccgactaa cag                              33

<210> SEQ ID NO 145
<211> LENGTH: 30
<212> TYPE: DNA
<213> ORGANISM: Artificial Sequence
<220> FEATURE:
<223> OTHER INFORMATION: Primer ill-EC-1-MLH1-08F

<400> SEQUENCE: 145 tttttttttct caaccgtgga caatattcgc                                  30

<210> SEQ ID NO 146
<211> LENGTH: 31
<212> TYPE: DNA
<213> ORGANISM: Artificial Sequence
<220> FEATURE:
<223> OTHER INFORMATION: Primer ill-EC-1-MLH1-08R

<400> SEQUENCE: 146 tttttttttcc tgtgtatttg actaaagcaa a                                31

<210> SEQ ID NO 147
<211> LENGTH: 36
<212> TYPE: DNA
<213> ORGANISM: Artificial Sequence
<220> FEATURE:
<223> OTHER INFORMATION: Primer ill-EC-2-MLH1-09F

<400> SEQUENCE: 147 tttttttttat gggaaggaac cttgtgtttt taaatt                           36

<210> SEQ ID NO 148
<211> LENGTH: 32
<212> TYPE: DNA
<213> ORGANISM: Artificial Sequence
<220> FEATURE:
<223> OTHER INFORMATION: Primer ill-EC-2-MLH1-09R

<400> SEQUENCE: 148 tttttttttca ctgagtagtt tgcattggat at                               32

<210> SEQ ID NO 149
<211> LENGTH: 35
<212> TYPE: DNA
<213> ORGANISM: Artificial Sequence
<220> FEATURE:
<223> OTHER INFORMATION: Primer ill-EC-1-MLH1-09F

<400> SEQUENCE: 149
```

```
tttttttttag aaattggatg tgaggataaa accct                            35

<210> SEQ ID NO 150
<211> LENGTH: 32
<212> TYPE: DNA
<213> ORGANISM: Artificial Sequence
<220> FEATURE:
<223> OTHER INFORMATION: Primer ill-EC-1-MLH1-09R

<400> SEQUENCE: 150 tttttttttat ggtcccataa aattccctgt gg                              32

<210> SEQ ID NO 151
<211> LENGTH: 34
<212> TYPE: DNA
<213> ORGANISM: Artificial Sequence
<220> FEATURE:
<223> OTHER INFORMATION: Primer ill-EC-2-MLH1-10F

<400> SEQUENCE: 151 ttttttttttg tctttcctga ggtgatttca tgac                            34

<210> SEQ ID NO 152
<211> LENGTH: 32
<212> TYPE: DNA
<213> ORGANISM: Artificial Sequence
<220> FEATURE:
<223> OTHER INFORMATION: Primer ill-EC-2-MLH1-10R

<400> SEQUENCE: 152
tttttttttt tttgggcaaa taggctgcat ac                               32

<210> SEQ ID NO 153
<211> LENGTH: 34
<212> TYPE: DNA
<213> ORGANISM: Artificial Sequence
<220> FEATURE:
<223> OTHER INFORMATION: Primer ill-EC-1-MLH1-10F

<400> SEQUENCE: 153
ttttttttga tcgtctggta gaatcaactt cctt                             34

<210> SEQ ID NO 154
<211> LENGTH: 34
<212> TYPE: DNA
<213> ORGANISM: Artificial Sequence
<220> FEATURE:
<223> OTHER INFORMATION: Primer ill-EC-1-MLH1-10R

<400> SEQUENCE: 154
ttttttttat ctctttcaaa gaggagagcc tgat                             34

<210> SEQ ID NO 155
<211> LENGTH: 34
<212> TYPE: DNA
<213> ORGANISM: Artificial Sequence
<220> FEATURE:
<223> OTHER INFORMATION: Primer ill-EC-2-MLH1-11F

<400> SEQUENCE: 155
ttttttttca tacaccatat gtgggctttt tctc                             34

<210> SEQ ID NO 156
<211> LENGTH: 32
<212> TYPE: DNA
```

<213> ORGANISM: Artificial Sequence
<220> FEATURE:
<223> OTHER INFORMATION: Primer ill-EC-2-MLH1-11R

<400> SEQUENCE: 156 tttttttttgc aggaagtgaa cttcatgctt tg                32

<210> SEQ ID NO 157
<211> LENGTH: 32
<212> TYPE: DNA
<213> ORGANISM: Artificial Sequence
<220> FEATURE:
<223> OTHER INFORMATION: Primer ill-EC-1-MLH1-11F

<400> SEQUENCE: 157 tttttttttca gtccccagaa tgtggatgtt aa                32

<210> SEQ ID NO 158
<211> LENGTH: 31
<212> TYPE: DNA
<213> ORGANISM: Artificial Sequence
<220> FEATURE:
<223> OTHER INFORMATION: Primer ill-EC-1-MLH1-11R

<400> SEQUENCE: 158 tttttttttga gaagtagctg gatgagaagc g                 31

<210> SEQ ID NO 159
<211> LENGTH: 33
<212> TYPE: DNA
<213> ORGANISM: Artificial Sequence
<220> FEATURE:
<223> OTHER INFORMATION: Primer ill-EC-2-MLH1-12F

<400> SEQUENCE: 159 tttttttttcc aattcctcca ggatgtactt cac               33

<210> SEQ ID NO 160
<211> LENGTH: 36
<212> TYPE: DNA
<213> ORGANISM: Artificial Sequence
<220> FEATURE:
<223> OTHER INFORMATION: Primer ill-EC-2-MLH1-12R

<400> SEQUENCE: 160 tttttttttat ccaggtaata cttgcaaaga aagttc            36

<210> SEQ ID NO 161
<211> LENGTH: 31
<212> TYPE: DNA
<213> ORGANISM: Artificial Sequence
<220> FEATURE:
<223> OTHER INFORMATION: Primer ill-EC-1-MLH1-12F

<400> SEQUENCE: 161 tttttttttta cagactttgc taccaggact t                 31

<210> SEQ ID NO 162
<211> LENGTH: 32
<212> TYPE: DNA
<213> ORGANISM: Artificial Sequence
<220> FEATURE:
<223> OTHER INFORMATION: Primer ill-EC-1-MLH1-12R

<400> SEQUENCE: 162 tttttttttga aatgcatcaa gcttctgttc cc                32

<210> SEQ ID NO 163
<211> LENGTH: 35
<212> TYPE: DNA
<213> ORGANISM: Artificial Sequence
<220> FEATURE:
<223> OTHER INFORMATION: Primer ill-EC-2-MLH1-13F

<400> SEQUENCE: 163
tttttttttt ctggaagtag tgataaggtc tatgc                    35

<210> SEQ ID NO 164
<211> LENGTH: 32
<212> TYPE: DNA
<213> ORGANISM: Artificial Sequence
<220> FEATURE:
<223> OTHER INFORMATION: Primer ill-EC-2-MLH1-13R

<400> SEQUENCE: 164
ttttttttcc tagccctgcc actagaaata tc                       32

<210> SEQ ID NO 165
<211> LENGTH: 31
<212> TYPE: DNA
<213> ORGANISM: Artificial Sequence
<220> FEATURE:
<223> OTHER INFORMATION: Primer ill-EC-1-MLH1-13F

<400> SEQUENCE: 165 tttttttca ggccattgtc acagaggata a                         31

<210> SEQ ID NO 166
<211> LENGTH: 33
<212> TYPE: DNA
<213> ORGANISM: Artificial Sequence
<220> FEATURE:
<223> OTHER INFORMATION: Primer ill-EC-1-MLH1-13R

<400> SEQUENCE: 166
tttttttttt ctgaagtccc ctttgttgta tcc                      33

<210> SEQ ID NO 167
<211> LENGTH: 32
<212> TYPE: DNA
<213> ORGANISM: Artificial Sequence
<220> FEATURE:
<223> OTHER INFORMATION: Primer ill-EC-2-MLH1-14F

<400> SEQUENCE: 167
ttttttttag caagatgagg agatgcttga ac                       32

<210> SEQ ID NO 168
<211> LENGTH: 32
<212> TYPE: DNA
<213> ORGANISM: Artificial Sequence
<220> FEATURE:
<223> OTHER INFORMATION: Primer ill-EC-2-MLH1-14R

<400> SEQUENCE: 168
ttttttttag aataaaggag gtaggctgta ct                       32

<210> SEQ ID NO 169
<211> LENGTH: 34
<212> TYPE: DNA
<213> ORGANISM: Artificial Sequence
<220> FEATURE:

<223> OTHER INFORMATION: Primer ill-EC-1-MLH1-14F

<400> SEQUENCE: 169 tttttttct tcagaaatgt cagagaagag agga         34

<210> SEQ ID NO 170
<211> LENGTH: 34
<212> TYPE: DNA
<213> ORGANISM: Artificial Sequence
<220> FEATURE:
<223> OTHER INFORMATION: Primer ill-EC-1-MLH1-14R

<400> SEQUENCE: 170 tttttttgc agagagaaga tgcaagtgat tcat         34

<210> SEQ ID NO 171
<211> LENGTH: 33
<212> TYPE: DNA
<213> ORGANISM: Artificial Sequence
<220> FEATURE:
<223> OTHER INFORMATION: Primer ill-EC-2-MLH1-15F

<400> SEQUENCE: 171 tttttttgt tcattcacag ctctgtagaa cca          33

<210> SEQ ID NO 172
<211> LENGTH: 33
<212> TYPE: DNA
<213> ORGANISM: Artificial Sequence
<220> FEATURE:
<223> OTHER INFORMATION: Primer ill-EC-2-MLH1-15R

<400> SEQUENCE: 172 tttttttca tcttccacca tttccacatc aga          33

<210> SEQ ID NO 173
<211> LENGTH: 35
<212> TYPE: DNA
<213> ORGANISM: Artificial Sequence
<220> FEATURE:
<223> OTHER INFORMATION: Primer ill-EC-1-MLH1-15F

<400> SEQUENCE: 173 tttttttat gatctgcact tccttttctt cattg        35

<210> SEQ ID NO 174
<211> LENGTH: 34
<212> TYPE: DNA
<213> ORGANISM: Artificial Sequence
<220> FEATURE:
<223> OTHER INFORMATION: Primer ill-EC-1-MLH1-15R

<400> SEQUENCE: 174 tttttttcc ctgctcatta atttcttcct ggag         34

<210> SEQ ID NO 175
<211> LENGTH: 33
<212> TYPE: DNA
<213> ORGANISM: Artificial Sequence
<220> FEATURE:
<223> OTHER INFORMATION: Primer ill-EC-2-MLH1-16F

<400> SEQUENCE: 175 tttttttgg aagatgattc ccgaaaggaa atg          33

```
<210> SEQ ID NO 176
<211> LENGTH: 32
<212> TYPE: DNA
<213> ORGANISM: Artificial Sequence
<220> FEATURE:
<223> OTHER INFORMATION: Primer ill-EC-2-MLH1-16R

<400> SEQUENCE: 176 tttttttttat ttccaaaacc ttggcagttg ag                    32

<210> SEQ ID NO 177
<211> LENGTH: 33
<212> TYPE: DNA
<213> ORGANISM: Artificial Sequence
<220> FEATURE:
<223> OTHER INFORMATION: Primer ill-EC-1-MLH1-16F

<400> SEQUENCE: 177 tttttttttgg ttggtaggat tctattactt acc                   33

<210> SEQ ID NO 178
<211> LENGTH: 32
<212> TYPE: DNA
<213> ORGANISM: Artificial Sequence
<220> FEATURE:
<223> OTHER INFORMATION: Primer ill-EC-1-MLH1-16R

<400> SEQUENCE: 178 tttttttttgc tgatttacct aagcttggtg gt                    32

<210> SEQ ID NO 179
<211> LENGTH: 30
<212> TYPE: DNA
<213> ORGANISM: Artificial Sequence
<220> FEATURE:
<223> OTHER INFORMATION: Primer ill-EC-2-MLH1-17F

<400> SEQUENCE: 179 tttttttttgt tttgcagttc tccgggagat                       30

<210> SEQ ID NO 180
<211> LENGTH: 32
<212> TYPE: DNA
<213> ORGANISM: Artificial Sequence
<220> FEATURE:
<223> OTHER INFORMATION: Primer ill-EC-2-MLH1-17R

<400> SEQUENCE: 180 tttttttttct ccctggacca ttgttgtagt ag                    32

<210> SEQ ID NO 181
<211> LENGTH: 34
<212> TYPE: DNA
<213> ORGANISM: Artificial Sequence
<220> FEATURE:
<223> OTHER INFORMATION: Primer ill-EC-1-MLH1-17F

<400> SEQUENCE: 181 tttttttttct caagcatgaa ttcagctttt cctt                  34

<210> SEQ ID NO 182
<211> LENGTH: 32
<212> TYPE: DNA
<213> ORGANISM: Artificial Sequence
<220> FEATURE:
<223> OTHER INFORMATION: Primer ill-EC-1-MLH1-17R
```

<400> SEQUENCE: 182 tttttttttag ctactatttt cagaaacgat ca    32

<210> SEQ ID NO 183
<211> LENGTH: 29
<212> TYPE: DNA
<213> ORGANISM: Artificial Sequence
<220> FEATURE:
<223> OTHER INFORMATION: Primer ill-EC-2-MLH1-18F

<400> SEQUENCE: 183 tttttttttgg atgctccgtt aaagcttgc    29

<210> SEQ ID NO 184
<211> LENGTH: 33
<212> TYPE: DNA
<213> ORGANISM: Artificial Sequence
<220> FEATURE:
<223> OTHER INFORMATION: Primer ill-EC-2-MLH1-18R

<400> SEQUENCE: 184 tttttttttag ccttcttctt cagaaactca aca    33

<210> SEQ ID NO 185
<211> LENGTH: 32
<212> TYPE: DNA
<213> ORGANISM: Artificial Sequence
<220> FEATURE:
<223> OTHER INFORMATION: Primer ill-EC-1-MLH1-18F

<400> SEQUENCE: 185 tttttttttcc caaagaagga cttgctgaat ac    32

<210> SEQ ID NO 186
<211> LENGTH: 32
<212> TYPE: DNA
<213> ORGANISM: Artificial Sequence
<220> FEATURE:
<223> OTHER INFORMATION: Primer ill-EC-1-MLH1-18R

<400> SEQUENCE: 186 tttttttttcc cggctggaaa ttttatttga ag    32

<210> SEQ ID NO 187
<211> LENGTH: 34
<212> TYPE: DNA
<213> ORGANISM: Artificial Sequence
<220> FEATURE:
<223> OTHER INFORMATION: Primer ill-EC-2-MLH1-19F

<400> SEQUENCE: 187 tttttttttag cactggagaa atgggatttg ttta    34

<210> SEQ ID NO 188
<211> LENGTH: 30
<212> TYPE: DNA
<213> ORGANISM: Artificial Sequence
<220> FEATURE:
<223> OTHER INFORMATION: Primer ill-EC-2-MLH1-19R

<400> SEQUENCE: 188 tttttttttcc tcagtggcta gtcgaagaat    30

<210> SEQ ID NO 189
<211> LENGTH: 31

```
<212> TYPE: DNA
<213> ORGANISM: Artificial Sequence
<220> FEATURE:
<223> OTHER INFORMATION: Primer ill-EC-1-MLH1-19F

<400> SEQUENCE: 189
ttttttttgg aacctgattg gattacccct t                                    31

<210> SEQ ID NO 190
<211> LENGTH: 31
<212> TYPE: DNA
<213> ORGANISM: Artificial Sequence
<220> FEATURE:
<223> OTHER INFORMATION: Primer ill-EC-1-MLH1-19R

<400> SEQUENCE: 190 tttttttat tccagatcaa agggtggtca t                                     31

<210> SEQ ID NO 191
<211> LENGTH: 33
<212> TYPE: DNA
<213> ORGANISM: Artificial Sequence
<220> FEATURE:
<223> OTHER INFORMATION: Primer ill-EC-2-MLH1-20F

<400> SEQUENCE: 191
ttttttttgt ctgtgatctc cgtttagaat gag                                  33

<210> SEQ ID NO 192
<211> LENGTH: 32
<212> TYPE: DNA
<213> ORGANISM: Artificial Sequence
<220> FEATURE:
<223> OTHER INFORMATION: Primer ill-EC-2-MLH1-20R

<400> SEQUENCE: 192
ttttttttag ggtcgactcc tcagatatgt ac                                   32

<210> SEQ ID NO 193
<211> LENGTH: 32
<212> TYPE: DNA
<213> ORGANISM: Artificial Sequence
<220> FEATURE:
<223> OTHER INFORMATION: Primer ill-EC-1-MLH1-20F

<400> SEQUENCE: 193
ttttttttcc aggtgaattg ggacgaagaa aa                                   32

<210> SEQ ID NO 194
<211> LENGTH: 34
<212> TYPE: DNA
<213> ORGANISM: Artificial Sequence
<220> FEATURE:
<223> OTHER INFORMATION: Primer ill-EC-1-MLH1-20R

<400> SEQUENCE: 194
ttttttttaa gattgtatga ggtcctgtcc tagt                                 34

<210> SEQ ID NO 195
<211> LENGTH: 34
<212> TYPE: DNA
<213> ORGANISM: Artificial Sequence
<220> FEATURE:
<223> OTHER INFORMATION: Primer ill-EC-2-MLH1-21F

<400> SEQUENCE: 195
```
tttttttttt caaaagccct agataacacc aagt        34

<210> SEQ ID NO 196
<211> LENGTH: 32
<212> TYPE: DNA
<213> ORGANISM: Artificial Sequence
<220> FEATURE:
<223> OTHER INFORMATION: Primer ill-EC-2-MLH1-21R

<400> SEQUENCE: 196
ttttttttac aatgtgttcc acagtccact tc        32

<210> SEQ ID NO 197
<211> LENGTH: 34
<212> TYPE: DNA
<213> ORGANISM: Artificial Sequence
<220> FEATURE:
<223> OTHER INFORMATION: Primer ill-EC-1-MLH1-21F

<400> SEQUENCE: 197
ttttttttct aatgtgtttt ccagagtgaa gtgc        34

<210> SEQ ID NO 198
<211> LENGTH: 33
<212> TYPE: DNA
<213> ORGANISM: Artificial Sequence
<220> FEATURE:
<223> OTHER INFORMATION: Primer ill-EC-1-MLH1-21R

<400> SEQUENCE: 198
ttttttttca aagactttgt atagatcagg cag        33

<210> SEQ ID NO 199
<211> LENGTH: 33
<212> TYPE: DNA
<213> ORGANISM: Artificial Sequence
<220> FEATURE:
<223> OTHER INFORMATION: Primer ill-EC-2-MLH1-22F

<400> SEQUENCE: 199
ttttttttga tggaaatatc ctgcagcttg cta        33

<210> SEQ ID NO 200
<211> LENGTH: 33
<212> TYPE: DNA
<213> ORGANISM: Artificial Sequence
<220> FEATURE:
<223> OTHER INFORMATION: Primer ill-EC-2-MLH1-22R

<400> SEQUENCE: 200
ttttttttat gttggtacac tttgtatatc aca        33

<210> SEQ ID NO 201
<211> LENGTH: 27
<212> TYPE: DNA
<213> ORGANISM: Artificial Sequence
<220> FEATURE:
<223> OTHER INFORMATION: Primer ill-EC-1-EPCAM-01F

<400> SEQUENCE: 201
ttttttttgg ctcctcgtgt cccactc        27

<210> SEQ ID NO 202
<211> LENGTH: 25
<212> TYPE: DNA
<213> ORGANISM: Artificial Sequence

```
<220> FEATURE:
<223> OTHER INFORMATION: Primer ill-EC-1-EPCAM-01R

<400> SEQUENCE: 202 tttttttttca atccgcgcct cacct                                          25

<210> SEQ ID NO 203
<211> LENGTH: 25
<212> TYPE: DNA
<213> ORGANISM: Artificial Sequence
<220> FEATURE:
<223> OTHER INFORMATION: Primer ill-EC-2-EPCAM-02F

<400> SEQUENCE: 203 tttttttttcc gcaggtcctc gcgtt                                          25

<210> SEQ ID NO 204
<211> LENGTH: 28
<212> TYPE: DNA
<213> ORGANISM: Artificial Sequence
<220> FEATURE:
<223> OTHER INFORMATION: Primer ill-EC-2-EPCAM-02R

<400> SEQUENCE: 204 tttttttttgc ctcttggtcc cctccta                                        28

<210> SEQ ID NO 205
<211> LENGTH: 35
<212> TYPE: DNA
<213> ORGANISM: Artificial Sequence
<220> FEATURE:
<223> OTHER INFORMATION: Primer ill-EC-1-EPCAM-03F

<400> SEQUENCE: 205
tttttttttg ggacatgaga gttaatagat ccaca                                35

<210> SEQ ID NO 206
<211> LENGTH: 32
<212> TYPE: DNA
<213> ORGANISM: Artificial Sequence
<220> FEATURE:
<223> OTHER INFORMATION: Primer ill-EC-1-EPCAM-03R

<400> SEQUENCE: 206
tttttttttt actcacgctt tgagcaaatg ac                                   32

<210> SEQ ID NO 207
<211> LENGTH: 34
<212> TYPE: DNA
<213> ORGANISM: Artificial Sequence
<220> FEATURE:
<223> OTHER INFORMATION: Primer ill-EC-2-EPCAM-04F

<400> SEQUENCE: 207
tttttttttg gccgtaaact gctttgtgaa taat                                 34

<210> SEQ ID NO 208
<211> LENGTH: 35
<212> TYPE: DNA
<213> ORGANISM: Artificial Sequence
<220> FEATURE:
<223> OTHER INFORMATION: Primer ill-EC-2-EPCAM-04R

<400> SEQUENCE: 208 tttttttttgc caataaaact ctttccaact caagg                               35
```

<210> SEQ ID NO 209
<211> LENGTH: 36
<212> TYPE: DNA
<213> ORGANISM: Artificial Sequence
<220> FEATURE:
<223> OTHER INFORMATION: Primer ill-EC-1-EPCAM-05F

<400> SEQUENCE: 209 tttttttttaa tcatgttaca aagtaagtgt gggaac                          36

<210> SEQ ID NO 210
<211> LENGTH: 34
<212> TYPE: DNA
<213> ORGANISM: Artificial Sequence
<220> FEATURE:
<223> OTHER INFORMATION: Primer ill-EC-1-EPCAM-05R

<400> SEQUENCE: 210 tttttttttat tcatttctgc cttcatcacc aaac                            34

<210> SEQ ID NO 211
<211> LENGTH: 36
<212> TYPE: DNA
<213> ORGANISM: Artificial Sequence
<220> FEATURE:
<223> OTHER INFORMATION: Primer ill-EC-2-EPCAM-06F

<400> SEQUENCE: 211
tttttttttc agtttggcat taaggtttct ttttca                           36

<210> SEQ ID NO 212
<211> LENGTH: 29
<212> TYPE: DNA
<213> ORGANISM: Artificial Sequence
<220> FEATURE:
<223> OTHER INFORMATION: Primer ill-EC-2-EPCAM-06R

<400> SEQUENCE: 212 ttttttttttt aaagagcccg ctctcatcg                                  29

<210> SEQ ID NO 213
<211> LENGTH: 30
<212> TYPE: DNA
<213> ORGANISM: Artificial Sequence
<220> FEATURE:
<223> OTHER INFORMATION: Primer ill-EC-1-EPCAM-07F

<400> SEQUENCE: 213 tttttttttcc tccagaacaa tgatgggctt                                 30

<210> SEQ ID NO 214
<211> LENGTH: 30
<212> TYPE: DNA
<213> ORGANISM: Artificial Sequence
<220> FEATURE:
<223> OTHER INFORMATION: Primer ill-EC-1-EPCAM-07R

<400> SEQUENCE: 214 tttttttttac tcactaggtt ctcactcgct                                 30

<210> SEQ ID NO 215
<211> LENGTH: 34
<212> TYPE: DNA
<213> ORGANISM: Artificial Sequence
<220> FEATURE:
<223> OTHER INFORMATION: Primer ill-EC-2-EPCAM-08F

```
<400> SEQUENCE: 215
ttttttttga acagacaagg acactgaaat aacc                      34

<210> SEQ ID NO 216
<211> LENGTH: 35
<212> TYPE: DNA
<213> ORGANISM: Artificial Sequence
<220> FEATURE:
<223> OTHER INFORMATION: Primer ill-EC-2-EPCAM-08R

<400> SEQUENCE: 216
ttttttttgc ttttcactgg acactcatat cttct                     35

<210> SEQ ID NO 217
<211> LENGTH: 34
<212> TYPE: DNA
<213> ORGANISM: Artificial Sequence
<220> FEATURE:
<223> OTHER INFORMATION: Primer ill-EC-1-EPCAM-09F

<400> SEQUENCE: 217
ttttttttgg aaaatagtat ggaagactga gtta                      34

<210> SEQ ID NO 218
<211> LENGTH: 30
<212> TYPE: DNA
<213> ORGANISM: Artificial Sequence
<220> FEATURE:
<223> OTHER INFORMATION: Primer ill-EC-1-EPCAM-09R

<400> SEQUENCE: 218
ttttttttag atttgagcca ccaactgtgc                           30

<210> SEQ ID NO 219
<211> LENGTH: 34
<212> TYPE: DNA
<213> ORGANISM: Artificial Sequence
<220> FEATURE:
<223> OTHER INFORMATION: Primer ill-EC-2-EPCAM-10F

<400> SEQUENCE: 219
ttttttttgc ttcttactgt tgtgtggtac aaac                      34

<210> SEQ ID NO 220
<211> LENGTH: 33
<212> TYPE: DNA
<213> ORGANISM: Artificial Sequence
<220> FEATURE:
<223> OTHER INFORMATION: Primer ill-EC-2-EPCAM-10R

<400> SEQUENCE: 220
ttttttttat actgtctcac caactgtctg cta                       33

<210> SEQ ID NO 221
<211> LENGTH: 35
<212> TYPE: DNA
<213> ORGANISM: Artificial Sequence
<220> FEATURE:
<223> OTHER INFORMATION: Primer ill-EC-1-EPCAM-11F

<400> SEQUENCE: 221
ttttttttga aaatcaaaca ctgaatattc tgatt                     35

<210> SEQ ID NO 222
```

<211> LENGTH: 35
<212> TYPE: DNA
<213> ORGANISM: Artificial Sequence
<220> FEATURE:
<223> OTHER INFORMATION: Primer ill-EC-1-EPCAM-11R

<400> SEQUENCE: 222 tttttttttgc tatgtccaca tcattctgag ttttt    35

<210> SEQ ID NO 223
<211> LENGTH: 36
<212> TYPE: DNA
<213> ORGANISM: Artificial Sequence
<220> FEATURE:
<223> OTHER INFORMATION: Primer ill-EC-2-EPCAM-12F

<400> SEQUENCE: 223
tttttttttt tccccagtat gagaataatg ttatca    36

<210> SEQ ID NO 224
<211> LENGTH: 34
<212> TYPE: DNA
<213> ORGANISM: Artificial Sequence
<220> FEATURE:
<223> OTHER INFORMATION: Primer ill-EC-2-EPCAM-12R

<400> SEQUENCE: 224
tttttttttt gaggcatgat agactacatt cctg    34

<210> SEQ ID NO 225
<211> LENGTH: 30
<212> TYPE: DNA
<213> ORGANISM: Artificial Sequence
<220> FEATURE:
<223> OTHER INFORMATION: Primer ill-EC-1-EPCAM-13F

<400> SEQUENCE: 225 tttttttaa gattcttggc agcggttctt    30

<210> SEQ ID NO 226
<211> LENGTH: 33
<212> TYPE: DNA
<213> ORGANISM: Artificial Sequence
<220> FEATURE:
<223> OTHER INFORMATION: Primer ill-EC-1-EPCAM-13R

<400> SEQUENCE: 226 tttttttat ccagttgttc cccatttact gtc    33

<210> SEQ ID NO 227
<211> LENGTH: 36
<212> TYPE: DNA
<213> ORGANISM: Artificial Sequence
<220> FEATURE:
<223> OTHER INFORMATION: Primer ill-EC-2-EPCAM-14F

<400> SEQUENCE: 227
tttttttttt ttaattcctt ttctccttttt caatac    36

<210> SEQ ID NO 228
<211> LENGTH: 29
<212> TYPE: DNA
<213> ORGANISM: Artificial Sequence
<220> FEATURE:
<223> OTHER INFORMATION: Primer ill-EC-2-EPCAM-14R

<400> SEQUENCE: 228 tttttttttac cagcttttag accctgcat 29

<210> SEQ ID NO 229
<211> LENGTH: 35
<212> TYPE: DNA
<213> ORGANISM: Artificial Sequence
<220> FEATURE:
<223> OTHER INFORMATION: Primer ill-EC-1-EPCAM-15F

<400> SEQUENCE: 229 tttttttgt tgatgaaaaa gcacctgaat tctca 35

<210> SEQ ID NO 230
<211> LENGTH: 35
<212> TYPE: DNA
<213> ORGANISM: Artificial Sequence
<220> FEATURE:
<223> OTHER INFORMATION: Primer ill-EC-1-EPCAM-15R

<400> SEQUENCE: 230 tttttttgc ccagccacta ttactttttc ttgaa 35

<210> SEQ ID NO 231
<211> LENGTH: 34
<212> TYPE: DNA
<213> ORGANISM: Artificial Sequence
<220> FEATURE:
<223> OTHER INFORMATION: Primer ill-EC-1-EPCAM-16F

<400> SEQUENCE: 231 tttttttg tccattaaaa gcatatatgt ctgt 34

<210> SEQ ID NO 232
<211> LENGTH: 33
<212> TYPE: DNA
<213> ORGANISM: Artificial Sequence
<220> FEATURE:
<223> OTHER INFORMATION: Primer ill-EC-1-EPCAM-16R

<400> SEQUENCE: 232 ttttttttt caacagggcc tttctattta ggt 33

<210> SEQ ID NO 233
<211> LENGTH: 35
<212> TYPE: DNA
<213> ORGANISM: Artificial Sequence
<220> FEATURE:
<223> OTHER INFORMATION: Primer ill-EC-2-EPCAM-17F

<400> SEQUENCE: 233 tttttttca atagttgtct ttcttccact caggt 35

<210> SEQ ID NO 234
<211> LENGTH: 34
<212> TYPE: DNA
<213> ORGANISM: Artificial Sequence
<220> FEATURE:
<223> OTHER INFORMATION: Primer ill-EC-2-EPCAM-17R

<400> SEQUENCE: 234 tttttttaa gggactccag tataactgaa atgc 34

<210> SEQ ID NO 235
<211> LENGTH: 35
<212> TYPE: DNA

```
<213> ORGANISM: Artificial Sequence
<220> FEATURE:
<223> OTHER INFORMATION: Primer ill-EC-2-EPCAM-18F

<400> SEQUENCE: 235
tttttttttt tttctgtgct ttttcctgtt tcaga                              35

<210> SEQ ID NO 236
<211> LENGTH: 34
<212> TYPE: DNA
<213> ORGANISM: Artificial Sequence
<220> FEATURE:
<223> OTHER INFORMATION: Primer ill-EC-2-EPCAM-18R

<400> SEQUENCE: 236 tttttttttaa actcatgacc ttcaaagatg tctt                              34

<210> SEQ ID NO 237
<211> LENGTH: 29
<212> TYPE: DNA
<213> ORGANISM: Artificial Sequence
<220> FEATURE:
<223> OTHER INFORMATION: Primer ill-EC-1-MSH2-01F

<400> SEQUENCE: 237 tttttttttgg aaacagctta gtgggtgtg                                    29

<210> SEQ ID NO 238
<211> LENGTH: 27
<212> TYPE: DNA
<213> ORGANISM: Artificial Sequence
<220> FEATURE:
<223> OTHER INFORMATION: Primer ill-EC-1-MSH2-01R

<400> SEQUENCE: 238 tttttttttga aaggcgcac tgtggtg                                       27

<210> SEQ ID NO 239
<211> LENGTH: 25
<212> TYPE: DNA
<213> ORGANISM: Artificial Sequence
<220> FEATURE:
<223> OTHER INFORMATION: Primer ill-EC-2-MSH2-02F

<400> SEQUENCE: 239 tttttttttcg gccgaggtcg gcttc                                        25

<210> SEQ ID NO 240
<211> LENGTH: 26
<212> TYPE: DNA
<213> ORGANISM: Artificial Sequence
<220> FEATURE:
<223> OTHER INFORMATION: Primer ill-EC-2-MSH2-02R

<400> SEQUENCE: 240 tttttttttac ctgccggccc catgta                                       26

<210> SEQ ID NO 241
<211> LENGTH: 26
<212> TYPE: DNA
<213> ORGANISM: Artificial Sequence
<220> FEATURE:
<223> OTHER INFORMATION: Primer ill-EC-1-MSH2-02F

<400> SEQUENCE: 241 tttttttttcg cccgggaggt gttcaa                                       26
```

<210> SEQ ID NO 242
<211> LENGTH: 27
<212> TYPE: DNA
<213> ORGANISM: Artificial Sequence
<220> FEATURE:
<223> OTHER INFORMATION: Primer ill-EC-1-MSH2-02R

<400> SEQUENCE: 242 tttttttcc actctctgag gcgggaa                                    27

<210> SEQ ID NO 243
<211> LENGTH: 37
<212> TYPE: DNA
<213> ORGANISM: Artificial Sequence
<220> FEATURE:
<223> OTHER INFORMATION: Primer ill-EC-2-MSH2-03F

<400> SEQUENCE: 243 tttttttac agtgcttgaa catgtaatat ctcaaat                         37

<210> SEQ ID NO 244
<211> LENGTH: 36
<212> TYPE: DNA
<213> ORGANISM: Artificial Sequence
<220> FEATURE:
<223> OTHER INFORMATION: Primer ill-EC-2-MSH2-03R

<400> SEQUENCE: 244 tttttttaa acttcaactc tatactgacg aaccag                          36

<210> SEQ ID NO 245
<211> LENGTH: 34
<212> TYPE: DNA
<213> ORGANISM: Artificial Sequence
<220> FEATURE:
<223> OTHER INFORMATION: Primer ill-EC-1-MSH2-03F

<400> SEQUENCE: 245 tttttttt taaggagcaa agaatctgca gagt                             34

<210> SEQ ID NO 246
<211> LENGTH: 37
<212> TYPE: DNA
<213> ORGANISM: Artificial Sequence
<220> FEATURE:
<223> OTHER INFORMATION: Primer ill-EC-1-MSH2-03R

<400> SEQUENCE: 246 tttttttag gaagataatt accttatatg ccaaata                         37

<210> SEQ ID NO 247
<211> LENGTH: 34
<212> TYPE: DNA
<213> ORGANISM: Artificial Sequence
<220> FEATURE:
<223> OTHER INFORMATION: Primer ill-EC-2-MSH2-04F

<400> SEQUENCE: 247 tttttttag aatagagctg gaaataaggc atcc                            34

<210> SEQ ID NO 248
<211> LENGTH: 38
<212> TYPE: DNA
<213> ORGANISM: Artificial Sequence
<220> FEATURE:

<223> OTHER INFORMATION: Primer ill-EC-2-MSH2-04R

<400> SEQUENCE: 248 tttttttttgt gtctcaaacc attctactat cacaatct         38

<210> SEQ ID NO 249
<211> LENGTH: 36
<212> TYPE: DNA
<213> ORGANISM: Artificial Sequence
<220> FEATURE:
<223> OTHER INFORMATION: Primer ill-EC-1-MSH2-04F

<400> SEQUENCE: 249 tttttttga gtttggattt ttccttttg cttata         36

<210> SEQ ID NO 250
<211> LENGTH: 30
<212> TYPE: DNA
<213> ORGANISM: Artificial Sequence
<220> FEATURE:
<223> OTHER INFORMATION: Primer ill-EC-1-MSH2-04R

<400> SEQUENCE: 250 tttttttcc acaacaccaa tggaagctga         30

<210> SEQ ID NO 251
<211> LENGTH: 31
<212> TYPE: DNA
<213> ORGANISM: Artificial Sequence
<220> FEATURE:
<223> OTHER INFORMATION: Primer ill-EC-2-MSH2-05F

<400> SEQUENCE: 251 tttttttct taggcttctc ctggcaatct c         31

<210> SEQ ID NO 252
<211> LENGTH: 33
<212> TYPE: DNA
<213> ORGANISM: Artificial Sequence
<220> FEATURE:
<223> OTHER INFORMATION: Primer ill-EC-2-MSH2-05R

<400> SEQUENCE: 252 tttttttgg gaattcacac agtcctagtt tcc         33

<210> SEQ ID NO 253
<211> LENGTH: 32
<212> TYPE: DNA
<213> ORGANISM: Artificial Sequence
<220> FEATURE:
<223> OTHER INFORMATION: Primer ill-EC-1-MSH2-05F

<400> SEQUENCE: 253 tttttttgg tgttaaaatg tccgcagttg at         32

<210> SEQ ID NO 254
<211> LENGTH: 30
<212> TYPE: DNA
<213> ORGANISM: Artificial Sequence
<220> FEATURE:
<223> OTHER INFORMATION: Primer ill-EC-1-MSH2-05R

<400> SEQUENCE: 254 tttttttgt ctctcctccg ggtaaaacac         30

```
<210> SEQ ID NO 255
<211> LENGTH: 32
<212> TYPE: DNA
<213> ORGANISM: Artificial Sequence
<220> FEATURE:
<223> OTHER INFORMATION: Primer ill-EC-2-MSH2-06F

<400> SEQUENCE: 255
ttttttttga tcagttctcc aatcttgagg ct                              32

<210> SEQ ID NO 256
<211> LENGTH: 35
<212> TYPE: DNA
<213> ORGANISM: Artificial Sequence
<220> FEATURE:
<223> OTHER INFORMATION: Primer ill-EC-2-MSH2-06R

<400> SEQUENCE: 256
ttttttttaa cagtatcatg tcaattaaag agcct                           35

<210> SEQ ID NO 257
<211> LENGTH: 37
<212> TYPE: DNA
<213> ORGANISM: Artificial Sequence
<220> FEATURE:
<223> OTHER INFORMATION: Primer ill-EC-1-MSH2-06F

<400> SEQUENCE: 257
tttttttttt cattttgct ttcttattc cttttct                           37

<210> SEQ ID NO 258
<211> LENGTH: 30
<212> TYPE: DNA
<213> ORGANISM: Artificial Sequence
<220> FEATURE:
<223> OTHER INFORMATION: Primer ill-EC-1-MSH2-06R

<400> SEQUENCE: 258 ttttttttg cctttcaaca accggttgag                                  30

<210> SEQ ID NO 259
<211> LENGTH: 34
<212> TYPE: DNA
<213> ORGANISM: Artificial Sequence
<220> FEATURE:
<223> OTHER INFORMATION: Primer ill-EC-2-MSH2-07F

<400> SEQUENCE: 259
tttttttttt caaagaggag gaattctgat caca                            34

<210> SEQ ID NO 260
<211> LENGTH: 37
<212> TYPE: DNA
<213> ORGANISM: Artificial Sequence
<220> FEATURE:
<223> OTHER INFORMATION: Primer ill-EC-2-MSH2-07R

<400> SEQUENCE: 260
ttttttttat tcacatttat aatccatgta cctgatt                         37

<210> SEQ ID NO 261
<211> LENGTH: 32
<212> TYPE: DNA
<213> ORGANISM: Artificial Sequence
<220> FEATURE:
<223> OTHER INFORMATION: Primer ill-EC-1-MSH2-07F
```

```
<400> SEQUENCE: 261
ttttttttgg agagcagatg aatagtgctg ta                    32

<210> SEQ ID NO 262
<211> LENGTH: 35
<212> TYPE: DNA
<213> ORGANISM: Artificial Sequence
<220> FEATURE:
<223> OTHER INFORMATION: Primer ill-EC-1-MSH2-07R

<400> SEQUENCE: 262
ttttttttca cagtttaggt tttgagataa atatg                 35

<210> SEQ ID NO 263
<211> LENGTH: 36
<212> TYPE: DNA
<213> ORGANISM: Artificial Sequence
<220> FEATURE:
<223> OTHER INFORMATION: Primer ill-EC-2-MSH2-08F

<400> SEQUENCE: 263
ttttttttag aactggatcc agtggtatag aaatct                36

<210> SEQ ID NO 264
<211> LENGTH: 33
<212> TYPE: DNA
<213> ORGANISM: Artificial Sequence
<220> FEATURE:
<223> OTHER INFORMATION: Primer ill-EC-2-MSH2-08R

<400> SEQUENCE: 264
ttttttttac tggctgaagt caaaagtagt cag                   33

<210> SEQ ID NO 265
<211> LENGTH: 35
<212> TYPE: DNA
<213> ORGANISM: Artificial Sequence
<220> FEATURE:
<223> OTHER INFORMATION: Primer ill-EC-1-MSH2-08F

<400> SEQUENCE: 265
ttttttttaa ttttaggttg cagtttcatc actgt                 35

<210> SEQ ID NO 266
<211> LENGTH: 31
<212> TYPE: DNA
<213> ORGANISM: Artificial Sequence
<220> FEATURE:
<223> OTHER INFORMATION: Primer ill-EC-1-MSH2-08R

<400> SEQUENCE: 266
ttttttttac ctgaaaaagg ttaagggctc t                     31

<210> SEQ ID NO 267
<211> LENGTH: 36
<212> TYPE: DNA
<213> ORGANISM: Artificial Sequence
<220> FEATURE:
<223> OTHER INFORMATION: Primer ill-EC-2-MSH2-09F

<400> SEQUENCE: 267
ttttttttta aggttttcac taatgagctt gccatt                36

<210> SEQ ID NO 268
<211> LENGTH: 33
```

```
<212> TYPE: DNA
<213> ORGANISM: Artificial Sequence
<220> FEATURE:
<223> OTHER INFORMATION: Primer ill-EC-2-MSH2-09R

<400> SEQUENCE: 268 tttttttttgt tcttatccat gagaggctgc tta                              33

<210> SEQ ID NO 269
<211> LENGTH: 33
<212> TYPE: DNA
<213> ORGANISM: Artificial Sequence
<220> FEATURE:
<223> OTHER INFORMATION: Primer ill-EC-1-MSH2-09F

<400> SEQUENCE: 269 tttttttttgc tgccttgctg aataagtgta aaa                              33

<210> SEQ ID NO 270
<211> LENGTH: 35
<212> TYPE: DNA
<213> ORGANISM: Artificial Sequence
<220> FEATURE:
<223> OTHER INFORMATION: Primer ill-EC-1-MSH2-09R

<400> SEQUENCE: 270
ttttttttaa gtggtataat catgtgggta actgc                             35

<210> SEQ ID NO 271
<211> LENGTH: 39
<212> TYPE: DNA
<213> ORGANISM: Artificial Sequence
<220> FEATURE:
<223> OTHER INFORMATION: Primer ill-EC-2-MSH2-10F

<400> SEQUENCE: 271 ttttttttc aagcttttta aatggaattt tgagctgat                          39

<210> SEQ ID NO 272
<211> LENGTH: 35
<212> TYPE: DNA
<213> ORGANISM: Artificial Sequence
<220> FEATURE:
<223> OTHER INFORMATION: Primer ill-EC-2-MSH2-10R

<400> SEQUENCE: 272 ttttttttc ttcttgtaaa gtctgcctca attct                              35

<210> SEQ ID NO 273
<211> LENGTH: 35
<212> TYPE: DNA
<213> ORGANISM: Artificial Sequence
<220> FEATURE:
<223> OTHER INFORMATION: Primer ill-EC-1-MSH2-10F

<400> SEQUENCE: 273
tttttttttt atttcagatt gaatttagtg gaagc                             35

<210> SEQ ID NO 274
<211> LENGTH: 36
<212> TYPE: DNA
<213> ORGANISM: Artificial Sequence
<220> FEATURE:
<223> OTHER INFORMATION: Primer ill-EC-1-MSH2-10R

<400> SEQUENCE: 274
``` tttttttttag ttgatttata ccctgataga gtcggt                36

<210> SEQ ID NO 275
<211> LENGTH: 33
<212> TYPE: DNA
<213> ORGANISM: Artificial Sequence
<220> FEATURE:
<223> OTHER INFORMATION: Primer ill-EC-2-MSH2-11F

<400> SEQUENCE: 275
tttttttttt gccaagaagt ttcaaagaca agc                33

<210> SEQ ID NO 276
<211> LENGTH: 35
<212> TYPE: DNA
<213> ORGANISM: Artificial Sequence
<220> FEATURE:
<223> OTHER INFORMATION: Primer ill-EC-2-MSH2-11R

<400> SEQUENCE: 276
ttttttttga cagcacattg ccaagtatat attgt                35

<210> SEQ ID NO 277
<211> LENGTH: 36
<212> TYPE: DNA
<213> ORGANISM: Artificial Sequence
<220> FEATURE:
<223> OTHER INFORMATION: Primer ill-EC-1-MSH2-11F

<400> SEQUENCE: 277
ttttttttac cttttggatc aaatgatgct tgttta                36

<210> SEQ ID NO 278
<211> LENGTH: 33
<212> TYPE: DNA
<213> ORGANISM: Artificial Sequence
<220> FEATURE:
<223> OTHER INFORMATION: Primer ill-EC-1-MSH2-11R

<400> SEQUENCE: 278
ttttttttct tggagaagtc agaacgaaga tca                33

<210> SEQ ID NO 279
<211> LENGTH: 36
<212> TYPE: DNA
<213> ORGANISM: Artificial Sequence
<220> FEATURE:
<223> OTHER INFORMATION: Primer ill-EC-2-MSH2-12F

<400> SEQUENCE: 279
ttttttttcc agaaattatt gttggcagtt tttgtg                36

<210> SEQ ID NO 280
<211> LENGTH: 35
<212> TYPE: DNA
<213> ORGANISM: Artificial Sequence
<220> FEATURE:
<223> OTHER INFORMATION: Primer ill-EC-2-MSH2-12R

<400> SEQUENCE: 280
ttttttttta caaactttct taaagtggcc tttgc                35

<210> SEQ ID NO 281
<211> LENGTH: 35
<212> TYPE: DNA
<213> ORGANISM: Artificial Sequence

```
<220> FEATURE:
<223> OTHER INFORMATION: Primer ill-EC-1-MSH2-12F

<400> SEQUENCE: 281 ttttttttg aaaacagtaa aatttaagtg ggagg                           35

<210> SEQ ID NO 282
<211> LENGTH: 34
<212> TYPE: DNA
<213> ORGANISM: Artificial Sequence
<220> FEATURE:
<223> OTHER INFORMATION: Primer ill-EC-1-MSH2-12R

<400> SEQUENCE: 282
tttttttttt cactgagatt aggatcaaat gaag                            34

<210> SEQ ID NO 283
<211> LENGTH: 35
<212> TYPE: DNA
<213> ORGANISM: Artificial Sequence
<220> FEATURE:
<223> OTHER INFORMATION: Primer ill-EC-2-MSH2-13F

<400> SEQUENCE: 283
ttttttttga ttttgtcact tgttctgtt tgcag                            35

<210> SEQ ID NO 284
<211> LENGTH: 33
<212> TYPE: DNA
<213> ORGANISM: Artificial Sequence
<220> FEATURE:
<223> OTHER INFORMATION: Primer ill-EC-2-MSH2-13R

<400> SEQUENCE: 284
ttttttttca acctccaatg acccattctt acc                             33

<210> SEQ ID NO 285
<211> LENGTH: 34
<212> TYPE: DNA
<213> ORGANISM: Artificial Sequence
<220> FEATURE:
<223> OTHER INFORMATION: Primer ill-EC-1-MSH2-13F

<400> SEQUENCE: 285
ttttttttag tcaacattaa taagtgcagc caga                            34

<210> SEQ ID NO 286
<211> LENGTH: 30
<212> TYPE: DNA
<213> ORGANISM: Artificial Sequence
<220> FEATURE:
<223> OTHER INFORMATION: Primer ill-EC-1-MSH2-13R

<400> SEQUENCE: 286 ttttttttg ttgggcgatt tctgtttgac                                  30

<210> SEQ ID NO 287
<211> LENGTH: 39
<212> TYPE: DNA
<213> ORGANISM: Artificial Sequence
<220> FEATURE:
<223> OTHER INFORMATION: Primer ill-EC-2-MSH2-14F

<400> SEQUENCE: 287
ttttttttac attgaaaaat ggtagtaggt atttatgga                       39
```

<210> SEQ ID NO 288
<211> LENGTH: 40
<212> TYPE: DNA
<213> ORGANISM: Artificial Sequence
<220> FEATURE:
<223> OTHER INFORMATION: Primer ill-EC-2-MSH2-14R

<400> SEQUENCE: 288 tttttttttgt ttttattgtt acgaaggact ttttcttcct          40

<210> SEQ ID NO 289
<211> LENGTH: 37
<212> TYPE: DNA
<213> ORGANISM: Artificial Sequence
<220> FEATURE:
<223> OTHER INFORMATION: Primer ill-EC-1-MSH2-14F

<400> SEQUENCE: 289 tttttttag tttggatatt actttcgtgt aacctgt               37

<210> SEQ ID NO 290
<211> LENGTH: 37
<212> TYPE: DNA
<213> ORGANISM: Artificial Sequence
<220> FEATURE:
<223> OTHER INFORMATION: Primer ill-EC-1-MSH2-14R

<400> SEQUENCE: 290
tttttttttt cacatcatgt tagagcattt agggaat              37

<210> SEQ ID NO 291
<211> LENGTH: 36
<212> TYPE: DNA
<213> ORGANISM: Artificial Sequence
<220> FEATURE:
<223> OTHER INFORMATION: Primer ill-EC-2-MSH2-15F

<400> SEQUENCE: 291 tttttttac tttggatatg tttcacgtag tacaca                36

<210> SEQ ID NO 292
<211> LENGTH: 32
<212> TYPE: DNA
<213> ORGANISM: Artificial Sequence
<220> FEATURE:
<223> OTHER INFORMATION: Primer ill-EC-2-MSH2-15R

<400> SEQUENCE: 292 tttttttgg catcctgggc ttcttcatat tc                    32

<210> SEQ ID NO 293
<211> LENGTH: 38
<212> TYPE: DNA
<213> ORGANISM: Artificial Sequence
<220> FEATURE:
<223> OTHER INFORMATION: Primer ill-EC-1-MSH2-15F

<400> SEQUENCE: 293 tttttttg cagcaaattg acttctttaa atgaagag              38

<210> SEQ ID NO 294
<211> LENGTH: 33
<212> TYPE: DNA
<213> ORGANISM: Artificial Sequence
<220> FEATURE:
<223> OTHER INFORMATION: Primer ill-EC-1-MSH2-15R

<400> SEQUENCE: 294
tttttttttt accaaaagcc aggtgacatt cag                33

<210> SEQ ID NO 295
<211> LENGTH: 34
<212> TYPE: DNA
<213> ORGANISM: Artificial Sequence
<220> FEATURE:
<223> OTHER INFORMATION: Primer ill-EC-2-MSH2-16F

<400> SEQUENCE: 295
ttttttttga aatgggtttt gaattcccaa atgg               34

<210> SEQ ID NO 296
<211> LENGTH: 32
<212> TYPE: DNA
<213> ORGANISM: Artificial Sequence
<220> FEATURE:
<223> OTHER INFORMATION: Primer ill-EC-2-MSH2-16R

<400> SEQUENCE: 296 tttttttac aacagcatct agctgagcta ac                  32

<210> SEQ ID NO 297
<211> LENGTH: 34
<212> TYPE: DNA
<213> ORGANISM: Artificial Sequence
<220> FEATURE:
<223> OTHER INFORMATION: Primer ill-EC-1-MSH2-16F

<400> SEQUENCE: 297
ttttttttat acaggctatg tagaaccaat gcag               34

<210> SEQ ID NO 298
<211> LENGTH: 37
<212> TYPE: DNA
<213> ORGANISM: Artificial Sequence
<220> FEATURE:
<223> OTHER INFORMATION: Primer ill-EC-1-MSH2-16R

<400> SEQUENCE: 298
ttttttttgc atgcctggat gcttttaata taattct            37

<210> SEQ ID NO 299
<211> LENGTH: 30
<212> TYPE: DNA
<213> ORGANISM: Artificial Sequence
<220> FEATURE:
<223> OTHER INFORMATION: Primer ill-EC-2-MSH2-17F

<400> SEQUENCE: 299
ttttttttga gcacctgttc catatgtacg                    30

<210> SEQ ID NO 300
<211> LENGTH: 37
<212> TYPE: DNA
<213> ORGANISM: Artificial Sequence
<220> FEATURE:
<223> OTHER INFORMATION: Primer ill-EC-2-MSH2-17R

<400> SEQUENCE: 300
tttttttttt ttaccagtaa tgatgtggaa catctgt            37

<210> SEQ ID NO 301

```
<211> LENGTH: 40
<212> TYPE: DNA
<213> ORGANISM: Artificial Sequence
<220> FEATURE:
<223> OTHER INFORMATION: Primer ill-EC-1-MSH2-17F

<400> SEQUENCE: 301 tttttttat tgcatttatt cctaatgacg tatactttga                    40

<210> SEQ ID NO 302
<211> LENGTH: 40
<212> TYPE: DNA
<213> ORGANISM: Artificial Sequence
<220> FEATURE:
<223> OTHER INFORMATION: Primer ill-EC-1-MSH2-17R

<400> SEQUENCE: 302 tttttttga actgggaatt ttctccatca attttaaata                    40

<210> SEQ ID NO 303
<211> LENGTH: 34
<212> TYPE: DNA
<213> ORGANISM: Artificial Sequence
<220> FEATURE:
<223> OTHER INFORMATION: Primer ill-EC-2-MSH2-18F

<400> SEQUENCE: 303
ttttttttac ctacgcgatt aatcatcagt gtac                         34

<210> SEQ ID NO 304
<211> LENGTH: 33
<212> TYPE: DNA
<213> ORGANISM: Artificial Sequence
<220> FEATURE:
<223> OTHER INFORMATION: Primer ill-EC-2-MSH2-18R

<400> SEQUENCE: 304
ttttttttcc caatttgggc catgagtact atc                          33

<210> SEQ ID NO 305
<211> LENGTH: 32
<212> TYPE: DNA
<213> ORGANISM: Artificial Sequence
<220> FEATURE:
<223> OTHER INFORMATION: Primer ill-EC-1-MSH2-18F

<400> SEQUENCE: 305 tttttttgc cccaatatgg gaggtaaatc aa                            32

<210> SEQ ID NO 306
<211> LENGTH: 32
<212> TYPE: DNA
<213> ORGANISM: Artificial Sequence
<220> FEATURE:
<223> OTHER INFORMATION: Primer ill-EC-1-MSH2-18R

<400> SEQUENCE: 306
ttttttttac gtggagactc ctttcaattg ac                           32

<210> SEQ ID NO 307
<211> LENGTH: 30
<212> TYPE: DNA
<213> ORGANISM: Artificial Sequence
<220> FEATURE:
<223> OTHER INFORMATION: Primer ill-EC-2-MSH2-19F

<400> SEQUENCE: 307
```
ttttttttga ctgcatctta gcccgagtag          30

<210> SEQ ID NO 308
<211> LENGTH: 36
<212> TYPE: DNA
<213> ORGANISM: Artificial Sequence
<220> FEATURE:
<223> OTHER INFORMATION: Primer ill-EC-2-MSH2-19R

<400> SEQUENCE: 308
ttttttttct gcaaatatac ttttccttct cacagg          36

<210> SEQ ID NO 309
<211> LENGTH: 34
<212> TYPE: DNA
<213> ORGANISM: Artificial Sequence
<220> FEATURE:
<223> OTHER INFORMATION: Primer ill-EC-1-MSH2-19F

<400> SEQUENCE: 309
ttttttttgg catatccttc ccaatgtatt gtct          34

<210> SEQ ID NO 310
<211> LENGTH: 34
<212> TYPE: DNA
<213> ORGANISM: Artificial Sequence
<220> FEATURE:
<223> OTHER INFORMATION: Primer ill-EC-1-MSH2-19R

<400> SEQUENCE: 310
ttttttttct aacccaaatc catcgtaggt agaa          34

<210> SEQ ID NO 311
<211> LENGTH: 32
<212> TYPE: DNA
<213> ORGANISM: Artificial Sequence
<220> FEATURE:
<223> OTHER INFORMATION: Primer ill-EC-2-MSH2-20F

<400> SEQUENCE: 311
ttttttttaa ttatgtgctt caggtctgca ac          32

<210> SEQ ID NO 312
<211> LENGTH: 34
<212> TYPE: DNA
<213> ORGANISM: Artificial Sequence
<220> FEATURE:
<223> OTHER INFORMATION: Primer ill-EC-2-MSH2-20R

<400> SEQUENCE: 312
ttttttttca aggcagtaag ttcatgaaaa tggg          34

<210> SEQ ID NO 313
<211> LENGTH: 35
<212> TYPE: DNA
<213> ORGANISM: Artificial Sequence
<220> FEATURE:
<223> OTHER INFORMATION: Primer ill-EC-1-MSH2-20F

<400> SEQUENCE: 313 ttttttttg ggctatatca gaatacattg caaca          35

<210> SEQ ID NO 314
<211> LENGTH: 35
<212> TYPE: DNA

```
<213> ORGANISM: Artificial Sequence
<220> FEATURE:
<223> OTHER INFORMATION: Primer ill-EC-1-MSH2-20R

<400> SEQUENCE: 314 tttttttttac ataccttct tcacctgata aagca                              35

<210> SEQ ID NO 315
<211> LENGTH: 32
<212> TYPE: DNA
<213> ORGANISM: Artificial Sequence
<220> FEATURE:
<223> OTHER INFORMATION: Primer ill-EC-2-MSH2-21F

<400> SEQUENCE: 315 tttttttttct tggccaatca gataccaact gt                                32

<210> SEQ ID NO 316
<211> LENGTH: 34
<212> TYPE: DNA
<213> ORGANISM: Artificial Sequence
<220> FEATURE:
<223> OTHER INFORMATION: Primer ill-EC-2-MSH2-21R

<400> SEQUENCE: 316 tttttttttag gcaattactg atgatttcaa gggt                              34

<210> SEQ ID NO 317
<211> LENGTH: 36
<212> TYPE: DNA
<213> ORGANISM: Artificial Sequence
<220> FEATURE:
<223> OTHER INFORMATION: Primer ill-EC-1-MSH2-21F

<400> SEQUENCE: 317
ttttttttta cataaattgc tgtctcttct catgct                             36

<210> SEQ ID NO 318
<211> LENGTH: 32
<212> TYPE: DNA
<213> ORGANISM: Artificial Sequence
<220> FEATURE:
<223> OTHER INFORMATION: Primer ill-EC-1-MSH2-21R

<400> SEQUENCE: 318 tttttttttca agttccaggg ctttctgttt ag                                32

<210> SEQ ID NO 319
<211> LENGTH: 33
<212> TYPE: DNA
<213> ORGANISM: Artificial Sequence
<220> FEATURE:
<223> OTHER INFORMATION: Primer ill-EC-2-MSH2-22F

<400> SEQUENCE: 319 tttttttttcg cttccccaaa tttcttatag gtg                               33

<210> SEQ ID NO 320
<211> LENGTH: 33
<212> TYPE: DNA
<213> ORGANISM: Artificial Sequence
<220> FEATURE:
<223> OTHER INFORMATION: Primer ill-EC-2-MSH2-22R

<400> SEQUENCE: 320
tttttttttt gctgctggtt ccatgatatc ata                                33
```

<210> SEQ ID NO 321
<211> LENGTH: 36
<212> TYPE: DNA
<213> ORGANISM: Artificial Sequence
<220> FEATURE:
<223> OTHER INFORMATION: Primer ill-EC-1-MSH2-22F

<400> SEQUENCE: 321 tttttttttgg aacttgagga gtttcagtat attgga           36

<210> SEQ ID NO 322
<211> LENGTH: 38
<212> TYPE: DNA
<213> ORGANISM: Artificial Sequence
<220> FEATURE:
<223> OTHER INFORMATION: Primer ill-EC-1-MSH2-22R

<400> SEQUENCE: 322 tttttttttaa aaccttcatc ttagtgtcct gtttatgt        38

<210> SEQ ID NO 323
<211> LENGTH: 36
<212> TYPE: DNA
<213> ORGANISM: Artificial Sequence
<220> FEATURE:
<223> OTHER INFORMATION: Primer ill-EC-2-MSH2-23F

<400> SEQUENCE: 323 tttttttttga tggaaatgaa acaatttgtc actgtc          36

<210> SEQ ID NO 324
<211> LENGTH: 33
<212> TYPE: DNA
<213> ORGANISM: Artificial Sequence
<220> FEATURE:
<223> OTHER INFORMATION: Primer ill-EC-2-MSH2-23R

<400> SEQUENCE: 324 tttttttttgt aaagggcatt tgtttcacct tgg             33

<210> SEQ ID NO 325
<211> LENGTH: 36
<212> TYPE: DNA
<213> ORGANISM: Artificial Sequence
<220> FEATURE:
<223> OTHER INFORMATION: Primer ill-EC-1-MSH2-23F

<400> SEQUENCE: 325 tttttttttta ctaatgggac attcacatgt gtttca          36

<210> SEQ ID NO 326
<211> LENGTH: 37
<212> TYPE: DNA
<213> ORGANISM: Artificial Sequence
<220> FEATURE:
<223> OTHER INFORMATION: Primer ill-EC-1-MSH2-23R

<400> SEQUENCE: 326 tttttttttct ttgctattac ttcagctttt agctgtt         37

<210> SEQ ID NO 327
<211> LENGTH: 37
<212> TYPE: DNA
<213> ORGANISM: Artificial Sequence
<220> FEATURE:

```
<223> OTHER INFORMATION: Primer ill-EC-2-MSH2-24F

<400> SEQUENCE: 327 tttttttttcc ctttactgaa atgtcagaag aaaacat                              37

<210> SEQ ID NO 328
<211> LENGTH: 37
<212> TYPE: DNA
<213> ORGANISM: Artificial Sequence
<220> FEATURE:
<223> OTHER INFORMATION: Primer ill-EC-2-MSH2-24R

<400> SEQUENCE: 328 tttttttttca gacaatagct tatcaatatt accttca                              37

<210> SEQ ID NO 329
<211> LENGTH: 33
<212> TYPE: DNA
<213> ORGANISM: Artificial Sequence
<220> FEATURE:
<223> OTHER INFORMATION: Primer ill-EC-1-MSH2-24F

<400> SEQUENCE: 329 tttttttttac gaataaaagt tactacgtga aaa                                  33

<210> SEQ ID NO 330
<211> LENGTH: 32
<212> TYPE: DNA
<213> ORGANISM: Artificial Sequence
<220> FEATURE:
<223> OTHER INFORMATION: Primer ill-EC-1-MSH2-24R

<400> SEQUENCE: 330 tttttttttca tgggcactga cagttaacac ta                                   32

<210> SEQ ID NO 331
<211> LENGTH: 25
<212> TYPE: DNA
<213> ORGANISM: Artificial Sequence
<220> FEATURE:
<223> OTHER INFORMATION: Primer ill-EC-1-MSH6-01F

<400> SEQUENCE: 331 tttttttttga gccgcgcggt agatg                                           25

<210> SEQ ID NO 332
<211> LENGTH: 25
<212> TYPE: DNA
<213> ORGANISM: Artificial Sequence
<220> FEATURE:
<223> OTHER INFORMATION: Primer ill-EC-1-MSH6-01R

<400> SEQUENCE: 332 tttttttttgg ccgccttcgc gtgag                                           25

<210> SEQ ID NO 333
<211> LENGTH: 25
<212> TYPE: DNA
<213> ORGANISM: Artificial Sequence
<220> FEATURE:
<223> OTHER INFORMATION: Primer ill-EC-2-MSH6-02F

<400> SEQUENCE: 333 tttttttttca agtctccggc gctga                                           25
```

```
<210> SEQ ID NO 334
<211> LENGTH: 26
<212> TYPE: DNA
<213> ORGANISM: Artificial Sequence
<220> FEATURE:
<223> OTHER INFORMATION: Primer ill-EC-2-MSH6-02R

<400> SEQUENCE: 334 tttttttttct tcgccttggg cggtga                                    26

<210> SEQ ID NO 335
<211> LENGTH: 25
<212> TYPE: DNA
<213> ORGANISM: Artificial Sequence
<220> FEATURE:
<223> OTHER INFORMATION: Primer ill-EC-1-MSH6-02F

<400> SEQUENCE: 335 tttttttttga tgcggcctgg agcga                                     25

<210> SEQ ID NO 336
<211> LENGTH: 25
<212> TYPE: DNA
<213> ORGANISM: Artificial Sequence
<220> FEATURE:
<223> OTHER INFORMATION: Primer ill-EC-1-MSH6-02R

<400> SEQUENCE: 336 tttttttttcg ctatgccccc gcctt                                     25

<210> SEQ ID NO 337
<211> LENGTH: 27
<212> TYPE: DNA
<213> ORGANISM: Artificial Sequence
<220> FEATURE:
<223> OTHER INFORMATION: Primer ill-EC-2-MSH6-03F

<400> SEQUENCE: 337 tttttttttct gctgccccca ccaggta                                   27

<210> SEQ ID NO 338
<211> LENGTH: 29
<212> TYPE: DNA
<213> ORGANISM: Artificial Sequence
<220> FEATURE:
<223> OTHER INFORMATION: Primer ill-EC-2-MSH6-03R

<400> SEQUENCE: 338 tttttttttga ccctgcact cattcaagc                                  29

<210> SEQ ID NO 339
<211> LENGTH: 33
<212> TYPE: DNA
<213> ORGANISM: Artificial Sequence
<220> FEATURE:
<223> OTHER INFORMATION: Primer ill-EC-1-MSH6-03F

<400> SEQUENCE: 339 tttttttttaa ctgcctttaa ggaaacttga cca                            33

<210> SEQ ID NO 340
<211> LENGTH: 29
<212> TYPE: DNA
<213> ORGANISM: Artificial Sequence
<220> FEATURE:
<223> OTHER INFORMATION: Primer ill-EC-1-MSH6-03R
```

<400> SEQUENCE: 340
tttttttttc cctttctcgc ggatgaatg                     29

<210> SEQ ID NO 341
<211> LENGTH: 31
<212> TYPE: DNA
<213> ORGANISM: Artificial Sequence
<220> FEATURE:
<223> OTHER INFORMATION: Primer ill-EC-2-MSH6-04F

<400> SEQUENCE: 341 tttttttttgg agatttggtt tgggccaaga t                 31

<210> SEQ ID NO 342
<211> LENGTH: 33
<212> TYPE: DNA
<213> ORGANISM: Artificial Sequence
<220> FEATURE:
<223> OTHER INFORMATION: Primer ill-EC-2-MSH6-04R

<400> SEQUENCE: 342 tttttttttgc tttaaaagcc ttttgctaac cca               33

<210> SEQ ID NO 343
<211> LENGTH: 32
<212> TYPE: DNA
<213> ORGANISM: Artificial Sequence
<220> FEATURE:
<223> OTHER INFORMATION: Primer ill-EC-1-MSH6-04F

<400> SEQUENCE: 343 tttttttttga aagggaaatc agtccgtgtt ca                32

<210> SEQ ID NO 344
<211> LENGTH: 32
<212> TYPE: DNA
<213> ORGANISM: Artificial Sequence
<220> FEATURE:
<223> OTHER INFORMATION: Primer ill-EC-1-MSH6-04R

<400> SEQUENCE: 344 tttttttttaa aaagtctgcc tgtctgtctg tt                32

<210> SEQ ID NO 345
<211> LENGTH: 34
<212> TYPE: DNA
<213> ORGANISM: Artificial Sequence
<220> FEATURE:
<223> OTHER INFORMATION: Primer ill-EC-2-MSH6-05F

<400> SEQUENCE: 345 tttttttttcc tggcatatat atattttaag atag              34

<210> SEQ ID NO 346
<211> LENGTH: 33
<212> TYPE: DNA
<213> ORGANISM: Artificial Sequence
<220> FEATURE:
<223> OTHER INFORMATION: Primer ill-EC-2-MSH6-05R

<400> SEQUENCE: 346 tttttttttca ctgtaaaaat gacctccctt ctg               33

<210> SEQ ID NO 347
<211> LENGTH: 31

```
<212> TYPE: DNA
<213> ORGANISM: Artificial Sequence
<220> FEATURE:
<223> OTHER INFORMATION: Primer ill-EC-1-MSH6-05F

<400> SEQUENCE: 347 tttttttttac cggcccttta ttgtttataa a                               31

<210> SEQ ID NO 348
<211> LENGTH: 32
<212> TYPE: DNA
<213> ORGANISM: Artificial Sequence
<220> FEATURE:
<223> OTHER INFORMATION: Primer ill-EC-1-MSH6-05R

<400> SEQUENCE: 348 tttttttttca tcacaaactg ccaattcaag cc                              32

<210> SEQ ID NO 349
<211> LENGTH: 32
<212> TYPE: DNA
<213> ORGANISM: Artificial Sequence
<220> FEATURE:
<223> OTHER INFORMATION: Primer ill-EC-2-MSH6-06F

<400> SEQUENCE: 349
tttttttttg aaatactgag agcaatgcaa cg                               32

<210> SEQ ID NO 350
<211> LENGTH: 32
<212> TYPE: DNA
<213> ORGANISM: Artificial Sequence
<220> FEATURE:
<223> OTHER INFORMATION: Primer ill-EC-2-MSH6-06R

<400> SEQUENCE: 350
tttttttttc ttcccccatc accctaacat aa                               32

<210> SEQ ID NO 351
<211> LENGTH: 30
<212> TYPE: DNA
<213> ORGANISM: Artificial Sequence
<220> FEATURE:
<223> OTHER INFORMATION: Primer ill-EC-1-MSH6-06F

<400> SEQUENCE: 351
tttttttttg cacgggtacc attataaagt                                  30

<210> SEQ ID NO 352
<211> LENGTH: 35
<212> TYPE: DNA
<213> ORGANISM: Artificial Sequence
<220> FEATURE:
<223> OTHER INFORMATION: Primer ill-EC-1-MSH6-06R

<400> SEQUENCE: 352
tttttttttg tacttcctct tcactctcaa tttca                            35

<210> SEQ ID NO 353
<211> LENGTH: 29
<212> TYPE: DNA
<213> ORGANISM: Artificial Sequence
<220> FEATURE:
<223> OTHER INFORMATION: Primer ill-EC-2-MSH6-07F

<400> SEQUENCE: 353
``` tttttttttct ggcaggtagg cacaactta                                    29

<210> SEQ ID NO 354
<211> LENGTH: 30
<212> TYPE: DNA
<213> ORGANISM: Artificial Sequence
<220> FEATURE:
<223> OTHER INFORMATION: Primer ill-EC-2-MSH6-07R

<400> SEQUENCE: 354 tttttttttaa ttccacatca gagccaccaa                                   30

<210> SEQ ID NO 355
<211> LENGTH: 34
<212> TYPE: DNA
<213> ORGANISM: Artificial Sequence
<220> FEATURE:
<223> OTHER INFORMATION: Primer ill-EC-1-MSH6-07F

<400> SEQUENCE: 355 tttttttttaa cgaagggtca tatcagattc tgag                              34

<210> SEQ ID NO 356
<211> LENGTH: 30
<212> TYPE: DNA
<213> ORGANISM: Artificial Sequence
<220> FEATURE:
<223> OTHER INFORMATION: Primer ill-EC-1-MSH6-07R

<400> SEQUENCE: 356 tttttttttat tctcttccgc tttcgagcaa                                   30

<210> SEQ ID NO 357
<211> LENGTH: 33
<212> TYPE: DNA
<213> ORGANISM: Artificial Sequence
<220> FEATURE:
<223> OTHER INFORMATION: Primer ill-EC-2-MSH6-08F

<400> SEQUENCE: 357 tttttttttgc agtgatgaaa taagcagtgg agt                               33

<210> SEQ ID NO 358
<211> LENGTH: 34
<212> TYPE: DNA
<213> ORGANISM: Artificial Sequence
<220> FEATURE:
<223> OTHER INFORMATION: Primer ill-EC-2-MSH6-08R

<400> SEQUENCE: 358
tttttttttc tgatgaaatg ctagttgctt gttt                               34

<210> SEQ ID NO 359
<211> LENGTH: 34
<212> TYPE: DNA
<213> ORGANISM: Artificial Sequence
<220> FEATURE:
<223> OTHER INFORMATION: Primer ill-EC-1-MSH6-08F

<400> SEQUENCE: 359
tttttttttc tcttaaaagg aaaagctcta ggaa                               34

<210> SEQ ID NO 360
<211> LENGTH: 31
<212> TYPE: DNA
<213> ORGANISM: Artificial Sequence

```
<220> FEATURE:
<223> OTHER INFORMATION: Primer ill-EC-1-MSH6-08R

<400> SEQUENCE: 360 tttttttttat accaaacagt agggcgacta c                              31

<210> SEQ ID NO 361
<211> LENGTH: 32
<212> TYPE: DNA
<213> ORGANISM: Artificial Sequence
<220> FEATURE:
<223> OTHER INFORMATION: Primer ill-EC-2-MSH6-09F

<400> SEQUENCE: 361 ttttttttc tgcccctcaa aattctgaat cc                               32

<210> SEQ ID NO 362
<211> LENGTH: 36
<212> TYPE: DNA
<213> ORGANISM: Artificial Sequence
<220> FEATURE:
<223> OTHER INFORMATION: Primer ill-EC-2-MSH6-09R

<400> SEQUENCE: 362 tttttttgc acatagagtg tagatgcatc aaaatc                           36

<210> SEQ ID NO 363
<211> LENGTH: 36
<212> TYPE: DNA
<213> ORGANISM: Artificial Sequence
<220> FEATURE:
<223> OTHER INFORMATION: Primer ill-EC-1-MSH6-09F

<400> SEQUENCE: 363
ttttttttat gaaactttag aatggcttaa ggagga                          36

<210> SEQ ID NO 364
<211> LENGTH: 35
<212> TYPE: DNA
<213> ORGANISM: Artificial Sequence
<220> FEATURE:
<223> OTHER INFORMATION: Primer ill-EC-1-MSH6-09R

<400> SEQUENCE: 364
ttttttttat caaagttctg agacttaatc tgcca                           35

<210> SEQ ID NO 365
<211> LENGTH: 34
<212> TYPE: DNA
<213> ORGANISM: Artificial Sequence
<220> FEATURE:
<223> OTHER INFORMATION: Primer ill-EC-2-MSH6-10F

<400> SEQUENCE: 365 ttttttta tgtgcctgag gatttcctca attc                              34

<210> SEQ ID NO 366
<211> LENGTH: 31
<212> TYPE: DNA
<213> ORGANISM: Artificial Sequence
<220> FEATURE:
<223> OTHER INFORMATION: Primer ill-EC-2-MSH6-10R

<400> SEQUENCE: 366 tttttttt catgaatacc agccccagtt c                                 31
```

```
<210> SEQ ID NO 367
<211> LENGTH: 32
<212> TYPE: DNA
<213> ORGANISM: Artificial Sequence
<220> FEATURE:
<223> OTHER INFORMATION: Primer ill-EC-1-MSH6-10F

<400> SEQUENCE: 367 tttttttttgg gaaattttat gagctgtacc ac                                   32

<210> SEQ ID NO 368
<211> LENGTH: 30
<212> TYPE: DNA
<213> ORGANISM: Artificial Sequence
<220> FEATURE:
<223> OTHER INFORMATION: Primer ill-EC-1-MSH6-10R

<400> SEQUENCE: 368
ttttttttca gtctgttcca ctcgtgctac                                       30

<210> SEQ ID NO 369
<211> LENGTH: 32
<212> TYPE: DNA
<213> ORGANISM: Artificial Sequence
<220> FEATURE:
<223> OTHER INFORMATION: Primer ill-EC-2-MSH6-11F

<400> SEQUENCE: 369
ttttttttgt tattcagatt ccctggtgca ga                                    32

<210> SEQ ID NO 370
<211> LENGTH: 32
<212> TYPE: DNA
<213> ORGANISM: Artificial Sequence
<220> FEATURE:
<223> OTHER INFORMATION: Primer ill-EC-2-MSH6-11R

<400> SEQUENCE: 370
ttttttttca ctgtaagtct gtgtacccctt gg                                   32

<210> SEQ ID NO 371
<211> LENGTH: 35
<212> TYPE: DNA
<213> ORGANISM: Artificial Sequence
<220> FEATURE:
<223> OTHER INFORMATION: Primer ill-EC-1-MSH6-11F

<400> SEQUENCE: 371
ttttttttta tccaagtatg atagagtggt gagga                                 35

<210> SEQ ID NO 372
<211> LENGTH: 30
<212> TYPE: DNA
<213> ORGANISM: Artificial Sequence
<220> FEATURE:
<223> OTHER INFORMATION: Primer ill-EC-1-MSH6-11R

<400> SEQUENCE: 372
ttttttttgc acaccata tgcacgagta                                         30

<210> SEQ ID NO 373
<211> LENGTH: 33
<212> TYPE: DNA
<213> ORGANISM: Artificial Sequence
<220> FEATURE:
<223> OTHER INFORMATION: Primer ill-EC-2-MSH6-12F
```

<400> SEQUENCE: 373 tttttttttgg tgatccctct gagaactaca gta                33

<210> SEQ ID NO 374
<211> LENGTH: 34
<212> TYPE: DNA
<213> ORGANISM: Artificial Sequence
<220> FEATURE:
<223> OTHER INFORMATION: Primer ill-EC-2-MSH6-12R

<400> SEQUENCE: 374 tttttttttcc actagagtcc taaatctcga acaa               34

<210> SEQ ID NO 375
<211> LENGTH: 33
<212> TYPE: DNA
<213> ORGANISM: Artificial Sequence
<220> FEATURE:
<223> OTHER INFORMATION: Primer ill-EC-1-MSH6-12F

<400> SEQUENCE: 375 tttttttttgt gctttgttga tacttcactg gga                33

<210> SEQ ID NO 376
<211> LENGTH: 34
<212> TYPE: DNA
<213> ORGANISM: Artificial Sequence
<220> FEATURE:
<223> OTHER INFORMATION: Primer ill-EC-1-MSH6-12R

<400> SEQUENCE: 376 tttttttttag aacaggacaa tgaactcttt agaa               34

<210> SEQ ID NO 377
<211> LENGTH: 33
<212> TYPE: DNA
<213> ORGANISM: Artificial Sequence
<220> FEATURE:
<223> OTHER INFORMATION: Primer ill-EC-2-MSH6-13F

<400> SEQUENCE: 377 tttttttttca cactatcccc cagtacaagt ttt                33

<210> SEQ ID NO 378
<211> LENGTH: 34
<212> TYPE: DNA
<213> ORGANISM: Artificial Sequence
<220> FEATURE:
<223> OTHER INFORMATION: Primer ill-EC-2-MSH6-13R

<400> SEQUENCE: 378
tttttttttt cttcctcaag gagagttctc aaag                34

<210> SEQ ID NO 379
<211> LENGTH: 34
<212> TYPE: DNA
<213> ORGANISM: Artificial Sequence
<220> FEATURE:
<223> OTHER INFORMATION: Primer ill-EC-1-MSH6-13F

<400> SEQUENCE: 379 tttttttttct gttctcttca ggaaggtctg atac               34

<210> SEQ ID NO 380

```
<211> LENGTH: 32
<212> TYPE: DNA
<213> ORGANISM: Artificial Sequence
<220> FEATURE:
<223> OTHER INFORMATION: Primer ill-EC-1-MSH6-13R

<400> SEQUENCE: 380 ttttttttg tcaacccaat ggaatcagac tc                          32

<210> SEQ ID NO 381
<211> LENGTH: 32
<212> TYPE: DNA
<213> ORGANISM: Artificial Sequence
<220> FEATURE:
<223> OTHER INFORMATION: Primer ill-EC-2-MSH6-14F

<400> SEQUENCE: 381 ttttttttg ttaccccagg tgcttaaagg ta                          32

<210> SEQ ID NO 382
<211> LENGTH: 37
<212> TYPE: DNA
<213> ORGANISM: Artificial Sequence
<220> FEATURE:
<223> OTHER INFORMATION: Primer ill-EC-2-MSH6-14R

<400> SEQUENCE: 382
ttttttttca aaattagcca ttgataaaag ctcctga                    37

<210> SEQ ID NO 383
<211> LENGTH: 32
<212> TYPE: DNA
<213> ORGANISM: Artificial Sequence
<220> FEATURE:
<223> OTHER INFORMATION: Primer ill-EC-1-MSH6-14F

<400> SEQUENCE: 383
ttttttttgc tctaggtggt tgtgtcttct ac                         32

<210> SEQ ID NO 384
<211> LENGTH: 33
<212> TYPE: DNA
<213> ORGANISM: Artificial Sequence
<220> FEATURE:
<223> OTHER INFORMATION: Primer ill-EC-1-MSH6-14R

<400> SEQUENCE: 384
tttttttttt aatgtcactg catctagcac cat                        33

<210> SEQ ID NO 385
<211> LENGTH: 34
<212> TYPE: DNA
<213> ORGANISM: Artificial Sequence
<220> FEATURE:
<223> OTHER INFORMATION: Primer ill-EC-2-MSH6-15F

<400> SEQUENCE: 385
ttttttttac tacaagatct ggtgctatct tcac                       34

<210> SEQ ID NO 386
<211> LENGTH: 30
<212> TYPE: DNA
<213> ORGANISM: Artificial Sequence
<220> FEATURE:
<223> OTHER INFORMATION: Primer ill-EC-2-MSH6-15R

<400> SEQUENCE: 386
``` tttttttttat tgctttagga gccgcttacc      30

<210> SEQ ID NO 387
<211> LENGTH: 33
<212> TYPE: DNA
<213> ORGANISM: Artificial Sequence
<220> FEATURE:
<223> OTHER INFORMATION: Primer ill-EC-1-MSH6-15F

<400> SEQUENCE: 387 tttttttta ctgaaggaac cctactagag agg      33

<210> SEQ ID NO 388
<211> LENGTH: 33
<212> TYPE: DNA
<213> ORGANISM: Artificial Sequence
<220> FEATURE:
<223> OTHER INFORMATION: Primer ill-EC-1-MSH6-15R

<400> SEQUENCE: 388
ttttttttgc tctacaactt cggagatttt gtc      33

<210> SEQ ID NO 389
<211> LENGTH: 33
<212> TYPE: DNA
<213> ORGANISM: Artificial Sequence
<220> FEATURE:
<223> OTHER INFORMATION: Primer ill-EC-2-MSH6-16F

<400> SEQUENCE: 389
ttttttttcg tctagatgcc atagaagacc tca      33

<210> SEQ ID NO 390
<211> LENGTH: 35
<212> TYPE: DNA
<213> ORGANISM: Artificial Sequence
<220> FEATURE:
<223> OTHER INFORMATION: Primer ill-EC-2-MSH6-16R

<400> SEQUENCE: 390
ttttttttag tttcttcata cattatagcc ctgct      35

<210> SEQ ID NO 391
<211> LENGTH: 32
<212> TYPE: DNA
<213> ORGANISM: Artificial Sequence
<220> FEATURE:
<223> OTHER INFORMATION: Primer ill-EC-1-MSH6-16F

<400> SEQUENCE: 391
ttttttttct cagtaaaatt cataatgttg gg      32

<210> SEQ ID NO 392
<211> LENGTH: 36
<212> TYPE: DNA
<213> ORGANISM: Artificial Sequence
<220> FEATURE:
<223> OTHER INFORMATION: Primer ill-EC-1-MSH6-16R

<400> SEQUENCE: 392
ttttttttca gcaacttctt ccatgatccc tataat      36

<210> SEQ ID NO 393
<211> LENGTH: 34
<212> TYPE: DNA

<213> ORGANISM: Artificial Sequence
<220> FEATURE:
<223> OTHER INFORMATION: Primer ill-EC-2-MSH6-17F

<400> SEQUENCE: 393
tttttttttc tgctctggaa ggattcaaag taat                            34

<210> SEQ ID NO 394
<211> LENGTH: 30
<212> TYPE: DNA
<213> ORGANISM: Artificial Sequence
<220> FEATURE:
<223> OTHER INFORMATION: Primer ill-EC-2-MSH6-17R

<400> SEQUENCE: 394 tttttttttgg tcaaaggctg tatcccatcg                                30

<210> SEQ ID NO 395
<211> LENGTH: 34
<212> TYPE: DNA
<213> ORGANISM: Artificial Sequence
<220> FEATURE:
<223> OTHER INFORMATION: Primer ill-EC-1-MSH6-17F

<400> SEQUENCE: 395 tttttttttgg tcgttttcct gatttgactg taga                           34

<210> SEQ ID NO 396
<211> LENGTH: 33
<212> TYPE: DNA
<213> ORGANISM: Artificial Sequence
<220> FEATURE:
<223> OTHER INFORMATION: Primer ill-EC-1-MSH6-17R

<400> SEQUENCE: 396 tttttttttgt ttctctaggt attccaggag gct                            33

<210> SEQ ID NO 397
<211> LENGTH: 36
<212> TYPE: DNA
<213> ORGANISM: Artificial Sequence
<220> FEATURE:
<223> OTHER INFORMATION: Primer ill-EC-2-MSH6-18F

<400> SEQUENCE: 397
tttttttttc ttgctgacat aagagaaaat gaacag                          36

<210> SEQ ID NO 398
<211> LENGTH: 35
<212> TYPE: DNA
<213> ORGANISM: Artificial Sequence
<220> FEATURE:
<223> OTHER INFORMATION: Primer ill-EC-2-MSH6-18R

<400> SEQUENCE: 398 tttttttttag atttcaactc gtattcttct ggcaa                          35

<210> SEQ ID NO 399
<211> LENGTH: 31
<212> TYPE: DNA
<213> ORGANISM: Artificial Sequence
<220> FEATURE:
<223> OTHER INFORMATION: Primer ill-EC-1-MSH6-18F

<400> SEQUENCE: 399 tttttttttcc tgagaatttc accactcgca a                              31

<210> SEQ ID NO 400
<211> LENGTH: 30
<212> TYPE: DNA
<213> ORGANISM: Artificial Sequence
<220> FEATURE:
<223> OTHER INFORMATION: Primer ill-EC-1-MSH6-18R

<400> SEQUENCE: 400 tttttttag ttatagaaca gtcgccgcat                               30

<210> SEQ ID NO 401
<211> LENGTH: 32
<212> TYPE: DNA
<213> ORGANISM: Artificial Sequence
<220> FEATURE:
<223> OTHER INFORMATION: Primer ill-EC-2-MSH6-19F

<400> SEQUENCE: 401 tttttttca taaatgctga agaacggagg ga                            32

<210> SEQ ID NO 402
<211> LENGTH: 33
<212> TYPE: DNA
<213> ORGANISM: Artificial Sequence
<220> FEATURE:
<223> OTHER INFORMATION: Primer ill-EC-2-MSH6-19R

<400> SEQUENCE: 402 tttttttct ggcaaacagc actacttatc aaa                           33

<210> SEQ ID NO 403
<211> LENGTH: 32
<212> TYPE: DNA
<213> ORGANISM: Artificial Sequence
<220> FEATURE:
<223> OTHER INFORMATION: Primer ill-EC-1-MSH6-19F

<400> SEQUENCE: 403 tttttttac ttaggctgat aaaccccca aa                             32

<210> SEQ ID NO 404
<211> LENGTH: 32
<212> TYPE: DNA
<213> ORGANISM: Artificial Sequence
<220> FEATURE:
<223> OTHER INFORMATION: Primer ill-EC-1-MSH6-19R

<400> SEQUENCE: 404 tttttttat ggcgtgatcc tttaagctct aa                            32

<210> SEQ ID NO 405
<211> LENGTH: 30
<212> TYPE: DNA
<213> ORGANISM: Artificial Sequence
<220> FEATURE:
<223> OTHER INFORMATION: Primer ill-EC-2-MSH6-20F

<400> SEQUENCE: 405 tttttttg tgcctggcta actatagtcg                                30

<210> SEQ ID NO 406
<211> LENGTH: 32
<212> TYPE: DNA
<213> ORGANISM: Artificial Sequence
<220> FEATURE:

<223> OTHER INFORMATION: Primer ill-EC-2-MSH6-20R

<400> SEQUENCE: 406
tttttttttc ctcacagcct attagaatgt ca                           32

<210> SEQ ID NO 407
<211> LENGTH: 30
<212> TYPE: DNA
<213> ORGANISM: Artificial Sequence
<220> FEATURE:
<223> OTHER INFORMATION: Primer ill-EC-1-MSH6-20F

<400> SEQUENCE: 407 tttttttcg ccatccttgc attacgaaga                               30

<210> SEQ ID NO 408
<211> LENGTH: 34
<212> TYPE: DNA
<213> ORGANISM: Artificial Sequence
<220> FEATURE:
<223> OTHER INFORMATION: Primer ill-EC-1-MSH6-20R

<400> SEQUENCE: 408 tttttttag aatcagttac ctgtctcata agcg                          34

<210> SEQ ID NO 409
<211> LENGTH: 32
<212> TYPE: DNA
<213> ORGANISM: Artificial Sequence
<220> FEATURE:
<223> OTHER INFORMATION: Primer ill-EC-2-MSH6-21F

<400> SEQUENCE: 409 tttttttag gaaaatggca aagcctattg tg                            32

<210> SEQ ID NO 410
<211> LENGTH: 36
<212> TYPE: DNA
<213> ORGANISM: Artificial Sequence
<220> FEATURE:
<223> OTHER INFORMATION: Primer ill-EC-2-MSH6-21R

<400> SEQUENCE: 410 tttttttgc tgactttat gtaactgtgt ttggaa                         36

<210> SEQ ID NO 411
<211> LENGTH: 31
<212> TYPE: DNA
<213> ORGANISM: Artificial Sequence
<220> FEATURE:
<223> OTHER INFORMATION: Primer ill-EC-1-MSH6-21F

<400> SEQUENCE: 411 tttttttgc ctagctctta cgtaagggtt c                             31

<210> SEQ ID NO 412
<211> LENGTH: 32
<212> TYPE: DNA
<213> ORGANISM: Artificial Sequence
<220> FEATURE:
<223> OTHER INFORMATION: Primer ill-EC-1-MSH6-21R

<400> SEQUENCE: 412 tttttttca ctctatcaat tggtgtgagc ct                            32

```
<210> SEQ ID NO 413
<211> LENGTH: 29
<212> TYPE: DNA
<213> ORGANISM: Artificial Sequence
<220> FEATURE:
<223> OTHER INFORMATION: Primer ill-EC-2-MSH6-22F

<400> SEQUENCE: 413
ttttttttca gatgggttgt tacgtccct                                    29

<210> SEQ ID NO 414
<211> LENGTH: 36
<212> TYPE: DNA
<213> ORGANISM: Artificial Sequence
<220> FEATURE:
<223> OTHER INFORMATION: Primer ill-EC-2-MSH6-22R

<400> SEQUENCE: 414
ttttttttag gctcatatac aagaagcaaa tatctt                            36

<210> SEQ ID NO 415
<211> LENGTH: 39
<212> TYPE: DNA
<213> ORGANISM: Artificial Sequence
<220> FEATURE:
<223> OTHER INFORMATION: Primer ill-EC-1-MSH6-22F

<400> SEQUENCE: 415
ttttttttat gtgtagctca tgatagctat ataacctag                         39

<210> SEQ ID NO 416
<211> LENGTH: 28
<212> TYPE: DNA
<213> ORGANISM: Artificial Sequence
<220> FEATURE:
<223> OTHER INFORMATION: Primer ill-EC-1-MSH6-22R

<400> SEQUENCE: 416
ttttttttac aagcaccaga gaatgtgc                                     28

<210> SEQ ID NO 417
<211> LENGTH: 29
<212> TYPE: DNA
<213> ORGANISM: Artificial Sequence
<220> FEATURE:
<223> OTHER INFORMATION: Primer ill-EC-2-MSH6-23F

<400> SEQUENCE: 417
ttttttttcc agcatactca tgcatgcaa                                    29

<210> SEQ ID NO 418
<211> LENGTH: 35
<212> TYPE: DNA
<213> ORGANISM: Artificial Sequence
<220> FEATURE:
<223> OTHER INFORMATION: Primer ill-EC-2-MSH6-23R

<400> SEQUENCE: 418
tttttttttg cgtgctctaa aaacattcat attgt                             35

<210> SEQ ID NO 419
<211> LENGTH: 33
<212> TYPE: DNA
<213> ORGANISM: Artificial Sequence
<220> FEATURE:
<223> OTHER INFORMATION: Primer ill-EC-1-MSH6-23F
```

<400> SEQUENCE: 419 tttttttttcg atgttgcttt tctgtcctag cat    33

<210> SEQ ID NO 420
<211> LENGTH: 36
<212> TYPE: DNA
<213> ORGANISM: Artificial Sequence
<220> FEATURE:
<223> OTHER INFORMATION: Primer ill-EC-1-MSH6-23R

<400> SEQUENCE: 420 tttttttttac gacattttat agtctcagca agttct    36

<210> SEQ ID NO 421
<211> LENGTH: 34
<212> TYPE: DNA
<213> ORGANISM: Artificial Sequence
<220> FEATURE:
<223> OTHER INFORMATION: Primer ill-EC-2-MSH6-24F

<400> SEQUENCE: 421 tttttttttac tttaacagga agaggtactg caac    34

<210> SEQ ID NO 422
<211> LENGTH: 34
<212> TYPE: DNA
<213> ORGANISM: Artificial Sequence
<220> FEATURE:
<223> OTHER INFORMATION: Primer ill-EC-2-MSH6-24R

<400> SEQUENCE: 422 tttttttttgc gcacagcaac attttgagaa taat    34

<210> SEQ ID NO 423
<211> LENGTH: 38
<212> TYPE: DNA
<213> ORGANISM: Artificial Sequence
<220> FEATURE:
<223> OTHER INFORMATION: Primer ill-EC-1-MSH6-24F

<400> SEQUENCE: 423 tttttttttat gtcgtacatt attttcaact cactacca    38

<210> SEQ ID NO 424
<211> LENGTH: 38
<212> TYPE: DNA
<213> ORGANISM: Artificial Sequence
<220> FEATURE:
<223> OTHER INFORMATION: Primer ill-EC-1-MSH6-24R

<400> SEQUENCE: 424 tttttttttga aaaatattag cgatacatgt gctagcaa    38

<210> SEQ ID NO 425
<211> LENGTH: 31
<212> TYPE: DNA
<213> ORGANISM: Artificial Sequence
<220> FEATURE:
<223> OTHER INFORMATION: Primer ill-EC-2-MSH6-25F

<400> SEQUENCE: 425 tttttttttgc gcctaggaca tatggtatgt g    31

<210> SEQ ID NO 426
<211> LENGTH: 32

```
<212> TYPE: DNA
<213> ORGANISM: Artificial Sequence
<220> FEATURE:
<223> OTHER INFORMATION: Primer ill-EC-2-MSH6-25R

<400> SEQUENCE: 426 tttttttttga ggaacgtaat agtctcctgg ct                                    32

<210> SEQ ID NO 427
<211> LENGTH: 33
<212> TYPE: DNA
<213> ORGANISM: Artificial Sequence
<220> FEATURE:
<223> OTHER INFORMATION: Primer ill-EC-1-MSH6-25F

<400> SEQUENCE: 427 tttttttttgg catgcatggt agaaaatgaa tgt                                   33

<210> SEQ ID NO 428
<211> LENGTH: 38
<212> TYPE: DNA
<213> ORGANISM: Artificial Sequence
<220> FEATURE:
<223> OTHER INFORMATION: Primer ill-EC-1-MSH6-25R

<400> SEQUENCE: 428 tttttttttct tctcaaattc tcttgctttt ctatgtcc                              38

<210> SEQ ID NO 429
<211> LENGTH: 34
<212> TYPE: DNA
<213> ORGANISM: Artificial Sequence
<220> FEATURE:
<223> OTHER INFORMATION: Primer ill-EC-2-MSH6-26F

<400> SEQUENCE: 429 tttttttttct tgctaatctc ccagaggaag ttat                                  34

<210> SEQ ID NO 430
<211> LENGTH: 34
<212> TYPE: DNA
<213> ORGANISM: Artificial Sequence
<220> FEATURE:
<223> OTHER INFORMATION: Primer ill-EC-2-MSH6-26R

<400> SEQUENCE: 430
tttttttttc atcccttccc cttttactgt ttct                                   34

<210> SEQ ID NO 431
<211> LENGTH: 33
<212> TYPE: DNA
<213> ORGANISM: Artificial Sequence
<220> FEATURE:
<223> OTHER INFORMATION: Primer ill-EC-1-MSH6-26F

<400> SEQUENCE: 431 tttttttttgg aagggatgat gcactatgaa aaa                                   33

<210> SEQ ID NO 432
<211> LENGTH: 34
<212> TYPE: DNA
<213> ORGANISM: Artificial Sequence
<220> FEATURE:
<223> OTHER INFORMATION: Primer ill-EC-1-MSH6-26R

<400> SEQUENCE: 432
``` tttttttttag tcaactcaaa gcttccaatg tagt                              34

<210> SEQ ID NO 433
<211> LENGTH: 34
<212> TYPE: DNA
<213> ORGANISM: Artificial Sequence
<220> FEATURE:
<223> OTHER INFORMATION: Primer ill-EC-2-MSH6-27F

<400> SEQUENCE: 433 tttttttttgc tagtgaaagg tcaactgtag atgc                              34

<210> SEQ ID NO 434
<211> LENGTH: 35
<212> TYPE: DNA
<213> ORGANISM: Artificial Sequence
<220> FEATURE:
<223> OTHER INFORMATION: Primer ill-EC-2-MSH6-27R

<400> SEQUENCE: 434 ttttttttttg ttgtctgaat ttaccacctt tgtca                             35

<210> SEQ ID NO 435
<211> LENGTH: 25
<212> TYPE: DNA
<213> ORGANISM: Artificial Sequence
<220> FEATURE:
<223> OTHER INFORMATION: Primer ill-EC-1-PTEN-01F

<400> SEQUENCE: 435 tttttttttgt ggaagccgtg ggctc                                        25

<210> SEQ ID NO 436
<211> LENGTH: 25
<212> TYPE: DNA
<213> ORGANISM: Artificial Sequence
<220> FEATURE:
<223> OTHER INFORMATION: Primer ill-EC-1-PTEN-01R

<400> SEQUENCE: 436 tttttttttaa ctctccggcg ttccc                                        25

<210> SEQ ID NO 437
<211> LENGTH: 25
<212> TYPE: DNA
<213> ORGANISM: Artificial Sequence
<220> FEATURE:
<223> OTHER INFORMATION: Primer ill-EC-2-PTEN-02F

<400> SEQUENCE: 437 tttttttttgg gtctgagtcg cctgt                                        25

<210> SEQ ID NO 438
<211> LENGTH: 26
<212> TYPE: DNA
<213> ORGANISM: Artificial Sequence
<220> FEATURE:
<223> OTHER INFORMATION: Primer ill-EC-2-PTEN-02R

<400> SEQUENCE: 438 ttttttttttt aaaaccggcc cgggtc                                       26

<210> SEQ ID NO 439
<211> LENGTH: 25
<212> TYPE: DNA
<213> ORGANISM: Artificial Sequence

```
<220> FEATURE:
<223> OTHER INFORMATION: Primer ill-EC-1-PTEN-02F

<400> SEQUENCE: 439
ttttttttcg gcggctggca catcc                                        25

<210> SEQ ID NO 440
<211> LENGTH: 28
<212> TYPE: DNA
<213> ORGANISM: Artificial Sequence
<220> FEATURE:
<223> OTHER INFORMATION: Primer ill-EC-1-PTEN-02R

<400> SEQUENCE: 440
tttttttttt ctcctcagca gccagagg                                     28

<210> SEQ ID NO 441
<211> LENGTH: 26
<212> TYPE: DNA
<213> ORGANISM: Artificial Sequence
<220> FEATURE:
<223> OTHER INFORMATION: Primer ill-EC-2-PTEN-03F

<400> SEQUENCE: 441
ttttttttgc agccgttcgg aggatt                                       26

<210> SEQ ID NO 442
<211> LENGTH: 25
<212> TYPE: DNA
<213> ORGANISM: Artificial Sequence
<220> FEATURE:
<223> OTHER INFORMATION: Primer ill-EC-2-PTEN-03R

<400> SEQUENCE: 442
ttttttttct gatgcccctc gctct                                        25

<210> SEQ ID NO 443
<211> LENGTH: 25
<212> TYPE: DNA
<213> ORGANISM: Artificial Sequence
<220> FEATURE:
<223> OTHER INFORMATION: Primer ill-EC-1-PTEN-03F

<400> SEQUENCE: 443
ttttttttcc ggctgcggtc cagag                                        25

<210> SEQ ID NO 444
<211> LENGTH: 32
<212> TYPE: DNA
<213> ORGANISM: Artificial Sequence
<220> FEATURE:
<223> OTHER INFORMATION: Primer ill-EC-1-PTEN-03R

<400> SEQUENCE: 444
ttttttttcg atctctttga tgatggctgt ca                                32

<210> SEQ ID NO 445
<211> LENGTH: 31
<212> TYPE: DNA
<213> ORGANISM: Artificial Sequence
<220> FEATURE:
<223> OTHER INFORMATION: Primer ill-EC-2-PTEN-04F

<400> SEQUENCE: 445
ttttttttgc catctctctc ctccttttc t                                  31
```

<210> SEQ ID NO 446
<211> LENGTH: 33
<212> TYPE: DNA
<213> ORGANISM: Artificial Sequence
<220> FEATURE:
<223> OTHER INFORMATION: Primer ill-EC-2-PTEN-04R

<400> SEQUENCE: 446 tttttttttcg ttctaagaga gtgacagaaa ggt                33

<210> SEQ ID NO 447
<211> LENGTH: 34
<212> TYPE: DNA
<213> ORGANISM: Artificial Sequence
<220> FEATURE:
<223> OTHER INFORMATION: Primer ill-EC-1-PTEN-04F

<400> SEQUENCE: 447
tttttttttc ttttagtttg attgctgcat attt                34

<210> SEQ ID NO 448
<211> LENGTH: 35
<212> TYPE: DNA
<213> ORGANISM: Artificial Sequence
<220> FEATURE:
<223> OTHER INFORMATION: Primer ill-EC-1-PTEN-04R

<400> SEQUENCE: 448
tttttttttc aaagcattct taccttacta catca               35

<210> SEQ ID NO 449
<211> LENGTH: 37
<212> TYPE: DNA
<213> ORGANISM: Artificial Sequence
<220> FEATURE:
<223> OTHER INFORMATION: Primer ill-EC-2-PTEN-05F

<400> SEQUENCE: 449 tttttttttag tactcagata tttatccaaa cattatt            37

<210> SEQ ID NO 450
<211> LENGTH: 35
<212> TYPE: DNA
<213> ORGANISM: Artificial Sequence
<220> FEATURE:
<223> OTHER INFORMATION: Primer ill-EC-2-PTEN-05R

<400> SEQUENCE: 450 tttttttttag aaatcttttc taaatgaaaa cacaa              35

<210> SEQ ID NO 451
<211> LENGTH: 35
<212> TYPE: DNA
<213> ORGANISM: Artificial Sequence
<220> FEATURE:
<223> OTHER INFORMATION: Primer ill-EC-1-PTEN-05F

<400> SEQUENCE: 451 tttttttttgt tagctcattt ttgttaatgg tggct              35

<210> SEQ ID NO 452
<211> LENGTH: 34
<212> TYPE: DNA
<213> ORGANISM: Artificial Sequence
<220> FEATURE:
<223> OTHER INFORMATION: Primer ill-EC-1-PTEN-05R

```
<400> SEQUENCE: 452 tttttttttct aacaagcaga taactttcac ttaa                                    34

<210> SEQ ID NO 453
<211> LENGTH: 37
<212> TYPE: DNA
<213> ORGANISM: Artificial Sequence
<220> FEATURE:
<223> OTHER INFORMATION: Primer ill-EC-2-PTEN-06F

<400> SEQUENCE: 453
tttttttttg tgtcacatta taaagattca ggcaatg                                  37

<210> SEQ ID NO 454
<211> LENGTH: 35
<212> TYPE: DNA
<213> ORGANISM: Artificial Sequence
<220> FEATURE:
<223> OTHER INFORMATION: Primer ill-EC-2-PTEN-06R

<400> SEQUENCE: 454 tttttttttgt acagtacatt catacctacc tctgc                                   35

<210> SEQ ID NO 455
<211> LENGTH: 34
<212> TYPE: DNA
<213> ORGANISM: Artificial Sequence
<220> FEATURE:
<223> OTHER INFORMATION: Primer ill-EC-1-PTEN-06F

<400> SEQUENCE: 455 tttttttttct tttagttgtg ctgaaagaca ttat                                    34

<210> SEQ ID NO 456
<211> LENGTH: 36
<212> TYPE: DNA
<213> ORGANISM: Artificial Sequence
<220> FEATURE:
<223> OTHER INFORMATION: Primer ill-EC-1-PTEN-06R

<400> SEQUENCE: 456
tttttttttg tatctcactc gataatctgg atgact                                   36

<210> SEQ ID NO 457
<211> LENGTH: 35
<212> TYPE: DNA
<213> ORGANISM: Artificial Sequence
<220> FEATURE:
<223> OTHER INFORMATION: Primer ill-EC-2-PTEN-07F

<400> SEQUENCE: 457 tttttttttgc aacatttcta aagttaccta cttgt                                   35

<210> SEQ ID NO 458
<211> LENGTH: 33
<212> TYPE: DNA
<213> ORGANISM: Artificial Sequence
<220> FEATURE:
<223> OTHER INFORMATION: Primer ill-EC-2-PTEN-07R

<400> SEQUENCE: 458 tttttttttat cttcacttag ccattggtca aga                                     33

<210> SEQ ID NO 459
```

```
<211> LENGTH: 31
<212> TYPE: DNA
<213> ORGANISM: Artificial Sequence
<220> FEATURE:
<223> OTHER INFORMATION: Primer ill-EC-1-PTEN-07F

<400> SEQUENCE: 459 tttttttttac ccaccacagc tagaacttat c                                31

<210> SEQ ID NO 460
<211> LENGTH: 29
<212> TYPE: DNA
<213> ORGANISM: Artificial Sequence
<220> FEATURE:
<223> OTHER INFORMATION: Primer ill-EC-1-PTEN-07R

<400> SEQUENCE: 460 tttttttttag ggcctcttgt gcctttaaa                                   29

<210> SEQ ID NO 461
<211> LENGTH: 35
<212> TYPE: DNA
<213> ORGANISM: Artificial Sequence
<220> FEATURE:
<223> OTHER INFORMATION: Primer ill-EC-2-PTEN-08F

<400> SEQUENCE: 461 tttttttttga aagggacgaa ctggtgtaat gatat                            35

<210> SEQ ID NO 462
<211> LENGTH: 36
<212> TYPE: DNA
<213> ORGANISM: Artificial Sequence
<220> FEATURE:
<223> OTHER INFORMATION: Primer ill-EC-2-PTEN-08R

<400> SEQUENCE: 462 ttttttttttt ccaataaatt ctcagatcca ggaaga                           36

<210> SEQ ID NO 463
<211> LENGTH: 33
<212> TYPE: DNA
<213> ORGANISM: Artificial Sequence
<220> FEATURE:
<223> OTHER INFORMATION: Primer ill-EC-1-PTEN-08F

<400> SEQUENCE: 463 tttttttttac gacccagtta ccatagcaat tta                              33

<210> SEQ ID NO 464
<211> LENGTH: 32
<212> TYPE: DNA
<213> ORGANISM: Artificial Sequence
<220> FEATURE:
<223> OTHER INFORMATION: Primer ill-EC-1-PTEN-08R

<400> SEQUENCE: 464 tttttttttag tgccactggt ctataatcca ga                               32

<210> SEQ ID NO 465
<211> LENGTH: 33
<212> TYPE: DNA
<213> ORGANISM: Artificial Sequence
<220> FEATURE:
<223> OTHER INFORMATION: Primer ill-EC-2-PTEN-09F

<400> SEQUENCE: 465
```
ttttttttag tcagaggcgc tatgtgtatt att                         33

<210> SEQ ID NO 466
<211> LENGTH: 35
<212> TYPE: DNA
<213> ORGANISM: Artificial Sequence
<220> FEATURE:
<223> OTHER INFORMATION: Primer ill-EC-2-PTEN-09R

<400> SEQUENCE: 466
ttttttttag aaaactgttc caatacatgg aagga                       35

<210> SEQ ID NO 467
<211> LENGTH: 30
<212> TYPE: DNA
<213> ORGANISM: Artificial Sequence
<220> FEATURE:
<223> OTHER INFORMATION: Primer ill-EC-1-PTEN-09F

<400> SEQUENCE: 467
ttttttttcg gaacttgcag taagtgcttg                             30

<210> SEQ ID NO 468
<211> LENGTH: 36
<212> TYPE: DNA
<213> ORGANISM: Artificial Sequence
<220> FEATURE:
<223> OTHER INFORMATION: Primer ill-EC-1-PTEN-09R

<400> SEQUENCE: 468
ttttttttaa tgcttcagaa atatagtctc ctgcat                      36

<210> SEQ ID NO 469
<211> LENGTH: 35
<212> TYPE: DNA
<213> ORGANISM: Artificial Sequence
<220> FEATURE:
<223> OTHER INFORMATION: Primer ill-EC-2-PTEN-10F

<400> SEQUENCE: 469
ttttttttcg tttttgacag tttgacagtt aaagg                       35

<210> SEQ ID NO 470
<211> LENGTH: 35
<212> TYPE: DNA
<213> ORGANISM: Artificial Sequence
<220> FEATURE:
<223> OTHER INFORMATION: Primer ill-EC-2-PTEN-10R

<400> SEQUENCE: 470
ttttttttgg gaactcaaag tacatgaact tgtct                       35

<210> SEQ ID NO 471
<211> LENGTH: 35
<212> TYPE: DNA
<213> ORGANISM: Artificial Sequence
<220> FEATURE:
<223> OTHER INFORMATION: Primer ill-EC-1-PTEN-10F

<400> SEQUENCE: 471
ttttttttgc cagctaaagg tgaagatata ttcct                       35

<210> SEQ ID NO 472
<211> LENGTH: 37
<212> TYPE: DNA

```
<213> ORGANISM: Artificial Sequence
<220> FEATURE:
<223> OTHER INFORMATION: Primer ill-EC-1-PTEN-10R

<400> SEQUENCE: 472 ttttttttc tcccaatgaa agtaaagtac aaacctt                37

<210> SEQ ID NO 473
<211> LENGTH: 33
<212> TYPE: DNA
<213> ORGANISM: Artificial Sequence
<220> FEATURE:
<223> OTHER INFORMATION: Primer ill-EC-2-PTEN-11F

<400> SEQUENCE: 473
ttttttttgt tacctgtgtg tggtgatatc aaa                   33

<210> SEQ ID NO 474
<211> LENGTH: 36
<212> TYPE: DNA
<213> ORGANISM: Artificial Sequence
<220> FEATURE:
<223> OTHER INFORMATION: Primer ill-EC-2-PTEN-11R

<400> SEQUENCE: 474 ttttttttg cagatctaat agaaaacaaa ttatag                 36

<210> SEQ ID NO 475
<211> LENGTH: 37
<212> TYPE: DNA
<213> ORGANISM: Artificial Sequence
<220> FEATURE:
<223> OTHER INFORMATION: Primer ill-EC-1-PTEN-11F

<400> SEQUENCE: 475
ttttttttaa atgtttaaca taggtgacag attttct                37

<210> SEQ ID NO 476
<211> LENGTH: 34
<212> TYPE: DNA
<213> ORGANISM: Artificial Sequence
<220> FEATURE:
<223> OTHER INFORMATION: Primer ill-EC-1-PTEN-11R

<400> SEQUENCE: 476 ttttttttc tactttttct gaggtttcct ctgg                   34

<210> SEQ ID NO 477
<211> LENGTH: 36
<212> TYPE: DNA
<213> ORGANISM: Artificial Sequence
<220> FEATURE:
<223> OTHER INFORMATION: Primer ill-EC-2-PTEN-12F

<400> SEQUENCE: 477
ttttttttgg gtaaatacat tcttcatacc aggacc                36

<210> SEQ ID NO 478
<211> LENGTH: 34
<212> TYPE: DNA
<213> ORGANISM: Artificial Sequence
<220> FEATURE:
<223> OTHER INFORMATION: Primer ill-EC-2-PTEN-12R

<400> SEQUENCE: 478 ttttttttt gtctttattt gctttgtcaa gatc                   34
```

<210> SEQ ID NO 479
<211> LENGTH: 32
<212> TYPE: DNA
<213> ORGANISM: Artificial Sequence
<220> FEATURE:
<223> OTHER INFORMATION: Primer ill-EC-1-PTEN-12F

<400> SEQUENCE: 479 tttttttta gagcgtgcag ataatgacaa gg                         32

<210> SEQ ID NO 480
<211> LENGTH: 35
<212> TYPE: DNA
<213> ORGANISM: Artificial Sequence
<220> FEATURE:
<223> OTHER INFORMATION: Primer ill-EC-1-PTEN-12R

<400> SEQUENCE: 480
ttttttttag aattaaacac acatcacata catac                     35

<210> SEQ ID NO 481
<211> LENGTH: 35
<212> TYPE: DNA
<213> ORGANISM: Artificial Sequence
<220> FEATURE:
<223> OTHER INFORMATION: Primer ill-EC-2-PTEN-13F

<400> SEQUENCE: 481
ttttttttaa atagtttaag atgagtcata tttgt                     35

<210> SEQ ID NO 482
<211> LENGTH: 35
<212> TYPE: DNA
<213> ORGANISM: Artificial Sequence
<220> FEATURE:
<223> OTHER INFORMATION: Primer ill-EC-1-PTEN-13F

<400> SEQUENCE: 482 ttttttttg agtcatattt gtgggttttc atttt                      35

<210> SEQ ID NO 483
<211> LENGTH: 35
<212> TYPE: DNA
<213> ORGANISM: Artificial Sequence
<220> FEATURE:
<223> OTHER INFORMATION: Primer ill-EC-2-PTEN-13R

<400> SEQUENCE: 483 ttttttttg tcagaatatc tataatgatc aggtt                      35

<210> SEQ ID NO 484
<211> LENGTH: 34
<212> TYPE: DNA
<213> ORGANISM: Artificial Sequence
<220> FEATURE:
<223> OTHER INFORMATION: Primer ill-EC-1-PTEN-13R

<400> SEQUENCE: 484 ttttttttc agagtcagtg gtgtcagaat atct                       34

<210> SEQ ID NO 485
<211> LENGTH: 30
<212> TYPE: DNA
<213> ORGANISM: Artificial Sequence
<220> FEATURE:

<223> OTHER INFORMATION: Primer ill-EC-2-PTEN-14F

<400> SEQUENCE: 485
tttttttttc tgacaccact gactctgatc                                     30

<210> SEQ ID NO 486
<211> LENGTH: 33
<212> TYPE: DNA
<213> ORGANISM: Artificial Sequence
<220> FEATURE:
<223> OTHER INFORMATION: Primer ill-EC-2-PTEN-14R

<400> SEQUENCE: 486
tttttttttc tgacacaatg tcctattgcc att                                 33

<210> SEQ ID NO 487
<211> LENGTH: 28
<212> TYPE: DNA
<213> ORGANISM: Artificial Sequence
<220> FEATURE:
<223> OTHER INFORMATION: Primer ill-EC-1-POLE-01F

<400> SEQUENCE: 487 tttttttag tggtctggtc actggaag                                        28

<210> SEQ ID NO 488
<211> LENGTH: 28
<212> TYPE: DNA
<213> ORGANISM: Artificial Sequence
<220> FEATURE:
<223> OTHER INFORMATION: Primer ill-EC-1-POLE-01R

<400> SEQUENCE: 488 tttttttcg gaacattgcc cagcacta                                        28

<210> SEQ ID NO 489
<211> LENGTH: 28
<212> TYPE: DNA
<213> ORGANISM: Artificial Sequence
<220> FEATURE:
<223> OTHER INFORMATION: Primer ill-EC-2-POLE-02F

<400> SEQUENCE: 489
tttttttttc cagggtctcc aggaggta                                       28

<210> SEQ ID NO 490
<211> LENGTH: 27
<212> TYPE: DNA
<213> ORGANISM: Artificial Sequence
<220> FEATURE:
<223> OTHER INFORMATION: Primer ill-EC-2-POLE-02R

<400> SEQUENCE: 490 tttttttct catctgcctc ggctcag                                         27

<210> SEQ ID NO 491
<211> LENGTH: 28
<212> TYPE: DNA
<213> ORGANISM: Artificial Sequence
<220> FEATURE:
<223> OTHER INFORMATION: Primer ill-EC-1-POLE-02F

<400> SEQUENCE: 491 tttttttga gacccagtc cactcaga                                         28

```
<210> SEQ ID NO 492
<211> LENGTH: 28
<212> TYPE: DNA
<213> ORGANISM: Artificial Sequence
<220> FEATURE:
<223> OTHER INFORMATION: Primer ill-EC-1-POLE-02R

<400> SEQUENCE: 492
ttttttttct gctcccttc aggtctgc                                28

<210> SEQ ID NO 493
<211> LENGTH: 28
<212> TYPE: DNA
<213> ORGANISM: Artificial Sequence
<220> FEATURE:
<223> OTHER INFORMATION: Primer ill-EC-2-POLE-03F

<400> SEQUENCE: 493
ttttttttga tggtgagggc gaagtctc                                28

<210> SEQ ID NO 494
<211> LENGTH: 26
<212> TYPE: DNA
<213> ORGANISM: Artificial Sequence
<220> FEATURE:
<223> OTHER INFORMATION: Primer ill-EC-2-POLE-03R

<400> SEQUENCE: 494
ttttttttgc ccacgaatgt gtctcg                                  26

<210> SEQ ID NO 495
<211> LENGTH: 27
<212> TYPE: DNA
<213> ORGANISM: Artificial Sequence
<220> FEATURE:
<223> OTHER INFORMATION: Primer ill-EC-1-POLE-03F

<400> SEQUENCE: 495
ttttttttgg gcatggactg gtctgca                                 27

<210> SEQ ID NO 496
<211> LENGTH: 28
<212> TYPE: DNA
<213> ORGANISM: Artificial Sequence
<220> FEATURE:
<223> OTHER INFORMATION: Primer ill-EC-1-POLE-03R

<400> SEQUENCE: 496
ttttttttag aagctgatgg ccttcacc                                28

<210> SEQ ID NO 497
<211> LENGTH: 26
<212> TYPE: DNA
<213> ORGANISM: Artificial Sequence
<220> FEATURE:
<223> OTHER INFORMATION: Primer ill-EC-2-POLE-04F

<400> SEQUENCE: 497
tttttttttg cacgactcac caggtc                                  26

<210> SEQ ID NO 498
<211> LENGTH: 25
<212> TYPE: DNA
<213> ORGANISM: Artificial Sequence
<220> FEATURE:
<223> OTHER INFORMATION: Primer ill-EC-2-POLE-04R
```

<400> SEQUENCE: 498 tttttttttgg gctggtgacc tctcg                                    25

<210> SEQ ID NO 499
<211> LENGTH: 28
<212> TYPE: DNA
<213> ORGANISM: Artificial Sequence
<220> FEATURE:
<223> OTHER INFORMATION: Primer ill-EC-1-POLE-04F

<400> SEQUENCE: 499
tttttttttc atctcgatgg cagaggag                                  28

<210> SEQ ID NO 500
<211> LENGTH: 27
<212> TYPE: DNA
<213> ORGANISM: Artificial Sequence
<220> FEATURE:
<223> OTHER INFORMATION: Primer ill-EC-1-POLE-04R

<400> SEQUENCE: 500 tttttttca ccaggcgctt ctcacag                                    27

<210> SEQ ID NO 501
<211> LENGTH: 29
<212> TYPE: DNA
<213> ORGANISM: Artificial Sequence
<220> FEATURE:
<223> OTHER INFORMATION: Primer ill-EC-2-POLE-05F

<400> SEQUENCE: 501 tttttttct gcagaagccc tcaagacac                                  29

<210> SEQ ID NO 502
<211> LENGTH: 28
<212> TYPE: DNA
<213> ORGANISM: Artificial Sequence
<220> FEATURE:
<223> OTHER INFORMATION: Primer ill-EC-2-POLE-05R

<400> SEQUENCE: 502 tttttttcg ctcctacgtg cttcctga                                   28

<210> SEQ ID NO 503
<211> LENGTH: 33
<212> TYPE: DNA
<213> ORGANISM: Artificial Sequence
<220> FEATURE:
<223> OTHER INFORMATION: Primer ill-EC-1-POLE-05F

<400> SEQUENCE: 503
tttttttttc tgagaaggaa gagtctttac aca                            33

<210> SEQ ID NO 504
<211> LENGTH: 32
<212> TYPE: DNA
<213> ORGANISM: Artificial Sequence
<220> FEATURE:
<223> OTHER INFORMATION: Primer ill-EC-1-POLE-05R

<400> SEQUENCE: 504 tttttttca aaccaggtga ataagctgaa cc                              32

<210> SEQ ID NO 505
<211> LENGTH: 28

```
<212> TYPE: DNA
<213> ORGANISM: Artificial Sequence
<220> FEATURE:
<223> OTHER INFORMATION: Primer ill-EC-2-POLE-06F

<400> SEQUENCE: 505
ttttttttga gaactcgccg acatccac                                    28

<210> SEQ ID NO 506
<211> LENGTH: 30
<212> TYPE: DNA
<213> ORGANISM: Artificial Sequence
<220> FEATURE:
<223> OTHER INFORMATION: Primer ill-EC-2-POLE-06R

<400> SEQUENCE: 506
ttttttttgt agcctaaggt ccagagggtt                                  30

<210> SEQ ID NO 507
<211> LENGTH: 32
<212> TYPE: DNA
<213> ORGANISM: Artificial Sequence
<220> FEATURE:
<223> OTHER INFORMATION: Primer ill-EC-1-POLE-06F

<400> SEQUENCE: 507
ttttttttac acatgtacgt tagtgtcctc tc                               32

<210> SEQ ID NO 508
<211> LENGTH: 31
<212> TYPE: DNA
<213> ORGANISM: Artificial Sequence
<220> FEATURE:
<223> OTHER INFORMATION: Primer ill-EC-1-POLE-06R

<400> SEQUENCE: 508
ttttttttga ttcagaagaa agtcacaggc t                                31

<210> SEQ ID NO 509
<211> LENGTH: 31
<212> TYPE: DNA
<213> ORGANISM: Artificial Sequence
<220> FEATURE:
<223> OTHER INFORMATION: Primer ill-EC-2-POLE-07F

<400> SEQUENCE: 509
tttttttttt attgagcagc aagtgggaac c                                31

<210> SEQ ID NO 510
<211> LENGTH: 31
<212> TYPE: DNA
<213> ORGANISM: Artificial Sequence
<220> FEATURE:
<223> OTHER INFORMATION: Primer ill-EC-2-POLE-07R

<400> SEQUENCE: 510
ttttttttcc ttatacttcc aggaatgatc a                                31

<210> SEQ ID NO 511
<211> LENGTH: 30
<212> TYPE: DNA
<213> ORGANISM: Artificial Sequence
<220> FEATURE:
<223> OTHER INFORMATION: Primer ill-EC-1-POLE-07F

<400> SEQUENCE: 511
```
ttttttttct ctgagtgagc tcatttgcga                30

<210> SEQ ID NO 512
<211> LENGTH: 31
<212> TYPE: DNA
<213> ORGANISM: Artificial Sequence
<220> FEATURE:
<223> OTHER INFORMATION: Primer ill-EC-1-POLE-07R

<400> SEQUENCE: 512 tttttttag tgacctaact cctctgtgtg c                31

<210> SEQ ID NO 513
<211> LENGTH: 28
<212> TYPE: DNA
<213> ORGANISM: Artificial Sequence
<220> FEATURE:
<223> OTHER INFORMATION: Primer ill-EC-2-POLE-08F

<400> SEQUENCE: 513
tttttttttt aggtcactgg cacatggc                   28

<210> SEQ ID NO 514
<211> LENGTH: 25
<212> TYPE: DNA
<213> ORGANISM: Artificial Sequence
<220> FEATURE:
<223> OTHER INFORMATION: Primer ill-EC-2-POLE-08R

<400> SEQUENCE: 514 tttttttcg tggccgtgta ccact                       25

<210> SEQ ID NO 515
<211> LENGTH: 27
<212> TYPE: DNA
<213> ORGANISM: Artificial Sequence
<220> FEATURE:
<223> OTHER INFORMATION: Primer ill-EC-1-POLE-08F

<400> SEQUENCE: 515 tttttttgc ctcagcccgt ccttcat                     27

<210> SEQ ID NO 516
<211> LENGTH: 32
<212> TYPE: DNA
<213> ORGANISM: Artificial Sequence
<220> FEATURE:
<223> OTHER INFORMATION: Primer ill-EC-1-POLE-08R

<400> SEQUENCE: 516 tttttttat taacaatgac attttagcct ca               32

<210> SEQ ID NO 517
<211> LENGTH: 29
<212> TYPE: DNA
<213> ORGANISM: Artificial Sequence
<220> FEATURE:
<223> OTHER INFORMATION: Primer ill-EC-2-POLE-09F

<400> SEQUENCE: 517 tttttttcc cttcttgcga taccatggc                   29

<210> SEQ ID NO 518
<211> LENGTH: 32
<212> TYPE: DNA
<213> ORGANISM: Artificial Sequence

```
<220> FEATURE:
<223> OTHER INFORMATION: Primer ill-EC-2-POLE-09R

<400> SEQUENCE: 518
tttttttttt tactggaaaa caactggaac at                                32

<210> SEQ ID NO 519
<211> LENGTH: 28
<212> TYPE: DNA
<213> ORGANISM: Artificial Sequence
<220> FEATURE:
<223> OTHER INFORMATION: Primer ill-EC-1-POLE-09F

<400> SEQUENCE: 519 tttttttttgg ctgcctgtgg caaaaact                                   28

<210> SEQ ID NO 520
<211> LENGTH: 31
<212> TYPE: DNA
<213> ORGANISM: Artificial Sequence
<220> FEATURE:
<223> OTHER INFORMATION: Primer ill-EC-1-POLE-09R

<400> SEQUENCE: 520
tttttttttc tcatgtgtta cagcaagact c                                31

<210> SEQ ID NO 521
<211> LENGTH: 31
<212> TYPE: DNA
<213> ORGANISM: Artificial Sequence
<220> FEATURE:
<223> OTHER INFORMATION: Primer ill-EC-2-POLE-10F

<400> SEQUENCE: 521 tttttttttca gtaaatcctc cacgttggat t                               31

<210> SEQ ID NO 522
<211> LENGTH: 26
<212> TYPE: DNA
<213> ORGANISM: Artificial Sequence
<220> FEATURE:
<223> OTHER INFORMATION: Primer ill-EC-2-POLE-10R

<400> SEQUENCE: 522 tttttttttcc tctaccaggc cgcgat                                     26

<210> SEQ ID NO 523
<211> LENGTH: 29
<212> TYPE: DNA
<213> ORGANISM: Artificial Sequence
<220> FEATURE:
<223> OTHER INFORMATION: Primer ill-EC-1-POLE-10F

<400> SEQUENCE: 523 tttttttttca cttgctgcag gaatgaacg                                  29

<210> SEQ ID NO 524
<211> LENGTH: 32
<212> TYPE: DNA
<213> ORGANISM: Artificial Sequence
<220> FEATURE:
<223> OTHER INFORMATION: Primer ill-EC-1-POLE-10R

<400> SEQUENCE: 524 tttttttttaa tttctttctc tcgatgctgg ga                              32
```

<210> SEQ ID NO 525
<211> LENGTH: 33
<212> TYPE: DNA
<213> ORGANISM: Artificial Sequence
<220> FEATURE:
<223> OTHER INFORMATION: Primer ill-EC-2-POLE-11F

<400> SEQUENCE: 525 tttttttttct tttcctttga ttccgccata gtt                        33

<210> SEQ ID NO 526
<211> LENGTH: 33
<212> TYPE: DNA
<213> ORGANISM: Artificial Sequence
<220> FEATURE:
<223> OTHER INFORMATION: Primer ill-EC-2-POLE-11R

<400> SEQUENCE: 526 tttttttttgg aaataaagga aagttgagaa caa                        33

<210> SEQ ID NO 527
<211> LENGTH: 33
<212> TYPE: DNA
<213> ORGANISM: Artificial Sequence
<220> FEATURE:
<223> OTHER INFORMATION: Primer ill-EC-1-POLE-11F

<400> SEQUENCE: 527 tttttttttgg gtcattttag catccctctc aaa                        33

<210> SEQ ID NO 528
<211> LENGTH: 30
<212> TYPE: DNA
<213> ORGANISM: Artificial Sequence
<220> FEATURE:
<223> OTHER INFORMATION: Primer ill-EC-1-POLE-11R

<400> SEQUENCE: 528 tttttttttgg tcatcagtca tctacgccaa                            30

<210> SEQ ID NO 529
<211> LENGTH: 31
<212> TYPE: DNA
<213> ORGANISM: Artificial Sequence
<220> FEATURE:
<223> OTHER INFORMATION: Primer ill-EC-2-POLE-12F

<400> SEQUENCE: 529
tttttttttt tgtacagagg atgatgcggt t                           31

<210> SEQ ID NO 530
<211> LENGTH: 32
<212> TYPE: DNA
<213> ORGANISM: Artificial Sequence
<220> FEATURE:
<223> OTHER INFORMATION: Primer ill-EC-2-POLE-12R

<400> SEQUENCE: 530 tttttttttct cagctctttt ccctcttgga tt                         32

<210> SEQ ID NO 531
<211> LENGTH: 30
<212> TYPE: DNA
<213> ORGANISM: Artificial Sequence
<220> FEATURE:
<223> OTHER INFORMATION: Primer ill-EC-1-POLE-12F

```
<400> SEQUENCE: 531
ttttttttca ctacttatcc cagaggcact                                30

<210> SEQ ID NO 532
<211> LENGTH: 29
<212> TYPE: DNA
<213> ORGANISM: Artificial Sequence
<220> FEATURE:
<223> OTHER INFORMATION: Primer ill-EC-1-POLE-12R

<400> SEQUENCE: 532 ttttttttc ctctctgctt catgaccct                                  29

<210> SEQ ID NO 533
<211> LENGTH: 31
<212> TYPE: DNA
<213> ORGANISM: Artificial Sequence
<220> FEATURE:
<223> OTHER INFORMATION: Primer ill-EC-2-POLE-13F

<400> SEQUENCE: 533
ttttttttgg aagagcttct tcatcatgtt g                              31

<210> SEQ ID NO 534
<211> LENGTH: 29
<212> TYPE: DNA
<213> ORGANISM: Artificial Sequence
<220> FEATURE:
<223> OTHER INFORMATION: Primer ill-EC-2-POLE-13R

<400> SEQUENCE: 534
ttttttttga tcctgaagag catggtcgt                                 29

<210> SEQ ID NO 535
<211> LENGTH: 32
<212> TYPE: DNA
<213> ORGANISM: Artificial Sequence
<220> FEATURE:
<223> OTHER INFORMATION: Primer ill-EC-1-POLE-13F

<400> SEQUENCE: 535
ttttttttcc tggttgtctg catagatgtt gt                             32

<210> SEQ ID NO 536
<211> LENGTH: 30
<212> TYPE: DNA
<213> ORGANISM: Artificial Sequence
<220> FEATURE:
<223> OTHER INFORMATION: Primer ill-EC-1-POLE-13R

<400> SEQUENCE: 536
ttttttttga aaacctgtgc ccatttcagt                                30

<210> SEQ ID NO 537
<211> LENGTH: 31
<212> TYPE: DNA
<213> ORGANISM: Artificial Sequence
<220> FEATURE:
<223> OTHER INFORMATION: Primer ill-EC-2-POLE-14F

<400> SEQUENCE: 537
ttttttttaa attaagggca aaggataaga c                              31

<210> SEQ ID NO 538
```

```
<211> LENGTH: 29
<212> TYPE: DNA
<213> ORGANISM: Artificial Sequence
<220> FEATURE:
<223> OTHER INFORMATION: Primer ill-EC-2-POLE-14R

<400> SEQUENCE: 538 tttttttat cagcttcgac gtgatccag                                       29

<210> SEQ ID NO 539
<211> LENGTH: 26
<212> TYPE: DNA
<213> ORGANISM: Artificial Sequence
<220> FEATURE:
<223> OTHER INFORMATION: Primer ill-EC-1-POLE-14F

<400> SEQUENCE: 539 tttttttag cctgaccacc cgtgat                                          26

<210> SEQ ID NO 540
<211> LENGTH: 27
<212> TYPE: DNA
<213> ORGANISM: Artificial Sequence
<220> FEATURE:
<223> OTHER INFORMATION: Primer ill-EC-1-POLE-14R

<400> SEQUENCE: 540 tttttttga gcatggcgtc ttcctgt                                         27

<210> SEQ ID NO 541
<211> LENGTH: 29
<212> TYPE: DNA
<213> ORGANISM: Artificial Sequence
<220> FEATURE:
<223> OTHER INFORMATION: Primer ill-EC-2-POLE-15F

<400> SEQUENCE: 541
tttttttttg tcgttgacat ggtgagact                                      29

<210> SEQ ID NO 542
<211> LENGTH: 28
<212> TYPE: DNA
<213> ORGANISM: Artificial Sequence
<220> FEATURE:
<223> OTHER INFORMATION: Primer ill-EC-2-POLE-15R

<400> SEQUENCE: 542 tttttttgg tctgttgctg gttctgga                                        28

<210> SEQ ID NO 543
<211> LENGTH: 30
<212> TYPE: DNA
<213> ORGANISM: Artificial Sequence
<220> FEATURE:
<223> OTHER INFORMATION: Primer ill-EC-1-POLE-15F

<400> SEQUENCE: 543 tttttttgg cactattgcc ttgagaagat                                      30

<210> SEQ ID NO 544
<211> LENGTH: 30
<212> TYPE: DNA
<213> ORGANISM: Artificial Sequence
<220> FEATURE:
<223> OTHER INFORMATION: Primer ill-EC-1-POLE-15R

<400> SEQUENCE: 544
```

```
tttttttttga caactgtctt gtcatggagt                                            30

<210> SEQ ID NO 545
<211> LENGTH: 29
<212> TYPE: DNA
<213> ORGANISM: Artificial Sequence
<220> FEATURE:
<223> OTHER INFORMATION: Primer ill-EC-2-POLE-16F

<400> SEQUENCE: 545
tttttttttt gatctcaaca gtggcttgg                                              29

<210> SEQ ID NO 546
<211> LENGTH: 29
<212> TYPE: DNA
<213> ORGANISM: Artificial Sequence
<220> FEATURE:
<223> OTHER INFORMATION: Primer ill-EC-2-POLE-16R

<400> SEQUENCE: 546 tttttttttag aggacatctc cacattcgg                                             29

<210> SEQ ID NO 547
<211> LENGTH: 29
<212> TYPE: DNA
<213> ORGANISM: Artificial Sequence
<220> FEATURE:
<223> OTHER INFORMATION: Primer ill-EC-1-POLE-16F

<400> SEQUENCE: 547 tttttttttca gttgtcatca gcctcctttt                                            29

<210> SEQ ID NO 548
<211> LENGTH: 30
<212> TYPE: DNA
<213> ORGANISM: Artificial Sequence
<220> FEATURE:
<223> OTHER INFORMATION: Primer ill-EC-1-POLE-16R

<400> SEQUENCE: 548 tttttttttgt gcaggtactt tcacattccc                                            30

<210> SEQ ID NO 549
<211> LENGTH: 29
<212> TYPE: DNA
<213> ORGANISM: Artificial Sequence
<220> FEATURE:
<223> OTHER INFORMATION: Primer ill-EC-2-POLE-17F

<400> SEQUENCE: 549
tttttttttg tcctctggta ggttcccaa                                              29

<210> SEQ ID NO 550
<211> LENGTH: 28
<212> TYPE: DNA
<213> ORGANISM: Artificial Sequence
<220> FEATURE:
<223> OTHER INFORMATION: Primer ill-EC-2-POLE-17R

<400> SEQUENCE: 550 tttttttttgg ccttcgagat gagcaggt                                              28

<210> SEQ ID NO 551
<211> LENGTH: 29
<212> TYPE: DNA
```

<210> SEQ ID NO 551
<211> LENGTH: 29
<212> TYPE: DNA
<213> ORGANISM: Artificial Sequence
<220> FEATURE:
<223> OTHER INFORMATION: Primer ill-EC-1-POLE-17F

<400> SEQUENCE: 551 tttttttttgc ccacaacgac agtactgtg                29

<210> SEQ ID NO 552
<211> LENGTH: 32
<212> TYPE: DNA
<213> ORGANISM: Artificial Sequence
<220> FEATURE:
<223> OTHER INFORMATION: Primer ill-EC-1-POLE-17R

<400> SEQUENCE: 552 tttttttttgc ctatctgtgt ggctgacaag at             32

<210> SEQ ID NO 553
<211> LENGTH: 30
<212> TYPE: DNA
<213> ORGANISM: Artificial Sequence
<220> FEATURE:
<223> OTHER INFORMATION: Primer ill-EC-2-POLE-18F

<400> SEQUENCE: 553 tttttttttca ggttgaggta gtgacggatc                30

<210> SEQ ID NO 554
<211> LENGTH: 29
<212> TYPE: DNA
<213> ORGANISM: Artificial Sequence
<220> FEATURE:
<223> OTHER INFORMATION: Primer ill-EC-2-POLE-18R

<400> SEQUENCE: 554 tttttttttcc acactcatcg ctgttcagt                 29

<210> SEQ ID NO 555
<211> LENGTH: 30
<212> TYPE: DNA
<213> ORGANISM: Artificial Sequence
<220> FEATURE:
<223> OTHER INFORMATION: Primer ill-EC-1-POLE-18F

<400> SEQUENCE: 555 tttttttttga taggcaccag tgggaattcc                30

<210> SEQ ID NO 556
<211> LENGTH: 30
<212> TYPE: DNA
<213> ORGANISM: Artificial Sequence
<220> FEATURE:
<223> OTHER INFORMATION: Primer ill-EC-1-POLE-18R

<400> SEQUENCE: 556 tttttttttgt gtgagcccca tcttctttga                30

<210> SEQ ID NO 557
<211> LENGTH: 32
<212> TYPE: DNA
<213> ORGANISM: Artificial Sequence
<220> FEATURE:
<223> OTHER INFORMATION: Primer ill-EC-2-POLE-19F

<400> SEQUENCE: 557 tttttttttca aggcaaaatg gaagaaaaga cc             32

<210> SEQ ID NO 558
<211> LENGTH: 30
<212> TYPE: DNA
<213> ORGANISM: Artificial Sequence
<220> FEATURE:
<223> OTHER INFORMATION: Primer ill-EC-2-POLE-19R

<400> SEQUENCE: 558 tttttttttca aacacacctt cgaagttcgg                              30

<210> SEQ ID NO 559
<211> LENGTH: 26
<212> TYPE: DNA
<213> ORGANISM: Artificial Sequence
<220> FEATURE:
<223> OTHER INFORMATION: Primer ill-EC-1-POLE-19F

<400> SEQUENCE: 559 tttttttttcg agcaggaatc gctgga                                  26

<210> SEQ ID NO 560
<211> LENGTH: 26
<212> TYPE: DNA
<213> ORGANISM: Artificial Sequence
<220> FEATURE:
<223> OTHER INFORMATION: Primer ill-EC-1-POLE-19R

<400> SEQUENCE: 560 tttttttttgt ctaggtgcgc agcaac                                  26

<210> SEQ ID NO 561
<211> LENGTH: 29
<212> TYPE: DNA
<213> ORGANISM: Artificial Sequence
<220> FEATURE:
<223> OTHER INFORMATION: Primer ill-EC-2-POLE-20F

<400> SEQUENCE: 561 tttttttttcc gtgctctgct gagtacagg                               29

<210> SEQ ID NO 562
<211> LENGTH: 31
<212> TYPE: DNA
<213> ORGANISM: Artificial Sequence
<220> FEATURE:
<223> OTHER INFORMATION: Primer ill-EC-2-POLE-20R

<400> SEQUENCE: 562 tttttttttcc atgagtgctt gtcgtgattg a                            31

<210> SEQ ID NO 563
<211> LENGTH: 30
<212> TYPE: DNA
<213> ORGANISM: Artificial Sequence
<220> FEATURE:
<223> OTHER INFORMATION: Primer ill-EC-1-POLE-20F

<400> SEQUENCE: 563 tttttttttcc cttgaggaca agacctggag                              30

<210> SEQ ID NO 564
<211> LENGTH: 26
<212> TYPE: DNA
<213> ORGANISM: Artificial Sequence
<220> FEATURE:

<223> OTHER INFORMATION: Primer ill-EC-1-POLE-20R

<400> SEQUENCE: 564 tttttttttcc cacaaagcgc tcttcg    26

<210> SEQ ID NO 565
<211> LENGTH: 30
<212> TYPE: DNA
<213> ORGANISM: Artificial Sequence
<220> FEATURE:
<223> OTHER INFORMATION: Primer ill-EC-2-POLE-21F

<400> SEQUENCE: 565 ttttttttc acagtgtcca gcacaaagac    30

<210> SEQ ID NO 566
<211> LENGTH: 29
<212> TYPE: DNA
<213> ORGANISM: Artificial Sequence
<220> FEATURE:
<223> OTHER INFORMATION: Primer ill-EC-2-POLE-21R

<400> SEQUENCE: 566 tttttttgg gtgacggtct tgtttccttt    29

<210> SEQ ID NO 567
<211> LENGTH: 31
<212> TYPE: DNA
<213> ORGANISM: Artificial Sequence
<220> FEATURE:
<223> OTHER INFORMATION: Primer ill-EC-1-POLE-21F

<400> SEQUENCE: 567
ttttttttgc gtggtggtac aggtagatat g    31

<210> SEQ ID NO 568
<211> LENGTH: 30
<212> TYPE: DNA
<213> ORGANISM: Artificial Sequence
<220> FEATURE:
<223> OTHER INFORMATION: Primer ill-EC-1-POLE-21R

<400> SEQUENCE: 568
ttttttttag agacctttgc tcttgagcac    30

<210> SEQ ID NO 569
<211> LENGTH: 30
<212> TYPE: DNA
<213> ORGANISM: Artificial Sequence
<220> FEATURE:
<223> OTHER INFORMATION: Primer ill-EC-2-POLE-22F

<400> SEQUENCE: 569
ttttttttcc tggttccagg tagctgaact    30

<210> SEQ ID NO 570
<211> LENGTH: 31
<212> TYPE: DNA
<213> ORGANISM: Artificial Sequence
<220> FEATURE:
<223> OTHER INFORMATION: Primer ill-EC-2-POLE-22R

<400> SEQUENCE: 570
ttttttttcc cgattcttcc aggttccgtt a    31

```
<210> SEQ ID NO 571
<211> LENGTH: 28
<212> TYPE: DNA
<213> ORGANISM: Artificial Sequence
<220> FEATURE:
<223> OTHER INFORMATION: Primer ill-EC-1-POLE-22F

<400> SEQUENCE: 571 ttttttttg cttcccagcc tgaaaggt                                      28

<210> SEQ ID NO 572
<211> LENGTH: 27
<212> TYPE: DNA
<213> ORGANISM: Artificial Sequence
<220> FEATURE:
<223> OTHER INFORMATION: Primer ill-EC-1-POLE-22R

<400> SEQUENCE: 572
ttttttttca catcccgggc agaagtc                                      27

<210> SEQ ID NO 573
<211> LENGTH: 30
<212> TYPE: DNA
<213> ORGANISM: Artificial Sequence
<220> FEATURE:
<223> OTHER INFORMATION: Primer ill-EC-2-POLE-23F

<400> SEQUENCE: 573
ttttttttgg gcgggtttct ttcctccata                                   30

<210> SEQ ID NO 574
<211> LENGTH: 30
<212> TYPE: DNA
<213> ORGANISM: Artificial Sequence
<220> FEATURE:
<223> OTHER INFORMATION: Primer ill-EC-2-POLE-23R

<400> SEQUENCE: 574
ttttttttta tgagtattca gtgccagagg                                   30

<210> SEQ ID NO 575
<211> LENGTH: 29
<212> TYPE: DNA
<213> ORGANISM: Artificial Sequence
<220> FEATURE:
<223> OTHER INFORMATION: Primer ill-EC-1-POLE-23F

<400> SEQUENCE: 575
ttttttttca gctcagcgtt gatctcgtt                                    29

<210> SEQ ID NO 576
<211> LENGTH: 31
<212> TYPE: DNA
<213> ORGANISM: Artificial Sequence
<220> FEATURE:
<223> OTHER INFORMATION: Primer ill-EC-1-POLE-23R

<400> SEQUENCE: 576
ttttttttgc tttgtgtgtg taccacagac a                                 31

<210> SEQ ID NO 577
<211> LENGTH: 31
<212> TYPE: DNA
<213> ORGANISM: Artificial Sequence
<220> FEATURE:
<223> OTHER INFORMATION: Primer ill-EC-2-POLE-24F
```

<400> SEQUENCE: 577 tttttttttta gatcatggga aagccacctc a        31

<210> SEQ ID NO 578
<211> LENGTH: 29
<212> TYPE: DNA
<213> ORGANISM: Artificial Sequence
<220> FEATURE:
<223> OTHER INFORMATION: Primer ill-EC-2-POLE-24R

<400> SEQUENCE: 578 tttttttttcc cgtgtgttct acgtgaacc        29

<210> SEQ ID NO 579
<211> LENGTH: 27
<212> TYPE: DNA
<213> ORGANISM: Artificial Sequence
<220> FEATURE:
<223> OTHER INFORMATION: Primer ill-EC-1-POLE-24F

<400> SEQUENCE: 579 tttttttttcc ctcctccgct ttagcga        27

<210> SEQ ID NO 580
<211> LENGTH: 31
<212> TYPE: DNA
<213> ORGANISM: Artificial Sequence
<220> FEATURE:
<223> OTHER INFORMATION: Primer ill-EC-1-POLE-24R

<400> SEQUENCE: 580 tttttttttgt tccagtgtgt cctgtgatgt g        31

<210> SEQ ID NO 581
<211> LENGTH: 29
<212> TYPE: DNA
<213> ORGANISM: Artificial Sequence
<220> FEATURE:
<223> OTHER INFORMATION: Primer ill-EC-2-POLE-25F

<400> SEQUENCE: 581 tttttttttgc tggtctcgct gatctgaaa        29

<210> SEQ ID NO 582
<211> LENGTH: 30
<212> TYPE: DNA
<213> ORGANISM: Artificial Sequence
<220> FEATURE:
<223> OTHER INFORMATION: Primer ill-EC-2-POLE-25R

<400> SEQUENCE: 582 tttttttttct ggagtttcct gcccatcgta        30

<210> SEQ ID NO 583
<211> LENGTH: 29
<212> TYPE: DNA
<213> ORGANISM: Artificial Sequence
<220> FEATURE:
<223> OTHER INFORMATION: Primer ill-EC-1-POLE-25F

<400> SEQUENCE: 583 tttttttttta accctcccat cccagacct        29

<210> SEQ ID NO 584
<211> LENGTH: 28

```
<212> TYPE: DNA
<213> ORGANISM: Artificial Sequence
<220> FEATURE:
<223> OTHER INFORMATION: Primer ill-EC-1-POLE-25R

<400> SEQUENCE: 584 tttttttttgg gagcttcttg cgaagaac                                             28

<210> SEQ ID NO 585
<211> LENGTH: 26
<212> TYPE: DNA
<213> ORGANISM: Artificial Sequence
<220> FEATURE:
<223> OTHER INFORMATION: Primer ill-EC-2-POLE-26F

<400> SEQUENCE: 585
tttttttttc tgccacggaa ggtcca                                                26

<210> SEQ ID NO 586
<211> LENGTH: 29
<212> TYPE: DNA
<213> ORGANISM: Artificial Sequence
<220> FEATURE:
<223> OTHER INFORMATION: Primer ill-EC-2-POLE-26R

<400> SEQUENCE: 586 tttttttttca agaagaagtg gcagctgca                                            29

<210> SEQ ID NO 587
<211> LENGTH: 27
<212> TYPE: DNA
<213> ORGANISM: Artificial Sequence
<220> FEATURE:
<223> OTHER INFORMATION: Primer ill-EC-1-POLE-26F

<400> SEQUENCE: 587 tttttttttcc ctctgccgac tccagac                                              27

<210> SEQ ID NO 588
<211> LENGTH: 27
<212> TYPE: DNA
<213> ORGANISM: Artificial Sequence
<220> FEATURE:
<223> OTHER INFORMATION: Primer ill-EC-1-POLE-26R

<400> SEQUENCE: 588 tttttttttgg cgggcattcc catctca                                              27

<210> SEQ ID NO 589
<211> LENGTH: 28
<212> TYPE: DNA
<213> ORGANISM: Artificial Sequence
<220> FEATURE:
<223> OTHER INFORMATION: Primer ill-EC-2-POLE-27F

<400> SEQUENCE: 589 tttttttttct gtgcagaccc ctcagaga                                             28

<210> SEQ ID NO 590
<211> LENGTH: 28
<212> TYPE: DNA
<213> ORGANISM: Artificial Sequence
<220> FEATURE:
<223> OTHER INFORMATION: Primer ill-EC-2-POLE-27R

<400> SEQUENCE: 590
``` tttttttttca gccccctgtca ctgtgaag        28

<210> SEQ ID NO 591
<211> LENGTH: 29
<212> TYPE: DNA
<213> ORGANISM: Artificial Sequence
<220> FEATURE:
<223> OTHER INFORMATION: Primer ill-EC-1-POLE-27F

<400> SEQUENCE: 591
tttttttttc tcccaaagaa ctcgcttcc        29

<210> SEQ ID NO 592
<211> LENGTH: 28
<212> TYPE: DNA
<213> ORGANISM: Artificial Sequence
<220> FEATURE:
<223> OTHER INFORMATION: Primer ill-EC-1-POLE-27R

<400> SEQUENCE: 592 tttttttgc agcccgagat cctgagat        28

<210> SEQ ID NO 593
<211> LENGTH: 32
<212> TYPE: DNA
<213> ORGANISM: Artificial Sequence
<220> FEATURE:
<223> OTHER INFORMATION: Primer ill-EC-2-POLE-28F

<400> SEQUENCE: 593 tttttttga acagaagctt cactacagca ca        32

<210> SEQ ID NO 594
<211> LENGTH: 32
<212> TYPE: DNA
<213> ORGANISM: Artificial Sequence
<220> FEATURE:
<223> OTHER INFORMATION: Primer ill-EC-2-POLE-28R

<400> SEQUENCE: 594 tttttttaa ctgctggaga agaatgatgt ct        32

<210> SEQ ID NO 595
<211> LENGTH: 30
<212> TYPE: DNA
<213> ORGANISM: Artificial Sequence
<220> FEATURE:
<223> OTHER INFORMATION: Primer ill-EC-1-POLE-28F

<400> SEQUENCE: 595 tttttttgg gtgaagagct cactgatctt        30

<210> SEQ ID NO 596
<211> LENGTH: 32
<212> TYPE: DNA
<213> ORGANISM: Artificial Sequence
<220> FEATURE:
<223> OTHER INFORMATION: Primer ill-EC-1-POLE-28R

<400> SEQUENCE: 596 tttttttgg gctaaaaact gtgcagttag ac        32

<210> SEQ ID NO 597
<211> LENGTH: 32
<212> TYPE: DNA
<213> ORGANISM: Artificial Sequence

```
<220> FEATURE:
<223> OTHER INFORMATION: Primer ill-EC-2-POLE-29F

<400> SEQUENCE: 597 tttttttttat cagagagaga cccttgtcta ac                          32

<210> SEQ ID NO 598
<211> LENGTH: 33
<212> TYPE: DNA
<213> ORGANISM: Artificial Sequence
<220> FEATURE:
<223> OTHER INFORMATION: Primer ill-EC-2-POLE-29R

<400> SEQUENCE: 598
ttttttttca gattctggat tgggactact aca                          33

<210> SEQ ID NO 599
<211> LENGTH: 32
<212> TYPE: DNA
<213> ORGANISM: Artificial Sequence
<220> FEATURE:
<223> OTHER INFORMATION: Primer ill-EC-1-POLE-29F

<400> SEQUENCE: 599 tttttttttgg gatggtgatg atcttctgga tg                          32

<210> SEQ ID NO 600
<211> LENGTH: 33
<212> TYPE: DNA
<213> ORGANISM: Artificial Sequence
<220> FEATURE:
<223> OTHER INFORMATION: Primer ill-EC-1-POLE-29R

<400> SEQUENCE: 600 ttttttttg agaggattaa ataagacaca gtg                           33

<210> SEQ ID NO 601
<211> LENGTH: 33
<212> TYPE: DNA
<213> ORGANISM: Artificial Sequence
<220> FEATURE:
<223> OTHER INFORMATION: Primer ill-EC-2-POLE-30F

<400> SEQUENCE: 601
ttttttttat tctgctctgt ctagcttttcc ttg                         33

<210> SEQ ID NO 602
<211> LENGTH: 31
<212> TYPE: DNA
<213> ORGANISM: Artificial Sequence
<220> FEATURE:
<223> OTHER INFORMATION: Primer ill-EC-2-POLE-30R

<400> SEQUENCE: 602
ttttttttga ggaagcactt tctccggaaa t                            31

<210> SEQ ID NO 603
<211> LENGTH: 31
<212> TYPE: DNA
<213> ORGANISM: Artificial Sequence
<220> FEATURE:
<223> OTHER INFORMATION: Primer ill-EC-1-POLE-30F

<400> SEQUENCE: 603
ttttttttct ggcactcact gctcgaatat c                            31
```

<210> SEQ ID NO 604
<211> LENGTH: 32
<212> TYPE: DNA
<213> ORGANISM: Artificial Sequence
<220> FEATURE:
<223> OTHER INFORMATION: Primer ill-EC-1-POLE-30R

<400> SEQUENCE: 604 tttttttag gatcagattt tgggtgattt tc                          32

<210> SEQ ID NO 605
<211> LENGTH: 26
<212> TYPE: DNA
<213> ORGANISM: Artificial Sequence
<220> FEATURE:
<223> OTHER INFORMATION: Primer ill-EC-2-POLE-31F

<400> SEQUENCE: 605 tttttttga gccctcacct gtccgt                                 26

<210> SEQ ID NO 606
<211> LENGTH: 29
<212> TYPE: DNA
<213> ORGANISM: Artificial Sequence
<220> FEATURE:
<223> OTHER INFORMATION: Primer ill-EC-2-POLE-31R

<400> SEQUENCE: 606 tttttttcc gagttcctgg gagaccaga                              29

<210> SEQ ID NO 607
<211> LENGTH: 30
<212> TYPE: DNA
<213> ORGANISM: Artificial Sequence
<220> FEATURE:
<223> OTHER INFORMATION: Primer ill-EC-1-POLE-31F

<400> SEQUENCE: 607 tttttttag atgatgtagc ggcaactcag                             30

<210> SEQ ID NO 608
<211> LENGTH: 32
<212> TYPE: DNA
<213> ORGANISM: Artificial Sequence
<220> FEATURE:
<223> OTHER INFORMATION: Primer ill-EC-1-POLE-31R

<400> SEQUENCE: 608 tttttttaa catgcctgac tctgagctat tc                          32

<210> SEQ ID NO 609
<211> LENGTH: 32
<212> TYPE: DNA
<213> ORGANISM: Artificial Sequence
<220> FEATURE:
<223> OTHER INFORMATION: Primer ill-EC-2-POLE-32F

<400> SEQUENCE: 609 tttttttgt agacttctgc tccccgtaat ct                          32

<210> SEQ ID NO 610
<211> LENGTH: 33
<212> TYPE: DNA
<213> ORGANISM: Artificial Sequence
<220> FEATURE:
<223> OTHER INFORMATION: Primer ill-EC-2-POLE-32R -continued

<400> SEQUENCE: 610 tttttttcc ttgatttctg cagtgtttta ccc                33

<210> SEQ ID NO 611
<211> LENGTH: 32
<212> TYPE: DNA
<213> ORGANISM: Artificial Sequence
<220> FEATURE:
<223> OTHER INFORMATION: Primer ill-EC-1-POLE-32F

<400> SEQUENCE: 611 tttttttgt tggctgccta gagaaagaca at                 32

<210> SEQ ID NO 612
<211> LENGTH: 35
<212> TYPE: DNA
<213> ORGANISM: Artificial Sequence
<220> FEATURE:
<223> OTHER INFORMATION: Primer ill-EC-1-POLE-32R

<400> SEQUENCE: 612 tttttttaa agtattgcca cacaggcata ttaga              35

<210> SEQ ID NO 613
<211> LENGTH: 31
<212> TYPE: DNA
<213> ORGANISM: Artificial Sequence
<220> FEATURE:
<223> OTHER INFORMATION: Primer ill-EC-2-POLE-33F

<400> SEQUENCE: 613 tttttttct tcatccttca tccctcagag c                  31

<210> SEQ ID NO 614
<211> LENGTH: 34
<212> TYPE: DNA
<213> ORGANISM: Artificial Sequence
<220> FEATURE:
<223> OTHER INFORMATION: Primer ill-EC-2-POLE-33R

<400> SEQUENCE: 614 tttttttg cagctgatta agatcttcca atcc                34

<210> SEQ ID NO 615
<211> LENGTH: 31
<212> TYPE: DNA
<213> ORGANISM: Artificial Sequence
<220> FEATURE:
<223> OTHER INFORMATION: Primer ill-EC-1-POLE-33F

<400> SEQUENCE: 615 tttttttta cagagccata cacctcttcc a                  31

<210> SEQ ID NO 616
<211> LENGTH: 32
<212> TYPE: DNA
<213> ORGANISM: Artificial Sequence
<220> FEATURE:
<223> OTHER INFORMATION: Primer ill-EC-1-POLE-33R

<400> SEQUENCE: 616 tttttttgg tatgctgtgt tcaatgaaga cg                 32

<210> SEQ ID NO 617

```
<211> LENGTH: 26
<212> TYPE: DNA
<213> ORGANISM: Artificial Sequence
<220> FEATURE:
<223> OTHER INFORMATION: Primer ill-EC-2-POLE-34F

<400> SEQUENCE: 617
ttttttttcg cggcgtttga cctcaa                                          26

<210> SEQ ID NO 618
<211> LENGTH: 29
<212> TYPE: DNA
<213> ORGANISM: Artificial Sequence
<220> FEATURE:
<223> OTHER INFORMATION: Primer ill-EC-2-POLE-34R

<400> SEQUENCE: 618
ttttttttga caggtggagg gttggaaag                                       29

<210> SEQ ID NO 619
<211> LENGTH: 33
<212> TYPE: DNA
<213> ORGANISM: Artificial Sequence
<220> FEATURE:
<223> OTHER INFORMATION: Primer ill-EC-1-POLE-34F

<400> SEQUENCE: 619
ttttttttcc aacctccttt ctgggctaaa tta                                  33

<210> SEQ ID NO 620
<211> LENGTH: 30
<212> TYPE: DNA
<213> ORGANISM: Artificial Sequence
<220> FEATURE:
<223> OTHER INFORMATION: Primer ill-EC-1-POLE-34R

<400> SEQUENCE: 620
tttttttttt tttgaggttg atgggccta                                       30

<210> SEQ ID NO 621
<211> LENGTH: 28
<212> TYPE: DNA
<213> ORGANISM: Artificial Sequence
<220> FEATURE:
<223> OTHER INFORMATION: Primer ill-EC-2-POLE-35F

<400> SEQUENCE: 621
ttttttttgg aggctggaag aatcatgg                                        28

<210> SEQ ID NO 622
<211> LENGTH: 28
<212> TYPE: DNA
<213> ORGANISM: Artificial Sequence
<220> FEATURE:
<223> OTHER INFORMATION: Primer ill-EC-2-POLE-35R

<400> SEQUENCE: 622
ttttttttgg gccatcatga gtgaagct                                        28

<210> SEQ ID NO 623
<211> LENGTH: 28
<212> TYPE: DNA
<213> ORGANISM: Artificial Sequence
<220> FEATURE:
<223> OTHER INFORMATION: Primer ill-EC-1-POLE-35F

<400> SEQUENCE: 623
``` tttttttttgt gacatcaggg cactgacg                                      28

<210> SEQ ID NO 624
<211> LENGTH: 30
<212> TYPE: DNA
<213> ORGANISM: Artificial Sequence
<220> FEATURE:
<223> OTHER INFORMATION: Primer ill-EC-1-POLE-35R

<400> SEQUENCE: 624 tttttttttcc caacagcttc ccagaaaatt                                    30

<210> SEQ ID NO 625
<211> LENGTH: 28
<212> TYPE: DNA
<213> ORGANISM: Artificial Sequence
<220> FEATURE:
<223> OTHER INFORMATION: Primer ill-EC-2-POLE-36F

<400> SEQUENCE: 625 tttttttttcc tgggtaggag atggtcac                                      28

<210> SEQ ID NO 626
<211> LENGTH: 29
<212> TYPE: DNA
<213> ORGANISM: Artificial Sequence
<220> FEATURE:
<223> OTHER INFORMATION: Primer ill-EC-2-POLE-36R

<400> SEQUENCE: 626 tttttttttca ctgggtgaaa aggaaaggg                                     29

<210> SEQ ID NO 627
<211> LENGTH: 28
<212> TYPE: DNA
<213> ORGANISM: Artificial Sequence
<220> FEATURE:
<223> OTHER INFORMATION: Primer ill-EC-1-POLE-36F

<400> SEQUENCE: 627
tttttttttt ccttcctgcc catgcttg                                       28

<210> SEQ ID NO 628
<211> LENGTH: 26
<212> TYPE: DNA
<213> ORGANISM: Artificial Sequence
<220> FEATURE:
<223> OTHER INFORMATION: Primer ill-EC-1-POLE-36R

<400> SEQUENCE: 628 tttttttttct ctcagggctc gctggt                                        26

<210> SEQ ID NO 629
<211> LENGTH: 27
<212> TYPE: DNA
<213> ORGANISM: Artificial Sequence
<220> FEATURE:
<223> OTHER INFORMATION: Primer ill-EC-2-POLE-37F

<400> SEQUENCE: 629 tttttttttcg gctccccttc tgcactc                                       27

<210> SEQ ID NO 630
<211> LENGTH: 28
<212> TYPE: DNA

```
<213> ORGANISM: Artificial Sequence
<220> FEATURE:
<223> OTHER INFORMATION: Primer ill-EC-2-POLE-37R

<400> SEQUENCE: 630 tttttttttct ctgatacccc ctggagga                                    28

<210> SEQ ID NO 631
<211> LENGTH: 33
<212> TYPE: DNA
<213> ORGANISM: Artificial Sequence
<220> FEATURE:
<223> OTHER INFORMATION: Primer ill-EC-1-POLE-37F

<400> SEQUENCE: 631 tttttttttct ccctccaaca ttccttgaat cag                              33

<210> SEQ ID NO 632
<211> LENGTH: 32
<212> TYPE: DNA
<213> ORGANISM: Artificial Sequence
<220> FEATURE:
<223> OTHER INFORMATION: Primer ill-EC-1-POLE-37R

<400> SEQUENCE: 632 tttttttttca agtgcatcct gaactccttc ta                               32

<210> SEQ ID NO 633
<211> LENGTH: 29
<212> TYPE: DNA
<213> ORGANISM: Artificial Sequence
<220> FEATURE:
<223> OTHER INFORMATION: Primer ill-EC-2-POLE-38F

<400> SEQUENCE: 633 tttttttttct accccttgcg catgacata                                   29

<210> SEQ ID NO 634
<211> LENGTH: 32
<212> TYPE: DNA
<213> ORGANISM: Artificial Sequence
<220> FEATURE:
<223> OTHER INFORMATION: Primer ill-EC-2-POLE-38R

<400> SEQUENCE: 634 tttttttttca tgttcatgtg cttctcaggt gt                               32

<210> SEQ ID NO 635
<211> LENGTH: 32
<212> TYPE: DNA
<213> ORGANISM: Artificial Sequence
<220> FEATURE:
<223> OTHER INFORMATION: Primer ill-EC-1-POLE-38F

<400> SEQUENCE: 635 ttttttttttc atacagcacc tccatgttct tg                               32

<210> SEQ ID NO 636
<211> LENGTH: 35
<212> TYPE: DNA
<213> ORGANISM: Artificial Sequence
<220> FEATURE:
<223> OTHER INFORMATION: Primer ill-EC-1-POLE-38R

<400> SEQUENCE: 636 tttttttttac taaaaacctg ggctattgac tttgt                            35
```

<210> SEQ ID NO 637
<211> LENGTH: 30
<212> TYPE: DNA
<213> ORGANISM: Artificial Sequence
<220> FEATURE:
<223> OTHER INFORMATION: Primer ill-EC-2-POLE-39F

<400> SEQUENCE: 637 tttttttttcc acttcatgag ccgactgaaa                                    30

<210> SEQ ID NO 638
<211> LENGTH: 31
<212> TYPE: DNA
<213> ORGANISM: Artificial Sequence
<220> FEATURE:
<223> OTHER INFORMATION: Primer ill-EC-2-POLE-39R

<400> SEQUENCE: 638 tttttttttgg gaaaactcct tctacgtgga c                                  31

<210> SEQ ID NO 639
<211> LENGTH: 30
<212> TYPE: DNA
<213> ORGANISM: Artificial Sequence
<220> FEATURE:
<223> OTHER INFORMATION: Primer ill-EC-1-POLE-39F

<400> SEQUENCE: 639 tttttttttgt ggagcccttt gaactcgtaa                                    30

<210> SEQ ID NO 640
<211> LENGTH: 31
<212> TYPE: DNA
<213> ORGANISM: Artificial Sequence
<220> FEATURE:
<223> OTHER INFORMATION: Primer ill-EC-1-POLE-39R

<400> SEQUENCE: 640
tttttttttg cttagattac tgccggaaag c                                   31

<210> SEQ ID NO 641
<211> LENGTH: 34
<212> TYPE: DNA
<213> ORGANISM: Artificial Sequence
<220> FEATURE:
<223> OTHER INFORMATION: Primer ill-EC-2-POLE-40F

<400> SEQUENCE: 641 tttttttttcc ttggtgatgt ggatcttctt gtag                               34

<210> SEQ ID NO 642
<211> LENGTH: 31
<212> TYPE: DNA
<213> ORGANISM: Artificial Sequence
<220> FEATURE:
<223> OTHER INFORMATION: Primer ill-EC-2-POLE-40R

<400> SEQUENCE: 642 tttttttttta gcagtgtatc tgagctgttg c                                  31

<210> SEQ ID NO 643
<211> LENGTH: 30
<212> TYPE: DNA
<213> ORGANISM: Artificial Sequence
<220> FEATURE:

<223> OTHER INFORMATION: Primer ill-EC-1-POLE-40F

<400> SEQUENCE: 643 tttttttttga gcaggagcca catctttaca                               30

<210> SEQ ID NO 644
<211> LENGTH: 29
<212> TYPE: DNA
<213> ORGANISM: Artificial Sequence
<220> FEATURE:
<223> OTHER INFORMATION: Primer ill-EC-1-POLE-40R

<400> SEQUENCE: 644 tttttttttat accatcggat ccagcacca                                29

<210> SEQ ID NO 645
<211> LENGTH: 26
<212> TYPE: DNA
<213> ORGANISM: Artificial Sequence
<220> FEATURE:
<223> OTHER INFORMATION: Primer ill-EC-2-POLE-41F

<400> SEQUENCE: 645
tttttttttt cctcgcggga cagttc                                    26

<210> SEQ ID NO 646
<211> LENGTH: 30
<212> TYPE: DNA
<213> ORGANISM: Artificial Sequence
<220> FEATURE:
<223> OTHER INFORMATION: Primer ill-EC-2-POLE-41R

<400> SEQUENCE: 646 tttttttttgt gtgtctgtgc ctccttttga                               30

<210> SEQ ID NO 647
<211> LENGTH: 27
<212> TYPE: DNA
<213> ORGANISM: Artificial Sequence
<220> FEATURE:
<223> OTHER INFORMATION: Primer ill-EC-1-POLE-41F

<400> SEQUENCE: 647 tttttttttga cactcaccca cccgttt                                  27

<210> SEQ ID NO 648
<211> LENGTH: 27
<212> TYPE: DNA
<213> ORGANISM: Artificial Sequence
<220> FEATURE:
<223> OTHER INFORMATION: Primer ill-EC-1-POLE-41R

<400> SEQUENCE: 648 tttttttttgc cctctgccat ggtggac                                  27

<210> SEQ ID NO 649
<211> LENGTH: 32
<212> TYPE: DNA
<213> ORGANISM: Artificial Sequence
<220> FEATURE:
<223> OTHER INFORMATION: Primer ill-EC-2-POLE-42F

<400> SEQUENCE: 649 tttttttttgc agtttgctcc aggcttattg aa                            32

```
<210> SEQ ID NO 650
<211> LENGTH: 31
<212> TYPE: DNA
<213> ORGANISM: Artificial Sequence
<220> FEATURE:
<223> OTHER INFORMATION: Primer ill-EC-2-POLE-42R

<400> SEQUENCE: 650 tttttttttat gtaccccaac atcatcctga c                              31

<210> SEQ ID NO 651
<211> LENGTH: 30
<212> TYPE: DNA
<213> ORGANISM: Artificial Sequence
<220> FEATURE:
<223> OTHER INFORMATION: Primer ill-EC-1-POLE-42F

<400> SEQUENCE: 651
ttttttttcg actctgacac gggaagtaaa                                 30

<210> SEQ ID NO 652
<211> LENGTH: 33
<212> TYPE: DNA
<213> ORGANISM: Artificial Sequence
<220> FEATURE:
<223> OTHER INFORMATION: Primer ill-EC-1-POLE-42R

<400> SEQUENCE: 652 ttttttttttc tctgcaggtg tgtgatgaga tta                            33

<210> SEQ ID NO 653
<211> LENGTH: 31
<212> TYPE: DNA
<213> ORGANISM: Artificial Sequence
<220> FEATURE:
<223> OTHER INFORMATION: Primer ill-EC-2-POLE-43F

<400> SEQUENCE: 653 ttttttttg gtagatgagt ggacactcga t                                31

<210> SEQ ID NO 654
<211> LENGTH: 34
<212> TYPE: DNA
<213> ORGANISM: Artificial Sequence
<220> FEATURE:
<223> OTHER INFORMATION: Primer ill-EC-2-POLE-43R

<400> SEQUENCE: 654
ttttttttca gcttttttcct ctcctgaatg tcta                           34

<210> SEQ ID NO 655
<211> LENGTH: 32
<212> TYPE: DNA
<213> ORGANISM: Artificial Sequence
<220> FEATURE:
<223> OTHER INFORMATION: Primer ill-EC-1-POLE-43F

<400> SEQUENCE: 655
ttttttttca caataaacgt gctgctgaaa ga                              32

<210> SEQ ID NO 656
<211> LENGTH: 32
<212> TYPE: DNA
<213> ORGANISM: Artificial Sequence
<220> FEATURE:
<223> OTHER INFORMATION: Primer ill-EC-1-POLE-43R
```

```
<400> SEQUENCE: 656
ttttttttct tgaggaagag gagaaagtgc ct                              32

<210> SEQ ID NO 657
<211> LENGTH: 32
<212> TYPE: DNA
<213> ORGANISM: Artificial Sequence
<220> FEATURE:
<223> OTHER INFORMATION: Primer ill-EC-2-POLE-44F

<400> SEQUENCE: 657
ttttttttcc tccctgatgg ttacctcttc aa                              32

<210> SEQ ID NO 658
<211> LENGTH: 27
<212> TYPE: DNA
<213> ORGANISM: Artificial Sequence
<220> FEATURE:
<223> OTHER INFORMATION: Primer ill-EC-2-POLE-44R

<400> SEQUENCE: 658
ttttttttct gaccccgtcg tctcact                                    27

<210> SEQ ID NO 659
<211> LENGTH: 28
<212> TYPE: DNA
<213> ORGANISM: Artificial Sequence
<220> FEATURE:
<223> OTHER INFORMATION: Primer ill-EC-1-POLE-44F

<400> SEQUENCE: 659 ttttttttc aaaggcggca ggattcta                                    28

<210> SEQ ID NO 660
<211> LENGTH: 28
<212> TYPE: DNA
<213> ORGANISM: Artificial Sequence
<220> FEATURE:
<223> OTHER INFORMATION: Primer ill-EC-1-POLE-44R

<400> SEQUENCE: 660
ttttttttgg agctttctcg ggcacaac                                   28

<210> SEQ ID NO 661
<211> LENGTH: 30
<212> TYPE: DNA
<213> ORGANISM: Artificial Sequence
<220> FEATURE:
<223> OTHER INFORMATION: Primer ill-EC-2-POLE-45F

<400> SEQUENCE: 661
ttttttttgg tcctaccaca gcacaagagt                                 30

<210> SEQ ID NO 662
<211> LENGTH: 30
<212> TYPE: DNA
<213> ORGANISM: Artificial Sequence
<220> FEATURE:
<223> OTHER INFORMATION: Primer ill-EC-2-POLE-45R

<400> SEQUENCE: 662
ttttttttag ttcaataagc tgacggacga                                 30

<210> SEQ ID NO 663
<211> LENGTH: 29
```

```
<212> TYPE: DNA
<213> ORGANISM: Artificial Sequence
<220> FEATURE:
<223> OTHER INFORMATION: Primer ill-EC-1-POLE-45F

<400> SEQUENCE: 663
ttttttttcc cgacgtaggt ctcagagtc                                      29

<210> SEQ ID NO 664
<211> LENGTH: 31
<212> TYPE: DNA
<213> ORGANISM: Artificial Sequence
<220> FEATURE:
<223> OTHER INFORMATION: Primer ill-EC-1-POLE-45R

<400> SEQUENCE: 664
ttttttttct ggaagccttg gtttctcttg c                                   31

<210> SEQ ID NO 665
<211> LENGTH: 30
<212> TYPE: DNA
<213> ORGANISM: Artificial Sequence
<220> FEATURE:
<223> OTHER INFORMATION: Primer ill-EC-2-POLE-46F

<400> SEQUENCE: 665
ttttttttgg aagatgatgt tggcgtggaa                                     30

<210> SEQ ID NO 666
<211> LENGTH: 33
<212> TYPE: DNA
<213> ORGANISM: Artificial Sequence
<220> FEATURE:
<223> OTHER INFORMATION: Primer ill-EC-2-POLE-46R

<400> SEQUENCE: 666 ttttttttc ctttcacact gaagttcagc tta                                  33

<210> SEQ ID NO 667
<211> LENGTH: 31
<212> TYPE: DNA
<213> ORGANISM: Artificial Sequence
<220> FEATURE:
<223> OTHER INFORMATION: Primer ill-EC-1-POLE-46F

<400> SEQUENCE: 667 ttttttttt cagctccagt gcatttggaa t                                    31

<210> SEQ ID NO 668
<211> LENGTH: 31
<212> TYPE: DNA
<213> ORGANISM: Artificial Sequence
<220> FEATURE:
<223> OTHER INFORMATION: Primer ill-EC-1-POLE-46R

<400> SEQUENCE: 668
ttttttttca gatgctgtcg ccacttacta c                                   31

<210> SEQ ID NO 669
<211> LENGTH: 34
<212> TYPE: DNA
<213> ORGANISM: Artificial Sequence
<220> FEATURE:
<223> OTHER INFORMATION: Primer ill-EC-2-POLE-47F

<400> SEQUENCE: 669
```

```
tttttttttta atggtgcaca gagcaaagat gaat                34
```

<210> SEQ ID NO 670
<211> LENGTH: 32
<212> TYPE: DNA
<213> ORGANISM: Artificial Sequence
<220> FEATURE:
<223> OTHER INFORMATION: Primer ill-EC-2-POLE-47R

<400> SEQUENCE: 670

```
tttttttttga ccctgggctc ttgattttg at                   32
```

<210> SEQ ID NO 671
<211> LENGTH: 27
<212> TYPE: DNA
<213> ORGANISM: Artificial Sequence
<220> FEATURE:
<223> OTHER INFORMATION: Primer ill-EC-1-POLE-47F

<400> SEQUENCE: 671

```
tttttttttcc gggatgtggc tcacatg                        27
```

<210> SEQ ID NO 672
<211> LENGTH: 28
<212> TYPE: DNA
<213> ORGANISM: Artificial Sequence
<220> FEATURE:
<223> OTHER INFORMATION: Primer ill-EC-1-POLE-47R

<400> SEQUENCE: 672

```
tttttttttcc aaggccaagc taggctat                       28
```

<210> SEQ ID NO 673
<211> LENGTH: 25
<212> TYPE: DNA
<213> ORGANISM: Artificial Sequence
<220> FEATURE:
<223> OTHER INFORMATION: Primer ill-EC-2-POLE-48F

<400> SEQUENCE: 673

```
tttttttttg ctccgtggcc atccg                           25
```

<210> SEQ ID NO 674
<211> LENGTH: 31
<212> TYPE: DNA
<213> ORGANISM: Artificial Sequence
<220> FEATURE:
<223> OTHER INFORMATION: Primer ill-EC-2-POLE-48R

<400> SEQUENCE: 674

```
tttttttttgg gctgcatgtt agaatcatcc t                   31
```

<210> SEQ ID NO 675
<211> LENGTH: 30
<212> TYPE: DNA
<213> ORGANISM: Artificial Sequence
<220> FEATURE:
<223> OTHER INFORMATION: Primer ill-EC-1-POLE-48F

<400> SEQUENCE: 675

```
tttttttttc ctcccatgag atgtggtgac                      30
```

<210> SEQ ID NO 676
<211> LENGTH: 31
<212> TYPE: DNA
<213> ORGANISM: Artificial Sequence
<220> FEATURE:
<223> OTHER INFORMATION: Primer ill-EC-1-POLE-48R

<400> SEQUENCE: 676 tttttttag gagataggct tccagaagga c                              31

<210> SEQ ID NO 677
<211> LENGTH: 27
<212> TYPE: DNA
<213> ORGANISM: Artificial Sequence
<220> FEATURE:
<223> OTHER INFORMATION: Primer ill-EC-2-POLE-49F

<400> SEQUENCE: 677 tttttttac ctgaggcagt ccatgtg                                   27

<210> SEQ ID NO 678
<211> LENGTH: 27
<212> TYPE: DNA
<213> ORGANISM: Artificial Sequence
<220> FEATURE:
<223> OTHER INFORMATION: Primer ill-EC-2-POLE-49R

<400> SEQUENCE: 678 tttttttgg gcattagagc ctgacct                                   27

<210> SEQ ID NO 679
<211> LENGTH: 29
<212> TYPE: DNA
<213> ORGANISM: Artificial Sequence
<220> FEATURE:
<223> OTHER INFORMATION: Primer ill-EC-1-POLE-49F

<400> SEQUENCE: 679 tttttttgc cacctcctaa gtcgacatg                                 29

<210> SEQ ID NO 680
<211> LENGTH: 31
<212> TYPE: DNA
<213> ORGANISM: Artificial Sequence
<220> FEATURE:
<223> OTHER INFORMATION: Primer ill-EC-1-POLE-49R

<400> SEQUENCE: 680 tttttttga tccaaaggtg gtttgaacac g                              31

<210> SEQ ID NO 681
<211> LENGTH: 36
<212> TYPE: DNA
<213> ORGANISM: Artificial Sequence
<220> FEATURE:
<223> OTHER INFORMATION: Primer ill-EC-2-POLE-50F

<400> SEQUENCE: 681 tttttttcc agttactcat agagaagaca cagact                         36

<210> SEQ ID NO 682
<211> LENGTH: 36
<212> TYPE: DNA
<213> ORGANISM: Artificial Sequence
<220> FEATURE:
<223> OTHER INFORMATION: Primer ill-EC-2-POLE-50R

<400> SEQUENCE: 682 ttttttttt ggaatagctt gaagaagaga aagagc                         36

<210> SEQ ID NO 683
<211> LENGTH: 30
<212> TYPE: DNA
<213> ORGANISM: Artificial Sequence
<220> FEATURE:
<223> OTHER INFORMATION: Primer ill-EC-1-POLE-50F

<400> SEQUENCE: 683 tttttttgc tgcaattctg atctgacgga                              30

<210> SEQ ID NO 684
<211> LENGTH: 34
<212> TYPE: DNA
<213> ORGANISM: Artificial Sequence
<220> FEATURE:
<223> OTHER INFORMATION: Primer ill-EC-1-POLE-50R

<400> SEQUENCE: 684 tttttttat tgaagatttt gagttcaccc ccaa                         34

<210> SEQ ID NO 685
<211> LENGTH: 35
<212> TYPE: DNA
<213> ORGANISM: Artificial Sequence
<220> FEATURE:
<223> OTHER INFORMATION: Primer ill-EC-2-POLE-51F

<400> SEQUENCE: 685 tttttttgg tagtttccca agtgatacct cctta                        35

<210> SEQ ID NO 686
<211> LENGTH: 34
<212> TYPE: DNA
<213> ORGANISM: Artificial Sequence
<220> FEATURE:
<223> OTHER INFORMATION: Primer ill-EC-2-POLE-51R

<400> SEQUENCE: 686 tttttttct ctgacttgtg ctgattgcta atga                         34

<210> SEQ ID NO 687
<211> LENGTH: 32
<212> TYPE: DNA
<213> ORGANISM: Artificial Sequence
<220> FEATURE:
<223> OTHER INFORMATION: Primer ill-EC-1-POLE-51F

<400> SEQUENCE: 687 ttttttttc tgaaacaatc tccctgttgg tg                           32

<210> SEQ ID NO 688
<211> LENGTH: 34
<212> TYPE: DNA
<213> ORGANISM: Artificial Sequence
<220> FEATURE:
<223> OTHER INFORMATION: Primer ill-EC-1-POLE-51R

<400> SEQUENCE: 688 tttttttag gaagcttaaa gcactttcac attg                         34

<210> SEQ ID NO 689
<211> LENGTH: 37
<212> TYPE: DNA
<213> ORGANISM: Artificial Sequence
<220> FEATURE:
<223> OTHER INFORMATION: Primer ill-EC-2-POLE-52F -continued

<400> SEQUENCE: 689 tttttttttat tcctggacta actcattatt cactcaa                37

<210> SEQ ID NO 690
<211> LENGTH: 32
<212> TYPE: DNA
<213> ORGANISM: Artificial Sequence
<220> FEATURE:
<223> OTHER INFORMATION: Primer ill-EC-2-POLE-52R

<400> SEQUENCE: 690 tttttttttct gatgctgaga cagaccagat ta                32

<210> SEQ ID NO 691
<211> LENGTH: 32
<212> TYPE: DNA
<213> ORGANISM: Artificial Sequence
<220> FEATURE:
<223> OTHER INFORMATION: Primer ill-EC-1-POLE-52F

<400> SEQUENCE: 691
tttttttttg gccatcgatc atgtaggaaa tc                32

<210> SEQ ID NO 692
<211> LENGTH: 35
<212> TYPE: DNA
<213> ORGANISM: Artificial Sequence
<220> FEATURE:
<223> OTHER INFORMATION: Primer ill-EC-1-POLE-52R

<400> SEQUENCE: 692 tttttttttgg agtttagagc ttggctttat gctta                35

<210> SEQ ID NO 693
<211> LENGTH: 32
<212> TYPE: DNA
<213> ORGANISM: Artificial Sequence
<220> FEATURE:
<223> OTHER INFORMATION: Primer ill-EC-2-POLE-53F

<400> SEQUENCE: 693 tttttttttca gtttggtcgt ctcaatgtca aa                32

<210> SEQ ID NO 694
<211> LENGTH: 33
<212> TYPE: DNA
<213> ORGANISM: Artificial Sequence
<220> FEATURE:
<223> OTHER INFORMATION: Primer ill-EC-2-POLE-53R

<400> SEQUENCE: 694 tttttttttca gctctagagc cttttgactc ttt                33

<210> SEQ ID NO 695
<211> LENGTH: 36
<212> TYPE: DNA
<213> ORGANISM: Artificial Sequence
<220> FEATURE:
<223> OTHER INFORMATION: Primer ill-EC-1-POLE-53F

<400> SEQUENCE: 695 tttttttttgc actgaagaat attctctcca gaaaac                36

<210> SEQ ID NO 696

```
<211> LENGTH: 33
<212> TYPE: DNA
<213> ORGANISM: Artificial Sequence
<220> FEATURE:
<223> OTHER INFORMATION: Primer ill-EC-1-POLE-53R

<400> SEQUENCE: 696 tttttttttct agttagcaca ctgtgtgttt tgc                              33

<210> SEQ ID NO 697
<211> LENGTH: 32
<212> TYPE: DNA
<213> ORGANISM: Artificial Sequence
<220> FEATURE:
<223> OTHER INFORMATION: Primer ill-EC-2-POLE-54F

<400> SEQUENCE: 697 tttttttttag caaaacttac aggtcgttca ac                               32

<210> SEQ ID NO 698
<211> LENGTH: 34
<212> TYPE: DNA
<213> ORGANISM: Artificial Sequence
<220> FEATURE:
<223> OTHER INFORMATION: Primer ill-EC-2-POLE-54R

<400> SEQUENCE: 698 tttttttttag atgatcatta tgggtgaatc caca                             34

<210> SEQ ID NO 699
<211> LENGTH: 32
<212> TYPE: DNA
<213> ORGANISM: Artificial Sequence
<220> FEATURE:
<223> OTHER INFORMATION: Primer ill-EC-1-POLE-54F

<400> SEQUENCE: 699
tttttttttc atctcctggc tgttaggaaa tt                                32

<210> SEQ ID NO 700
<211> LENGTH: 36
<212> TYPE: DNA
<213> ORGANISM: Artificial Sequence
<220> FEATURE:
<223> OTHER INFORMATION: Primer ill-EC-1-POLE-54R

<400> SEQUENCE: 700 tttttttttac tgatgaagag gaaacctcta agaaga                           36

<210> SEQ ID NO 701
<211> LENGTH: 27
<212> TYPE: DNA
<213> ORGANISM: Artificial Sequence
<220> FEATURE:
<223> OTHER INFORMATION: Primer ill-EC-2-POLE-55F

<400> SEQUENCE: 701 tttttttttca tcgtactcgc gcatgtc                                     27

<210> SEQ ID NO 702
<211> LENGTH: 31
<212> TYPE: DNA
<213> ORGANISM: Artificial Sequence
<220> FEATURE:
<223> OTHER INFORMATION: Primer ill-EC-2-POLE-55R

<400> SEQUENCE: 702
```

| | |
|---|---|
| tttttttttcc tactgagttg gaactctggt c | 31 |

<210> SEQ ID NO 703
<211> LENGTH: 33
<212> TYPE: DNA
<213> ORGANISM: Artificial Sequence
<220> FEATURE:
<223> OTHER INFORMATION: Primer ill-EC-1-POLE-55F

<400> SEQUENCE: 703

| | |
|---|---|
| ttttttttgt gttcctgtct cctatccatc ttg | 33 |

<210> SEQ ID NO 704
<211> LENGTH: 32
<212> TYPE: DNA
<213> ORGANISM: Artificial Sequence
<220> FEATURE:
<223> OTHER INFORMATION: Primer ill-EC-1-POLE-55R

<400> SEQUENCE: 704

| | |
|---|---|
| ttttttttac actgtggagg atcttgtcaa ag | 32 |

<210> SEQ ID NO 705
<211> LENGTH: 33
<212> TYPE: DNA
<213> ORGANISM: Artificial Sequence
<220> FEATURE:
<223> OTHER INFORMATION: Primer ill-EC-2-POLE-56F

<400> SEQUENCE: 705

| | |
|---|---|
| ttttttttca agaccaaagt ttacctggaa agc | 33 |

<210> SEQ ID NO 706
<211> LENGTH: 32
<212> TYPE: DNA
<213> ORGANISM: Artificial Sequence
<220> FEATURE:
<223> OTHER INFORMATION: Primer ill-EC-2-POLE-56R

<400> SEQUENCE: 706

| | |
|---|---|
| ttttttttca aatcacttgg tgggtttgaa gc | 32 |

<210> SEQ ID NO 707
<211> LENGTH: 32
<212> TYPE: DNA
<213> ORGANISM: Artificial Sequence
<220> FEATURE:
<223> OTHER INFORMATION: Primer ill-EC-1-POLE-56F

<400> SEQUENCE: 707

| | |
|---|---|
| ttttttttgt ggaaggacag cctgatgtaa tt | 32 |

<210> SEQ ID NO 708
<211> LENGTH: 32
<212> TYPE: DNA
<213> ORGANISM: Artificial Sequence
<220> FEATURE:
<223> OTHER INFORMATION: Primer ill-EC-1-POLE-56R

<400> SEQUENCE: 708

| | |
|---|---|
| ttttttttct tgaagtcgcc aactctttga ct | 32 |

<210> SEQ ID NO 709
<211> LENGTH: 34
<212> TYPE: DNA

```
<213> ORGANISM: Artificial Sequence
<220> FEATURE:
<223> OTHER INFORMATION: Primer ill-EC-2-POLE-57F

<400> SEQUENCE: 709 tttttttttaa caatgtagac tctggcctca ttta                          34

<210> SEQ ID NO 710
<211> LENGTH: 35
<212> TYPE: DNA
<213> ORGANISM: Artificial Sequence
<220> FEATURE:
<223> OTHER INFORMATION: Primer ill-EC-2-POLE-57R

<400> SEQUENCE: 710 tttttttttga agccttttc attctgatcc tgatt                          35

<210> SEQ ID NO 711
<211> LENGTH: 34
<212> TYPE: DNA
<213> ORGANISM: Artificial Sequence
<220> FEATURE:
<223> OTHER INFORMATION: Primer ill-EC-1-POLE-57F

<400> SEQUENCE: 711 tttttttttag aaaagatgaa acttctcgct caca                          34

<210> SEQ ID NO 712
<211> LENGTH: 32
<212> TYPE: DNA
<213> ORGANISM: Artificial Sequence
<220> FEATURE:
<223> OTHER INFORMATION: Primer ill-EC-1-POLE-57R

<400> SEQUENCE: 712 tttttttttga ccagaaaggt gagtgtgttt ca                            32

<210> SEQ ID NO 713
<211> LENGTH: 31
<212> TYPE: DNA
<213> ORGANISM: Artificial Sequence
<220> FEATURE:
<223> OTHER INFORMATION: Primer ill-EC-2-POLE-58F

<400> SEQUENCE: 713 tttttttttag aatgacacac aggtcgtctg a                             31

<210> SEQ ID NO 714
<211> LENGTH: 34
<212> TYPE: DNA
<213> ORGANISM: Artificial Sequence
<220> FEATURE:
<223> OTHER INFORMATION: Primer ill-EC-2-POLE-58R

<400> SEQUENCE: 714 tttttttttgc aagcaatgtg ttttcacttt tctc                          34

<210> SEQ ID NO 715
<211> LENGTH: 32
<212> TYPE: DNA
<213> ORGANISM: Artificial Sequence
<220> FEATURE:
<223> OTHER INFORMATION: Primer ill-EC-1-POLE-58F

<400> SEQUENCE: 715 tttttttttca gtcacagagc tacatgaaca cc                            32
```

<210> SEQ ID NO 716
<211> LENGTH: 35
<212> TYPE: DNA
<213> ORGANISM: Artificial Sequence
<220> FEATURE:
<223> OTHER INFORMATION: Primer ill-EC-2-POLE-59F

<400> SEQUENCE: 716 tttttttttac ccataaaagt gggtttttagc ttgtc                35

<210> SEQ ID NO 717
<211> LENGTH: 33
<212> TYPE: DNA
<213> ORGANISM: Artificial Sequence
<220> FEATURE:
<223> OTHER INFORMATION: Primer ill-EC-1-POLE-58R

<400> SEQUENCE: 717
tttttttttt gtgtctgtgt tgactgattc tct                33

<210> SEQ ID NO 718
<211> LENGTH: 34
<212> TYPE: DNA
<213> ORGANISM: Artificial Sequence
<220> FEATURE:
<223> OTHER INFORMATION: Primer ill-EC-2-POLE-59R

<400> SEQUENCE: 718 tttttttttct aactgtgtag aggatggtct tgtg                34

<210> SEQ ID NO 719
<211> LENGTH: 32
<212> TYPE: DNA
<213> ORGANISM: Artificial Sequence
<220> FEATURE:
<223> OTHER INFORMATION: Primer ill-EC-1-POLE-59F

<400> SEQUENCE: 719 tttttttttct tcacatctcc cacctgattc ac                32

<210> SEQ ID NO 720
<211> LENGTH: 31
<212> TYPE: DNA
<213> ORGANISM: Artificial Sequence
<220> FEATURE:
<223> OTHER INFORMATION: Primer ill-EC-1-POLE-59R

<400> SEQUENCE: 720
tttttttttg agaagacagg ctggctcatt a                31

<210> SEQ ID NO 721
<211> LENGTH: 31
<212> TYPE: DNA
<213> ORGANISM: Artificial Sequence
<220> FEATURE:
<223> OTHER INFORMATION: Primer ill-EC-2-POLE-60F

<400> SEQUENCE: 721 tttttttttgg agaaggacct agtgcttaca g                31

<210> SEQ ID NO 722
<211> LENGTH: 30
<212> TYPE: DNA
<213> ORGANISM: Artificial Sequence
<220> FEATURE:

<223> OTHER INFORMATION: Primer ill-EC-2-POLE-60R

<400> SEQUENCE: 722
tttttttttc tttcactcag ggatgatggc                             30

<210> SEQ ID NO 723
<211> LENGTH: 33
<212> TYPE: DNA
<213> ORGANISM: Artificial Sequence
<220> FEATURE:
<223> OTHER INFORMATION: Primer ill-EC-1-POLE-60F

<400> SEQUENCE: 723
ttttttttca aaccaaacc gcaaatccat ctt                          33

<210> SEQ ID NO 724
<211> LENGTH: 33
<212> TYPE: DNA
<213> ORGANISM: Artificial Sequence
<220> FEATURE:
<223> OTHER INFORMATION: Primer ill-EC-1-POLE-60R

<400> SEQUENCE: 724
ttttttttag cagcaggtgg cattacaaat taa                         33

<210> SEQ ID NO 725
<211> LENGTH: 25
<212> TYPE: DNA
<213> ORGANISM: Artificial Sequence
<220> FEATURE:
<223> OTHER INFORMATION: Primer ill-EC-2-POLE-61F

<400> SEQUENCE: 725
ttttttttcc ccatggcacc ctccg                                  25

<210> SEQ ID NO 726
<211> LENGTH: 26
<212> TYPE: DNA
<213> ORGANISM: Artificial Sequence
<220> FEATURE:
<223> OTHER INFORMATION: Primer ill-EC-2-POLE-61R

<400> SEQUENCE: 726
ttttttttgt gggagcgcgc caaatt                                 26

<210> SEQ ID NO 727
<211> LENGTH: 28
<212> TYPE: DNA
<213> ORGANISM: Artificial Sequence
<220> FEATURE:
<223> OTHER INFORMATION: Primer ill-EC-MLH1-Z01F

<400> SEQUENCE: 727 ttttttttg ctccatttgg ggacctgt                                28

<210> SEQ ID NO 728
<211> LENGTH: 30
<212> TYPE: DNA
<213> ORGANISM: Artificial Sequence
<220> FEATURE:
<223> OTHER INFORMATION: Primer ill-EC-MLH1-Z01R

<400> SEQUENCE: 728
ttttttttaa gacgaggtca gacttgttgt                             30

```
<210> SEQ ID NO 729
<211> LENGTH: 33
<212> TYPE: DNA
<213> ORGANISM: Artificial Sequence
<220> FEATURE:
<223> OTHER INFORMATION: Primer ill-EC-PMS2-Z01F

<400> SEQUENCE: 729 tttttttttcc atacagtgac tacggtcagt tct                              33

<210> SEQ ID NO 730
<211> LENGTH: 32
<212> TYPE: DNA
<213> ORGANISM: Artificial Sequence
<220> FEATURE:
<223> OTHER INFORMATION: Primer ill-EC-PMS2-Z01R

<400> SEQUENCE: 730 tttttttttga tgaagaaact gatcacccac at                               32

<210> SEQ ID NO 731
<211> LENGTH: 27
<212> TYPE: DNA
<213> ORGANISM: Artificial Sequence
<220> FEATURE:
<223> OTHER INFORMATION: Primer ill-EC-PMS2-Z02F

<400> SEQUENCE: 731 tttttttttag ttccaggggt ggtccat                                     27

<210> SEQ ID NO 732
<211> LENGTH: 30
<212> TYPE: DNA
<213> ORGANISM: Artificial Sequence
<220> FEATURE:
<223> OTHER INFORMATION: Primer ill-EC-PMS2-Z02R

<400> SEQUENCE: 732 ttttttttttc tgaagagctg ccattctgac                                  30

<210> SEQ ID NO 733
<211> LENGTH: 28
<212> TYPE: DNA
<213> ORGANISM: Artificial Sequence
<220> FEATURE:
<223> OTHER INFORMATION: Primer ill-EC-PMS2-Z03F

<400> SEQUENCE: 733 tttttttttgc tgagaccttc ctcgactg                                    28

<210> SEQ ID NO 734
<211> LENGTH: 29
<212> TYPE: DNA
<213> ORGANISM: Artificial Sequence
<220> FEATURE:
<223> OTHER INFORMATION: Primer ill-EC-PMS2-Z03R

<400> SEQUENCE: 734 tttttttttcc aggacgtcga tgaactgat                                   29

<210> SEQ ID NO 735
<211> LENGTH: 28
<212> TYPE: DNA
<213> ORGANISM: Artificial Sequence
<220> FEATURE:
<223> OTHER INFORMATION: Primer ill-EC-PMS2-Z04F
```

<400> SEQUENCE: 735 tttttttttgg ctgtcgctca gcatgaag                                28

<210> SEQ ID NO 736
<211> LENGTH: 31
<212> TYPE: DNA
<213> ORGANISM: Artificial Sequence
<220> FEATURE:
<223> OTHER INFORMATION: Primer ill-EC-PMS2-Z04R

<400> SEQUENCE: 736 tttttttttaa acgtgtttgt caagtcatgg a                            31

<210> SEQ ID NO 737
<211> LENGTH: 31
<212> TYPE: DNA
<213> ORGANISM: Artificial Sequence
<220> FEATURE:
<223> OTHER INFORMATION: Primer ill-EC-PMS2-Z05F

<400> SEQUENCE: 737
tttttttttg aacactaaac acactcacgc t                             31

<210> SEQ ID NO 738
<211> LENGTH: 32
<212> TYPE: DNA
<213> ORGANISM: Artificial Sequence
<220> FEATURE:
<223> OTHER INFORMATION: Primer ill-EC-PMS2-Z05R

<400> SEQUENCE: 738
tttttttttg cagaaatgga aatcattggt ca                            32

<210> SEQ ID NO 739
<211> LENGTH: 33
<212> TYPE: DNA
<213> ORGANISM: Artificial Sequence
<220> FEATURE:
<223> OTHER INFORMATION: Primer ill-EC-PMS2-Z06F

<400> SEQUENCE: 739
tttttttttg ctcatgtgca ttaaccaata ctc                           33

<210> SEQ ID NO 740
<211> LENGTH: 28
<212> TYPE: DNA
<213> ORGANISM: Artificial Sequence
<220> FEATURE:
<223> OTHER INFORMATION: Primer ill-EC-PMS2-Z06R

<400> SEQUENCE: 740 tttttttttgt cagcgtgcag cagttatt                                28

<210> SEQ ID NO 741
<211> LENGTH: 31
<212> TYPE: DNA
<213> ORGANISM: Artificial Sequence
<220> FEATURE:
<223> OTHER INFORMATION: Primer ill-EC-PTEN-Z01F

<400> SEQUENCE: 741 tttttttttgc agttcaactt ctgtaacacc a                            31

<210> SEQ ID NO 742
<211> LENGTH: 31

```
<212> TYPE: DNA
<213> ORGANISM: Artificial Sequence
<220> FEATURE:
<223> OTHER INFORMATION: Primer ill-EC-PTEN-Z01R

<400> SEQUENCE: 742
tttttttttg ctgatcttca tcaaaaggtt c                              31

<210> SEQ ID NO 743
<211> LENGTH: 75
<212> TYPE: DNA
<213> ORGANISM: Artificial Sequence
<220> FEATURE:
<223> OTHER INFORMATION: Primer Ion-BC1-F

<400> SEQUENCE: 743
tccgatcgca agcctcagta gcgaccatct catccctgcg tgtctccgac tcagctaagg    60
taacgatcgg aaaaa                                                    75

<210> SEQ ID NO 744
<211> LENGTH: 66
<212> TYPE: DNA
<213> ORGANISM: Artificial Sequence
<220> FEATURE:
<223> OTHER INFORMATION: Primer Ion-BC1-R

<400> SEQUENCE: 744
atcaccgacg caagcctcag tagcgactaa ggtctcagcc tctctatggg cagtcggtga    60
taaaaa                                                              66

<210> SEQ ID NO 745
<211> LENGTH: 75
<212> TYPE: DNA
<213> ORGANISM: Artificial Sequence
<220> FEATURE:
<223> OTHER INFORMATION: Primer Ion-BC2-F

<400> SEQUENCE: 745
tccgatcgca agcctcagta gcgaccatct catccctgcg tgtctccgac tcagttacaa    60
cctcgatcgg aaaaa                                                    75

<210> SEQ ID NO 746
<211> LENGTH: 66
<212> TYPE: DNA
<213> ORGANISM: Artificial Sequence
<220> FEATURE:
<223> OTHER INFORMATION: Primer Ion-BC2-R

<400> SEQUENCE: 746
atcaccgacg caagcctcag tagcgattac agtctcagcc tctctatggg cagtcggtga    60
taaaaa                                                              66

<210> SEQ ID NO 747
<211> LENGTH: 77
<212> TYPE: DNA
<213> ORGANISM: Artificial Sequence
<220> FEATURE:
<223> OTHER INFORMATION: Primer Ion-BC3-F

<400> SEQUENCE: 747
tccgatcgca agcctcagta gcgaccatct catccctgcg tgtctccgac tcagcctgcc    60
attcgcgatc ggaaaaa                                                  77
```

<210> SEQ ID NO 748
<211> LENGTH: 66
<212> TYPE: DNA
<213> ORGANISM: Artificial Sequence
<220> FEATURE:
<223> OTHER INFORMATION: Primer Ion-BC3-R

<400> SEQUENCE: 748
atcaccgacg caagcctcag tagcgacctg cgtctcagcc tctctatggg cagtcggtga    60
taaaaa                                                               66

<210> SEQ ID NO 749
<211> LENGTH: 77
<212> TYPE: DNA
<213> ORGANISM: Artificial Sequence
<220> FEATURE:
<223> OTHER INFORMATION: Primer Ion-BC4-F

<400> SEQUENCE: 749
tccgatcgca agcctcagta gcgaccatct catccctgcg tgtctccgac tcagtggagg    60
acggacgatc ggaaaaa                                                   77

<210> SEQ ID NO 750
<211> LENGTH: 66
<212> TYPE: DNA
<213> ORGANISM: Artificial Sequence
<220> FEATURE:
<223> OTHER INFORMATION: Primer Ion-BC4-R

<400> SEQUENCE: 750
atcaccgacg caagcctcag tagcgatgga ggtctcagcc tctctatggg cagtcggtga    60
taaaaa                                                               66

<210> SEQ ID NO 751
<211> LENGTH: 75
<212> TYPE: DNA
<213> ORGANISM: Artificial Sequence
<220> FEATURE:
<223> OTHER INFORMATION: Primer Ion-BC5-F

<400> SEQUENCE: 751
tccgatcgca agcctcagta gcgaccatct catccctgcg tgtctccgac tcagtgagcg    60
gaacgatcgg aaaaa                                                     75

<210> SEQ ID NO 752
<211> LENGTH: 66
<212> TYPE: DNA
<213> ORGANISM: Artificial Sequence
<220> FEATURE:
<223> OTHER INFORMATION: Primer Ion-BC5-R

<400> SEQUENCE: 752
atcaccgacg caagcctcag tagcgatgag cgtctcagcc tctctatggg cagtcggtga    60
taaaaa                                                               66

<210> SEQ ID NO 753
<211> LENGTH: 76
<212> TYPE: DNA
<213> ORGANISM: Artificial Sequence
<220> FEATURE:
<223> OTHER INFORMATION: Primer Ion-BC6-F

<400> SEQUENCE: 753

```
tccgatcgca agcctcagta gcgaccatct catccctgcg tgtctccgac tcagccttag    60
agttcgatcg gaaaaa                                                    76
```

<210> SEQ ID NO 754
<211> LENGTH: 66
<212> TYPE: DNA
<213> ORGANISM: Artificial Sequence
<220> FEATURE:
<223> OTHER INFORMATION: Primer Ion-BC6-R

<400> SEQUENCE: 754

```
atcaccgacg caagcctcag tagcgacctt agtctcagcc tctctatggg cagtcggtga    60
taaaaa                                                               66
```

<210> SEQ ID NO 755
<211> LENGTH: 75
<212> TYPE: DNA
<213> ORGANISM: Artificial Sequence
<220> FEATURE:
<223> OTHER INFORMATION: Primer Ion-BC7-F

<400> SEQUENCE: 755

```
tccgatcgca agcctcagta gcgaccatct catccctgcg tgtctccgac tcagtcctcg    60
aatcgatcgg aaaaa                                                     75
```

<210> SEQ ID NO 756
<211> LENGTH: 66
<212> TYPE: DNA
<213> ORGANISM: Artificial Sequence
<220> FEATURE:
<223> OTHER INFORMATION: Primer Ion-BC7-R

<400> SEQUENCE: 756

```
atcaccgacg caagcctcag tagcgatcct cgtctcagcc tctctatggg cagtcggtga    60
taaaaa                                                               66
```

<210> SEQ ID NO 757
<211> LENGTH: 75
<212> TYPE: DNA
<213> ORGANISM: Artificial Sequence
<220> FEATURE:
<223> OTHER INFORMATION: Primer Ion-BC8-F

<400> SEQUENCE: 757

```
tccgatcgca agcctcagta gcgaccatct catccctgcg tgtctccgac tcagaacctc    60
attcgatcgg aaaaa                                                     75
```

<210> SEQ ID NO 758
<211> LENGTH: 66
<212> TYPE: DNA
<213> ORGANISM: Artificial Sequence
<220> FEATURE:
<223> OTHER INFORMATION: Primer Ion-BC8-R

<400> SEQUENCE: 758

```
atcaccgacg caagcctcag tagcgaaacc tgtctcagcc tctctatggg cagtcggtga    60
taaaaa                                                               66
```

<210> SEQ ID NO 759
<211> LENGTH: 17
<212> TYPE: DNA

```
<213> ORGANISM: Artificial Sequence
<220> FEATURE:
<223> OTHER INFORMATION: Primer C-primer

<400> SEQUENCE: 759
tcgctactga ggcttgc                                                    17
```